United States Patent [19]

Morishita et al.

[11] Patent Number: 5,968,175
[45] Date of Patent: Oct. 19, 1999

[54] SOFTWARE USE METHOD CONTROL SYSTEM

[75] Inventors: Akira Morishita, Tokyo; Miwako Doi, Kawasaki; Seiji Miike, Yokohama; Hirofumi Muratani, Kawasaki, all of Japan

[73] Assignee: Kabushiki Kaisha Toshiba, Kawasaki, Japan

[21] Appl. No.: 08/880,396

[22] Filed: Jun. 23, 1997

Related U.S. Application Data

[63] Continuation of application No. 08/749,556, Nov. 15, 1996, abandoned, which is a continuation of application No. 08/412,126, Mar. 28, 1995, abandoned.

[30] Foreign Application Priority Data

Mar. 29, 1994 [JP] Japan .................................. 6-081102
Jun. 17, 1994 [JP] Japan .................................. 6-158213

[51] Int. Cl.$^6$ .................................................. G06F 12/14
[52] U.S. Cl. .................................. 713/200; 380/3; 707/9; 340/825.31
[58] Field of Search ............................. 395/186, 187.01, 395/188.01; 380/3, 4, 23, 25; 340/825.31, 825.32; 364/222.5, 286.4, 286.5; 713/200, 201, 202; 707/9, 10

[56] References Cited

U.S. PATENT DOCUMENTS

| | | | |
|---|---|---|---|
| 4,791,565 | 12/1988 | Dunham | 395/186 |
| 4,941,175 | 7/1990 | Enescu | 380/4 |
| 5,014,234 | 5/1991 | Edwards | 395/186 |
| 5,023,907 | 6/1991 | Johnson | 380/4 |
| 5,027,271 | 6/1991 | Curley | 364/200 |
| 5,073,933 | 12/1991 | Rosenthal | 380/25 |
| 5,103,392 | 4/1992 | Mori | 395/725 |
| 5,291,598 | 3/1994 | Grundy | 395/650 |
| 5,305,456 | 4/1994 | Boitana | 395/700 |
| 5,379,433 | 1/1995 | Yamagishi | 395/725 |
| 5,452,455 | 9/1995 | Brown | 395/700 |
| 5,469,556 | 11/1995 | Clifton | 395/186 |
| 5,483,658 | 1/1996 | Grube | 395/186 X |
| 5,499,379 | 3/1996 | Tanaka et al. | 395/860 |
| 5,506,961 | 4/1996 | Carlson | 395/186 |

FOREIGN PATENT DOCUMENTS

| | | |
|---|---|---|
| 60-77218 | 5/1985 | Japan . |
| 60-191322 | 9/1985 | Japan . |
| 64-68835 | 3/1989 | Japan . |
| 4-64129 | 2/1992 | Japan . |
| 5-334324 | 12/1993 | Japan . |

OTHER PUBLICATIONS

White, Fisch and Pooch, Computer System and Network Security, 1995, pp. 37–51 and 75–89.

Primary Examiner—Dieu-Minh T. Le
Attorney, Agent, or Firm—Oblon, Spivak, McClelland, Maier & Neustadt, P.C.

[57] ABSTRACT

A software use method control system including a storage device and an access controller. The storage device stores information for designating a right to access system resources of operating systems which are to be executed in the software use method control system. The access controller controls access to the system resources of the operating systems. The system also includes a privilege protecting section. The privilege protecting section includes an input receiver for receiving an execution request made by a software user, a program-executing device for executing a program having a right to access all system resources of the operating systems, and a program-execution inhibiting device for determining whether the program-executing device is allowed to executed the program, from the execution request which the input receiver has received, and for inhibiting the program executing device from executing the programs when the programs are not allowed to be executed.

10 Claims, 77 Drawing Sheets

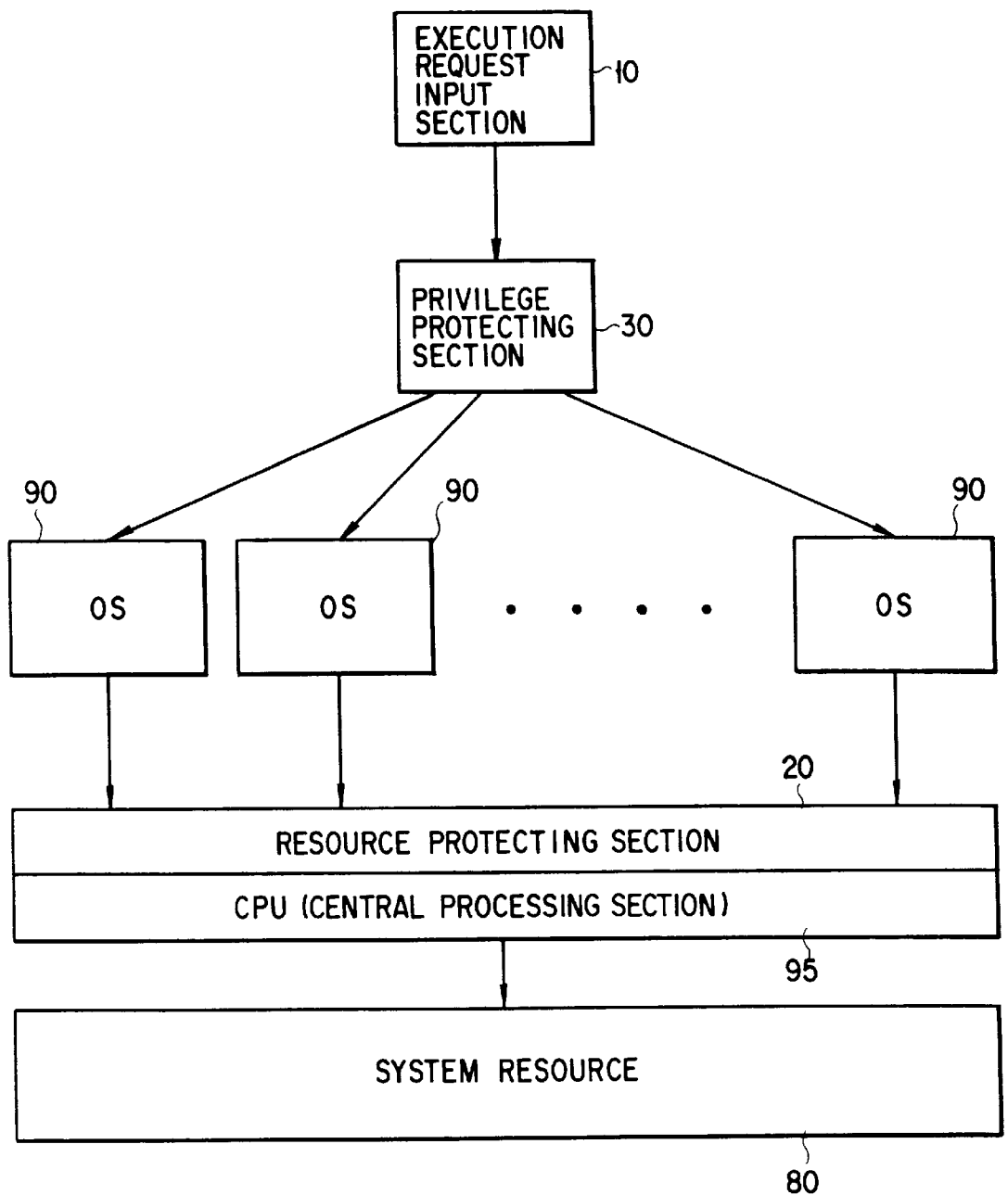
F I G. 1

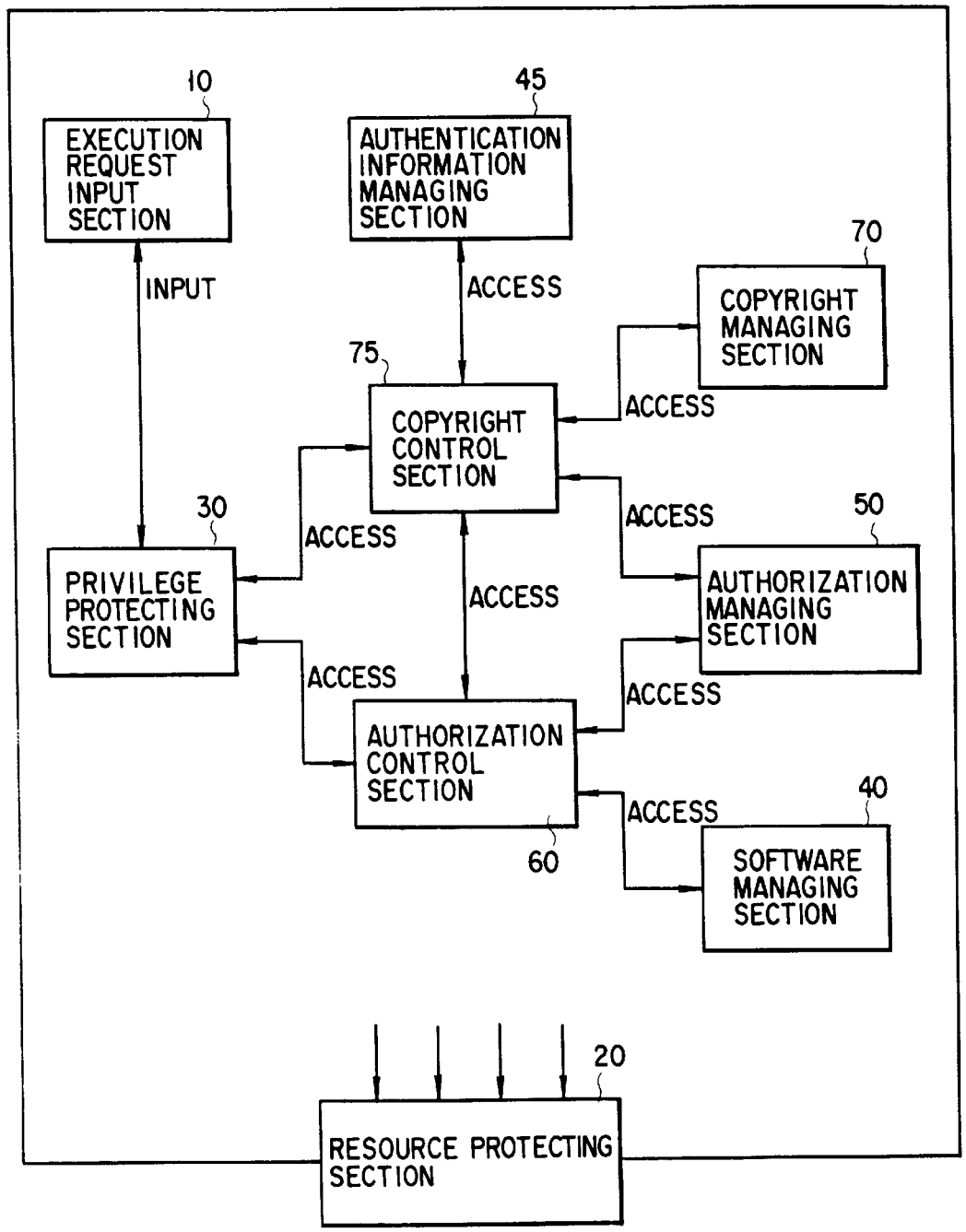
F I G. 2

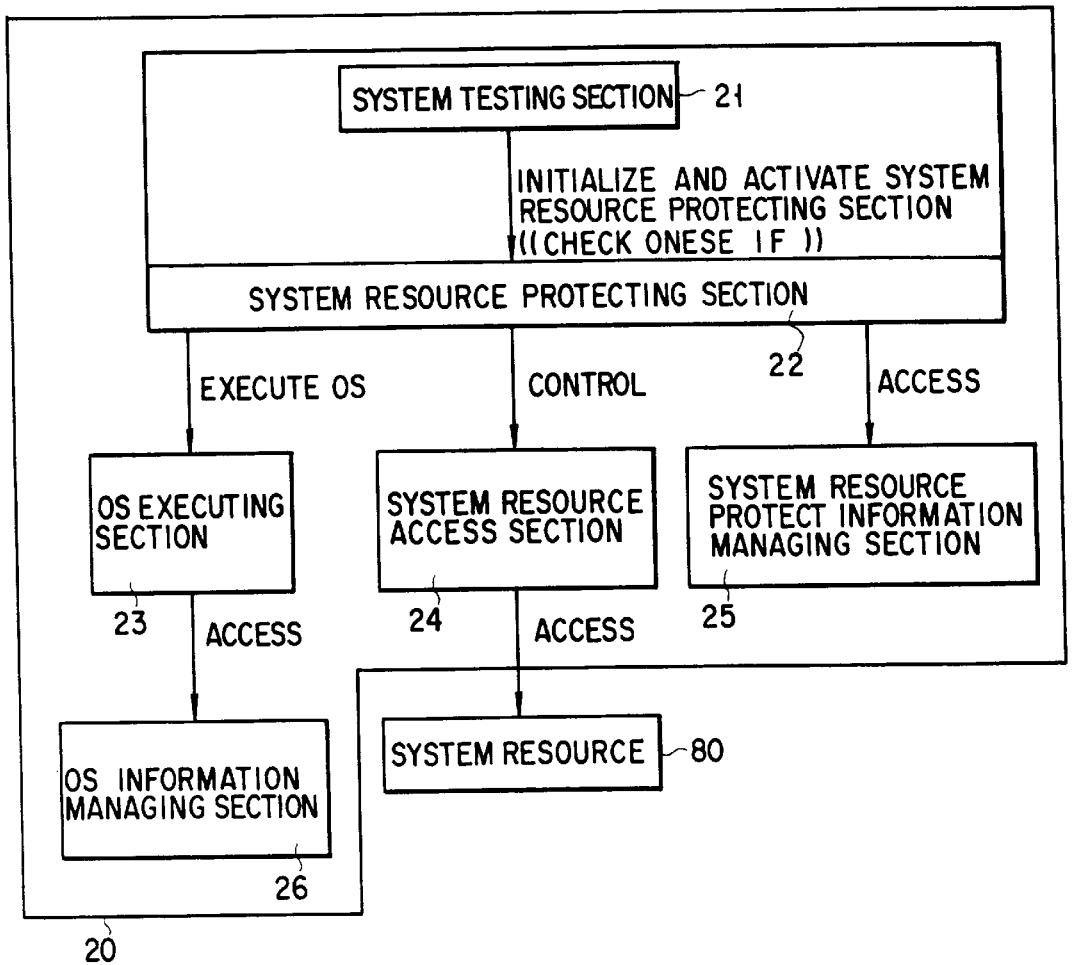
F I G. 3

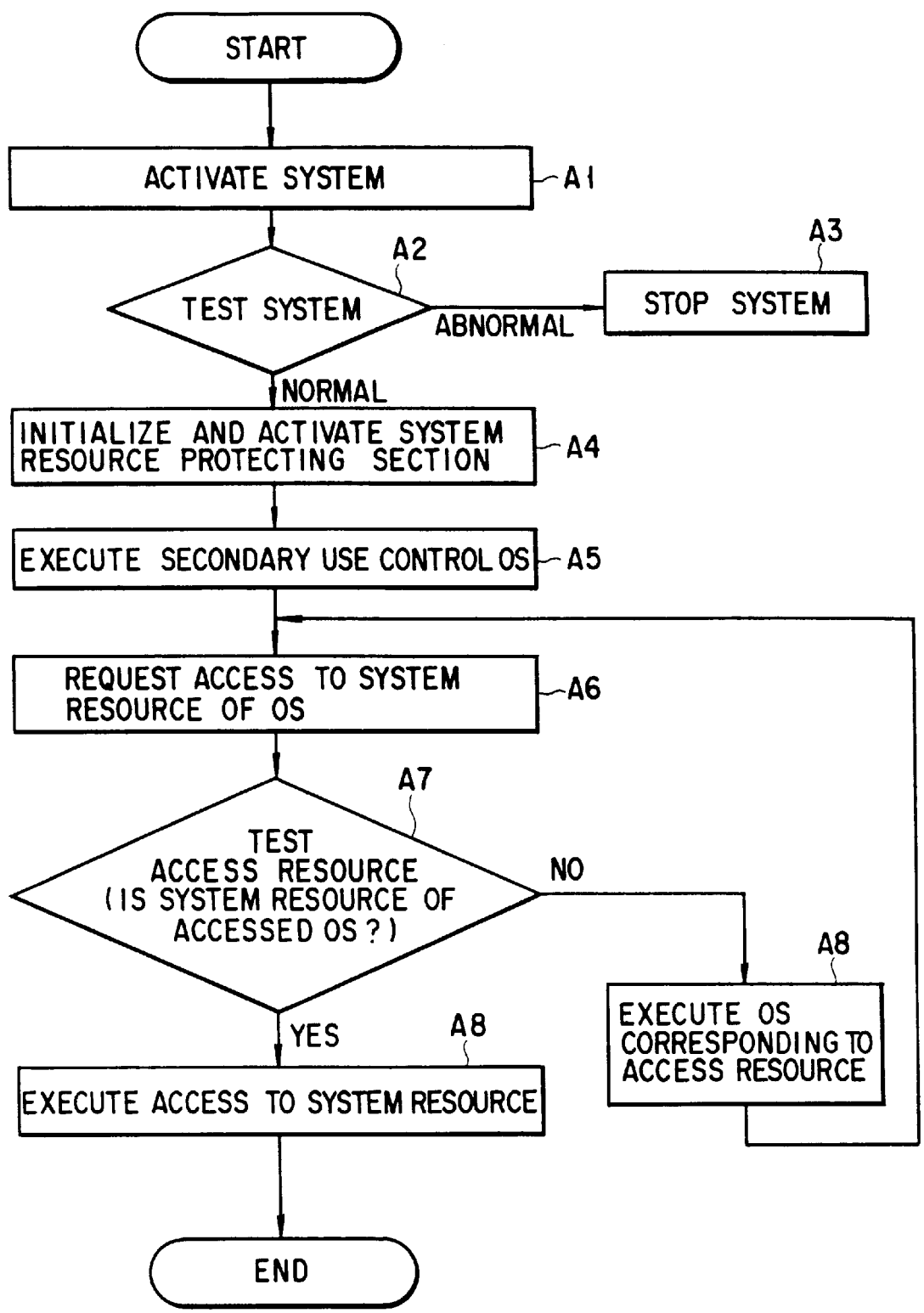
F I G. 7

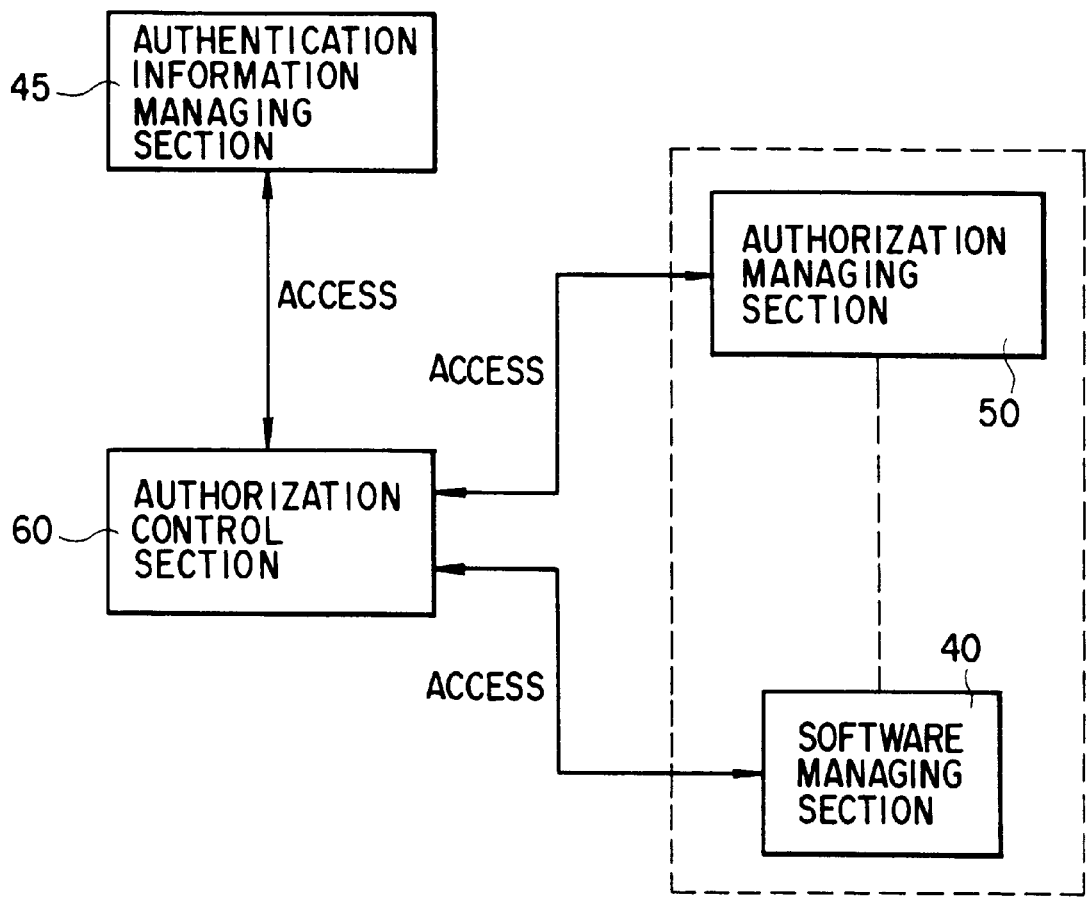
F I G. 8

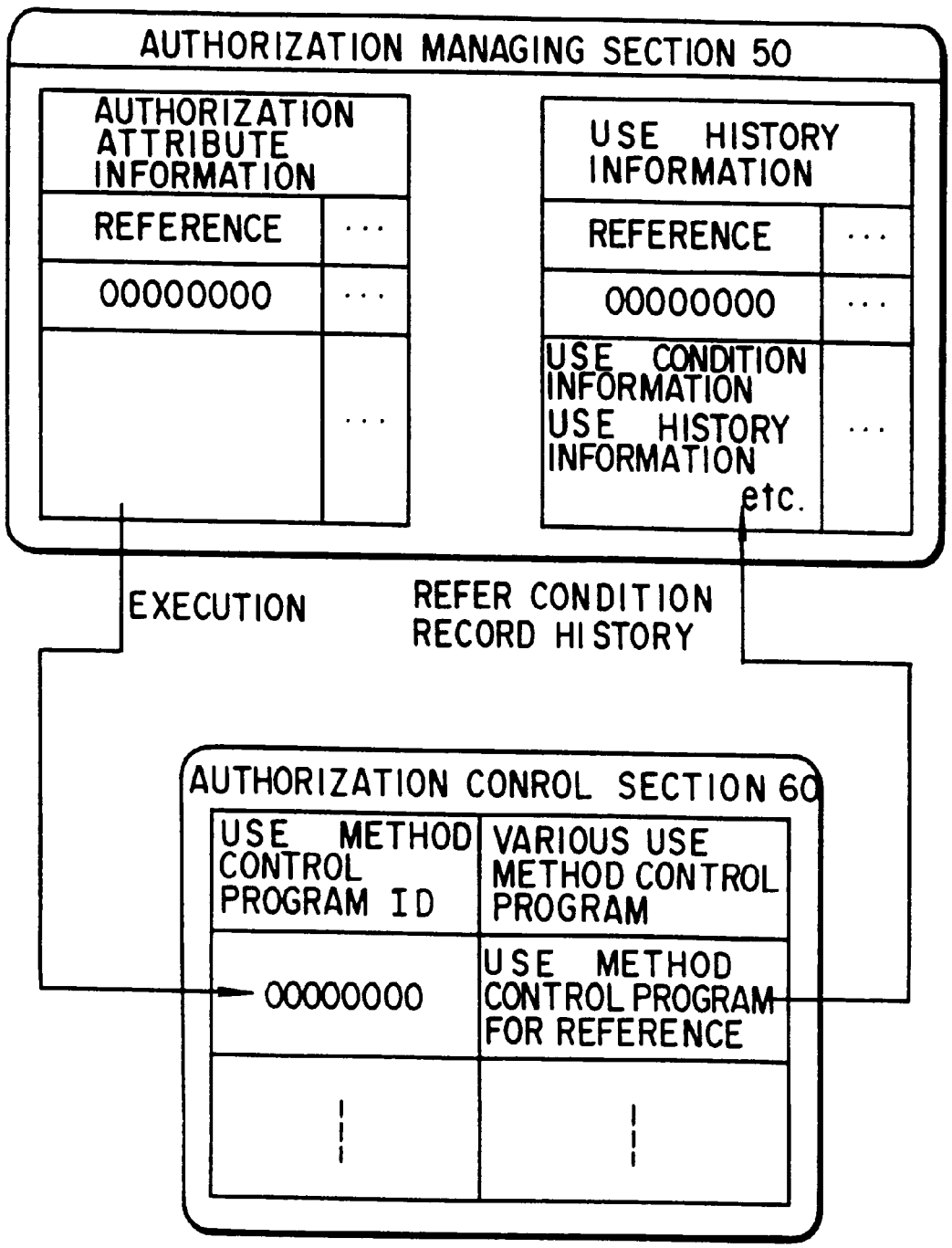
F I G. 10

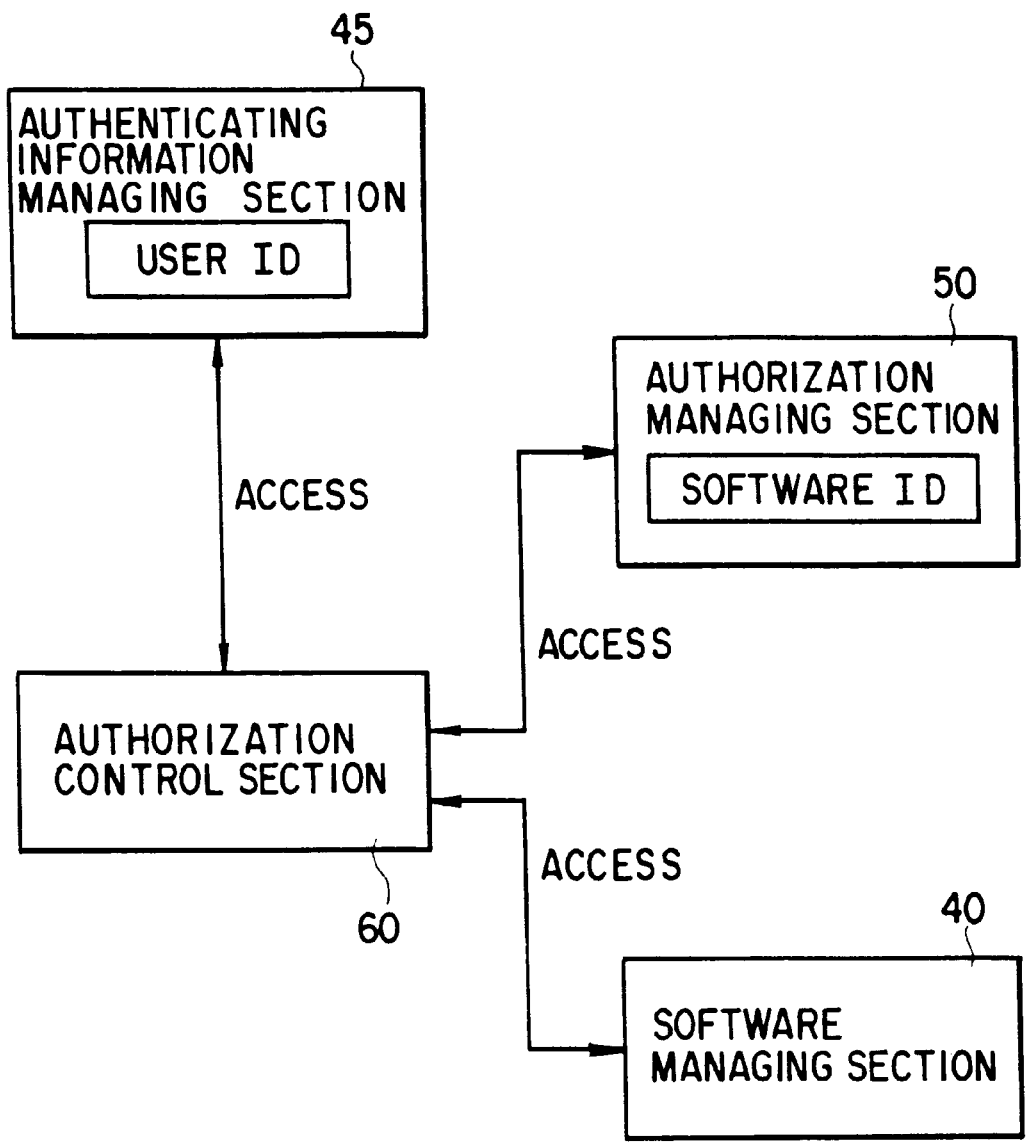
F I G. 13

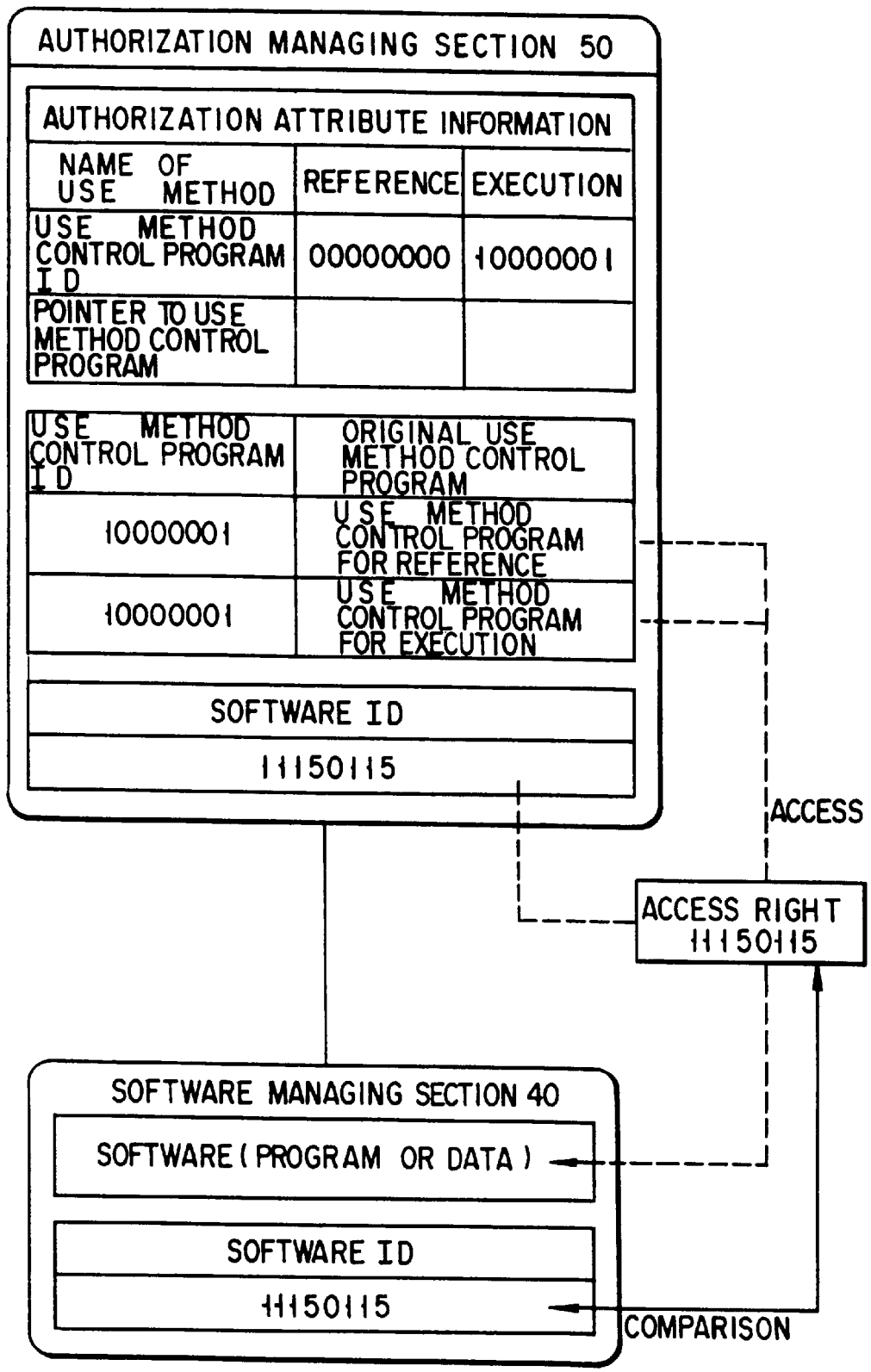
F I G. 14

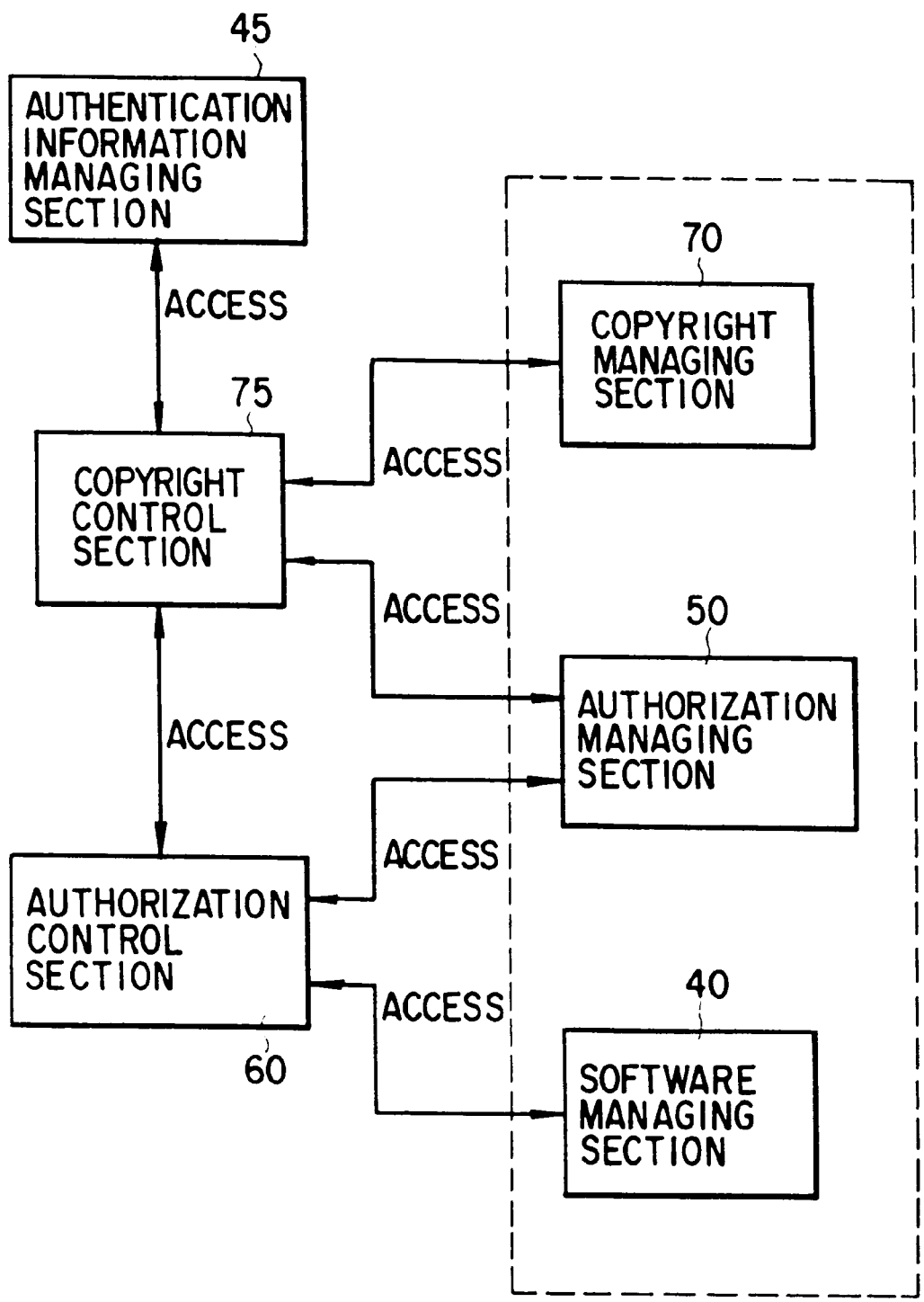
F I G. 15

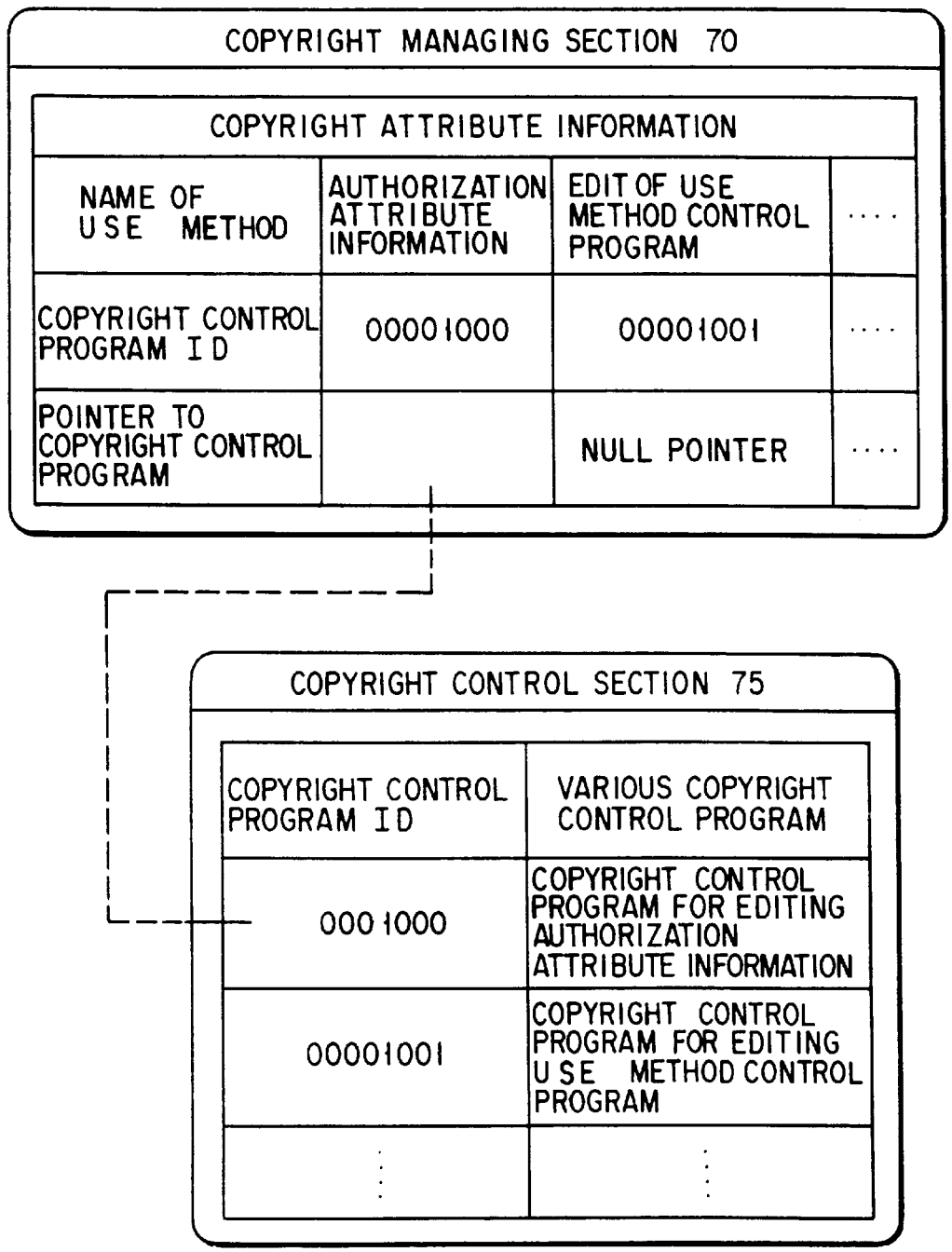
F I G. 16

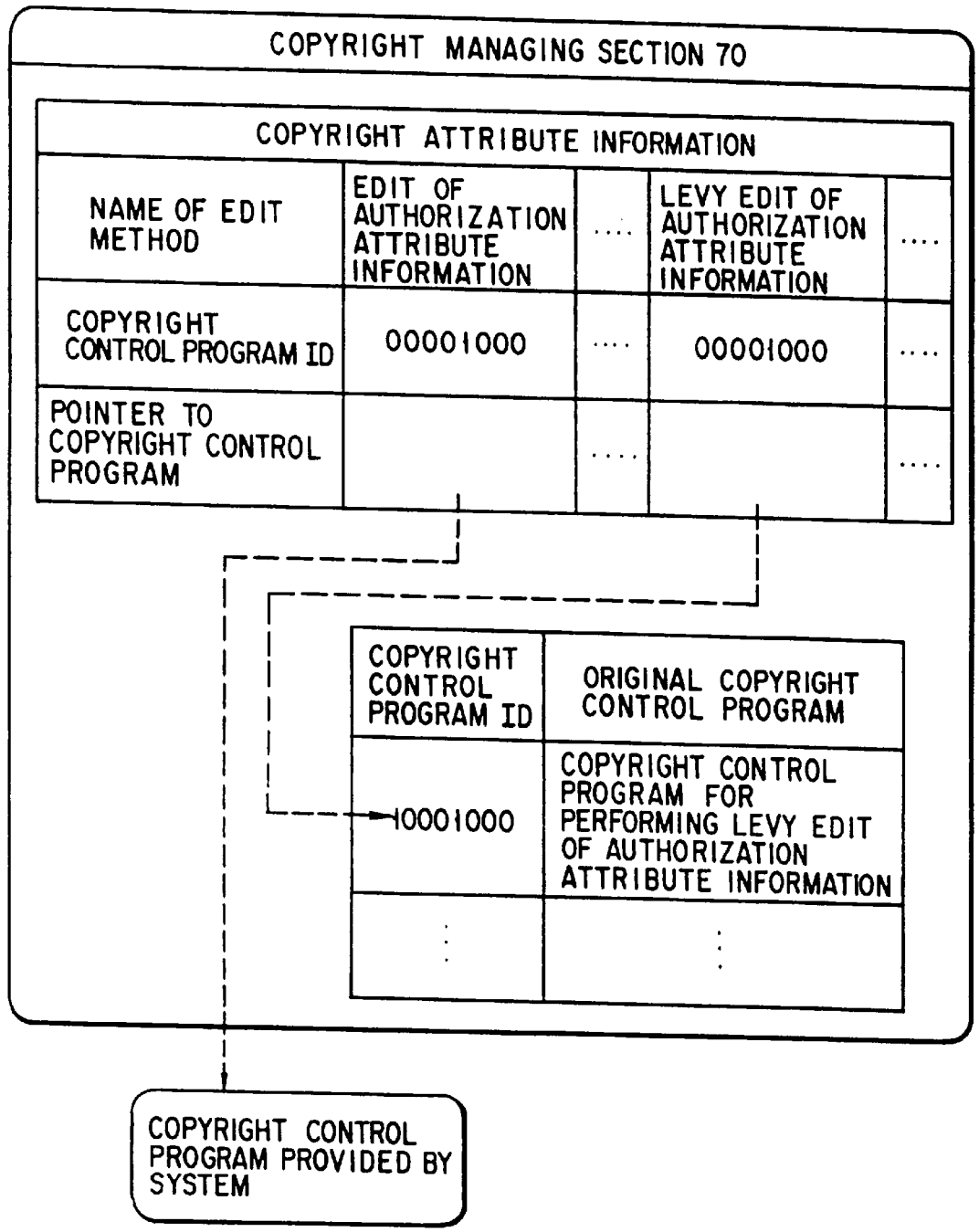
F I G. 18

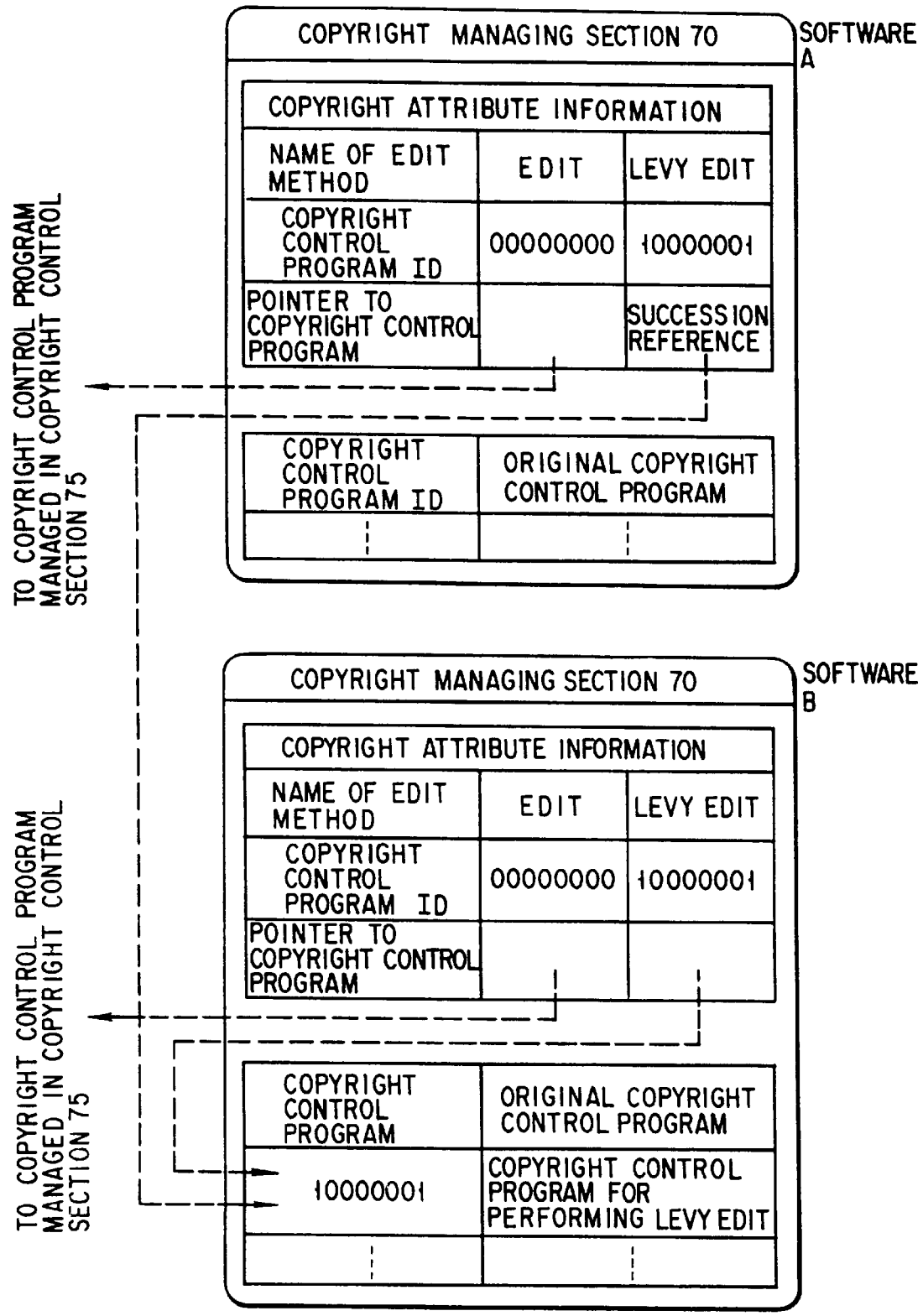
F I G. 19

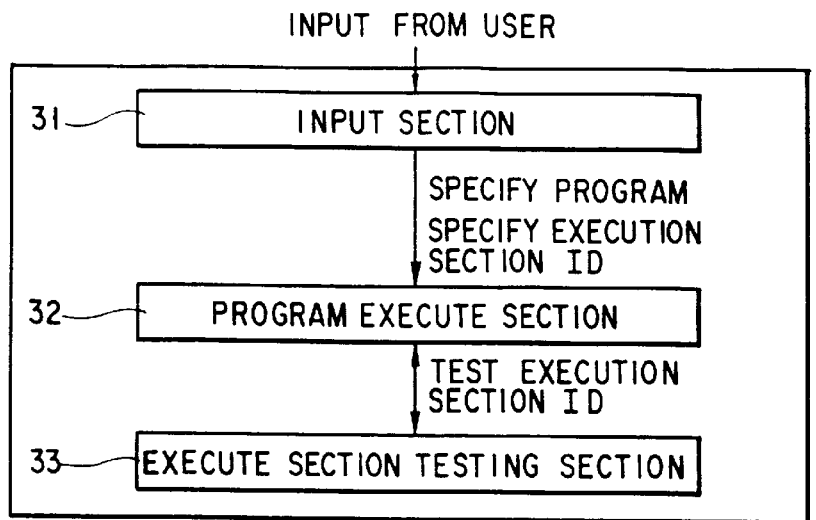
F I G. 20
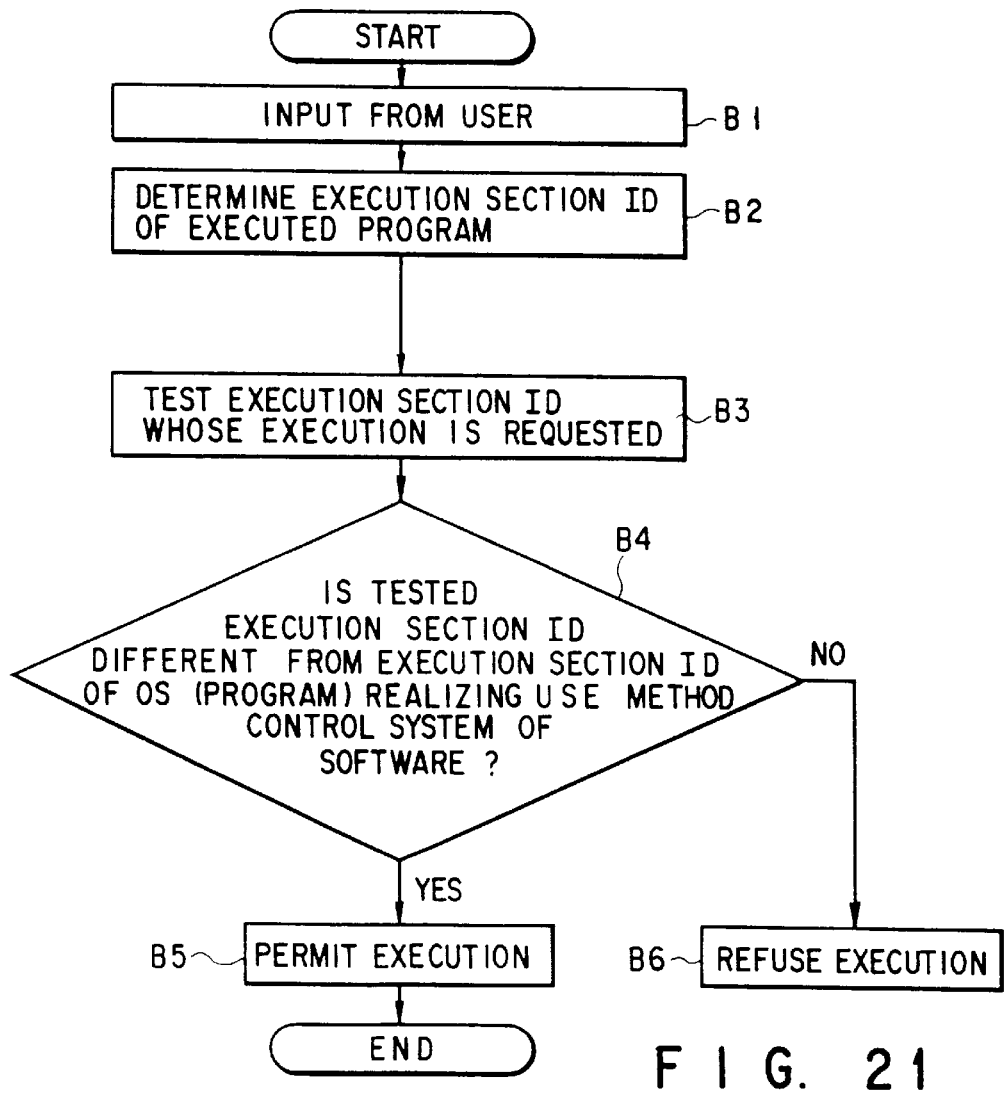
F I G. 21

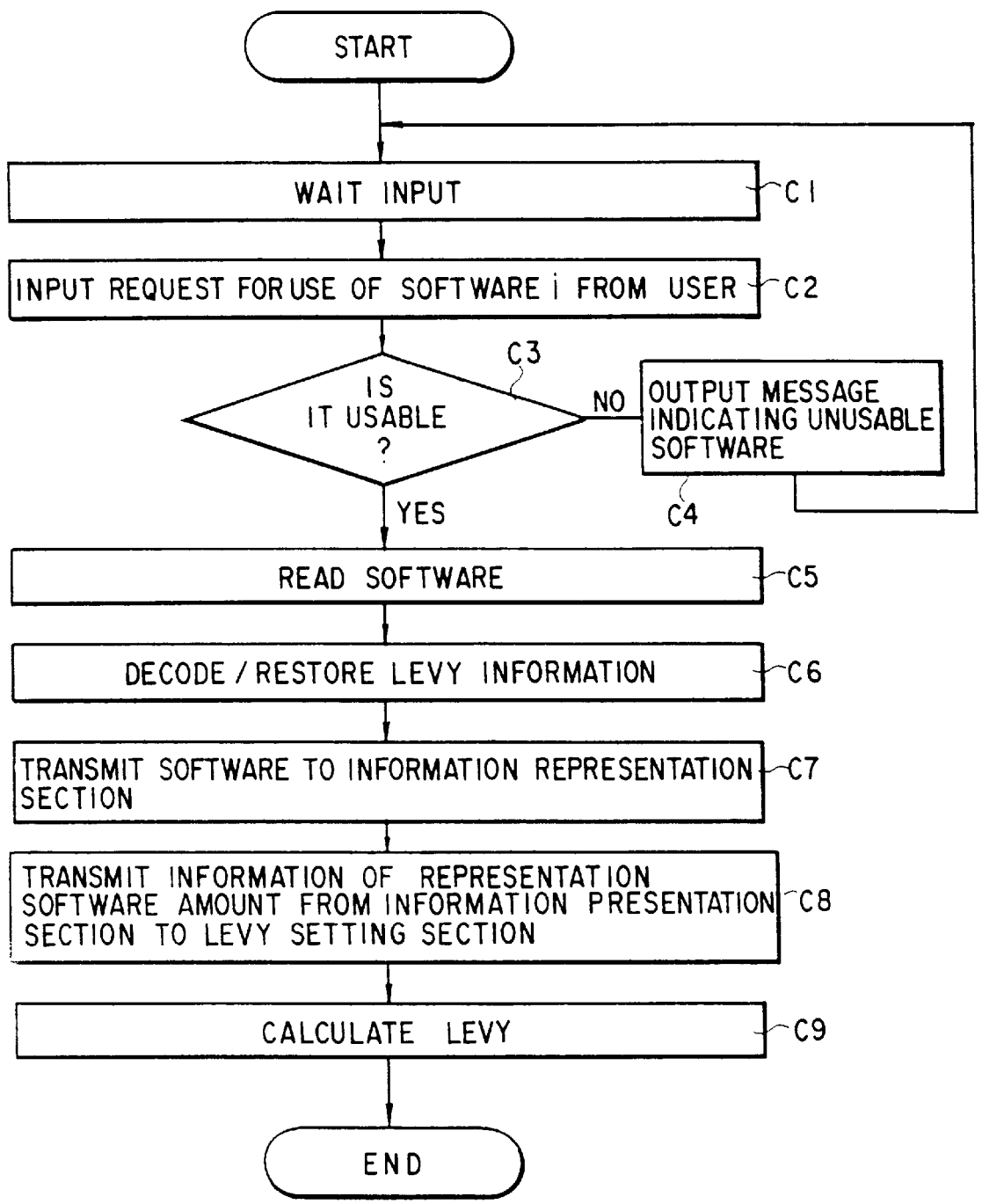
F I G. 24

| START LETTER POSITION | END LETTER POSITION | ACCESS·FLAG |
|---|---|---|
| 1 | 2400 | 1 |
| 2401 | 7200 | 0 |
| 7201 | 9600 | 1 |
| 9601 | 12000 | 0 |

F I G. 25

| START LETTER POSITION | END LETTER POSITION | ACCESS·FLAG |
|---|---|---|
| 1 | 2400 | 1 |
| 2401 | 3600 | 0 |
| 3601 | 7200 | 0 |
| 7201 | 8400 | 1 |
| 8401 | 9600 | 1 |
| 9601 | 12000 | 0 |

F I G. 26

| START LETTER POSITION | END LETTER POSITION | ACCESS·FLAG |
|---|---|---|
| 1 | 2400 | 1 |
| 2401 | 3600 | 0 |
| 3601 | 7200 | 2 |
| 7201 | 8400 | 1 |
| 8401 | 9600 | 1 |
| 9601 | 12000 | 0 |

F I G. 27

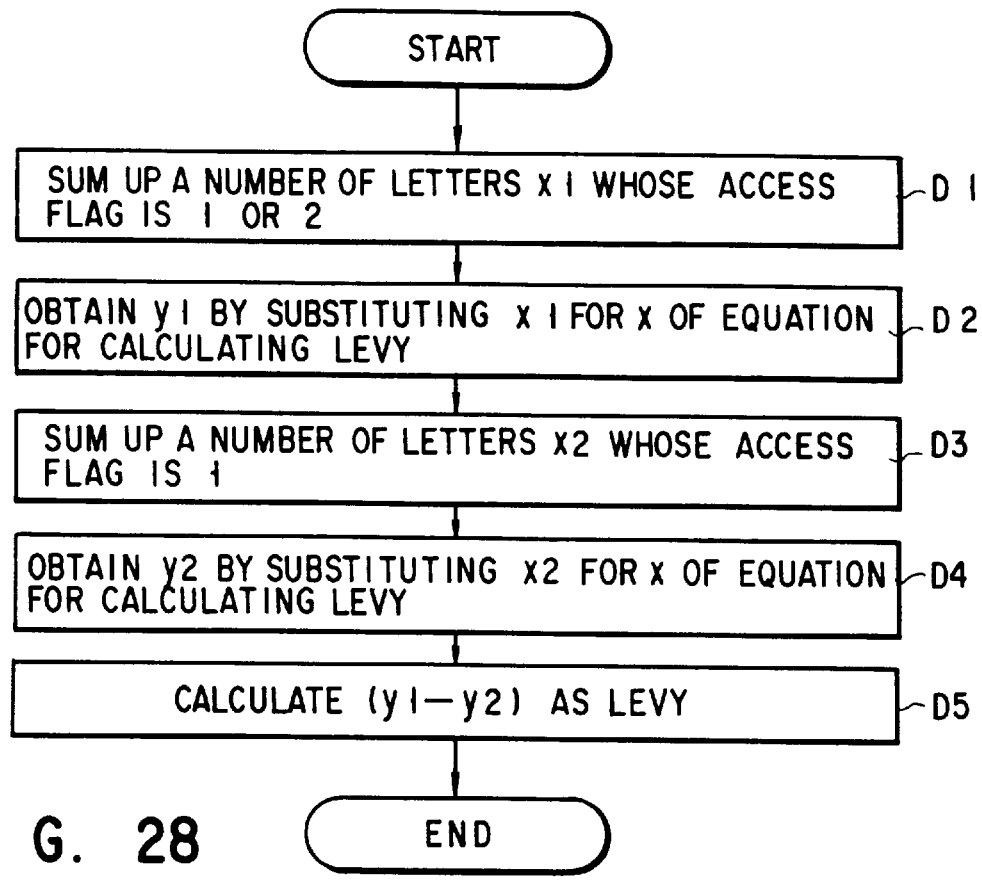
F I G. 28
F I G. 29

```
<FORM> KIND OF INFORMATION 1
        SERIAL NUMBER 1 : POINTER 1.
                . . .
        SERIAL NUMBER n : POINTER n.
        KIND OF INFORMATION k.
        SERIAL NUMBER 1 : POINTER 1.
                . . .
        SERIAL NUMBER m : POINTER m.
        ¥0

<EXAMPLE> NEWS INFORMATION
        NEWS 1 : NEWS POINTER 1.
        NEWS 2 : NEWS POINTER 2.
        NEWS 3 : NEWS POINTER 3.
                . . .
        NEWS n : NEWS POINTER n.
        ADVERTISEMENT INFORMATION
        ADVERTISEMENT 1 : ADVERTISEMENT POINTER 1
        ADVERTISEMENT 2 : ADVERTISEMENT POINTER 2.
        ADVERTISEMENT 3 : ADVERTISEMENT POINTER 3.
                . . .
        ADVERTISEMENT m : ADVERTISEMENT POINTER m.
        ¥0
```

FIG. 32

EDITORIAL : ARGUE FOR COPYRIGHT PROTECTION

---------------
---------------
---------------
---------------
-----(TEXT)-----
---------------
---------------
---------------
---------------

---[AD]---------------------

A XXX FOR HOUSE. (ISDN TERMINAL , 98,000)

A YYY FOR A PERSON. (PERSONAL INFORMATION DEVICE, 19,000)

BUY AT YOUR NEAR ELECTRIC APPLIANCE STORE IF YOU NEED. SHIN XX DENKI.

FIG. 34

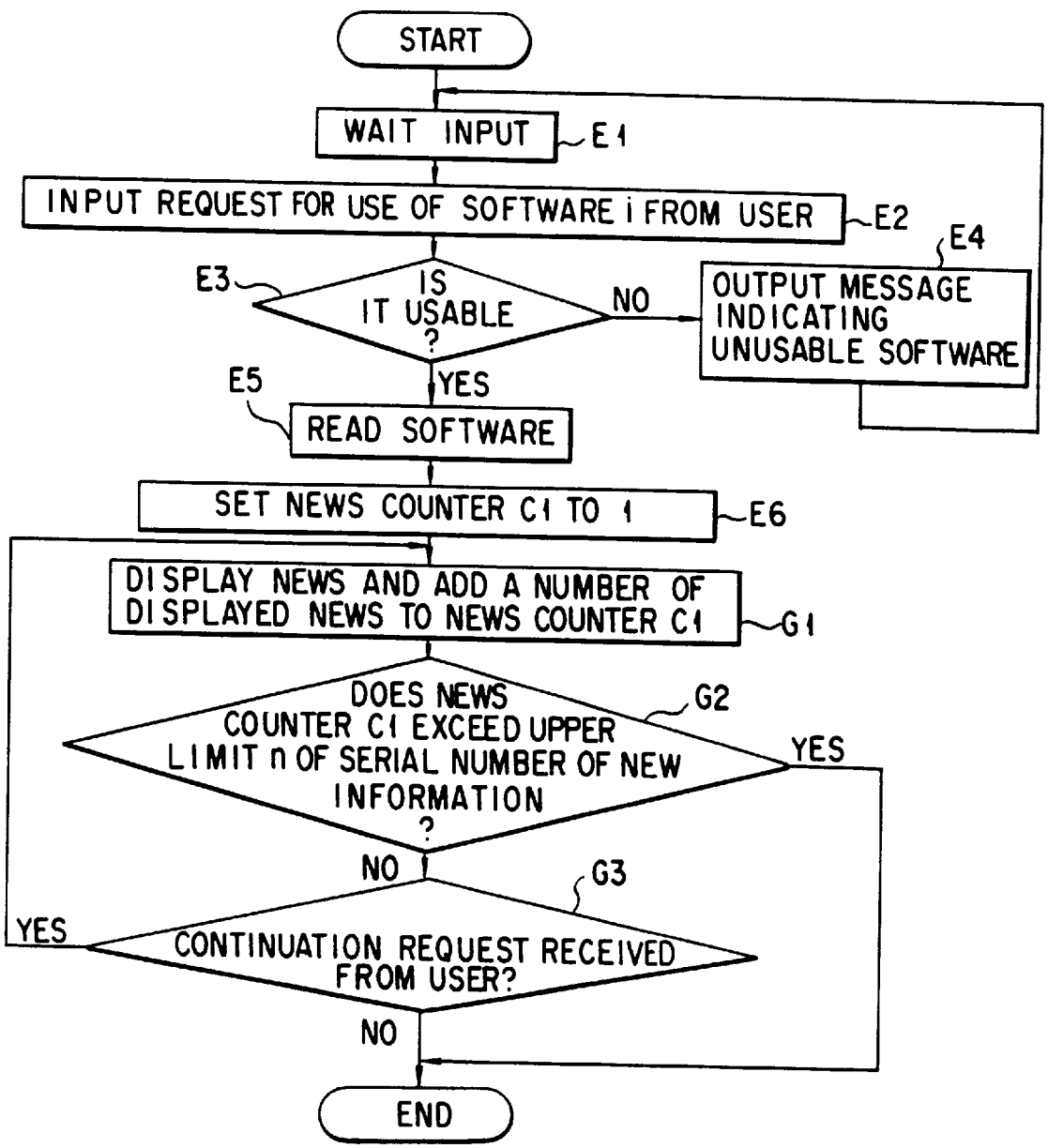
F I G. 36

| NEWS INFORMATION : 30. |
| NEWS 1 : NEWS POINTER 1. |
| NEWS 2 : NEWS POINTER 2. |
| NEWS 3 : NEWS POINTER 3. |
| ... |
| NEWS 30 : NEWS POINTER 30. |
| ADVERTISEMENT INFORMATION : 20 |
| ADVERTISEMENT 1 : ADVERTISEMENT POINTER 1. |
| ADVERTISEMENT 2 : ADVERTISEMENT POINTER 2. |
| ADVERTISEMENT 3 : ADVERTISEMENT POINTER 3. |
| ... |
| ADVERTISEMENT 20 : ADVERTISEMENT POINTER 20. |
| ¥0 |

FIG. 40A

| ☐ NEWS | TOTAL NUMBER OF CASES : 30 | CASES WHICH HAVE SEEN : 0 | CASES WHICH HAVE NOT SEEN : 30 |
| --- | --- | --- | --- |
| ☐ NEWS | TOTAL NUMBER OF CASES : 20 | CASES WHICH HAVE SEEN : 0 | CASES WHICH HAVE NOT SEEN : 20 |

FIG. 40B

| ☐ NEWS | TOTAL NUMBER OF CASES : 30 | CASES WHICH HAVE SEEN : 3 | CASES WHICH HAVE NOT SEEN : 27 |
| --- | --- | --- | --- |
| ☐ NEWS | TOTAL NUMBER OF CASES : 20 | CASES WHICH HAVE SEEN : 0 | CASES WHICH HAVE NOT SEEN : 20 |

FIG. 40C

| ☐ NEWS | TOTAL NUMBER OF CASES : 30 | CASES WHICH HAVE SEEN : 0 | CASES WHICH HAVE NOT SEEN : 30 |
| --- | --- | --- | --- |
| ☐ NEWS | TOTAL NUMBER OF CASES : 20 | CASES WHICH HAVE SEEN : 2 | CASES WHICH HAVE NOT SEEN : 18 |

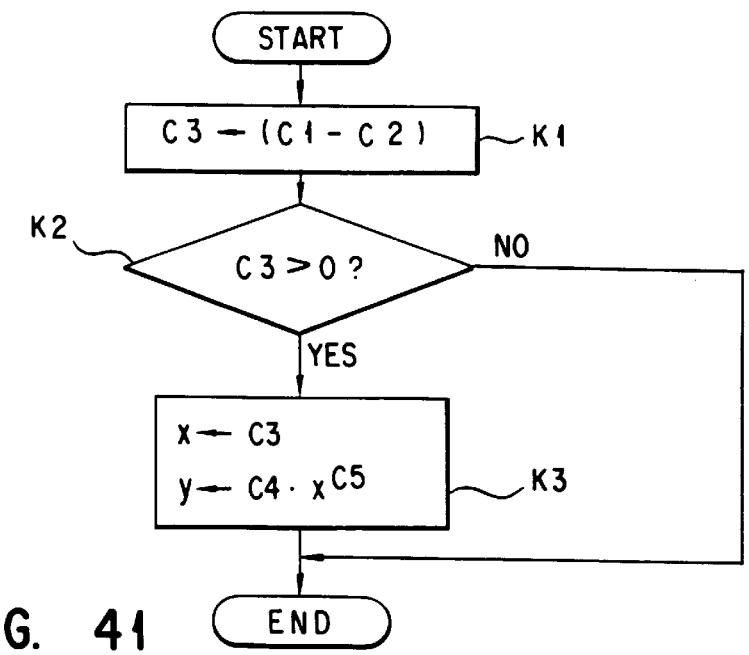
F I G. 41
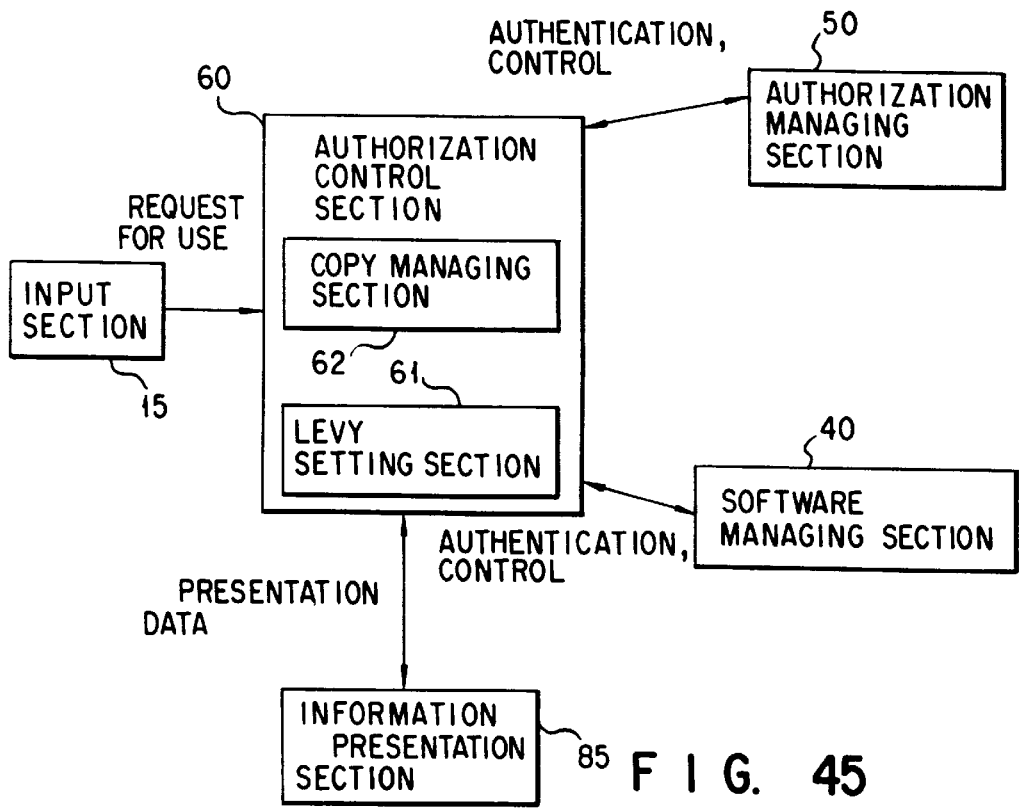
F I G. 45

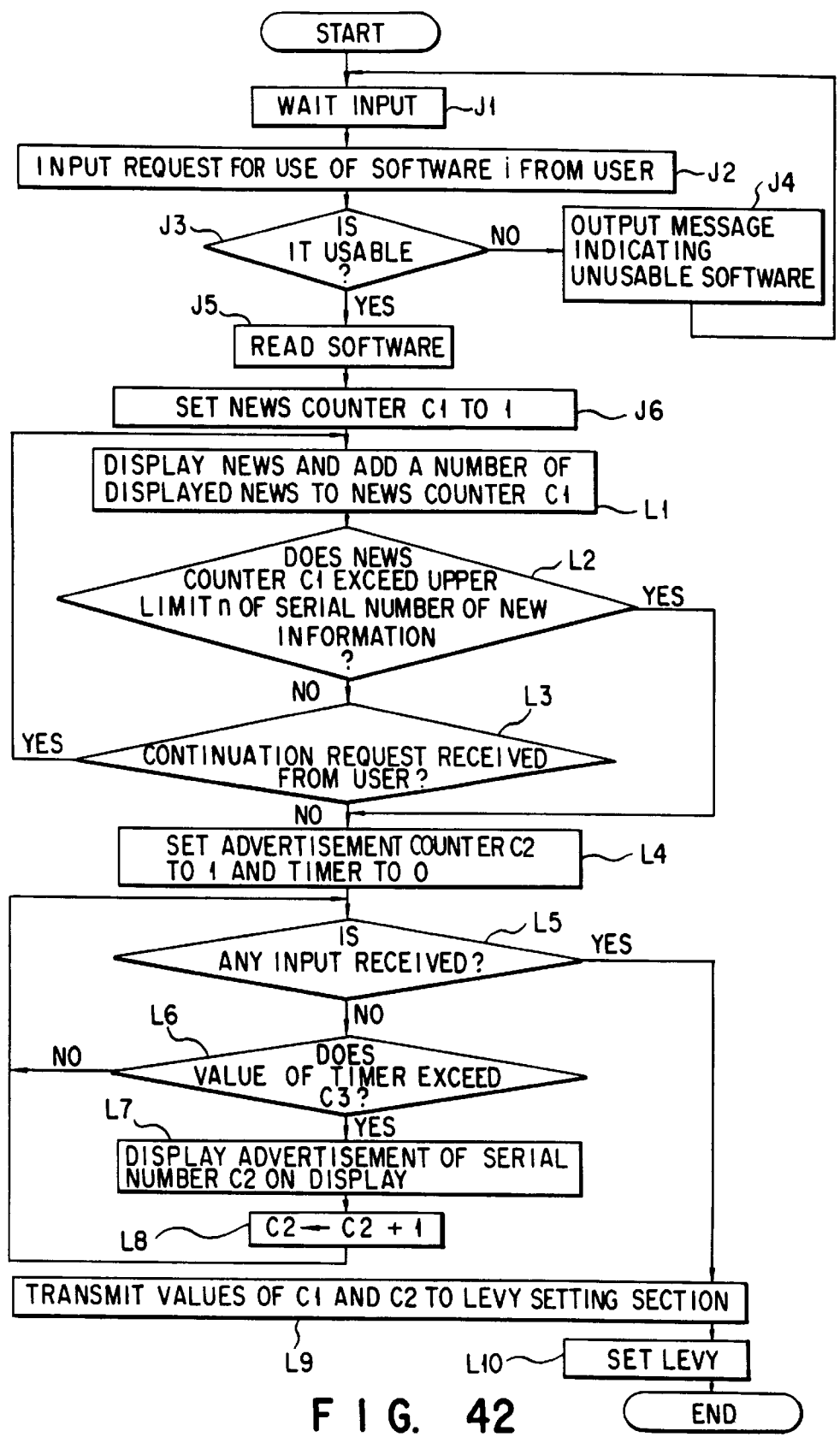
F I G. 42

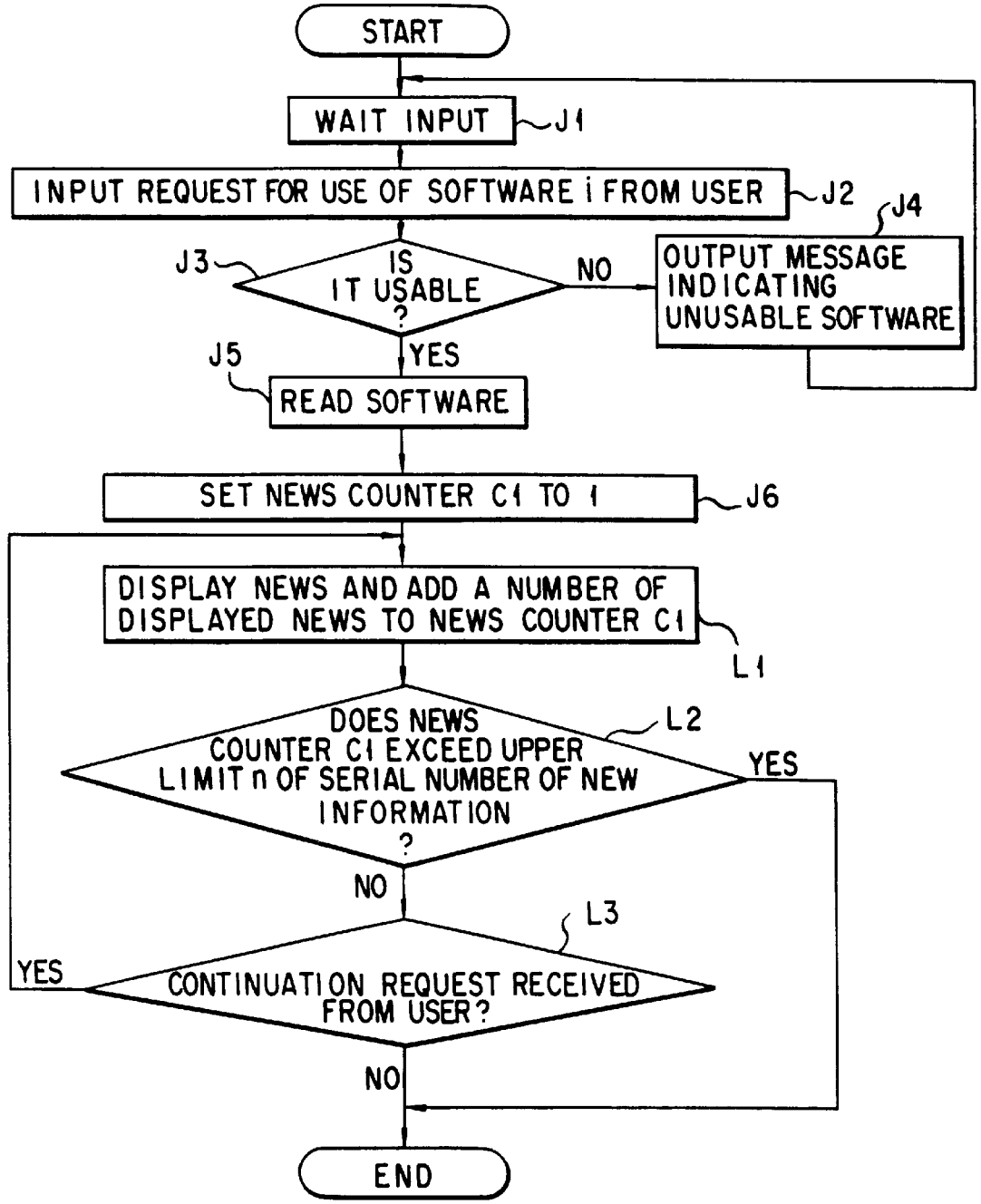
F I G. 43

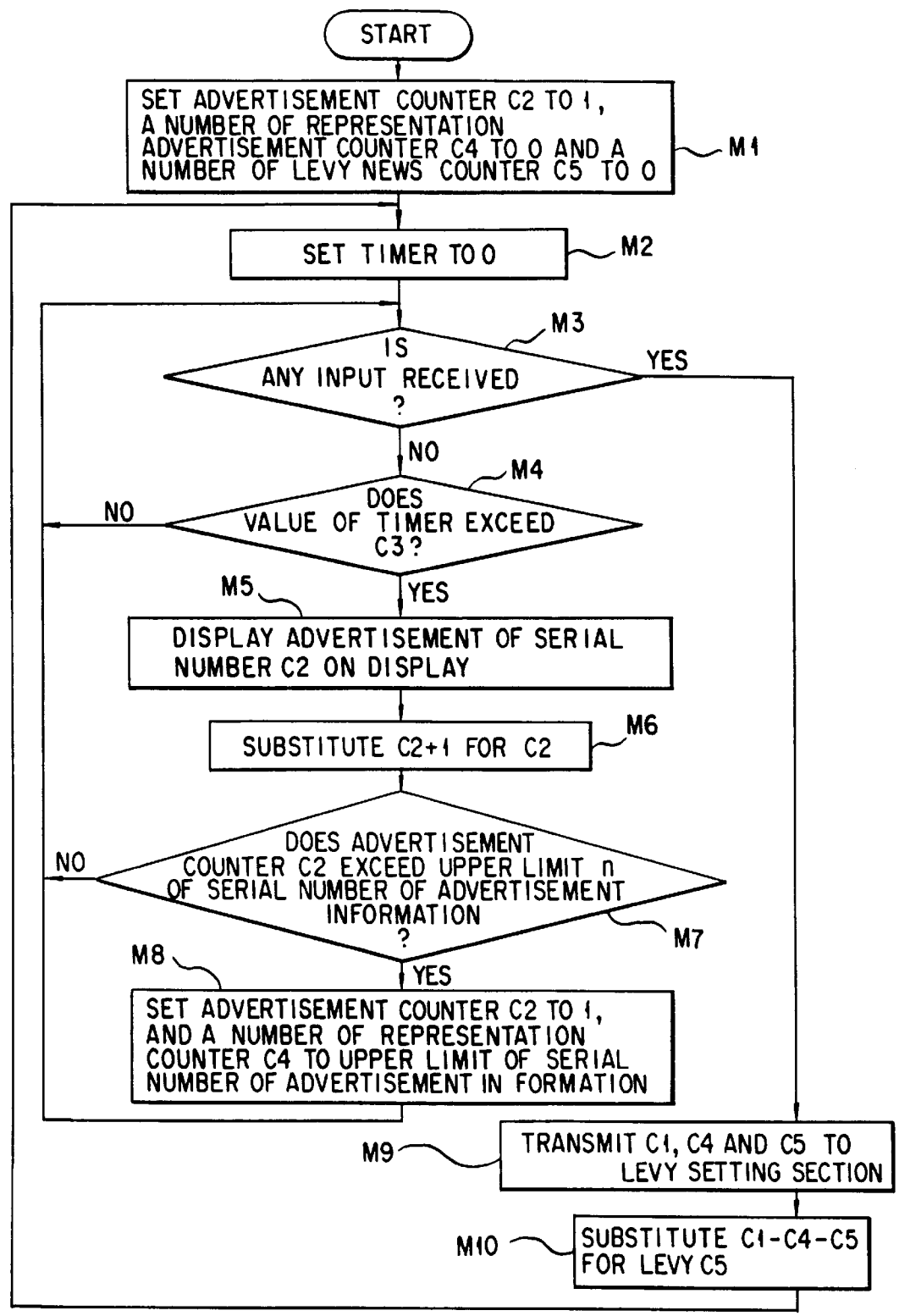
F I G. 44

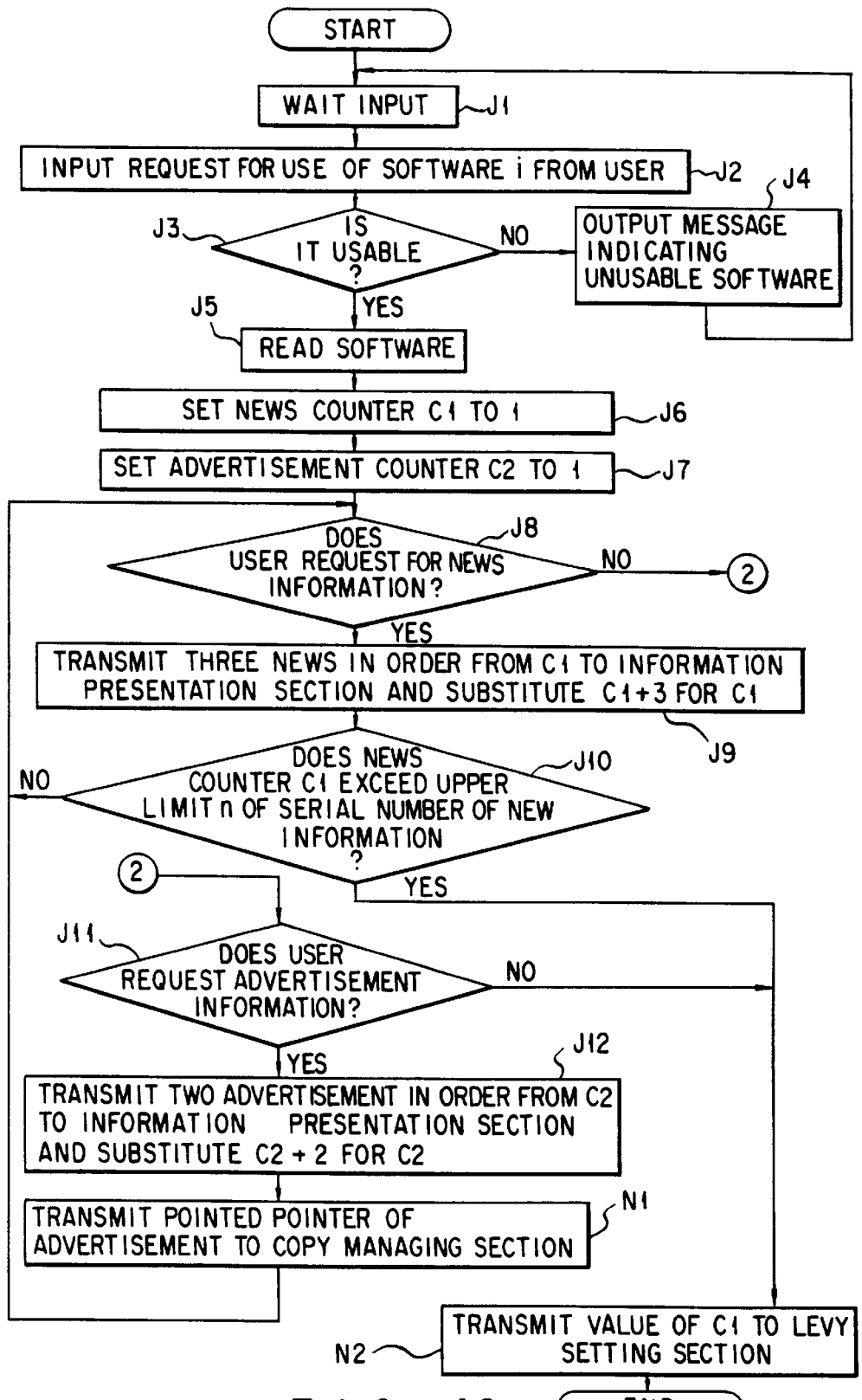
F I G. 46

```
<FORM>      KIND OF INFORMATION
            SERIAL NUMBER 1 : POINTER 1 : POINT 1.
                ...
            SERIAL NUMBER n : POINTER n : POINT n.
            KIND OF INFORMATION k.
            SERIAL NUMBER 1 : POINTER 1 : POINT 1.
                ...
            SERIAL NUMBER m : POINTER m : POINT m.
            ¥0

<EXAMPLE>   NEWS INFORMATION : 30.
            NEWS 1 : NEWS POINTER 1 : 0.7.
            NEWS 2 : NEWS POINTER 2 : 1.2.
            NEWS 3 : NEWS POINTER 3 : 1.5.
                ...
            NEWS 30 : NEWS POINTER 30 : 0.8.
            ADVERTISEMENT POINTER : 20.
            ADVERTISEMENT 1 : ADVERTISEMENT POINTER 1 : 0.5.
            ADVERTISEMENT 2 : ADVERTISEMENT POINTER 2 : 1.0.
            ADVERTISEMENT 3 : ADVERTISEMENT POINTER 3 : 0.6.
                ...
            ADVERTISEMENT 20 : ADVERTISEMENT POINTER 20 : 0.8.
            ¥0
```

FIG. 49

```
<EXAMPLE>   NOVEL : 10.
             PROLOGUE : POINTER 1 : 0.5.
             FIRST CHAPTER POINTER 2 : 0.7.
             SECOND CHAPTER POINTER 3 : 0.7.
                 . . .
             EPILOGUE : POINTER 10 : 3.9.
             ¥ 0
```

F I G. 50

```
<FORM>    KIND OF INFORMATION.
          SERIAL NUMBER 1 :    INDEX POINTER 1 :    TEXT POINTER 1.
          SERIAL NUMBER 2 :    INDEX POINTER 2 :    TEXT POINTER 2.
                . . .
          SERIAL NUMBER n :    INDEX POINTER n :    TEXT POINTER n.

<EXAMPLE> NEWS INFORMATION : 30.
          NEWS 1 : NEWS INDEX POINTER 1 : NEWS TEXT POINTER 1.
          NEWS 2 : NEWS INDEX POINTER 2 : NEWS TEXT POINTER 2.
          NEWS 3 : NEWS INDEX POINTER 3 : NEWS TEXT POINTER 3.
                . . .
          NEWS 30 : NEWS INDEX POINTER 30 : NEWS TEXT POINTER 30.
          ¥ 0
```

F I G. 52

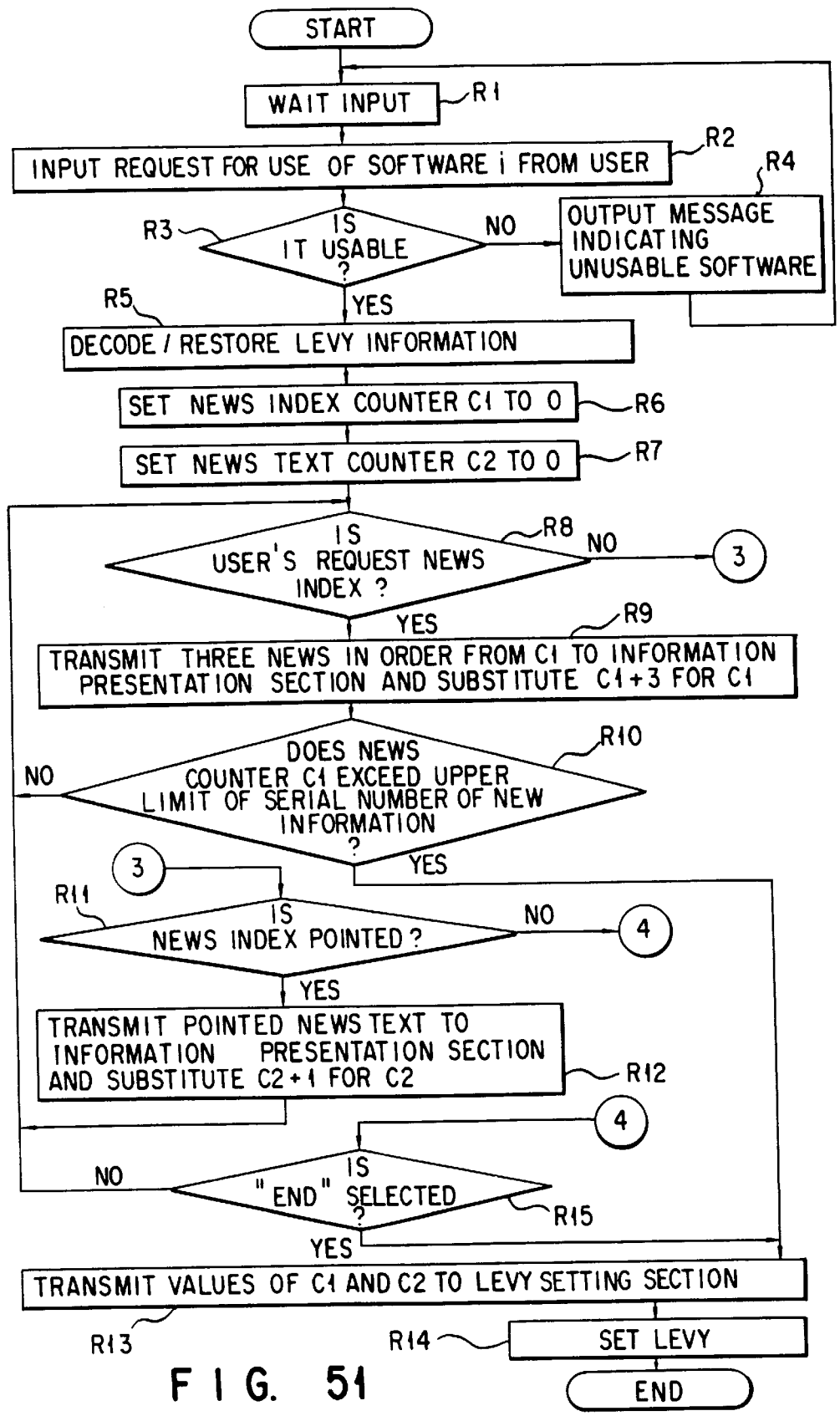
F I G. 51

☐ NEXT INDEX  ☐ END
- - - - - - - - - - - - - - - - - - - -

1 ☐ JAPANESE - AMERICAN TRADE NEGOTIATION IS AGREED

2 ☐ XX VISITS CHINA

3 ☐ SENSATION OF SHORT RICE STOCK DOES DOWN

F I G. 53

<FORM>  SERIAL NUMBER 1 : TITLE : POINTER1 : POINT 1.

SERIAL NUMBER 2 : TITLE : POINTER2 : POINT 2.

...

SERIAL NUMBER n : TITLE : POINTER n : POINT n.

<EXAMPLE> 1 : MORNING PAPER OF XX NEWSPAPER 3/22 : POINTER 1 : 30.

2 : WEEKLY MONDAY 3/21 : POINTER 2 : 50.

3 : MONTHLY YYY 3/22 : POINTER 3 : 100.

...

30 : NEW BOOK "JAPAN IN 21 CENTURY" : POINTER 30 : 440.

¥ 0

F I G. 54

```
☐ NEXT INDEX    ☐ END
-------------------------------------------
    1   ☐  MORNING PAPER OF XX NEWSPAPER 3/22
    2   ☐  WEEKLY MONDAY 3/21
    3   ☐  MONTHLY YYY 3/22
```

F I G. 55

```
<FORM>      SERIAL NUMBER 1 : TITLE : POINTER 1 : SUBTITLE POINTER 1.
            SERIAL NUMBER 2 : TITLE : POINTER 2 : SUBTITLE POINTER 2.
            ...
            SERIAL NUMBER n : TITLE : POINTER n : SUBTITLE POINTER n.

<EXAMPLE>   1: 「XX」(AMERICAN FILM) : POINTER 1 : SUBTITLE POINTER 1.
            2: 「YY」(FRENCH FILM) : POINTER 2 : SUBTITLE POINTER 2.
            ...
            30: 「ZZ」(JAPANESE FILM) : POINTER 30.
            ¥0
```

F I G. 56

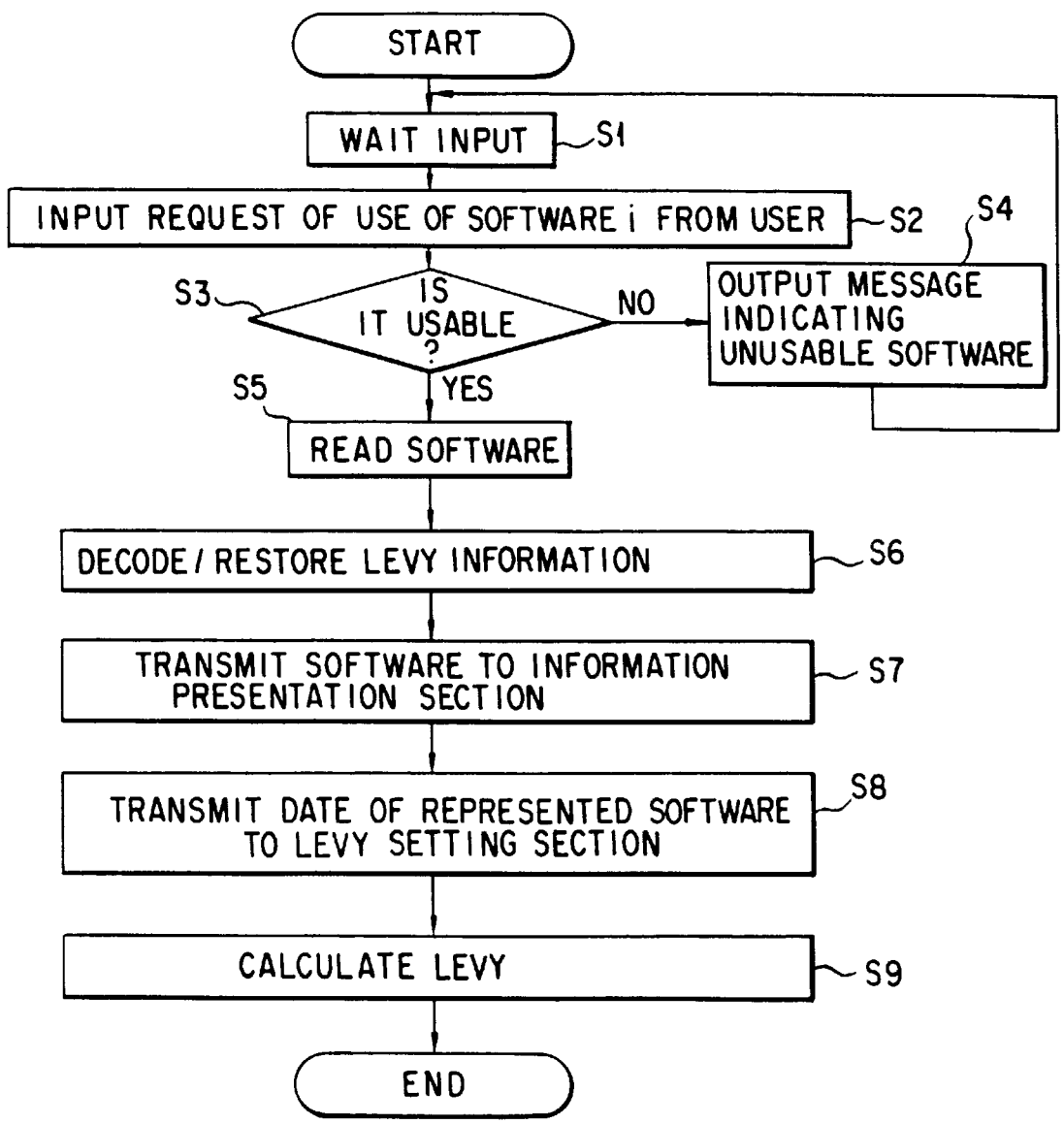
F I G. 58

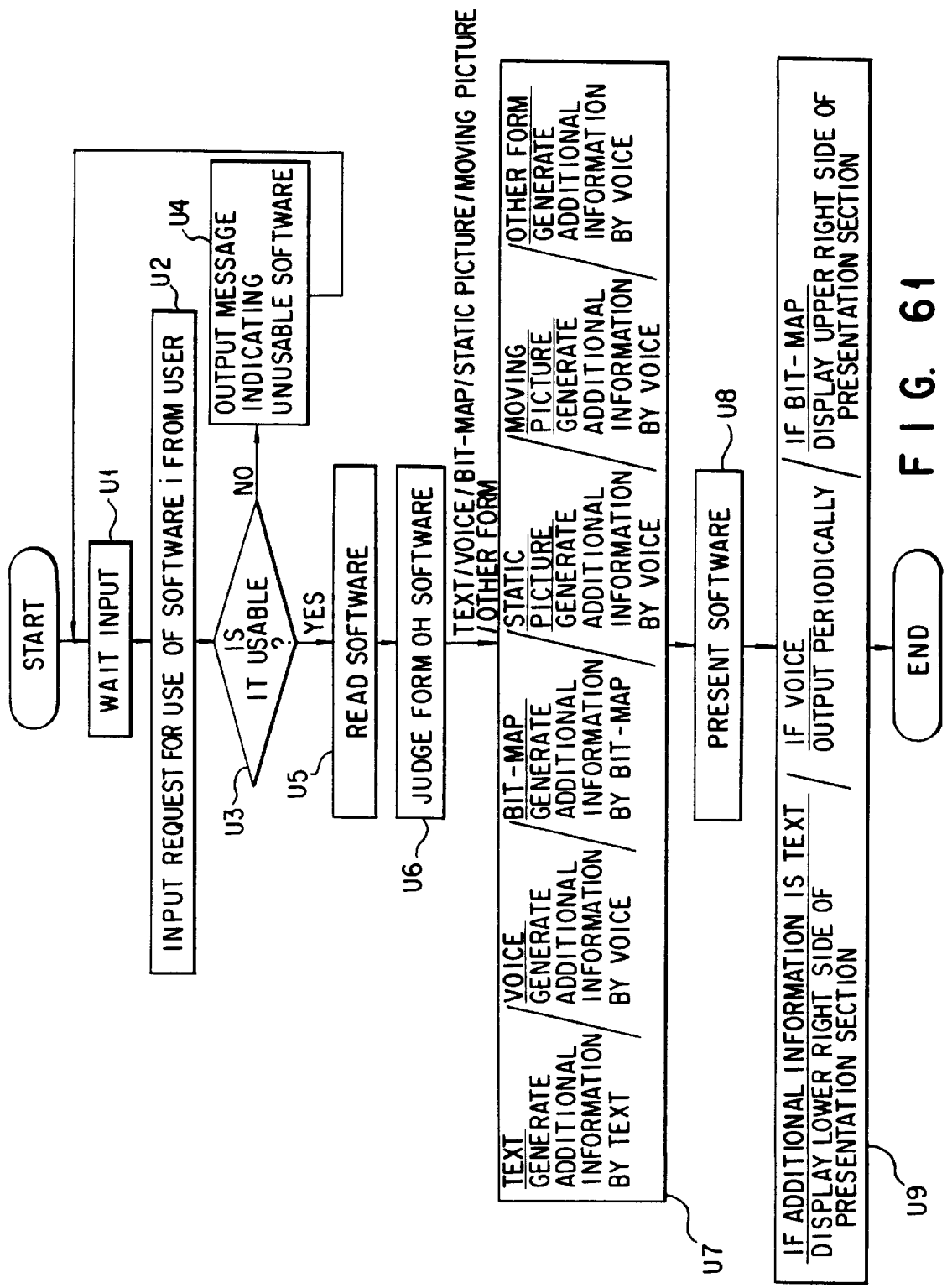
F I G. 61

| FORM OF SOFTWARE | FORM OF ADDITIONAL INFORMATION |
|---|---|
| TEXT | TEXT |
| VOICE | VOICE |
| BIT-MAP | BIT-MAP |
| STATIC PICTURE | VOICE |
| MOVING PICTURE | VOICE |
| OTHER FORM | VOICE |

F I G. 62

| FORM OF ADDITIONAL INFORMATION | REPRESENTATION PLACE | REPRESENTATION PERIOD | SIZE |
|---|---|---|---|
| TEXT | LOWER RIGHT SIDE | ALWAYS | 9 |
| VOICE | SPEAKER | 3 MINUTES ETC. | 10db |
| BIT-MAP | UPPER RIGHT SIDE | ALWAYS | 24 dot |

F I G. 63

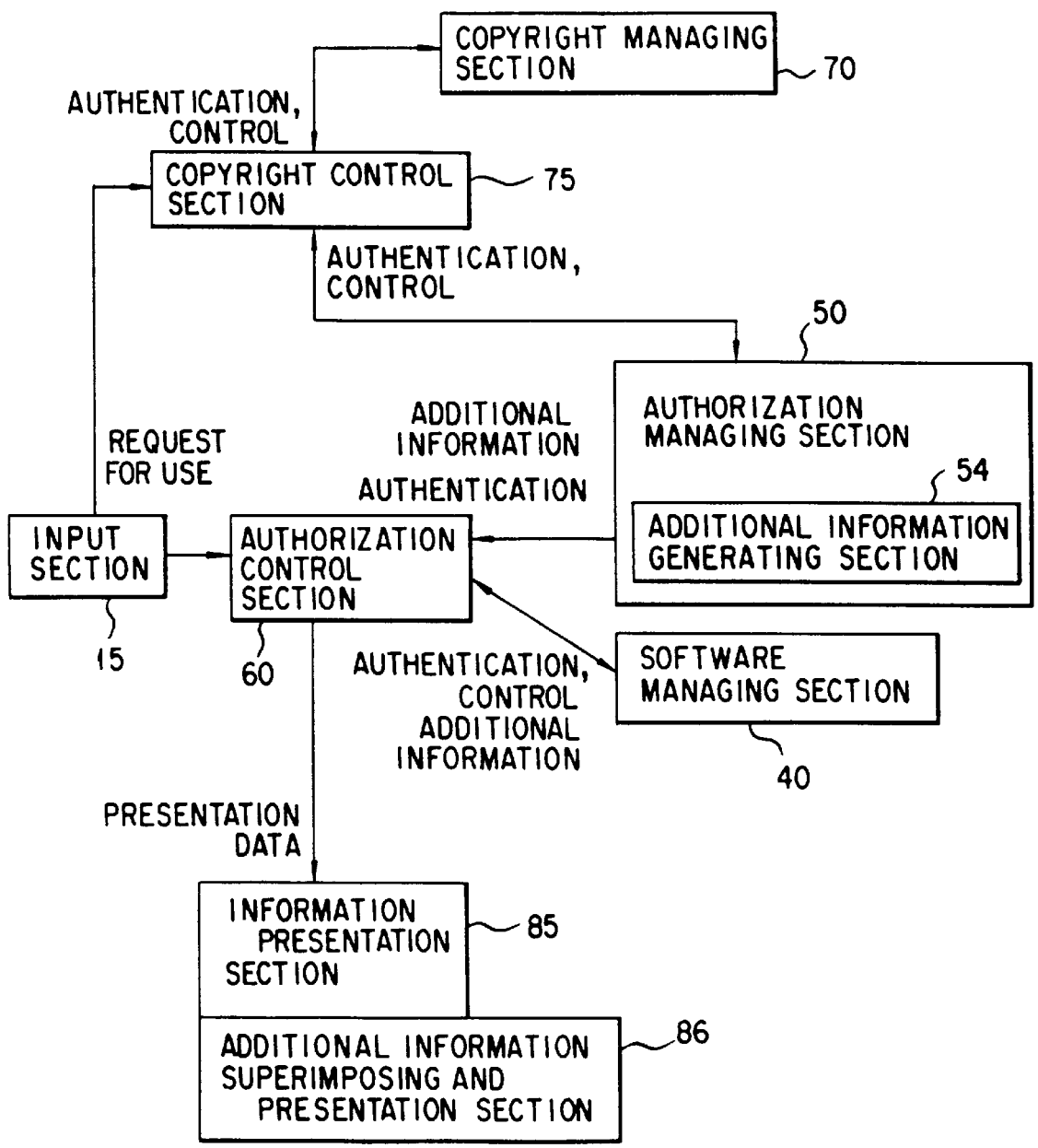
F I G. 65

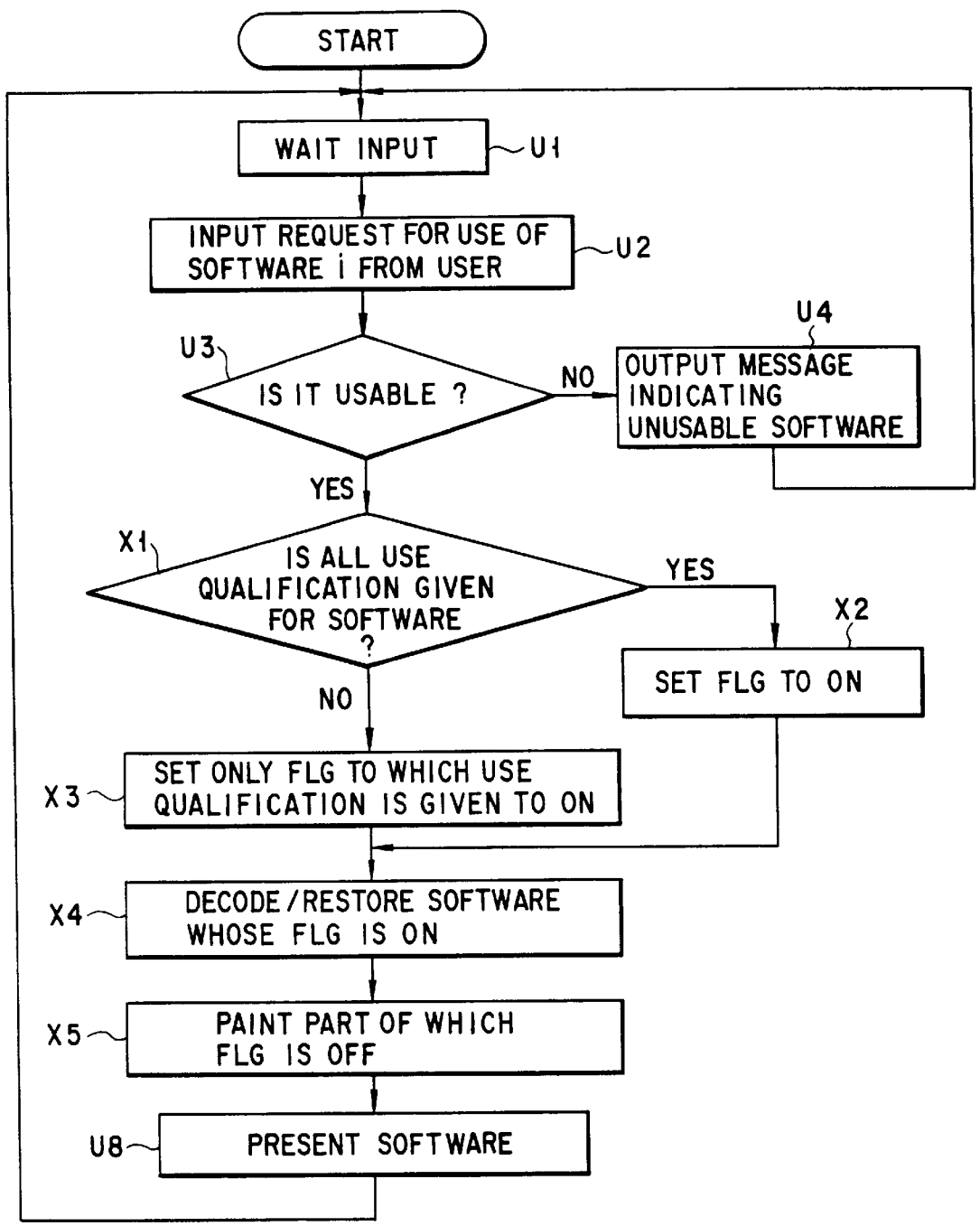
F I G. 70

|  | U17 | MELTING FLG |
|---|---|---|
| TEXT A | NA | OFF |
| TEXT B | NA | OFF |
| PHOTOGRAPH C | A | OFF |
| ADVERTISEMENT | NA | OFF |

FIG. 71A

|  | U17 | MELTING FLG |
|---|---|---|
| TEXT A | NA | ON |
| TEXT B | NA | ON |
| PHOTOGRAPH C | A | ON |
| ADVERTISEMENT | NA | ON |

FIG. 71B

|  | U17 | MELTING FLG |
|---|---|---|
| TEXT A | NA | ON |
| TEXT B | NA | ON |
| PHOTOGRAPH C | A | OFF |
| ADVERTISEMENT | NA | ON |

FIG. 71C

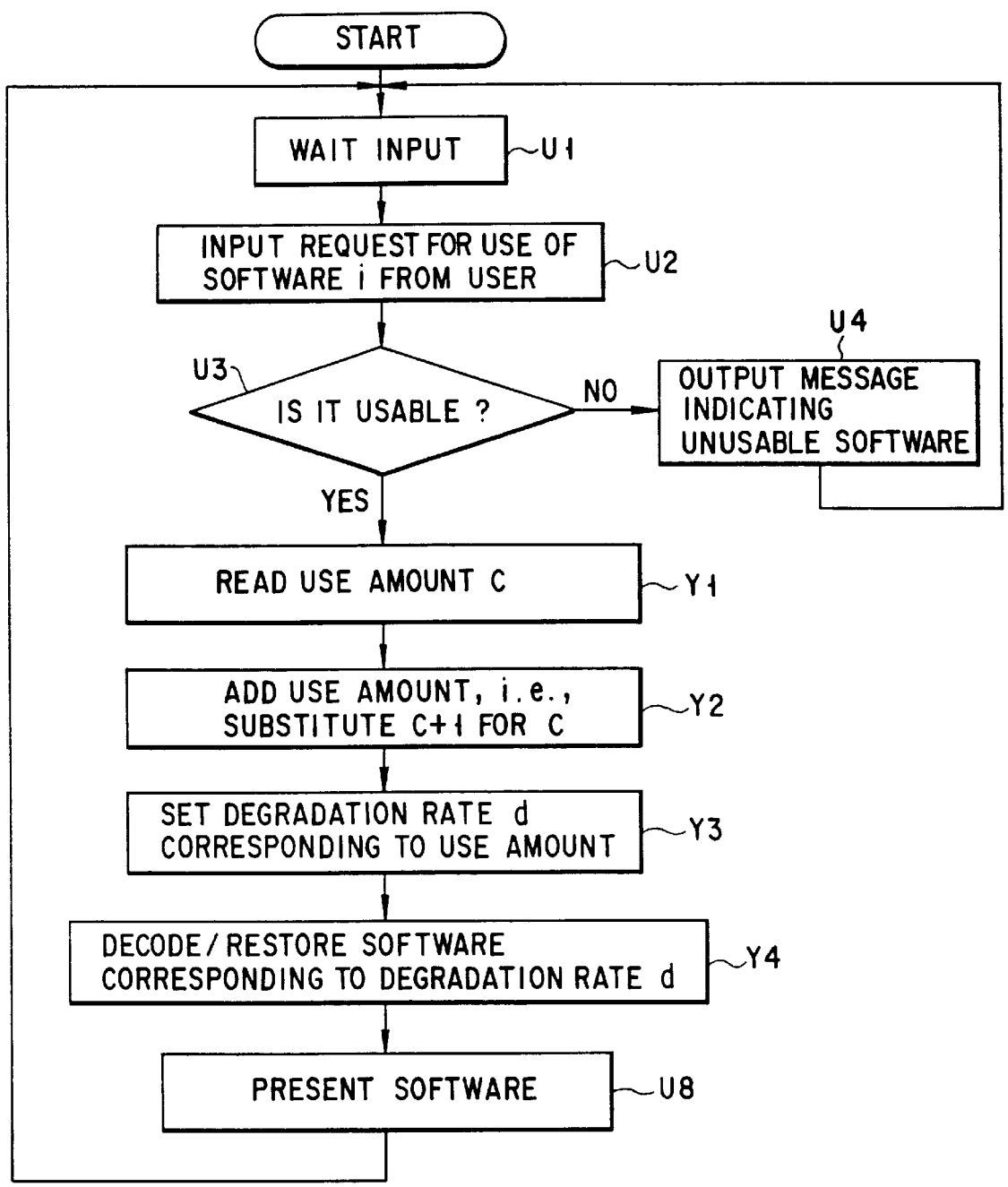
F I G. 74

| ITEM | | PERFORMANCE VALUE |
|---|---|---|
| GRAPHICS | MONITOR | 16" |
| | RESOLUTION | 1280 × 1024 |
| | COLOR | 8-BIT COLOR |
| AUDIO | OUTPUT | STEREO LEVEL LINE ANALOG |
| | SAMPLING | 32kHz |
| | AD CONVERTER | 16-BIT 64 TIMES OVER-SAMPLING |
| | DA CONVERTER | 16-BIT 8 TIMES OVER-SAMPLING |

F I G. 77

| ITEM | | PERFORMANCE VALUE | CONVERSION PROGRAM |
|---|---|---|---|
| GRAPHICS | MONITOR | >= 16" | NULL |
| | RESOLUTION | == 1280 × 1024 | p1 |
| | COLOR | == 24-BIT FULL COLOR | p2 |

F I G. 78

A EXAMPLE OF PRESENTATION ABILITY INFORMATION
MANAGED BY INFORMATION PRESENTATION SECTION A

| ITEM | | PERFORMANCE VALUE |
|---|---|---|
| GRAPHICS | MONITOR | 16" |
| | RESOLUTION | 1280 1024 |
| | COLOR | 8-BIT COLOR |

FIG. 80A

A EXAMPLE OF PRESENTATION ABILITY INFORMATION
MANAGED BY INFORMATION PRESENTATION SECTION B

| ITEM | | PERFORMANCE VALUE |
|---|---|---|
| AUDIO | OUTPUT | STEREO LEVEL LINE ANALOG |
| | SAMPLING | 32kHz |
| | AD CONVERTER | 16-BIT 64 TIMES OVER-SAMPLING |
| | DA CONVERTER | 16-BIT 8 TIMES OVER-SAMPLING |

FIG. 80B

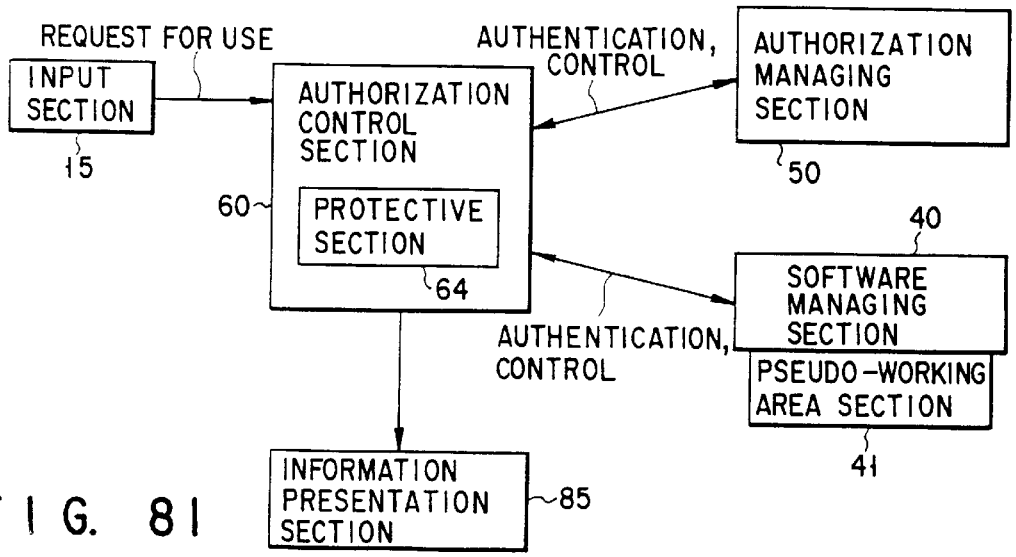

FIG. 81

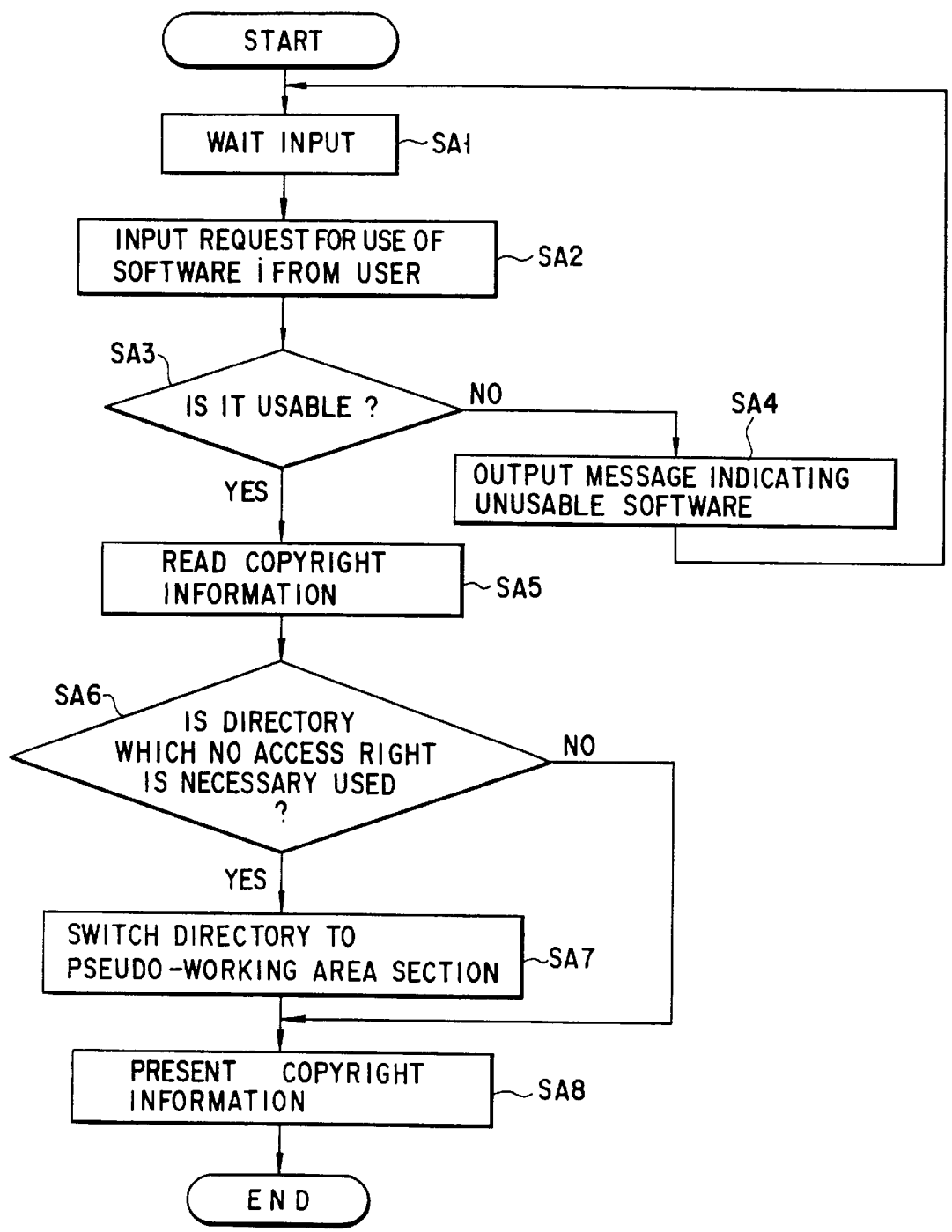
F I G. 82

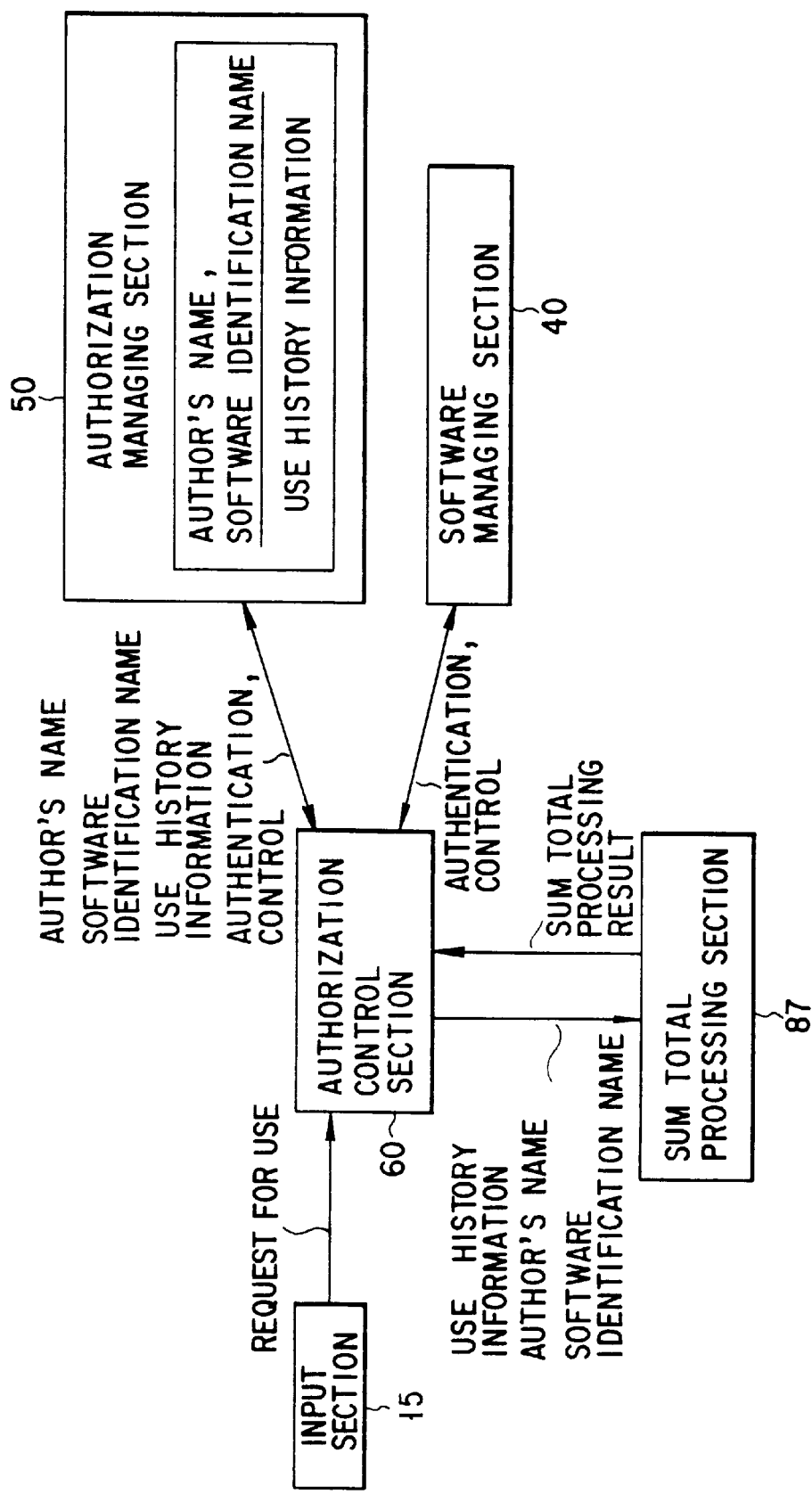
F I G. 83

| AUTHORIZATION MANAGING SECTION 50 | | |
|---|---|---|
| AUTHOR'S NAME | USE HISTORY INFORMATION | |
| ANONYMITY A | STARTING DATE/TIME | x x1 x2 x3 : x4 |
| SOFTWARE IDENTIFICATION NAME | ACCUMULATIVE USE TIME | y1 : y2 |
| APPLICATION a | ABANDONING DATE/TIME | |

F I G. 85

| AUTHOR'S NAME | SOFTWARE NAME | NEW NUMBER | ACCUMULATIVE NUMBER | NEW TIME | ACCUMULATIVE TIME |
|---|---|---|---|---|---|
| X-DREAM SOFTHOUSE | yzd APPLICATION | 99 | 2030 | 45h07m | 2080h77m |
| CLEAN Z PLAN | APPLICATION bcx | 130 | 1850 | 55h33m | 1722h78m |
| : | : | : | : | : | : |

F I G. 87

```
BEST SOFTWARE USED IN THIS WEEK (5/16-22)

1. APPLICATION bcx      CLEAN Z PLAN
2. yzd APPLICATION      X-DREAM SOFTHOUSE
       :                       :
       :                       :
```

F I G. 88

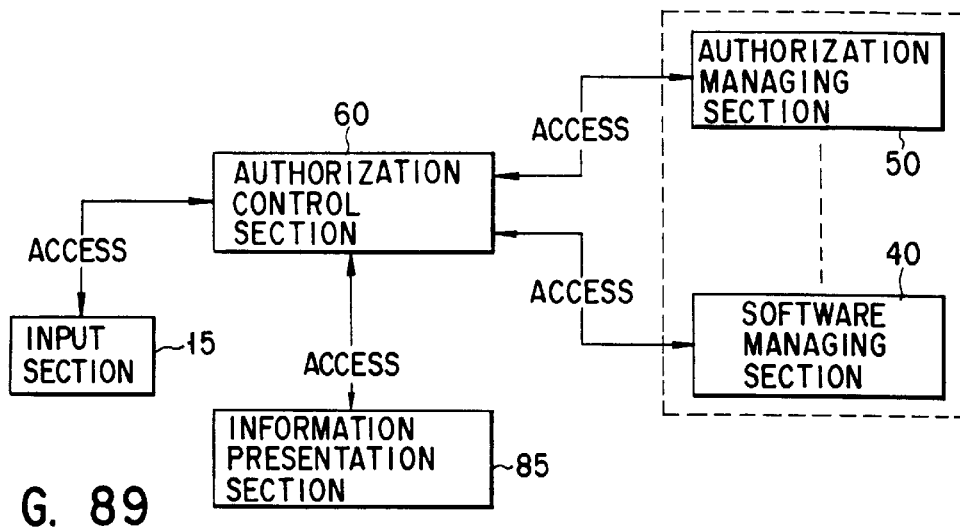
FIG. 89
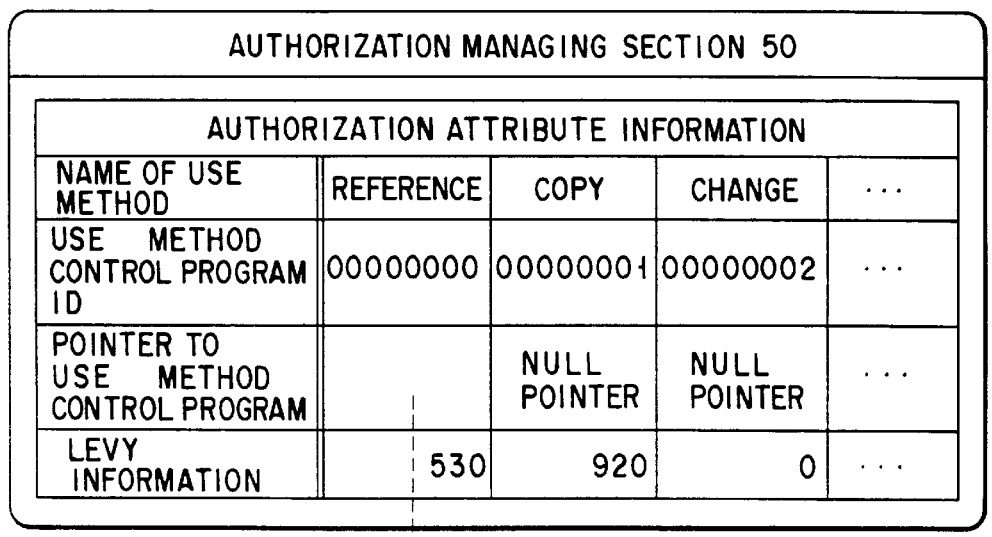
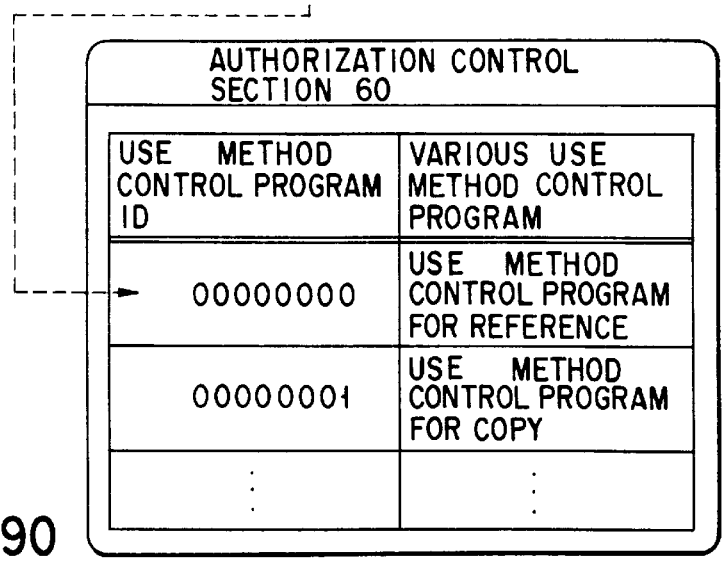
FIG. 90

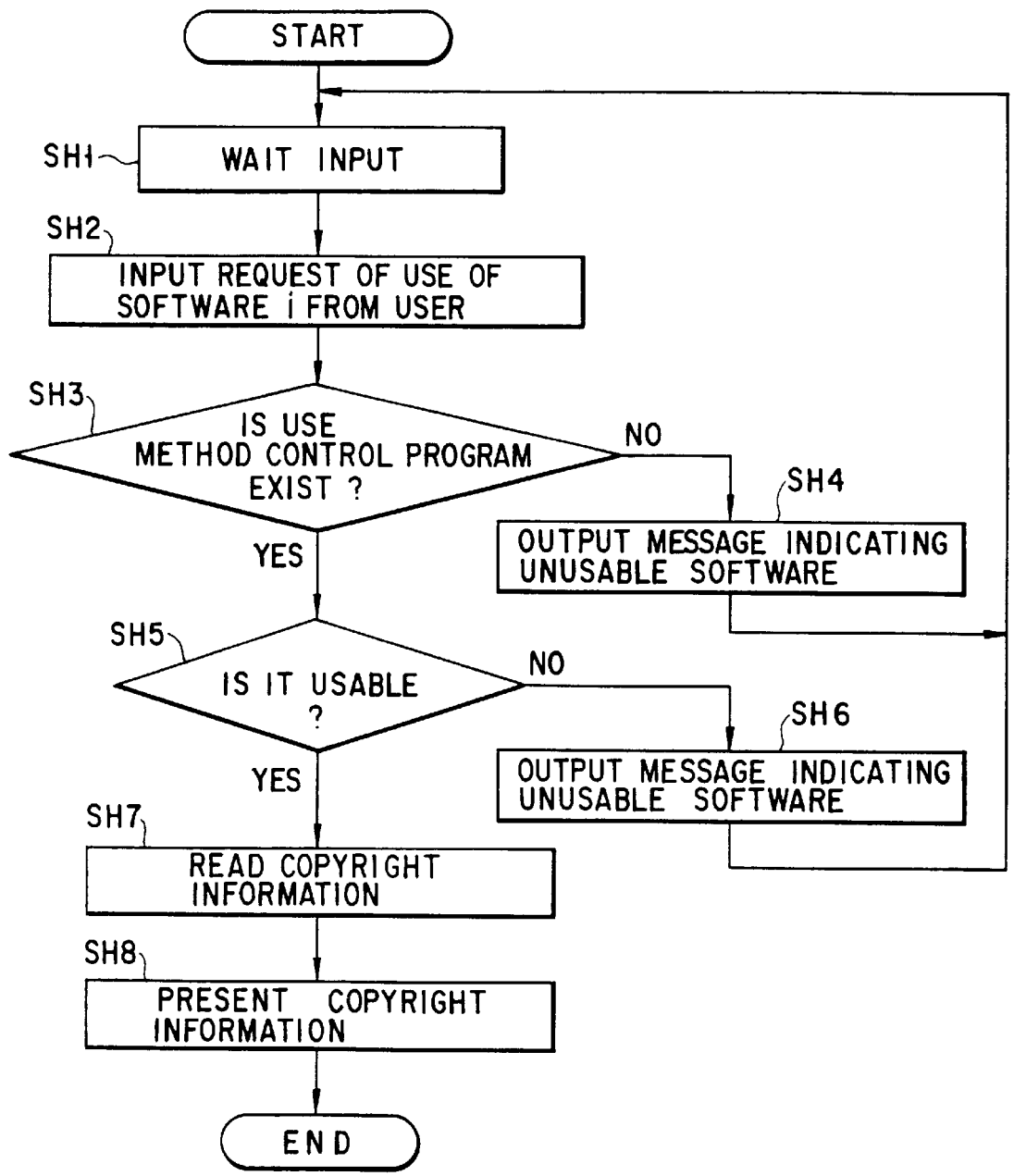
F I G. 100

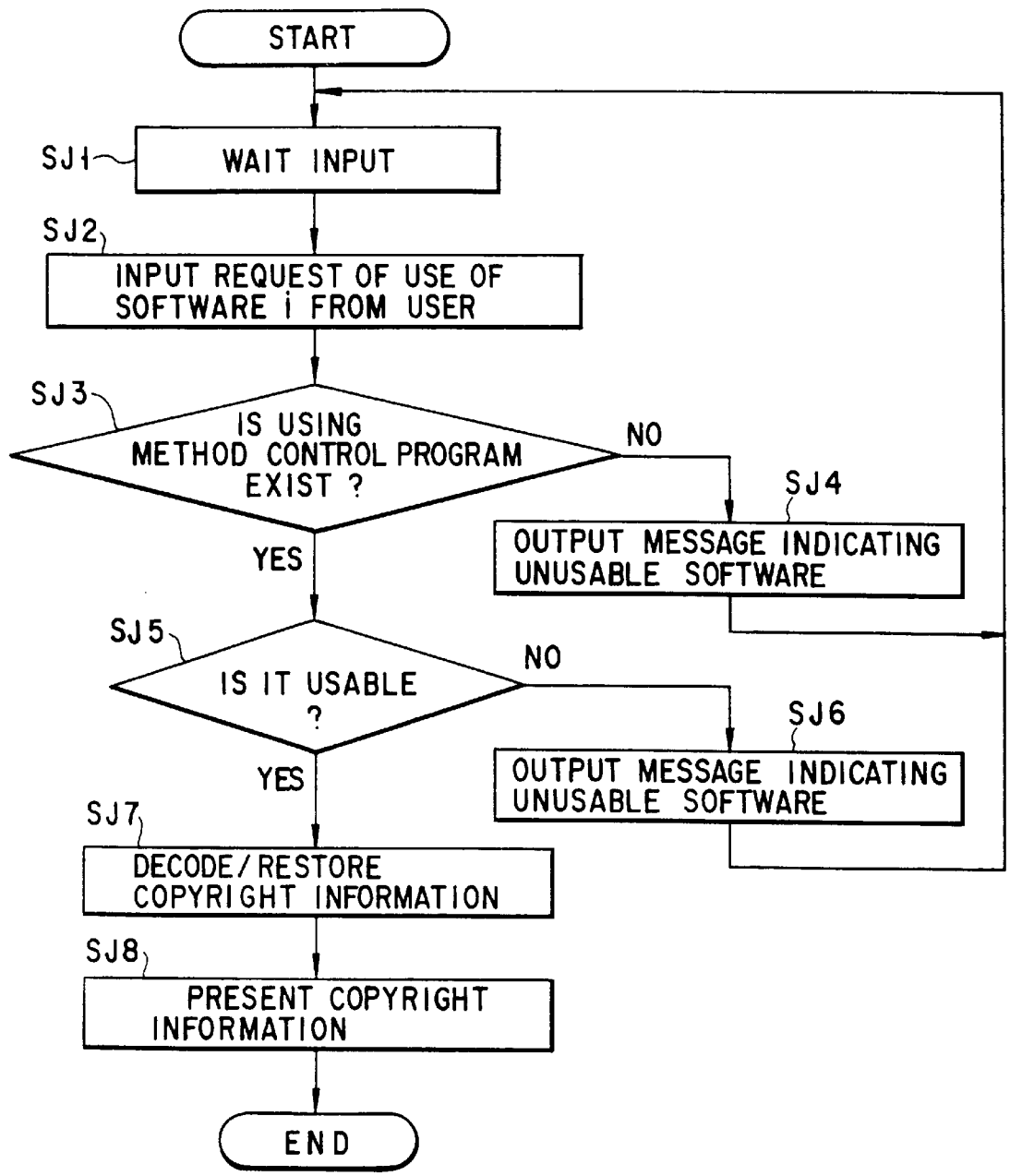
F I G. 103

SOFTWARE USE METHOD CONTROL SYSTEM

This application is a Continuation of application Ser. No. 08/749,556, filed on Nov. 15, 1996, now abandoned, which is a continuation of application Ser. No. 08/412,126, filed on Mar. 28, 1995, now abandoned.

BACKGROUND OF THE INVENTION

1. Field of the Invention

This invention relates to a software use method control system for controlling a method of using software.

2. Description of the Related Art

Recently, personal computers (hereinafter abbreviated as "PCs") have become increasingly used. In accordance with this trend, more and more software items, such as electronic books and digital video movies, have become increasingly accessible through PCs, in addition to video games and business-related software. Furthermore, software items prepared by individuals are distributed in increasing numbers.

In view of this trend it is essential to protect copyrights pertaining to software items. Various methods have been devised to prevent illegal use of software.

One of the copyright-protecting methods is to employ a system architecture called "super-current architecture." Super-current architecture is a system which is designed to levy charges on the use of software, to give permission to use software upon payment of the charges, and to determine whether or not to permit the use of software in accordance with various conditions under which the software will be utilized.

Owners of software may use any data item contained in the software as a reference, may revise or edit the software in part or wholly, may copy and distribute the software in part or wholly—only in the specific manner which the copyright owner has designated. A software use method control system has yet to be developed, however, which can prohibit the software owners from exploiting the software in any manner other than the designated manners.

Such a software use method control system may be provided in the form of a special operating system (abbreviated as "OS") or a program that can be executed on an OS. It is difficult to devise a control system of this type, simply because software can be used in countless ways, whatever kind it is. For the copyright owner it is impossible to predict every way in which the software owners may exploit the software, in an effort to design a software use method control system which can prohibit the software owners from exploiting the software in any possible manner other than those designated by the copyright owner.

The copyright owner may revise the software use method control system every time he or she thinks of new ways in which the software owners may utilize the software but which are prohibited by the copyright owner. For the copyright owner it is difficult to modify the control system so often since a great cost is required to do so. Even if the copyright owner can afford to and does modify the software use method control system as frequently as needed, there are problems on the part of the copyright owner.

A variety of OSs have been developed for use in PCs which are now used in increasing numbers. Each of these OSs can be applied to many different programs, each reflecting the originality of the programmer. Therefore, a plurality of OSs, for example a first OS and a second OS, can be executed on the same PC which is designed to execute a particular software use method control system. The PC user has access to system resources of either OS. Thus, he or she can get a system resource from the second OS, though unable to obtain the identical protected system resource from the first OS. In other words, the PC user can illegally acquire a system resource from the second OS, which is protected in the first OS. Further, the PC user can acquire any protected system resource of the first OS from the second OS, can modify the protected system resource and can, thereafter, make unauthorized access to the protected resource of the first OS. Still further, malfunction of the first OS, if it occurs, destroys the protected system resource which corresponds to any system resource of the second OS.

A PC user may use any existing OS, thereby acquiring the right to access the system resources of the OS. Then, he or she can gain unauthorized access to any system resource, not only one not protected, but also one protected by a software use method control system. Also he or she can achieve unauthorized access to the protected system resources corresponding to all programs being executed on the OS, by making use of the right to access the system resources of the OS.

In order to operate a software use method control system of the above-described type on a programmable system such as a PC, it is necessary to protect system resources from unauthorized access. In the existing OS circumstances, however, it is impossible to protect system resources though they should be protected by means of a software use method control system.

To develop a software use method control system in the form of a special OS, it is necessary to develop novel circumstances in which to prepare and use software. The cost of developing the control system is huge. In addition, it is very hard to attract PC users to the newly developed OS, away from an existing OS, if any, which is predominant on the market.

Instead of attempting to develop a full-scale software use method control system, an OS of minimum scale, having a structure of a software use method control system, may first be designed and used to control an existing OS, thereby to utilize the features of the existing OS in which to prepare and use software. To utilize the existing OS features, some program items must be transplanted to the existing OS. Here arises a problem. The copyright owner of the existing OS may not permit the software use method control system developer to transplant the program. If the owner permits the control system developer to do so, he or she will likely demand a huge royalty of the control system developer.

The problems with the conventional software use method control systems, which have been discussed, can be summarized as follows:

(1) The software use method control system cannot prohibit software owners from exploiting the software in any manner other than those designated by the owner of the copyright to the software.

(2) Since software can be used in countless ways which can hardly be predicted, a software use method control system can hardly be designed which can prohibit the use of software in every possible way other than that which the copyright owner has designated. The copyright owner may revise the control system every time he or she thinks of new ways in which software owners may exploit the software illegally, but cannot afford to revise the control system so often since a great cost is required to do so.

(3) To operate the software use method control system of the above-described type on a programmable system such as a PC, the system resources must be protected from unauthorized access. The system resources of the control system cannot be protected in S the existing OS circumstances, however. They cannot be protected in the ordinary multi-OS circumstances, either.

(4) The software use method control system may be developed in the form of a special OS. In this case, novel circumstances in which to prepare and use software need to be developed, as well. The cost of developing the control system is inevitably huge.

(5) An OS of minimum scale, having a structure of a software use method control system may first be designed and used to control the conventional OS, thereby to utilize the circumstances of the existing OS in which to prepare and use software. To utilize the existing OS circumstances, some program items must be transplanted to the existing OS. However, the copyright owner of the existing OS is likely not to permit the program transplantation. If the owner permits the program transplantation, a huge royalty must be paid to the copyright owner.

SUMMARY OF THE INVENTION

The object of the present invention is to provide a software use method control system which is characterized in the following respects:

(1) The system has resource-protecting means which protects system resources of a plurality of OSs and which can activate an application program of one OS from another OS, thus switching application programs among the OSs.

(2) The system has an access-right protecting section which prohibits a system user from acquiring an access right (generally known as "privilege") to all resources of the system by using the OS installed in his or her PC, thereby protecting the system resources against unauthorized access from the system user.

(3) The system has software use method controlling means for controlling the method of using software, such that the software is copied, edited and utilized in only the ways designated by the owner of the copyright of the software.

(4) The system has software use method controlling means for protecting the system resources against unauthorized access in not only the existing OS circumstances but also the ordinary multi-OS circumstances, in the case where the system is operated on a programmable system such as a PC.

(5) The system has software use method controlling means which enables the software, which is executed on a specified OS corresponding to the system, to be executed also on any OS that can be executed on a PC.

(6) The system has software use method controlling means which ensures the use of any existing OS, without transplanting the existing OS to the system.

(7) The system can be revised at low cost, thereby adding means for prohibiting unauthorized use of software in ways other those already designated by the owner of the copyright to the software.

The software use method control system according to the invention has the basic structure shown in FIG. 1. As FIG. 1 shows, the system comprises an execution request input section 10, a resource protecting section 20, a privilege protecting section 30, a system resource 80, a plurality of OSs 90, and a CPU 95.

The execution request input section 10 receives an execution request made by a system user.

The resource protecting section 20 designates an access right to the system resource 80 for each of the OSs 90. The access to the system resource 80 will be controlled in accordance with the access right thus designated. The section 20 is provided in the input section to the CPU 94. Instead, it may be located in the input section to the system resource 80.

The privilege protecting section 30 prohibits every user of the software use method control system from acquiring an access right (i.e., privilege) to the system resource 80 by utilizing the OS loaded in his or her PC. As can be understood from FIG. 1, the section 30 is an independent unit. Nonetheless, it may be incorporated into the input section to each OS 90.

The CPU 95 performs data-processing in response to a request made by a system user. The CPU 95 contains a coprocessor.

The system resource 80 comprises a memory, a memory containing a hard disk, output devices such as a display and a printer, and data-processing devices such as a CPU, a coprocessor and an extension board.

The software use method control system will be described in more detail, with reference to FIG. 2. FIG. 2 is an overall schematic presentation of the software use method control system.

As illustrated in FIG. 2, the system comprises a software managing section 40, an authentication information managing section 45, an authorization managing section 50, an authorization control section 60, a copyright managing section 70 and a copyright control section 75—besides the execution request input section 10, the resource protecting section 20, the privilege protecting section 30, the system resource 80, the plurality of OSs 90 and the CPU 95.

As indicated above, the execution request input section 10 receives an execution request made by a system user.

The resource protecting section 20 designates an access right to the system resource 80 for each of the OSs 90, and the access to the system resource 80 will be controlled in accordance with the access right thus designated.

As described above, the privilege protecting section 30 prohibits every system user from acquiring an access right to the system resource 80 by using the OS loaded in his or her PC.

The software managing section 40 is designed to manage software. More specifically, the section 40 manages various application programs such as video game programs and business-related programs and various information items such as electronic books and digital video movies. The phrase "to manage software" used here also means "to store software." Hence, the software managing section 40 has a storage unit and a management unit.

The authentication information managing section 45 has a management unit and a storage unit. The management unit manages the authentication information which presents the conditions that the software assumes when the software is accessed. The storage units store the authentication information.

The authorization managing section 50 has a management unit and a storage unit. The management unit manages authorization information. This information includes items which represent the conditions of utilizing the software and programs which are executed to utilize the software in those conditions. The storage unit stores the authorization information.

The authorization control section 60 is designed to access the software managing section 40, authentication information managing section 45 and the authorization managing section 50. The section 60 also controls an access to the software managing section 40, by using the authorization information or the authentication information, or both.

The copyright managing section 70 has a management unit and a storage unit. The management unit manages copyright information required for controlling an access from the copyright control section 75 to the authorization managing section 50. The storage unit stores the copyright information.

The copyright control section 75 accesses to the authentication information managing section 45 and the copyright managing section 70. Also the section 75 accesses to the authorization managing section 50, using the copyright information and the authentication information.

The software managing section 40, the authorization managing section 50 and the copyright managing section 70 constitute a software use method control section for the software. The software use method control system of FIG. 2 has some other identical software use method control sections (not shown), each provided for a piece of software.

According to a first aspect of the invention, there is provided a software use method control system comprising resource protection means which comprises: storage means for storing information for designating a right to access system resources of operating systems which are to be executed in the software use method control system; and access control means for controlling access to the system resources of the operating systems.

The software use method control system according to the first aspect has system resource protecting means which controls an access that any operating system (OS) makes to system resources other than those which the OS should manage. Multi-OS circumstances can therefore be provided, in which a plurality of OSs can be executed in parallel. If an OS makes access to an application program which can be used on another OS, the system resource protecting means activates the other OS. The application program can be accessed from the other OS thus activated. In other words, application programs can be switched among various OSs, while protecting the system resources which can be executed on these OSs.

Further, any software which can be used on a specific OS and whose use can be controlled by the software use method control system of the invention can be executed by using another OS which can be executed on a PC. Still further, any existing OS can be utilized in the software use method control system, without transplanting the existing OS to the software use method control system.

According to a second aspect of this invention, there is provided a software use method control system which differs from the system according to the first aspect, in that it further comprises privilege protecting means which comprises: first means for receiving an execution request made by a software user; second means for executing a program having a right to access all system resources of the operating systems; and third means for determining whether the second means is allowed to executed the program, from the execution request which the first means has received, and for inhibiting the second means from executing the programs when it is determined that the programs are not allowed to be executed.

The software use method control system according to the second aspect has privilege protecting means which prohibits a system user from acquiring an access right (privilege) to access all system resources by using the OS loaded in his or her PC. Thus, the system resources which the OS of the software use method control system should manage are protected against unauthorized access.

According to a third aspect of this invention, there is provided a software use method control system which comprises: software; software managing means for managing the software; authorization managing means including storage means for storing authorization information corresponding to a least one of a method of executing the software and a method for secondary use thereof and means for utilizing the software in accordance with the authorization information stored in the storage means; and authorization control means for controlling an access to the software managing means by using at least one of the authorization information and authentication information. The authorization control means includes means for storing and managing the software incorporating conditions in which the software is to be used and the authorization information authorizing a user to use the software in the conditions incorporated in the software.

The following are preferred embodiments of the software use method control system according to the present invention.

(1) The system further comprises authentication information managing means which manages authentication information showing the condition that the software assumes when it is used.

(2) The system identical to the system (1), except that it further comprises copyright managing means for managing copyright information which controls an access to the authorization control means; and copyright control means for making an access to the copyright managing means and the authentication information managing means and to the authorization managing means by using the copyright information and the authentication information.

(3) The system identical to the system (2), except that the copyright control means edits the software in at least one of three control schemes of "software can be edited in any way," "software cannot be edited at all" and "software can be edited only in ways designated."

(4) The system identical to the system (2), except that the authorization control means or the copyright control means, or both, include means for treating a use method control program or a copyright control program, or both, as an execution unit protected from access from any other program, and for using the copyright information as software ID indicating an access right to each execution unit.

(5) The system identical to the system (2), except that, when the copyright control means edits the software in the control schemes of "software can be edited in any way," the authorization control means or the copyright control means, or both, include means for treating the use method control program, the copyright control program and the software, as execution units protected from access from any other program, and for using the copyright information as software ID indicating an access right to each of these execution units.

(6) The system identical to the system (2), except that the authorization control means or the copyright control means, or both, include means for protecting a program and data access by the use of the program, as independent execution units.

(7) The system identical to the system (6), except that the authorization control means or the copyright control means, or both, include means for inhibiting an access to data of at least one program when the at least one program and at least one data item have different execution unit IDs.

(8) The system identical to the system (7), except that the authorization control means or the copyright control means, or both, include means for allowing an access to the data of the program.

(9) The system identical to the system (1), except that the authorization control means contains a use method control program; the copyright control means contains a copyright control program; and the authorization managing means includes means for executing a program as an execution unit protected from an access from any other program and for using the authentication information as a software ID indicating the access right to the execution unit.

(10) The system identical to the system (9), except that the program to be used, the use method control program, the copyright information and the authentication information includes at least one of a personal ID assigned to a specific person, an apparatus ID assigned to a specific apparatus and a software ID assigned to specific software.

(11) The system identical to the system (1), except that the authorization control means controls an access to the software in at least one of three control schemes of "software can be accessed unconditionally," "software cannot be accessed at all" and "software can be accessed only in ways designated."

(12) The system according to the third aspect, in which the authorization information contains at least one program which is to be executed to use the software.

(13) The system identical to the system (12), except that the authorization information contains a software ID assigned to the software and a program to be executed to use the software, and the program is executed as a program having an access right to the software having the software ID.

(14) The system identical to the system (12), except that the authorization control means includes means for referring from another software a program which is contained in the authorization information together with a specified software and which is to be executed to use the software.

(15) The system identical to the system (14), except that the authorization information contains a software ID assigned to the software and a program which is stored together with the software and which is to be executed to use the software.

According to the third aspect of the invention, the software contains authorization information including the conditions in which the software should be used (i.e., limited methods of executing the software and limited methods for secondary use thereof) and a program which is executed to use the program in those conditions. In other words, the authorization information represents the software use method methods designated by the owner of the copyright to the software. It is in these methods only that an owner of the software may use any data item contained in the software to reference, revise or edit the software in part or wholly, and copy and distribute the software in part or wholly. Thus, the owner of the software is prohibited from using the software in any method other than those presented by the authorization information.

The system resource protecting means, the privilege protecting means of the second aspect of the invention and the authorization control means which characterize the software use method control systems according to the first to third aspects of the invention, respectively, may be used in combination to protect the system resources against unauthorized access in not only the existing OS circumstances but also the ordinary multi-OS circumstances, even if the system is operated on a programmable system such as a PC.

Further, any software which can be used on a specific OS and whose use can be controlled by the software use method control system of the invention can be executed by using another OS which can be executed on a PC. Moreover, any existing OS can be utilized in the software use method control system, without transplanting the existing OS to the software use method control system.

According to a fourth aspect of this invention, there is provided a software use method control system which comprises: a plurality of software use method control means, each having software, software managing means for managing software, first storage means for storing authorization information corresponding to a least one of a method of executing the software and a method for secondary use thereof and means for utilizing the software in accordance with the authorization information stored in the storage means; and communication means for achieving communication among the software use method control units. Each of the software use method control units further comprises: means for receiving, through the communication means, a request for using the software in a specific method; second storage means for storing a program for controlling the method of using the software, at a storage location designated by the authorization information; means for determining, from the authorization information, whether the program is stored at the storage location designated by the authorization information; and copying means for copying the program from any other software use method control unit having the program, when the program is determined not to be stored in at the storage location designated by the authorization information.

In the software use method control system according to the fourth aspect of the invention, in order to copy the software managed by any other software use method control unit, each software use method control unit determines whether or not it stores a program for controlling the method of using the software, and then copies the program from the other software use method control unit when the program is not stored in the software use method control unit and stored in the other software use method control unit. Alternatively, each software use method control unit determines whether or not it stores a program for controlling the method of using the software, when it receives a request for using the software, and then copies the program from the other software use method control unit when the program is not stored in the software use method control unit and stored in the other software use method control unit.

Since each software use method control unit can automatically copy a program for using the software in a new method, from any other software use method control unit which has that program. The user of each unit need not install the program and can yet utilize the software in that new method.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a diagram showing the basic structure of a software use method control system according to a first embodiment of the present invention;

FIG. 2 is an over-all view of the software use method control system shown in FIG. 1;

FIG. 3 is a diagram illustrating the resource protecting section incorporated in the software use method control system shown in FIG. 1;

FIG. 7 is a flow chart explaining the operation of the software use method control system shown in FIG. 1;

FIG. 8 is a diagram showing the basic structure of a software use method control system according to a second embodiment of the present invention;

FIG. 10 is a diagram showing the authorization managing section of the system shown in FIG. 8 and a second type of the information managed by the authorization managing section;

FIG. 13 is a diagram showing the basic structure of a software use method control system according to a third embodiment of the present invention;

FIG. 14 is a diagram showing the software managing section used in the system of FIG. 13 and the information managed by the authorization managing section incorporated in the system of FIG. 13;

FIG. 15 is a diagram showing the basic structure of a software use method control system according to a fourth embodiment of the invention;

FIG. 16 is a diagram illustrating the copyright managing section of the system shown in FIG. 15 and a first type of the information managed by the copyright managing section;

FIG. 18 is a diagram showing a third type of the information managed by the copyright managing section of the system shown in FIG. 15;

FIG. 19 is a diagram illustrating a modification of the information managed by the copyright managing section of the system shown in FIG. 15;

FIG. 20 is a diagram illustrating the privilege protecting section incorporated in a software use method control system according to a fifth embodiment of the invention;

FIG. 21 a flow chart explaining the operation of the privilege protecting section;

FIG. 24 is a flow chart explaining the operation of the system shown in FIG. 23;

FIG. 25 is a diagram showing a software managing table;

FIG. 26 is a diagram depicting another software managing table;

FIG. 27 is a diagram illustrating still another software managing table;

FIG. 28 is a flow chart explaining the operation of a modification of the system shown in FIG. 23;

FIG. 29 is a diagram showing an example of a software managing table;

FIG. 32 is a diagram presenting an example of software incorporated in the system of FIG. 30;

FIG. 34 is a diagram showing an advertisement displayed by the first modification of the system shown in FIG. 30;

FIG. 36 is a flow chart explaining another operation of the second modification of the system shown in FIG. 30;

FIGS. 40A to 40C are diagrams showing examples of data items displayed by the system according to the ninth embodiment;

FIG. 41 is a flow chart explaining how the system according to the ninth embodiment sets a levy;

FIG. 42 is a flow chart explaining an operation of a first modification of the system according to the ninth embodiment;

FIG. 43 is a flow chart explaining another operation of the first modification of the system according to the ninth embodiment;

FIG. 44 is a flow chart explaining still another operation of the first modification of the system according to the ninth embodiment;

FIG. 45 is a diagram illustrating the basic structure of a second modification of the system according to the ninth embodiment;

FIG. 46 is a flow chart explaining the operation of the authorization control section used in the second embodiment of the system according to the ninth embodiment;

FIG. 49 is a diagram showing another example of software incorporated in the system according to the ninth embodiment;

FIG. 50 is a diagram showing still another example of software incorporated in the system according to the ninth embodiment;

FIG. 51 is a flow chart explaining the operation of a software use method control system according to a tenth embodiment of the invention;

FIG. 52 is a diagram illustrating an example of software incorporated in the system according to the tenth embodiment;

FIG. 53 is a diagram showing data items displayed by the system according to the tenth embodiment;

FIG. 54 is a diagram depicting another example of software incorporated in the system according to the tenth embodiment;

FIG. 55 is a diagram showing other data items displayed by the system according to the tenth embodiment;

FIG. 56 is a diagram showing still another example of software incorporated in the system according to the tenth embodiment;

FIG. 58 is a flow chart explaining the operation of the system according to the eleventh embodiment;

FIG. 61 is a flow chart explaining the operation of the system according to the twelfth embodiment;

FIG. 62 is a diagram showing a table for generating additional information in the twelfth embodiment;

FIG. 63 is a diagram showing a table for presenting additional information;

FIG. 65 is a diagram illustrating the basic structure of a software use method control system according to a thirteen embodiment of the invention;

FIG. 70 is a flow chart explaining the operation of the system according to the fifteenth embodiment;

FIGS. 71A to 71C are diagrams showing qualification judgment tables;

FIG. 74 is a flow chart explaining the operation of the system according to the sixteenth embodiment;

FIG. 77 is a diagram showing various presentation ability data items stored in the system according to the seventeenth embodiment;

FIG. 78 is a diagram showing conditions for presenting the software;

FIGS. 80A and 80B are diagrams illustrating examples of presentation ability data items;

FIG. 81 is a diagram illustrating the basic structure of a software use method control system according to an eighteenth embodiment of the invention;

FIG. 82 is a flow chart explaining how the authorization control section operates in the system according to the eighteenth embodiment;

FIG. 83 is a diagram illustrating the basic structure of a software use method control system according to nineteenth embodiment of the invention;

FIG. 85 is a diagram showing data items the authorization managing section manages in the system according to the nineteenth embodiment;

FIG. 87 is a diagram showing an example of information input to the sum total processing section of the nineteenth embodiment;

FIG. 88 is a diagram depicting an example of information output by the nineteenth embodiment;

FIG. 89 is a diagram illustrating the basic structure of a software use method control system according to a twentieth embodiment of the invention;

FIG. 90 is a diagram schematically showing the authorization managing section and the authorization control section, both incorporated in the twentieth embodiment;

FIG. 100 is a flow chart explaining the operation of the twenty-second embodiment;

FIG. 103 is a flow chart explaining the operation of the twenty-third embodiment.

DETAILED DESCRIPTION OF THE PREFERRED EMBODIMENTS

Figures 4, 5, 6:
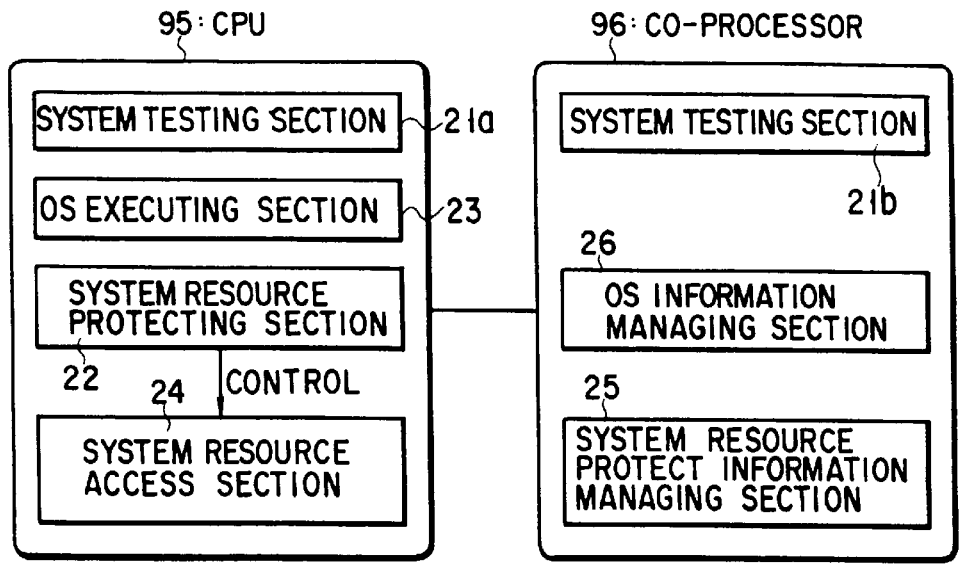
FIG. 4 is a schematic representation of a resource protecting section which comprises a CPU and a coprocessor.
FIG. 5 is a diagram showing the information managed by the OS information managing section used in the system of FIG. 1.
FIG. 6 is a diagram illustrating the resource protect information managed by the resource-protect information managing section incorporated in the system of FIG. 1.

The embodiments of the invention will be explained with reference to the accompanying drawings.

Similar or identical components are denoted using the same reference numerals in the drawings. They will not be repeatedly described, unless the functions they perform in one embodiment are different from those they perform in a previously described embodiment.

Before explaining the embodiments, the invention will be summarized.

(1) In the invention, a system resource to be protected, which corresponds to a certain operating system (OS), will be protected from access from other OSs. Further, when a certain OS has accessed software corresponding to any other OS, access control is performed, causing the OS corresponding to the software to access the software (or part of the software). Thus, any software corresponding to an OS operable in the system can be executed by the OS operable in the system. In other words, application programs can be switched among various OSs.

(2) The software use method control system of the invention prohibits a user of the system from acquiring an access right to the system resources by using the system. The system resources are thereby protected.

(3) Under the above-described protection circumstances, when the creator of software or the copyright owner of software has specified a use method (the manner of execution and a secondary use method) corresponding to each software in accordance with the circumstances in which to use the software, the method of using the software is controlled so that specified copying or editing can be performed in accordance with the use circumstances, even to perform secondary use, i.e., distribution of software copies, reconstruction such as editing of the same, etc.

(4) If the portions of software, other than the portions relating to control of the method of using the software correspond to OSs which do not correspond to the software, the software use method control system executes only the portions relating to control of the use methods, and the other portions are executed by other OSs corresponding thereto, respectively. In other words, multi OS circumstances can be realized in which complex software including portions corresponding to a plurality of OSs can be executed by a given OS which is operable in the system and is not specific to the system.

Each embodiment of the invention will now be explained in detail. The structure, advantage, specific explanation, and modification, if any, of each embodiment will be described in the order mentioned.

First Embodiment (1) Main Components and Features

FIG. 3 is a schematic view, showing a resource protecting section 20 included in a software use method control system according to the first embodiment. This embodiment is characterized by the resource protecting section 20 which is designed to prohibit unauthorized access to a resource to be protected (by an OS which does not correspond to the resource or a program to be executed by the OS).

The resource protecting section 20 includes a system testing section 21, a system resource protecting section 22, an OS executing section 23, a system resource access section 24, a system resource protect information managing section 25 and an OS information managing section. As will be explained later, the resource protecting section 20 inhibits unauthorized access to a protected resource (from an OS not corresponding to the resource, or from a program that OS can execute).

The system testing section 21 determines whether or not the system has been modified illegally, and initializes the system.

The OS information managing section 26 manages information required for executing OSs.

The OS executing section 23 executes an OS specified, for example, by an execution request input section 10 on the basis of information stored in the OS information managing section 26.

The system resource protect information managing section 25 manages and stores information for designating the access right of each OS to a corresponding system resource.

The system resource protecting section 22 controls access to a system resource by each OS on the basis of the information stored in the system resource protect information managing section 25.

The system resource access section 24 executes access to a system resource under the control of the system resource protecting section 22.

(2) Advantages

The software use method control system which incorporates the resource protecting section 20 has the following advantages:

While a plurality of OSs which are not specific to the software use method control system are being executed, the system resource protecting section 22 can protect a system resource corresponding to an OS against access from any other OS. The system resource can be prevented from being modified illegally by another OS. Further, a system resource corresponding to an OS can be protected from destruction due to abnormal execution of another OS. Moreover, software corresponding to a predetermined OS can be prevented from being used by the other OSs.

When an OS has tried to access the software corresponding to another OS, the OS information managing section 26 and the OS executing section 23 can control the access operation to make the OS corresponding to the software execute this software. In other words, an OS corresponding to software already accessed is automatically executed, and any given software corresponding to an OS can be executed from the corresponding OS.

Therefore, in the case where the resource protecting section 20 is used as a program to be executed in a particular OS, when OSs other than the particular one have tried to access software corresponding to the software use method control system, the access operation is controlled, enabling the particular OS corresponding to the software use method control system to access the software when OSs other than the particular one have tried to access software corresponding to the software use method control system.

In other words, in multi-OS circumstances, software corresponding to the software use method control system can be executed from a desired OS which can operate in the system. Furthermore, a system resource corresponding to each OS can be protected from unauthorized access from OSs which do not correspond to the software use method system.

The software use method control system may be developed to be operated by an original OS. The cost of developing an OS for controlling a method using software can be considerably reduced by designing a minimum OS which has a function for executing only the software use method control system and by using, as the other necessary functions, the use or development circumstances of OSs not specific to the software use method control system by controlling the execution of the OSs by the minimum OS.

Also in the case of using the functions of OSs by another OS which corresponds to the software use method control system, it is not necessary to transplant OSs. It suffices to install the OSs in the system in a usual manner. The user need not be bothered to ask the copyright owner of the existing OS for permit him to transplant the OS, or to play a huge royalty to transplant the OS.

In addition, since a plurality of OSs are executed in one information processing unit, the consumption of OSs or of applications can be increased. Therefore, approval of software makers is easy to obtain. It is also very advantageous to users to execute a plurality of OSs in one processing unit, and hence realizing the software use method control system by its original OS can obtain their approval with ease.

In the software use method control system according to the first embodiment, the resource protecting section examines whether or not the section itself has been destroyed or modified. The resource protecting section stops the operation of the system when it is found to have been destroyed or modified. As a result, destruction or modification of the resource protecting section can be prevented.

(3) Detailed Description of the First Embodiment

The structure and operation of the first embodiment will be explained in detail, with reference to FIGS. 4 to 7.

FIG. 4 is a schematic view, showing a case where the resource protecting section is constituted by a CPU 95 and a coprocessor 96.

The resource protecting section 20 is constructed as shown in FIG. 3. It comprises the CPU 95 and the coprocessor 96.

The resource protecting section 20 designates the access right of each OS to system resources such as memory units including a memory and a hard disk, output units including a display and a printer, processing units including the CPU, the coprocessor and an extension board, etc. The section 20 then controls the access of the OS to the system resources. The word "address" used in the following descriptions means, in some cases, the data indicative of the above-described system resource or of a predetermined portion of the system resource.

The CPU 95 has a system testing section 21a for testing whether or not the system has been modified illegally, initializing the system, and for testing whether the coprocessor 96 defined by the system is connected to the CPU 95. It further comprises the system resource protecting section 22 for controlling the access of an OS to the system resources, the OS executing section 23 for executing an OS specified, for example, by the execution request input section 10, and the system resource access section 24 for allowing access to the system resources.

The coprocessor 96 connected to the CPU 95 has a system testing section 21b for testing whether or not the system has been modified illegally, initializing the system, and for testing whether the CPU 95 defined by the system is connected to the coprocessor 96, the OS information managing section 26 for managing information for executing OSs, and the system resource protect information managing section 25 for managing information for designating the access right of each OS to a corresponding system resource.

A unique ID is assigned to each OS to be executed in the system.

As is shown in FIG. 5, the information to be managed by the OS information managing section 26 includes table data which indicates the ID pieces of OSs, the boot addresses of the OSs, and resume addresses for resuming the execution of each OS, if suspended. The information further includes a series of data pieces relating the execution circumstances of the OSs for resuming the execution of each OS, if suspended, and the ID of an OS which is being currently executed. These information pieces are stored, for example, in a reloadable non-volatile memory (e.g. EEPROM) incorporated in the coprocessor 96.

The OS executing section 23 searches the table information stored in the OS information managing section 26, for the ID of an OS specified by e.g. the execution request input section 10. The execution section 23 executes the OS in accordance with the boot address if the resume address is a particular address which should not be used. The section 23 then resumes the execution of the OS in accordance with the resume address if the resume address is a normal address.

As is shown in FIG. 6, the information managed by the system resource protect information managing section 25 is table information indicating the ID pieces of the OSs and lists of addresses corresponding to the OSs and to be protected. These information pieces are stored in a reloadable nonvolatile memory (e.g. EEPROM) of the coprocessor 96.

The system resource protecting section 22 is realized in hardware as an extension of an MMU (Memory Management Unit). The section 22 searches the table information stored in the system resource protect information managing section 25, for an address to which a request for access has been made. The second 22 then determines the ID of an OS having the right of access to the address. Further, the section 22 determines the ID of an OS having made the access request (the ID of the OS currently being executed), from the OS information managing section 26, and compares the determined ID pieces, thereby determining whether the OS being operated has the right of access. If it does not have a right of access, the system resource protecting section 22 inhibits access from the OS, or the OS execution section 23 executes an OS having the right of access to the address.

FIG. 7 is a flowchart, showing the processing of the software use method control system according to the first embodiment. In the first embodiment, the software use method control system is realized as an independent OS.

When the system has started its operation (Step A1), the system testing section 21a transmits to the coprocessor 96 at least one particular command stored in the CPU 95 (which cannot be referred to from the software). Upon receipt of the particular command, the coprocessor 96 is initialized to perform normal operations. Further, particular data returned by the coprocessor 96 is tested (Step A2), thereby recognizing that the coprocessor 96 is defined by the system. If it is determined that no normal data is returned by the coprocessor 96, the CPU ceases the operation. If the CPU 95 does not supply the initialization command to the coprocessor 96 even after a predetermined time period elapses from the start of the system, the coprocessor 96 ceases the CPU 95 (Step A3).

If the system is normal, the system testing section 21*a* obtains the boot address of the software use method control system with reference to the table information managed by the OS executing section 23. Then, the system resource protecting section 22 searches a list of addresses to be protected and corresponding to the ID of the software use method control system, with reference to the table information managed by the system resource protect information managing section 25. An address area is set to which only the software use method control system can access, and the system resource protecting section 22 starts performing its function (Step A4). The section 22 causes the OS executing section 23 to execute the software use method control system having ID defined by the system (Step A5).

If a request for access to an address (application, etc.) corresponding to an OS has been made during execution of another OS, the OS corresponding to the address to be accessed is executed by the OS executing section 23 (Step A6).

When a request for execution of another OS has been made, the OS executing section 23 interrupts the current execution of an OS, and causes the OS information managing section 26 to store the execution circumstances of the currently executed OS and its resume address for resuming the execution of the OS. Thereafter, the section 23 refers to the table information managed by the execution OS selecting section, thereby obtaining the boot address and resume address of an OS specified e.g. by the execution request input section 10. Then, the system resource protecting section 22 refers to the table information managed by the system resource protect information managing section 25. The section system resource protecting 22 thereby obtains a list of addresses corresponding to the ID of the selected OS, and stores an address area to which the OS having the ID is accessible (Steps A6 and A7).

Lastly, the CPU 95 executes the specified OS in accordance with its boot address or resume address (Step A8). Alternatively, the CPU 95 allows current access to the system resource (Step A9).

The system resource protecting section 22 unconditionally allows the software use method control system to access any desired address. As regards an OS other than the software use method control system, the section 22 tests whether or not the address to be accessed is identical to an address to which the OS is accessible, and allows the access of the OS to the address only if the address can be accessed by the same. If the address to which a request for access has been made can be accessed only by the software use method control system, the OS executing section 23 reads the software use method control system to cause the same to access the address, or to prohibit such access. If the address to which a request for access has been made is a to-be-protected one corresponding to an OS other than the software use method control system, such access is prohibited.

As described above, the resource protecting section 20 prohibits unauthorized access to system resources (by OSs which do not correspond to the system resources) to be protected and managed by the software use method control system, such as a software managing section 40, an authorization managing section 50, a copyright managing section 70, an authorization control section 60, a copyright control section 75, an authentication information managing section 45, a privilege protecting section 30, etc.

(4) Modification of the First Embodiment

In the first embodiment, the CPU 95 and the coprocessor 96 constitute the resource protecting section 20. Nonetheless, the section 20 may further comprises a memory, a hard disk, an IC card, and the like. The components of the section 20 are not limited to the CPU 95, the coprocessor 96 and a memory. The second resource protecting section 20 can be modified in various manners. For example, the section 20 can be constituted only by one of the CPU 95 and the coprocessor 96.

The system resource protect information managing section 25 may be incorporated in the system resource protecting section 22. Moreover, the section 25 may be modified so as to manage information on the relationship between data for directly designating each OS and an address for directly designating each system source, and to determines, when a request for access to a system resource has been made, whether or not the access request is allowable with reference to the information. The section 25 may be constituted by software or hardware.

Furthermore, the unit of an address managed by the OS executing section 23 or the system resource protecting section 22 may be 1 byte or any segment block unit greater than 1 byte.

Also, an output unit or a processing unit can be intensively managed together with a memory unit by assigning predetermined addresses to the units.

In the first embodiment, an OS section included in the software use method control system and other OSs are on an equal basis, and the OSs are protected from the hardware used. Nonetheless, the system may be used as an OS which is more similar to a system resource than the other OSs, and may be designed to execute the other OSs. In this case, the boot address or resume address of the software use method control system and a command for executing the software use method control system must be stored in the CPU 95 needs to store such that they cannot directly be accessed by software and that the command is executed whenever the CPU 95 is reset.

Furthermore, the software use method control system may be designed to prepare at least two privilege modes in order to discriminate a privilege mode for the software use method control system from that for each of the other OSs. A system resource to which access can be performed only in the privilege mode for the software use method control system can thereby be set, and access to the system resource in the other privilege modes can be inhibited. As a result, many functions of the resource protecting section 20 can be realized by software.

The other OSs may be modified to have privilege lower than the software use method control system and to be read by the system so that the program may be executed by the system upon completion or interruption of the execution of any other OS.

If an address which has been requested to be accessed is one to which only the software use method control system can access, the current execution of an OS is interrupted and the program returns to the execution of the software use method control system. The software use method control system can then access to the address or can inhibit the access.

In the first embodiment, the information managed by the OS executing section 23 and the system resource protect information managing section 25 is stored in the CPU or the coprocessor. Instead, the information may be stored in an address area which is protected from being accessed by any OS other than the system.

A list of OSs which can be read by selecting a predetermined menu or pushing a predetermined key or switch may be displayed. In this case, the user can select any other OS from the list with the use of a menu, etc.

Moreover, the software use method control system may be a program to be executed by an OS which is not peculiar thereto, not used as an independent OS as described above.

Second Embodiment (1) Main Components and Features

FIG. 8 schematically shows a software use method control section included in a software use method control system according to the second embodiment.

The software use method control system comprises a software managing section 40, an authentication information managing section 45, an authorization managing section 50 and an authorization control section 60.

The software managing section 40 manages software.

The authentication information managing section 45 manages authentication information indicative of circumstances assumed when software has been accessed.

The authorization managing section 50 manages and stores authorization information corresponding to each use method of software (the manner of execution and a secondary use method).

The authorization control section 60 accesses the software managing section 40, the authorization managing section 50 and the authentication information managing section 45. It controls the access to the software managing section 40 using at least one of the authorization information and the authentication information.

(2) Advantages

In the second embodiment, the owner of copyright of the software beforehand specifies the use method which he or she thinks most suitable for each software system in view of the authorization attribute information and the software use method circumstances, in order to copy or edit the software. Then, the secondary use of the software such as copy or redistribution, edition or reconstruction, etc. can be achieved.

Further, various use methods corresponding to software systems can be provided by preparing a mechanism for enabling the owner of copyright to insert into the software systems his original procedures for using them. Since these procedures are protected by the software use method control system, the copyright owner can easily create protected software which can be used by his specified use method.

Moreover, the method of using the software can be controlled in accordance with the software use method circumstances by storing therein the condition for controlling the use method or for use history information, and by referring to at least one of the stored information and the authentication information indicative of the circumstances of the software having been accessed. As a result, the software use method can be controlled, for example. A still image formed by the software will fade out and finally disappear after a predetermined time period elapses from the time of the acquisition of the software.

(3) Detailed Description of the Second Embodiment

The operation of each component of the software use method control system according to the second embodiment will be described in detail.

The software managing section 40 manages various kinds of application programs such as game software, business software, etc. or various kinds of data such as an electronic book, a static picture, a digital video.

The authentication information managing section 45 manages at least one of information for authenticating at least one particular person, information for authenticating at least one particular unit, and information for authenticating at least one password, and uses the at least one information as authentication information which can indicate in a unique manner the circumstances at the time when the software has been accessed. The authentication information includes at least one of text information, voice information, bit map information, stroke information, static picture information, moving picture information, binary information, program information and constructed information of these information pieces.

The authorization managing section 50 manages, as authorization information corresponding to each method of using the software, at least one of information indicative of the kind (name) of each use method, information indicative of the copyright owner's intention about each software use method, information for discriminating one software system from another, information for using the software, information for controlling each use method, information for storing the history of each use method, information for the use history of the software, information for controlling a levy for using the software and constructed information of these information pieces. These authorization information pieces includes at least one of text information, voice information, bit image map information, stroke information, static picture information, moving picture information, binary information, program information and constructed information of these information pieces.

The information managed by the authorization managing section 50 and the information managed by the software managing section 40 constitute one software system.

The authorization control section 60 manages and executes at least one program (hereinafter referred to as "use method control program") of a procedure for storing at least one (use history information) of software access history, authentication information obtained when software has been accessed, history of levy on access, and history of payment for access;

a procedure for determining whether or not the access to the software is allowed, in accordance with the use history information of the software and current use circumstances of the same; and a procedure for executing the specified access to the software in accordance with the use history information of the software and current use circumstances of the same.

The authorization control section 60 accesses the software managing section 40, the authorization managing section 50 and the authentication information managing section 45, and at the same time controls the access to the software managing section 40 with the use of at least one of the authorization information and the authentication information.

Figure 9:
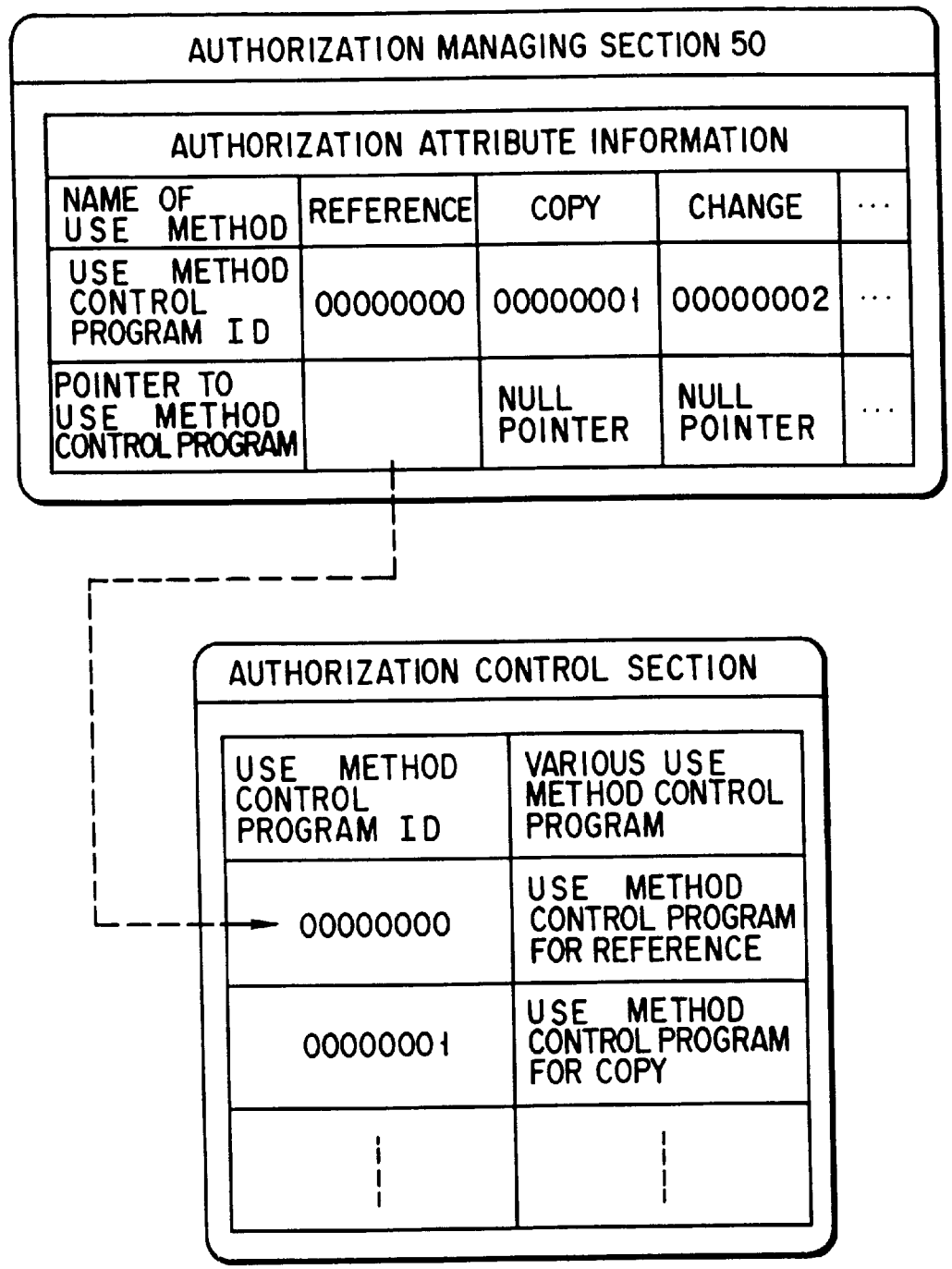
FIG. 9 is a diagram illustrating the authorization managing section of the system shown in FIG. 8 and a first type of the information managed by the authorization managing section.

FIG. 9 shows a first structure of information managed and controlled by the authorization managing section 50 and the authorization control section 60 employed in the second embodiment.

As is shown in FIG. 9, the authorization attribute information is one of the authorization information pieces managed by the authorization managing section 50. The authorization attribute information has an information string corresponding to each method of using the software. Each information string includes information indicative of the name of the method, information indicative of a pointer to a program (use method control program) for controlling the use method, and ID information directly indicative of the using control program corresponding to the use method. The use method control program is controlled by the authorization control section 60.

In FIG. 9, "NULL pointer" indicates that the use method is not allowed in the software, and a pointer other than the NULL pointer indicates that the use method is allowed.

A procedure for controlling the software use method will be explained.

Assume that a request for use has been made to the authorization control section 60, using the software use method control program ID as an argument. The section 60 searches the authorization attribute information for an information string having the specified use method control program ID, and then fro a pointer to the specified use method control program. If the pointer is not the NULL pointer, the use method control program is executed. The executed use method control program provides services for using the software in accordance with a method specified by the program.

The authorization managing section 50 corresponding to the software can be accessed only within a range specified by the copyright owner (which will be explained in a fourth embodiment). Accordingly, even when the owner of the software has been changed to a new one as a result of copying the same, the new owner cannot unjustly change the use method control program of the authorization managing section 50.

The access control of an OS such as UNIX, etc. has been performed so far, by using only three access rights such as read right, write right and execution right. The software owner has been allowed to have all access rights to the software. In these circumstances, if read is possible, copy is possible, too; if copy is possible, edit of copied software is possible, too. Thus, complicate use method control is impossible. It is impossible to perform such complicate control that reference is allowed only under particular conditions (the performance of a display device, a time point, the kind of the machine, etc.).

In the software use method control system of the invention, software also can be protected from being accessed by the owner of its copy, and can be used only by a use method control program specified by the copyright owner of the software. Thus, the copyright owner can perform various kinds of control. For example, he or she can refer to the software, but cannot copy it. Alternatively, he or she can copy the software, but cannot edit it. Still alternatively, he or she can copy the software, and can refer to it but only at a predetermined time point.

FIG. 10 shows a second structure of information managed and controlled by the authorization managing section 50 and the authorization control section 60 employed in the second embodiment.

As is shown in FIG. 10, the use history information is one of the authorization information pieces managed by the authorization managing section 50. The use history information has an information string corresponding to each use method of the software. Each information string includes information indicative of the name of the use method, information indicative of a pointer to a program (use method control program) for controlling the use method, and ID information directly indicative of the use control program corresponding to the use method. The use method control program is controlled by the authorization control section 60.

A procedure for controlling the use methods of software in accordance with the use history information will be explained.

When a request for use has been made to the authorization control section 60, by utilizing the use method control program ID as an argument, the section 60 searches the authorization attribute information for an information string having the specified use method control program ID. The section 60 also searches the use history information for an information string having the specified use method control program ID. It examines a pointer to information indicative of use conditions for controlling the use method of a software system corresponding to the searched information string, and a pointer to information indicative of the use history of the software system.

Thereafter, the authorization control section 60 examines a pointer to the specified use method control program in the authorization attribute information. The section 60 executes the use method control program indicated by the pointer when the pointer is not the NULL pointer. The authorization managing section 50 manages use history information corresponding to each use method control program.

The use method control program specifies its own use method control program ID, and makes an access request to the authorization managing section 50, thereby accessing its own use history information. For example, a use method control program for reference specifies its own ID 00000000. A request for access to the authorization managing section 50 is thereby made to access use history information relating to reference. Thus, information relating to the history of use such as the number of occasions of access to software is used to perform processing such as determination of a levy on reference.

As explained above, the use method control program provides a service of using software in accordance with a specified program, while accessing its own use history information.

Figure 11:
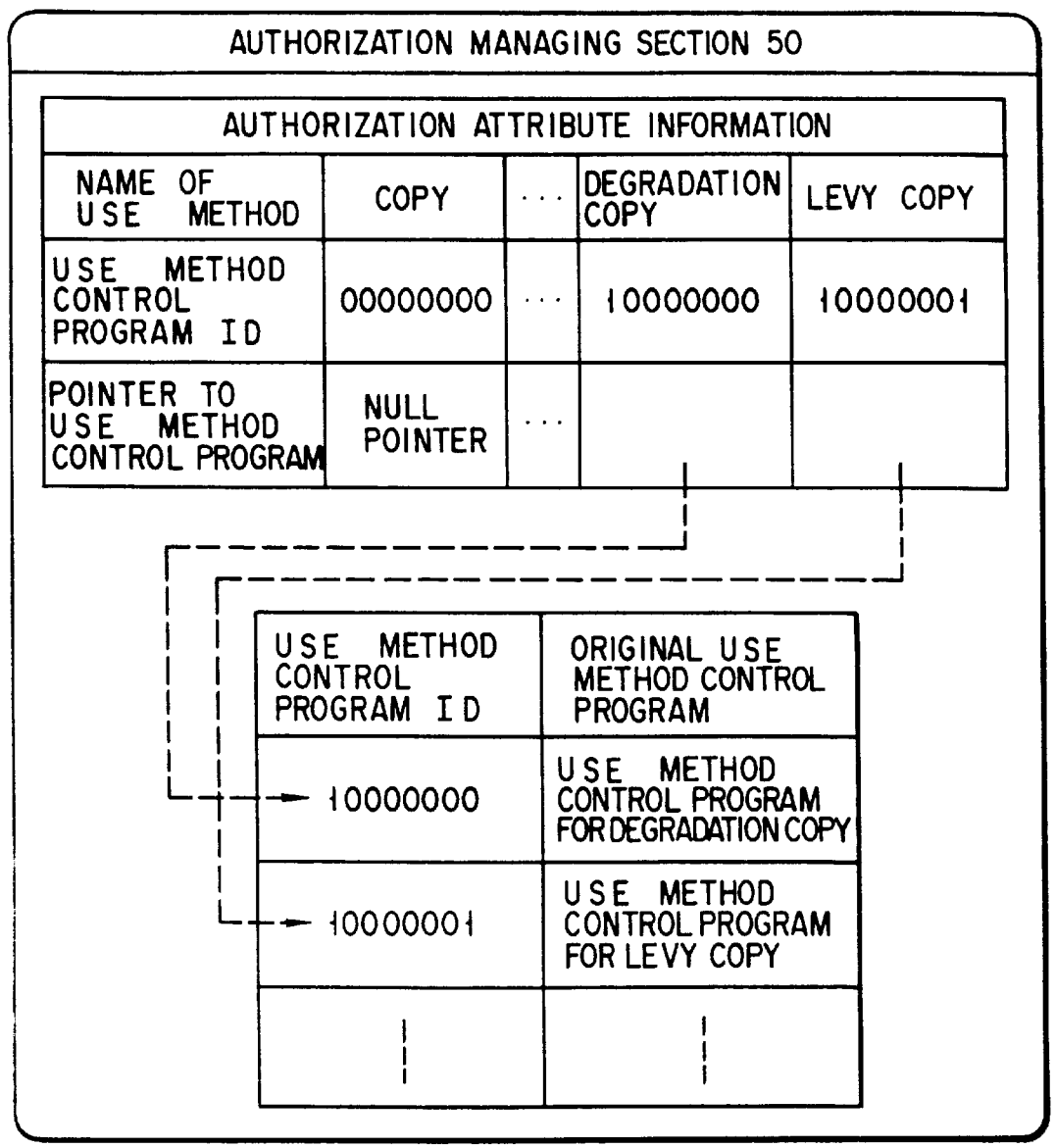
FIG. 11 is a diagram showing the authorization managing section of the system shown in FIG. 8 and a third type of the information managed by the authorization managing section.

FIG. 11 shows a third structure of information managed by the authorization managing section 50 used in the second embodiment.

In FIG. 11, the authorization attribute information has an information string corresponding to each use method of software, as in the FIG. 9 example. Each information string includes information indicative of the name of the use method, information indicative of a pointer to a program (use method control program) for controlling the use method, and ID information directly indicative of the use method control program corresponding to the use method.

The original use method control program of the software is controlled by the use method managing section 50. In other words, the original use method control program is inserted in the software. This program can be created in a desired manner by the copyright owner of the software.

As is shown in FIG. 11, where a use method for "copy" corresponds to a use method control program for unconditioned copy (stored, for example, in the authorization control section 60), the pointer to the use method control program corresponding to unconditioned copy is set to "NULL pointer", thereby prohibiting unconditioned copy.

The authorization information managing section 50 manages a use method control program for realizing degradation copy in which noise is applied each time copy is performed, or for realizing levy copy in which levy is made each time copy is performed. The authorization attribute information managed by the section 50 has an information string corresponding to each use method control program, and a pointer to each use method control program indicates the same program.

If the user tries to perform "copy", a signal indicating that copy is prohibited is displayed, and the name of a use method which can be executed is found in the authorization attribute information and is displayed. If a use method for degradation copy or levy copy is selected, a copy function corresponding to the selected method is executed.

Each use method control program has a function for displaying an explanation of its use method. Such an explanation is displayed, for example, as follows:

(a) An explanation of a use method is displayed before the execution of a corresponding use method control program.

(b) When an operation has been performed, requesting for an explanation of a use method, a particular argument is supplied to a corresponding use method control program. A function for displaying the explanation of the use method is thereby executed.

(c) The authorization attribute information contains information which is used for storing an explanation relating to each use method. When an operation for requesting an explanation of a use method has been performed, the authorization control section 60 displays the explanation.

As described above, the authorization managing section 50 selects a use method control program which corresponds to "copy", "degradation copy" or "levy copy" in accordance with conditions for use or the history of use. The section 50 manages an original use method control program for executing the selected use method control program. Assume that a pointer is switched from a use method control program corresponding to the name of the use method for "copy", to the use method control program for "degradation copy" or "levy copy", when the use method control program corresponding to the name of the use method for "copy" has been tried to be executed. Then, the actually-executed use method control program is switched to the use method control program for "degradation copy" or "levy copy" in accordance with the circumstances of use.

Moreover, a program language is prepared to facilitate the description of a use method control program corresponding to the above use method switching function. This program language can provide a function of, for example, searching the authorization information, by using a simple command.

(4) Modifications of the Second Embodiment

In the second embodiment, the authorization information is managed by the authorization managing section 50. The information may be managed by the authorization control section 60, instead.

Further, the common use method control programs may be managed, not by the authorization control section 60, but by the authorization managing section 50.

Still further, the original use method control may be managed, not by the authorization managing section 50, but by the authorization control section 60.

Figure 12:
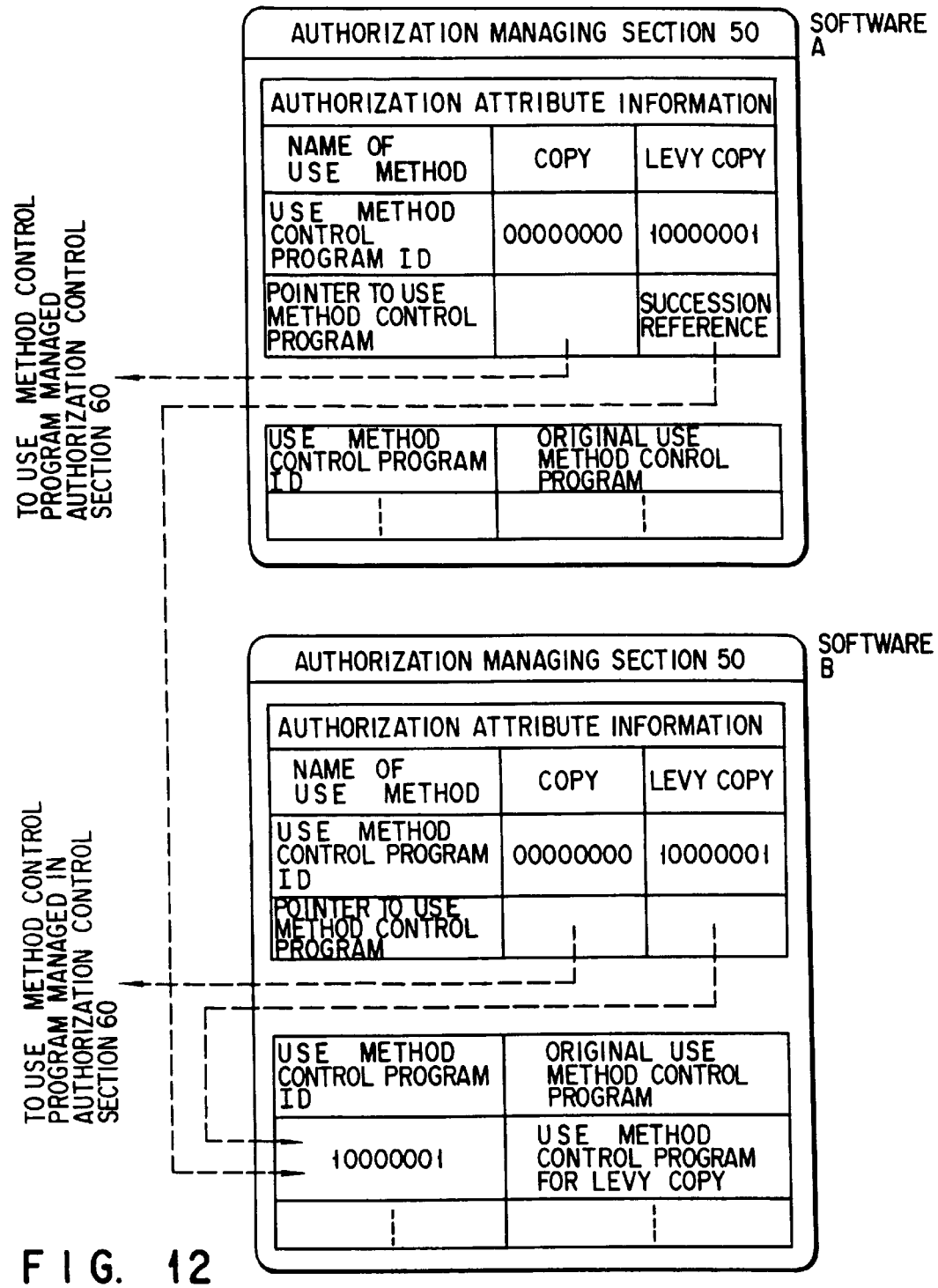
FIG. 12 is a diagram presenting a modification of the information managed by the authorization managing section of the system shown in FIG. 8.

FIG. 12 shows a modification of information managed by the authorization managing section employed in the second embodiment. Specifically, FIG. 12 shows a state in which a use method control program for levy copy is incorporated in the authorization managing section 50 of one (software B) of software systems A and B.

In this modification, that pointer indicative of a use method control program for levy copy is included in the authorization attribute information in the authorization managing section 50 of the software A. This pointer is switched so as to indicate a use method control program for levy copy managed by the authorization managing section 50 of the software B. As a result, the use method control program of the software B can be used again by the software A. If the software A having the use method control program is protected from being accessed due to the access right of the software B, the authorization control section 60 of the software A rejects the use of the use method control program of the software A by the software B.

In the second embodiment, the use of the use method is allowed depending upon whether the pointer is the NULL pointer or not. The invention is not limited to this. Rather, an information string included in the authorization attribute information and corresponding to each use method may have an area for storing information indicative of whether or not the use method can be used.

Third Embodiment (1) Main Components and Features

FIG. 13 is a schematic diagram, showing a software use method control system according to a third embodiment. This embodiment differs from the second embodiment in that the authentication information managing section 45 includes user ID, and that the authorization managing section 50 includes software ID.

(2) Advantages

In general, software can be executed only by a person who has the right to access it, or only by a person whose right to access it has been specified beforehand.

Since the use method control program of the software use method control system accesses a protected system resource, it must have a special access right which differs from that of the user.

If the use method control program is peculiar to software, it is created by the copyright owner of the software. Therefore, the execution of the software by the privilege of the software use method control system may lead to unauthorized access to a to-be-protected system resource by a use method control program created by an unauthorized person.

In the case of executing the software by the access right of the copyright owner, it is possible that the above-described reuse, etc. enables access to all software systems, created by a single copyright owner, by means of the use method control program.

In the software use method control system according to the third embodiment, the authentication information managing section 45 and the authorization managing section 50 each has the user ID and the software ID, and the use method control program is executed by an access right assigned to each software system. As a result, the use range of the use method control program can be limited, for example, to software information managed by a particular software managing section 40, or software information managed by a particular software managing section 40 is made such that it can be accessed only by a particular use method control program.

(3) Detailed Description of the Third Embodiment

The software use method control system of the third embodiment has a structure similar to that of the second embodiment, and therefore only different portions will be explained below.

The authorization managing section 50 manages at least one of information for authenticating at least one particular person, information for authenticating at least one particular unit, and information for authenticating at least one software system. The section 50 uses the at least one information as information (software ID) for discriminating software systems. These software IDs include at least one of text information, voice information, bit map information, stroke information, static picture information, moving picture information, binary information, program information and constructed information of these information pieces.

As is shown in FIG. 14, the software managing section 40 and the authorization managing section 50 manage software ID corresponding to software. The use method control program is executed, by using the access right of the software ID. Before the use method control program accesses the software managing section 40, the authorization control section 60 compares the access right of the use method control program with the software ID managed by the software managing section 40. If the access right is identified by the software ID, the use method control program is allowed to access the software managing section 40. In the case shown in FIG. 14, the software ID (1150115) of the software managing section 40 is identical to that (1150115) of the authorization managing section 50. The use method control program therefore accesses to the section 40.

To utilize again the use method control program of a software system which does not correspond to the software managing section 40 to be accessed, the access right (software ID) of the use method control program is compared with the software ID of the software managing section 40, and access to the section 40 is allowed if the software IDs are identical to each other.

As explained above, in the third embodiment, it can be arranged that the use method control program is accessible only to software information managed by a particular software managing section 40, or that software information managed by a particular software managing section 40 can be accessed only by a particular use method control program.

The software ID may be a combination of the personal ID of the copyright owner and a number specified by the copyright owner. When the user tries to directly access software information managed by the software managing section 40 without utilizing the use method control program, the authorization control section 60 compares the user's personal ID (user ID) managed by the authentication information managing section 45 with the personal ID of the copyright owner included in the software ID managed by the software managing section 40. The software information can be assessed if the IDs are identical to each other.

The software ID may consist only of a number specified by the copyright owner. In this case, the software IDs managed by the software managing section 40 and the authorization managing section 50 are encoded as a key to the personal ID of the copyright owner, and the encoded software IDs are combined with the user's personal ID (user ID) managed by the authentication information managing section 45 when the user has tried to directly access the software information managed by the software managing section 40, without utilizing the use method control program. The access to the software information is allowed if both the combined software IDs are identical to each other.

Fourth Embodiment (1) Main Components and Features

FIG. 15 is a schematic view, showing a software use method control unit included in a software use method control system according to a fourth embodiment. The fourth embodiment differs from the second embodiment in that the software use method control unit further comprises a copyright controls section 75 and a copyright managing section 70.

The fourth embodiment comprises an authorization managing section 50, a software managing section 40, an authentication information managing section 45 and an authorization control section 60, which are identical to those employed in the second embodiment. These components 40, 45, 50 and 60 will not be described in detail.

The copyright managing section 70 manages information (copyright information) for controlling the access of the copyright control section 75 to the authorization managing section 50.

The copyright control section 75 accesses the copyright managing section 70 and the authentication information managing section 45. The section 75 also accesses the authorization managing section 50 with the use of the copyright information and the authentication information.

(2) Advantages

The fourth embodiment which incorporates the copyright managing section 70 and the copyright control section 75 can provide the following advantages:

Editing of the authorization information of each software system, as a secondary use, can be controlled to perform editing in accordance with the circumstances of use as its copyright owner intends, provided that the copy right owner has designated a method for editing the authorization information in accordance with the circumstances of use.

Further, an authorization information-editing method can be provided for each software system by preparing a structure, in which an original procedure for controlling the editing of the authorization information of the software system is inserted into the same software system by the copyright owner. Since the original procedure is protected by the software use method control system, the copyright owner can freely create protected software in which the original editing method of authorization information can be controlled, by inserting into the software his original procedure for controlling a method for editing authorization information.

Moreover, an authorization information-editing method can be provided for each software system by preparing a structure, in which an original procedure for controlling the editing of the authorization information of the software system is inserted into the same software system by the copyright owner. Since the original procedure is protected by the software use method control system, the copyright owner can freely create protected software in which the authorization information can be edited only by a specified editing method, by inserting into the software his original procedure for controlling a method for editing authorization information.

(3) Detailed Description of the Fourth Embodiment

Since the software use method control system according to the fourth embodiment is substantially the same in structure as that of the second embodiment, different components will be explained preponderantly.

The copyright managing section 70 manages at least one of information for editing the use methods of software, information indicative of the conditions for editing the use methods of software, information for discriminating one software system from another software system, information for storing the edit history of the use methods of software, information for controlling levy on the editing of the use methods of software, authentication information, and information consisting of those information pieces combined in a classified manner or in a non-classified manner. The at least one information is used as information (copyright information) for controlling the editing of authorization information managed by the authorization control section 60. The copyright information includes at least one of text information, voice information, bit map information, stroke information, static picture information, moving picture information, binary information, program information and constructed information of these information pieces.

The section 70 controls the editing of the authorization information managed by the authorization control section 60.

The copyright control section 75 controls access to the authorization managing section 50 in the software use method control section of each software system, with the use of the copyright information and the authentication information.

FIG. 16 shows a first structure of information managed and controlled by the copyright managing section 70 and the copyright control section 75 employed in the fourth embodiment.

As is shown in FIG. 16, copyright attribute information is one of the copyright information pieces the copyright managing section 70 manages. The copyright attribute information has an information string corresponding to each edit method for each use method of software. Each information string includes information indicative of the name of the edit method, information indicative of a pointer to a program (copyright control program) for controlling the edit method, and ID information directly indicative of a copyright control program corresponding to the edit method. The copyright control program is controlled by the copyright control section 75.

In FIG. 16, if the pointer to the copyright control program is "NULL pointer", it means that the edit method for editing the use methods of the software is not allowed. On the other hand, if the pointer is not the NULL pointer, it means that the edit method is allowed.

The copyright owner of software can control the editing of the use methods of the software, for example, in manners as follows:

(a) The copyright control program specified by the copyright owner of software, which is protected from access thereto by the user, enables the user to refer to the software use method but prohibit the user from altering the software use method.

(b) The software use method can be freely edited after a predetermined number of days have passed.

A procedure for controlling the method of editing each use method of the software will be explained.

When a request for use has been made to the copyright control section 75 which uses copyright control program ID as an argument, the copyright control section 75 searches the copyright attribute information for an information string having a specified copyright control program ID from and then for a pointer to the specified copyright control program. If the pointer is not the NULL pointer, the indicated copyright control program is executed. The executed copyright control program provides services for editing the software use method methods, in accordance with a method specified by the program.

Figure 17:
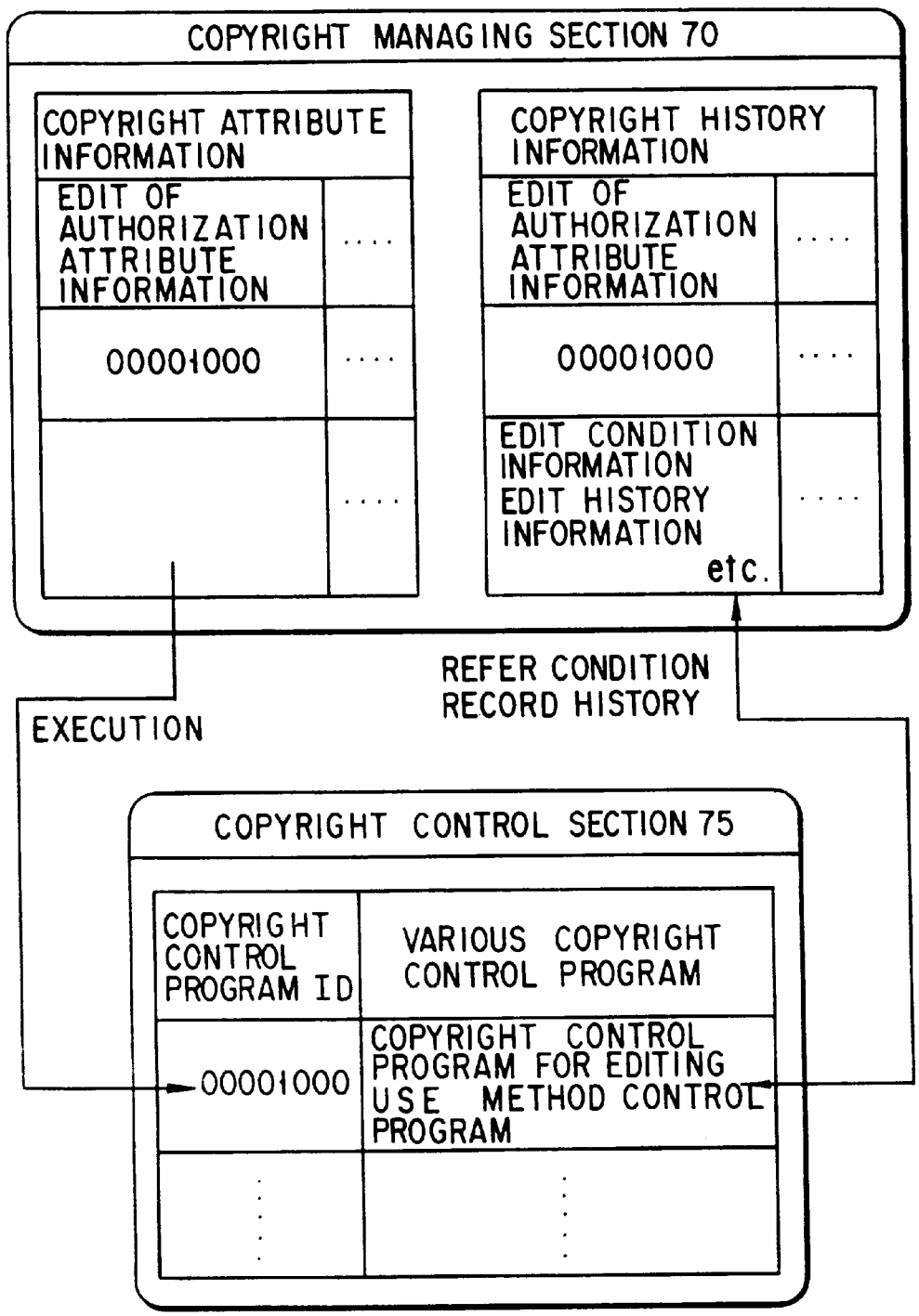
FIG. 17 is a diagram depicting the copyright managing section of the system shown in FIG. 15 and a second type of the information managed by the copyright managing section.

FIG. 17 shows a second structure of information managed and controlled by the copyright managing section 70 and the copyright control section 75 employed in the fourth embodiment.

The copyright history information is one of the copyright information pieces managed by the copyright managing section 70. The copyright history information has an information string corresponding to each use method of the software. Each information string includes information indicative of edit conditions for controlling the method of editing each software use method, information indicative of the edit history of each software use method, information indicative of the name of the edit method, and ID information directly indicative of the copyright control program corresponding to the edit method. The copyright control program is controlled by the copyright control section 75.

A procedure for controlling each use method of software with the use of the copyright history information will be explained.

When a request for edit has been made to the copyright control section 75 by using copyright control program ID as an argument, the section 75 searches the copyright attribute information for an information string having specified copyright control program ID. Then, the section 75 examines a pointer to information indicative of edit conditions for controlling the edit method of the use method of a software system corresponding to the searched information string, and a pointer to information indicative of the edit history of the use method of the software system.

The copyright managing section 70 executes the copyright control program indicated by the pointer if the pointer is not the NULL pointer. The copyright managing section 70 manages copyright history information corresponding to each copyright control program. The copyright control program specifies its own copyright control program ID, and makes an access request to the copyright managing section 70, thereby accessing its own copyright history information. For example, in FIG. 17, a copyright control program for edit specifies 00001000, which is its own copyright control program ID, thereby making an access request to the copyright managing section 70 to access copyright history information relating to edit. Thus, processing for determining levy on edit, etc. is performed by using information relating to use history such as the number of the occasions of editing the software authorization information. As described above, the copyright control program provides edit services in accordance with a method specified therein, while accessing copyright history information corresponding to the program itself.

The copyright managing section 70 stores the copyright history information, and information indicative of edit conditions for each use method of software (e.g. information for authenticating at least one particular person, information for authenticating at least one particular unit and information for authenticating at least one password). The copyright control section 75 compares the copyright history information with the authentication information indicative of circumstances required for executing each copyright control program. It executes the editing of the use method of software in accordance with the copyright control program only if the copyright history information is identical to the authentication information or when they have a predetermined relationship.

FIG. 18 shows a third structure of information managed by the copyright managing section 70 used in the fourth embodiment.

The copyright attribute information is one of copyright information managed by the copyright managing section 70. This information includes an information string corresponding to each edit method for each use method of software. Each information string includes information indicative of the name of the edit method, information indicative of a pointer to a program (copyright control program) for controlling the edit method, and ID information directly indicative of the copyright control program corresponding to the edit method.

As shown in FIG. 18, a copyright control program specific to the software is managed by the copyright managing section 70. In other words, the peculiar or original copyright control program is included in the software itself. The software copyright owner can create the original copyright control program in whatever manner he or she desires.

If the use method for "edit" corresponds to a copyright control program which allows only the copyright owner specified by the software use method control system to edit the use methods, the pointer to the copyright control program corresponding to "edit" is set to "NULL pointer." The editing of the software use method methods are thereby inhibited completely. The copyright managing section 70 manages a copyright control program for realizing an edit method for "levy edit", in which program the use method can be edited by the user if the user pays a predetermined amount of money. The copyright attribute information has information strings corresponding to copyright control programs, and each of pointers in the information strings indicates a corresponding one of the programs.

If the user tries to execute a procedure for "edit" in the above-described case, a message will be displayed, indicating that the execution is prohibited, and the name of an edit method which can be executed is searched from the copyright attribute information and displayed. If the user selects "levy edit", an edit function for executing a use method according to the edit method is executed.

The copyright control program has a function for displaying an explanation of the use method, and the explanation is displayed, for example, in the following manners:

(a) Before the copyright control program is executed, the explanation of the use method is displayed.

(b) If an operation for requesting an explanation for "edit" has been performed, a particular argument is supplied to the copyright control program, and the explanation of the edit method is displayed.

(c) The copyright attribute information contains the information for storing an explanation which corresponds to each edit method. When an explanation for "edit" has been requested for, the copyright control section 75 displays an explanation for the edit method.

Assume that the use method for "edit" corresponds to a copyright control program which allows only the copyright owner specified by the software use method control system to edit the use methods. A procedure for the use method for "levy edit" is then executed whenever the normal use method for "edit" has been tried to be executed, provided that a pointer to a copyright control program corresponding to "edit" is replaced with a pointer to an original copyright control program corresponding to "levy edit" and managed by the copyright managing section 70.

Further, if the pointer to the copyright control program corresponding to "edit" is replaced with a pointer to an original copyright control program corresponding to "edit switching function" and managed by the copyright managing section 70, a copyright control program corresponding to the name of an edit method for "edit" or "levy edit" is selected in accordance with the edit history of edit conditions and the authorization information whenever the normal use method for "edit" has been tried to be executed. In this case, the copyright managing section 70 manages an original copyright control program for executing the selected copyright control program. Thus, replacing the pointer to the name of the copyright control program corresponding to "edit" with a pointer to such a copyright control program enables the actually-executed copyright control program to be changed in accordance with edit circumstances, whenever the copyright control program corresponding to the name of the edit method for "edit" has been tried to be executed.

(4) Modification of the Fourth Embodiment

In the fourth embodiment, the copyright managing section 70 manages the copyright information. Instead, the copyright information may be managed by the copyright control section 75. Moreover, the common copyright control programs may be managed, not by the copyright control section 75, but by the copyright managing section 70. Furthermore, the original copyright control program may be managed, not by the copyright managing section 70, but by the copyright control section 75.

FIG. 19 shows a modification of information managed by the copyright managing section according to the fourth embodiment, in which software A and software B each having the copyright managing section 70 are employed, and only the copyright managing section 70 of the software B stores a copyright control program for levy edit.

In the fourth embodiment, the pointer showing the copyright control program for levy edit, which is included in the copyright attribute information in the copyright managing section 70 of the software A, is switched to indicate a copyright control program for levy edit managed by the copyright managing section 70 of the software B. As a result, the copyright control program of the software B can be used again by the software A. In this case, if the software A is protected from being accessed with the access right of the software B, the copyright control section 70 of the software A rejects the use of the copyright control program of the software A by the software B.

In the fourth embodiment, the use of the edit method is allowed depending upon whether the pointer is the NULL pointer or not. Nonetheless, the invention is not limited to this. Rather, it may be modified such that an information string included in the copyright attribute information and corresponding to each edit method has an area for storing information indicative of whether or not the edit method can be used.

Fifth Embodiment (1) Main Elements and Features

FIG. 20 is a schematic diagram showing the structure of a privilege protecting section 30 included in a software use method control system according to a fifth embodiment of the present invention. The fifth embodiment is characterized by comprising the privilege protecting section 30. The section 30 grants all the users of the software use method control system an access right for accessing the system resource in order to inhibit an access to the system resource by an unauthorized person.

The privilege protecting section 30 comprises an input section 31, a program execute section 32, and an execution testing section 33. The program execute section 32 executes a requested program with an execution section ID specified by the input section 31 The execute section testing section 33 tests the execution section ID and allowing or rejecting the execution based on the test result.

(2) Advantages

The resource protecting section 20 of the first embodiment can protect the system resource corresponding to the software use method control system (structure), against unauthorized access by another OS.

However, the conventional OS has such a structure that an user of the system obtains an access right to the system resource of the OS through the OS. For example, the UNIX has a structure in which a super user, i.e., a system manager who knows a specific password, can freely access the system by utilizing the access right to the OS.

In the above structure, the user of the system obtains an access right for the system resource of the OS through the OS, so as to freely access the system resource to be protected corresponding to the OS. Therefore, the user can alter the OS and access, through the altered OS, the system resource to be protected corresponding to the OS. Further, the system resource to be protected, corresponding to the OS, may be broken by a careless operation by the user.

The software use method control system of the fifth embodiment has the privilege protecting section 30 for inhibiting an unauthorized person from accessing the system resource by granting all the users of the software use method control system an access right to access the system resource.

As a result, it is possible to inhibit an access by an unauthorized person to the system resource by granting all the users of the software use method control system an access right for accessing the system resource. Further, it is possible to prevent alteration of the software use method control system and unauthorized access to the system resource to be protected, corresponding to the software use method control system, through the altered software use method control system. Furthermore, it is possible to prevent the system resource to be protected, corresponding to the software use method control system, by a careless operation by the user.

(3) Detailed Description of the Fifth Embodiment

Each program executed by the software use method control system is managed as one execute section. ID information known as an execution section ID is assigned to each execute section and used as data for discriminating one execute section from another.

The execution section ID serves to present an access right for judging whether the access is permitted or not, when the system resource is accessed by the executed program. Each system resource is also assigned an execution section ID serving to presents the execute section which has an access right to the system resource. Thus, only the program executed by the execution section ID, the same as the program of the system resource, is permitted to access the system resource.

In the software use method control system, the software use method control system is treated as one execute section as well as each program. The IDs assigned to the software use method control system and the programs executed thereon are, therefore, treated as IDs of the OS by the resource protecting section 20 described in the first embodiment.

The resource protecting section 20 manages the execution section IDs and judges whether the access is permitted or not as in the first embodiment as described above.

A special execution section ID is assigned to the software use method control system. The software use method control system is executed as a program having the special execution section ID. The resource protecting section 20 permits the software use method control system having the special execution section ID to unconditionally access all the system resources. In other words, the execution section ID of the software use method control system is information presenting an execution program which has an access right to the system resources.

FIG. 21 is a flowchart explaining an operation of the privilege protecting section 30.

The input section 31 determines an execution section ID for executing the requested program (Steps B1 and B2) in accordance with the input made by the user.

Before executing the program, the program execute section 32 requests that the execute section testing section 33 test the executing section ID to be executed. The section 33 tests the relationship between the execution section ID of the execution section to be executed and the execution section ID assigned to the software use method control system itself (Step B3).

If the execution section IDs coincide with each other (Step B4), this means that a general user is going to activate a program having a privileged access right similar to that of the software use method control system. In this case, the execute section testing section notifies the program execute section 32 that execution of the program should be refused (Step B6). In Step B4, if the execution section IDs do not coincide, the execute section testing section notifies the program execute section 32 that execution of the program should be permitted (Step B5).

Sixth Embodiment (1) Main Components and Features

Figure 22:
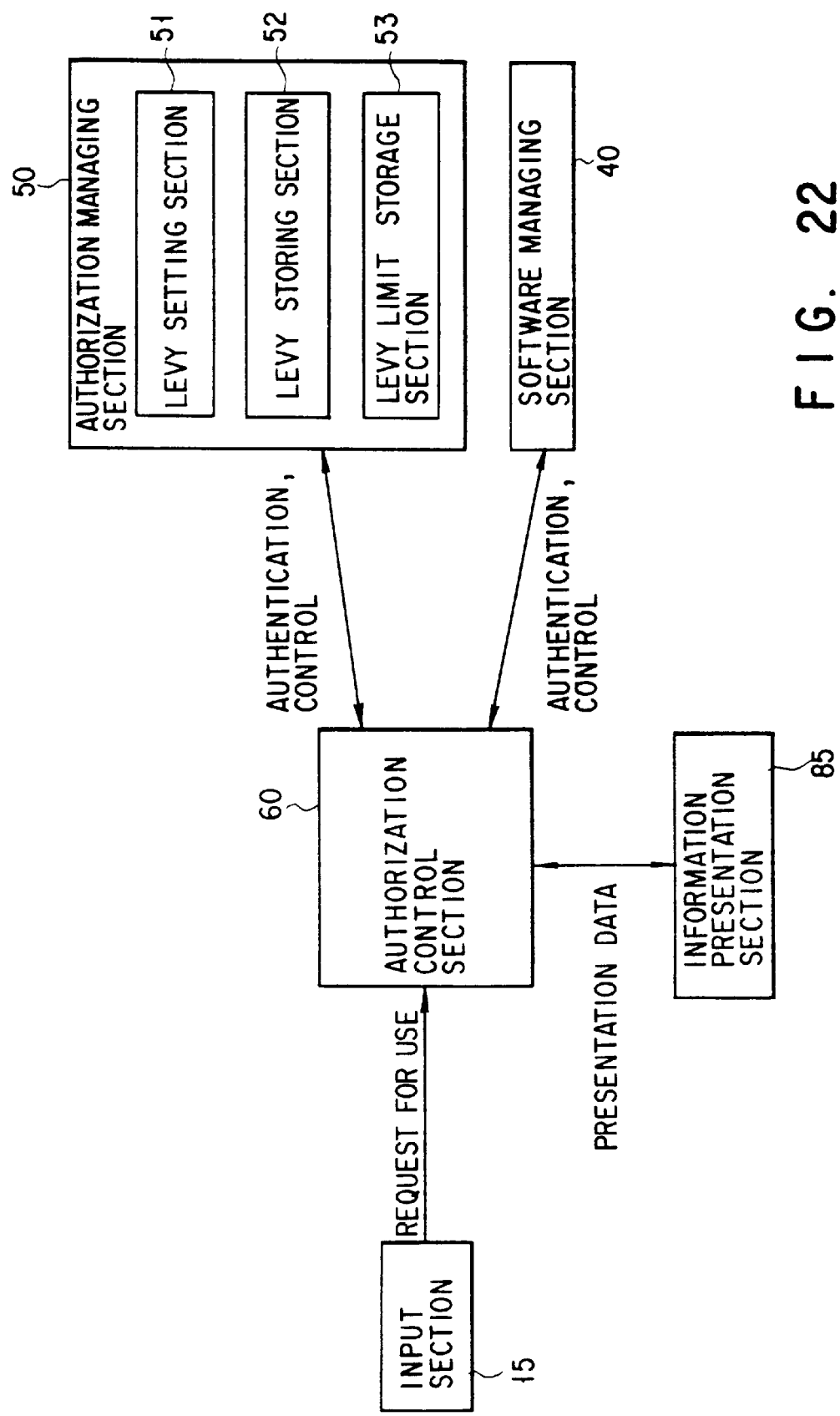
FIG. 22 is a diagram showing the basic structure of a software use method control system according to a fifth embodiment of this invention.

FIG. 22 is a schematic diagram showing the structure of a software use method control system according to a sixth embodiment of the present invention. The sixth embodiment comprises an input section 15, a software managing section 40, an authorization managing section 50, an authorization control section 60 and an information presentation section 85. The sixth embodiment is characterized in that the authorization managing section 50 includes a levy setting section 51, a levy storing section 52 and a levy limit storing section 53.

The input section 15 includes, for example, keys and track balls, through which the user inputs request instructions.

The software managing section 40 manages software information, such as books, newspapers and software.

The authorization managing section 50 manages the method of using the software managed by the software managing section 40.

The authorization control section 60, in reply to a request from the input section 15, determines whether software can be used, alters information managed by the authorization managing section 50, based on the use request. The section 60 reads the software from the software managing section 40 and decodes encoded data and restores compressed data.

The information presentation section 85 presents data which the authorization control section 60 allows to be presented.

The authorization managing section 50 includes the levy setting section 51 for determining a levy in accordance with the way of access (including an amount of access) to the software by the user, the levy storing section 52 for storing the sum of levies, and the levy limit storing section 53 for storing an upper limit of the sum of levies.

(2) Advantages

In a conventional system of a network in which a payment is levied every time the software is used, it is necessary to transmit or receive information to or from a levy center for the purpose of payment. An apparatus for levying a payment for using software must be connected to the network all the time or every time the software is used. If a payment is not levied until the system is connected to the network without such a restriction, unlimited use of the software will be permitted, so long as the system is not connected to the network. In this case, a great risk may be involved.

The total amount of the levies is managed for every software. In addition, an upper limit of the levy for a use of software is set. If the levy exceeds the upper limit and if any payment operation is not performed to initialize the levy, the use of the software or the entire system is inhibited. Thus, the software can be used independent of the network and unpaid use of the software beyond a predetermined level can be inhibited, thereby accomplishing reasonable payment and collection of fees.

(3) Detailed Description of the Sixth Embodiment

As shown in FIG. 22, the user inputs a request for using i-th software (hereinafter referred to as 'software i") to the input section 15. Then, the authorization control section 60 executes one of the use method control programs corresponding to the software i. That is, the section 60 executes a levy setting program (managed by the authorization managing section 50), thereby calculating the amount of levy in accordance with the way in which the software i is used.

In the levy setting program, a calculated amount is added to an amount of levy managed by the levy storing section 52 of the authorization managing section 50. Since the authorization managing section 50 is managed together with each software, the levy of each software is individually managed.

The authorization managing section 50 also manages the levy limit storing section 53, which manage the upper limit of the levy set by the owner of copyright of the software.

In the levy setting program, every time a calculated amount is added to an amount of levy managed by the levy storing section 52, the sum is compared with the upper limit stored in the levy limit storing section 53. When the sum exceeds the upper limit, the authorization control section 60 is notified that use of the software should be prohibited.

The authorization control section 60 registers the prohibited software and prohibits use of the software or use of the system except for a predetermined payment operation, until the payment operation is executed.

An IC card can be used as the levy storing section 52 of the authorization managing section 50. When the user uses the apparatus of the present invention, he or she inserts the IC card into the apparatus, so that the levy of each user can be managed. In this manner, a plurality of users can easily use one apparatus in common.

(4) Modifications of the Sixth Embodiment (a) First Modification

The levy storing section 52 can be managed, not by the authorization managing section 50, but by the authorization control section 60. If the authorization control section 60 manages the levy storing section 52, the levies for the respective software can be individually managed or the total levy for all the software can be managed as a lump sum.

(b) Second Modification

The levy limit storing section 53 may be managed, not by the authorization managing section 50 in the sixth embodiment, but by the authorization control section 60. If the authorization control section 60 manages the levy limit storing section 53, the levies for the respective software can be individually managed or the total levy for all the software can be managed as a lump sum.

In the above first and second modifications, if the authorization control section 60 manages the total levy for all the software as a lump sum, it is possible that the user inserts a prepaid card in the apparatus for using desired software to pay a fee, so that the levy becomes 0 (or as close to 0 as possible) and the amount of the payment can be subtracted from the levy.

Seventh Embodiment (1) Main Components and Features

Figure 23:
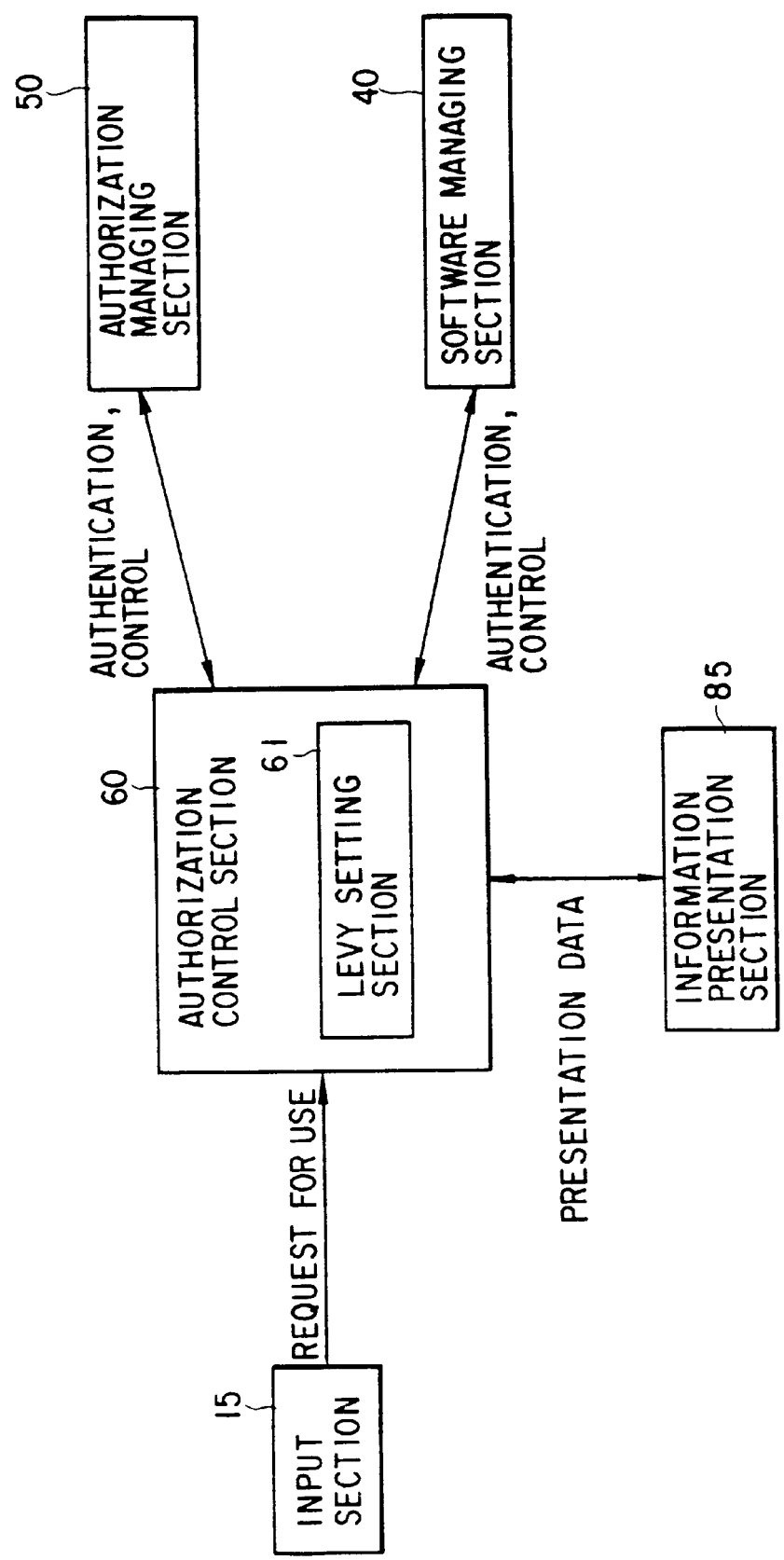
FIG. 23 is a diagram showing the basic structure of a software use method control system according to a seventh embodiment of the invention.

FIG. 23 is a schematic diagram showing the structure of a software use method control system according to a seventh embodiment of the present invention. The seventh embodiment differs from the sixth embodiment in that the authorization control section 60 includes a levy setting section 61, and the levy setting section 51, the levy storing section 52 and the levy limit storing section 53 are omitted from the authorization managing section 50. The levy setting section 61 determines the levy with reference to the structure of software, when the authorization control section 60 judges the software to be usable.

(2) Advantages

Conventionally, when a user buys a book or the like, one book must be paid for unconditionally. In other words, even if the user finds the book useless while reading, the user cannot have all or some of the payment refunded. Further, a considerable effort was required to achieve such a refund.

In the seventh embodiment, reasonable payment and collection can be executed since the levy is set in accordance with an amount of access to information such as documents.

(3) Detailed Description of the Seventh Embodiment

FIG. 24 is a flowchart showing the process of the seventh embodiment.

In a state of waiting for an input from the user (Step C1), if a request for use of software i is input by the user (Step C2), the authorization control section 60 judges whether the software i is usable in the same manner as in the second embodiment (Step C3). In Step C3, if the software i cannot be used, a message showing that the software cannot be used is presented to the information presentation section 85 (Step C4), and the process is terminated and returned to the state of waiting (Step C1). In Step C3, if use of the software i is permitted, the authorization control section 60 reads the requested software i from the software managing section 40 (Step C5). In Step C5, if the software i is compressed or encoded, it is restored (compressed data is returned to an original state) or decoded (encoded data is decoded by means of a key or the like).

Of the information managed by the authorization managing section 50, the levy information is restored or decoded and transmitted to the levy setting section 61 (Step C6). The following is an example of the levy information:

$$y = C1 \cdot x^{C2}$$

In the above equation, C1 and C2 are constants, x is an amount of information of the software obtained by Step C8, and y is an amount of levy.

The authorization control section 60 transmits the software decoded in Step C5 to the information presentation section 85 (Step C7). The information presentation section 85 transmits information of the presented amount to the authorization control section 60. The authorization control section 60 transfers the information to the levy setting section 61 (Step C8). If the software is a document, the information presentation section 85 counts the number of letters from the start to the end of the presented portion of the document, and transmits the number of letters to the authorization control section 60. The authorization control section 60 transfers the number of letters to the levy setting section 61.

The levy setting section 61 substitutes the number of letters supplied from the authorization control section 60 for x of the equation of the levy information, thereby obtaining the amount y (Step C9).

Since, as described above, it is possible to pay only for the presented portion of the software, not for the entire software, reasonable payment and collection for the use of the software can be achieved. For example, while reading the presented document, if the user finds that the subsequent portion of the document is not required, it is only necessary to pay for the read portion of the document. Since the user can pay only for the read portion, he or she can access a great amount of software with a low cost.

(4) Modifications of the Seventh Embodiment (a) First Modification

In the seventh embodiment, the information presentation section 85 counts the number of letters from the start to the end of the presented portion of the document, and the levy is calculated on the basis of the count. The letters presented in the document can be managed as follows.

The levy information, which is included in the information managed by the authorization managing section 50 and which is decoded and transmitted to the levy setting section 61, is constituted by a software data managing table and a levy calculating equation. The levy calculating equation is identical to the levy information in the seventh embodiment, and will not be described.

The software data managing table stores whether a portion of a document has been presented or not. FIG. 25 shows an example of the software data managing table. In FIG. 25, an access flag "1" indicates that a start letter position to an end letter position of the corresponding line has already been presented, and an access flag "0" indicates that a start letter position to an end letter position of the corresponding line has not yet been presented. The information in the software data managing table are arranged in an ascending order of start letters.

Steps C1 to C7 of the operation of the modification are the same as those in the seventh embodiment.

The information presentation section 85 transmits information of the start letter position and the end letter position of the presented portion of the software to the authorization control section 60. The section 60 transfers the information to the levy setting section 61 (Step C8).

The levy setting section 61 stores the information on the letter positions in the software data managing table and calculates the levy (Step C9). For example, a case, in which the information are the start letter position "3601" and the end letter position "8400", will be described with reference to FIGS. 26 and 27.

As shown in FIG. 26, a start letter position and an end letter position are set (the document is divided) so that the transmitted start and end letter positions "3601", and "8400" can be indicated. At this time, the value of the access flag is unchanged.

Then, as shown in FIG. 27, the access flag is changed to "2" if the access flag is "0" in a range of the start letter position "3601 to the end letter position "8400."

The levy is calculated in accordance with the flowchart shown in FIG. 28. First, the numbers x1 of letters having the access flag "1" are sum up (Step D1), and x1 is substituted for x in the levy calculating equation, thereby obtaining a value y1 (Step D2). Then, the numbers x2 of letters having the access flag "1" are sum up (Step D3), and x2 is substituted for x in the levy calculating equation, thereby obtaining a value y2 (Step D4). The value (y2−y1) is calculated, thereby obtaining an amount of levy (Step D5).

In the software data managing table, finally, an access flag "2" is changed to "1." Further, adjacent portions having the access flag "1" are combined into one line. The case shown in FIG. 27 is changed as shown in FIG. 29.

As described above, in the first modification, the presented letters of a document are managed in the same manner as in the seventh embodiment. As a result, payment and collection of the levy can be executed without levying again the portion which has already been read.

(b) Second Modification

In the seventh embodiment, the number of letters presented is substituted for x in the levy information $y=C1 \cdot x^{c2}$, thereby obtaining the levy y. However, a percentage of the number of the letters presented to the number of all letters can be substituted for x as follows:

{(Number of letters presented)/(Number of all letters)}× 100

The levy information is not limited to the aforementioned equation, but can be presented by the following equations:

$$y = C \cdot x \ (0 < x < 25)$$

$$y = 2 \cdot C \cdot x \ (25 < x < 50)$$

$$y = 3 \cdot C \cdot x \ (50 < x < 75)$$

$$y = 4 \cdot C \cdot x \ (75 < x < 100)$$

where C is a constant and x is a percentage of the number of presented letters to the number of all letters.

(c) Third Modification

In the seventh embodiment, the number of presented letters is used to calculate a levy. However, a levy can be calculated from, for example, the number of words, sentences, paragraphs or chapters.

(d) Fourth Modification

In the seventh embodiment, the number of letters presented is used to calculate a levy, in a case where the software is a document. However, if the software is a sound, a levy can be calculated from a period of time in which the software is output by the user or the ratio of the period of time to the entire period. If the software is a bit map or a static picture, a levy can be calculated from the number of bits output by the user or the ratio of the output bits to all the bits, or the area of an image output by the user or the ratio of the output area to all the area. If the software is a moving image, a levy can be calculated from the number of bits output by the user or the ratio of the output bits to all the bits, the number of frames output by the user or the ratio of the output frames to all the frames, or the area of an image output by the user or the ratio of the output area to all the area. As described above, in general, a levy can be calculated from an amount of output information or the ratio of the output information to the overall information.

Figure 30:
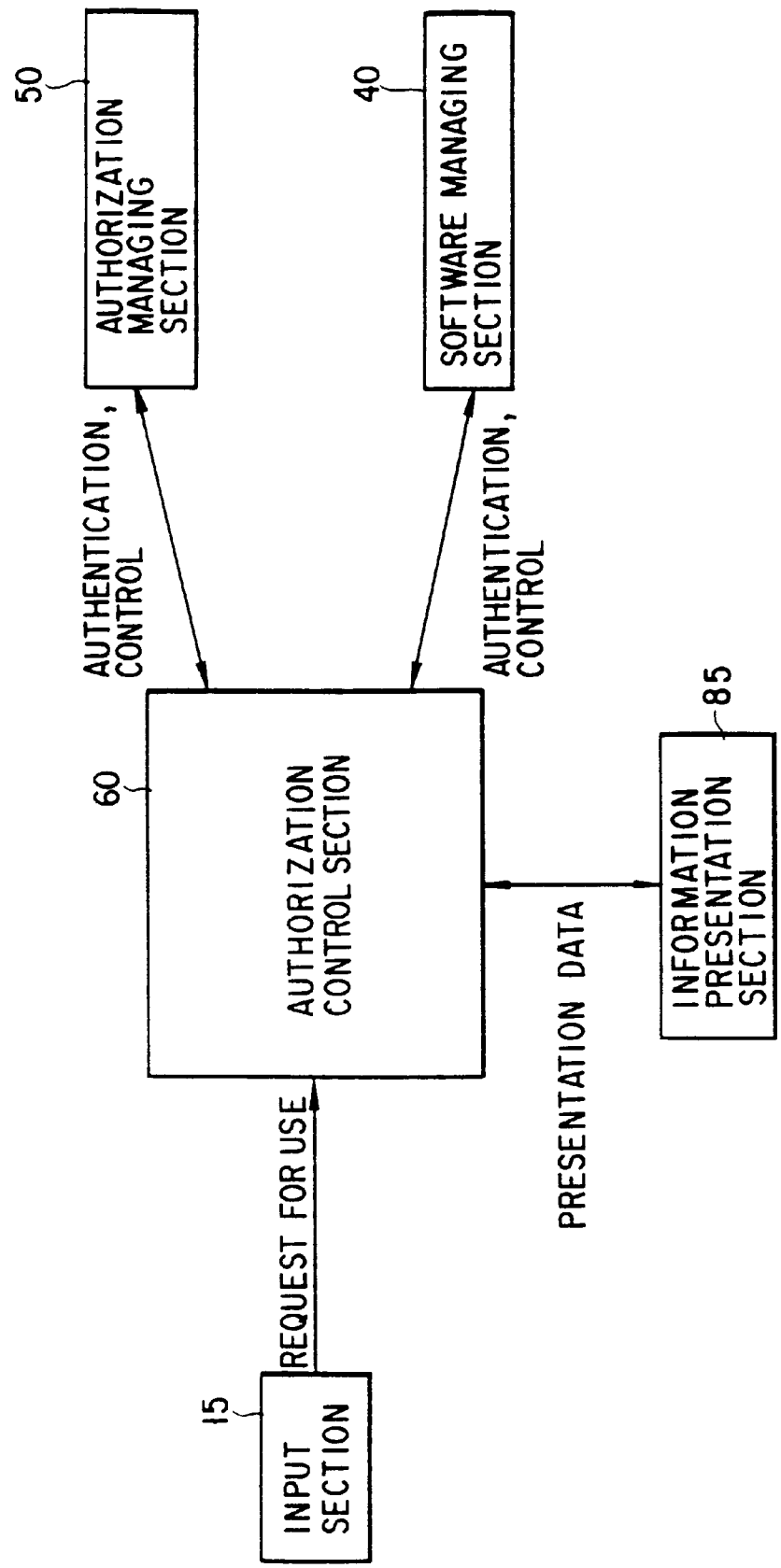
FIG. 30 is a diagram showing the basic structure of a software use method control system according to an eighth embodiment of the present invention.

Eighth Embodiment (1) Main Components and Features FIG. 30 is a schematic diagram showing the structure of a software use method control system according to an eighth embodiment of the present invention. The eighth embodiment differs from the seventh embodiment in that the levy setting section 61 is excluded. Since the functions of the other components of the eighth embodiment are the same as those in the seventh embodiment, a detailed description thereof is omitted.

(2) Advantages

Since electronic newspapers or magazines, as well as newspapers or magazines paper, serve as advertising media, they are worth advertisement fees. Therefore, the price of information on newspapers or magazines can be reduced. In the eighth embodiment, since an advertisement is automatically displayed, it does not require work of a user or an information provider.

(3) Detailed Description of the Eighth Embodiment

FIG. 30 is a flowchart showing an operation of the eighth embodiment. Since Steps E1 to E4 are the same as Steps C1 to C4 of the fourth embodiment shown in FIG. 24.

In Step E5, the authorization control section 60 reads the constitution of the requested software i from the authorization managing section 50. The section 60 reads the content of software indicated by a pointer read from the software managing section 40 into the software. If the content of the software i or the software indicated by the pointer is compressed or encoded, it is restored (compressed data is returned to an original state) or decoded (encoded data is decoded by means of a key or the like).

FIG. 32 shows an example of the structure of the decoded or restored software i. As shown in FIG. 32, the software includes advertisement information and news information other than the advertisement information. Each information consists of serial numbers and pointers. Each pointer indicates the content of information. The symbol "¥0" means the end of the software.

Subsequently, a news counter C1 and an advertisement counter C2 are set to "1" (Steps E6 and E7). Three pieces of news, beginning with the news having the same serial number as the news counter C1, are successively sent to the information presentation section 85 (Step E8). For example, when the counter C1 is "1", the contents of the news 1 to 3 are presented. Further, 3 is added to the counter C1. Similarly, two advertisements, beginning with the advertisement having the same serial number as the advertisement counter C2, are successively sent to the information presentation section 85 (Step E9). For example, when the counter C2 is "1", the contents of the advertisement 1 and 2 are presented. Further, 2 is added to the counter C2. The information presentation section 85 successively presents news or advertisements transmitted from the authorization control section 60. When there is no news to be presented, the process is terminated (Step E10). When news to be presented remains, if a continuation request is input by the user in Step E11, the flow returns to Step E8 to continue the process, and if not, the process is completed.

(4) Modifications of the Eighth Embodiment (a) First Modification

In the eighth modification, the authorization control section 60 controls so that news and advertisements are alternately presented. An advertisement can always be presented in a lower portion of the screen as follows.

Figure 31:
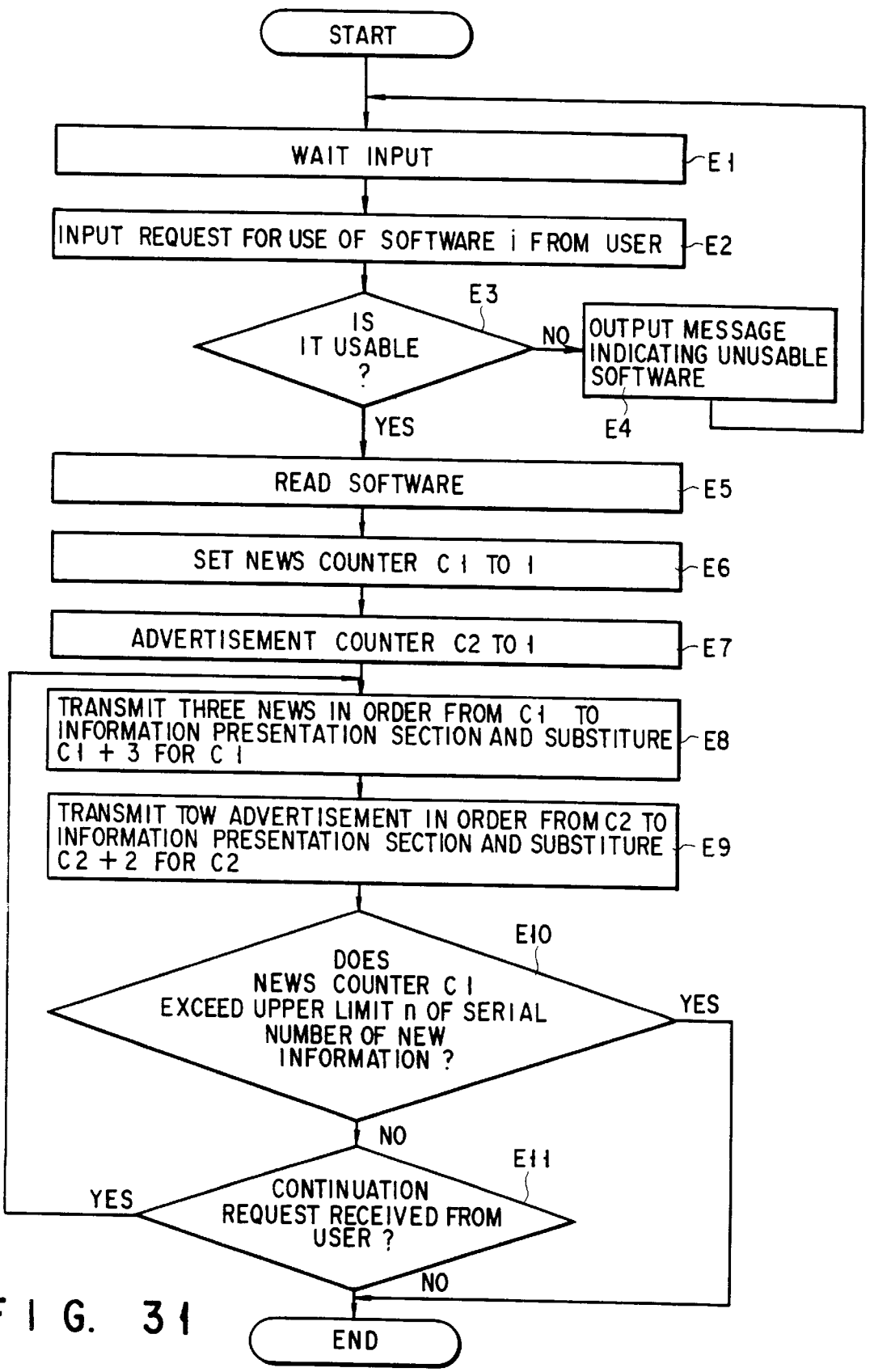
FIG. 31 is a flow chart explaining the operation of the system shown in FIG. 30.
Figure 33:
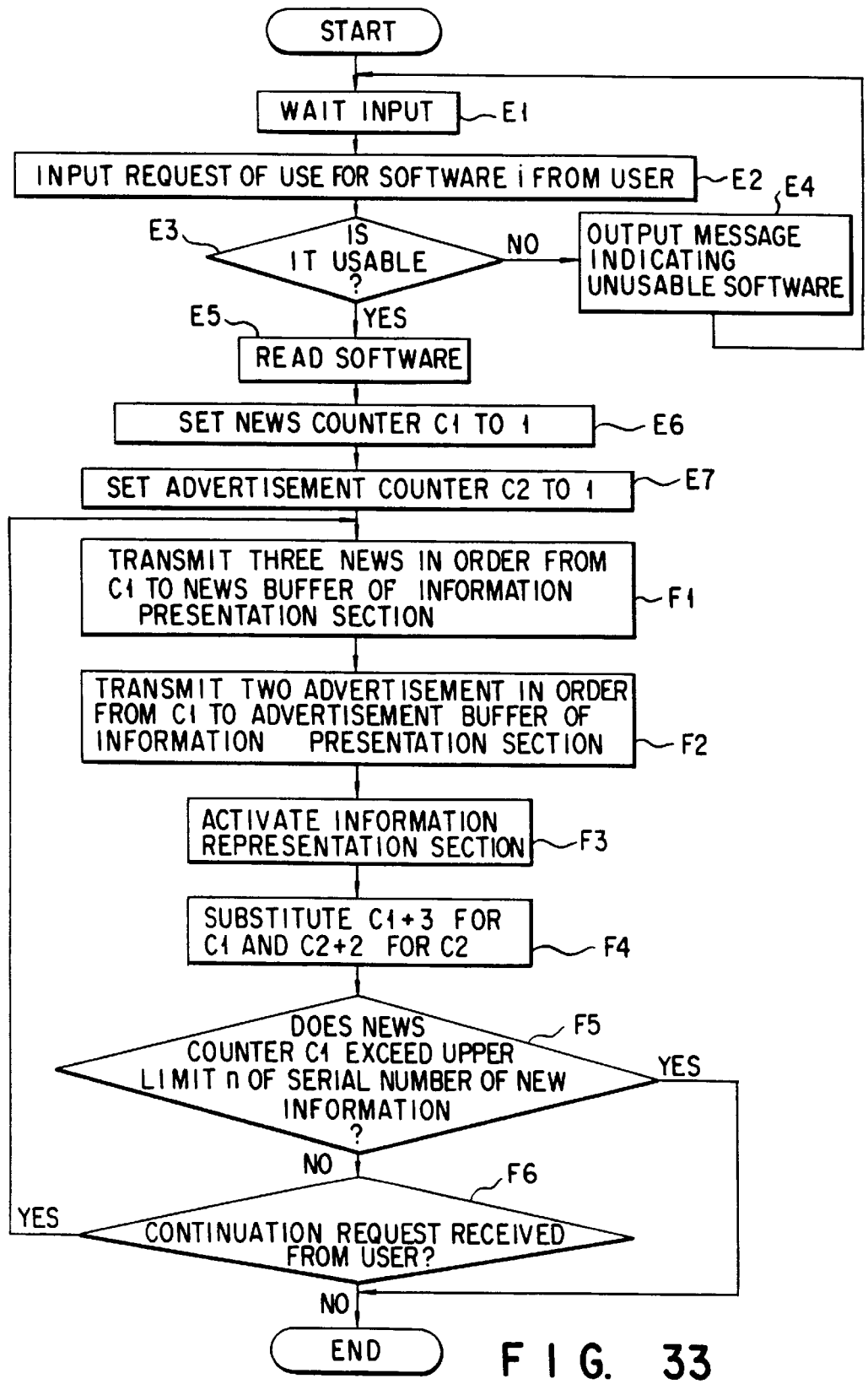
FIG. 33 is a flow chart explaining the operation of a first modification of the system shown in FIG. 30.

In FIG. 33, Steps E1 to E7 are the same as those in FIG. 31 of the eighth embodiment, a description thereof is omitted.

Three pieces of news, beginning with the news having the same serial number as the news counter C1, are successively stored in a news buffer in the information presentation section 85 (Step F1). Similarly, two advertisements, the first of which has the same serial number as the advertisement counter C2, are successively stored in an advertisement buffer (Step F2). Then, the authorization control section 60 activates the information presentation section 85 (Step F3). Three (3) is added to the counter C1 and 2 is added to the counter C2 (Step F4). When there is no news to be presented, the process is terminated (Step F5). When news to be presented remains, if a continuation request is input by the user in Step F6, the flow returns to Step F1 to continue the process, and if not, the process is terminated.

As a result, when the information presentation section 85 is activated by the authorization control section 60, data in the news buffer is presented in an upper portion of the screen and data in the buffer for advertisement is presented in a lower portion of the screen. FIG. 34 shows an example of the presented screen.

(b) Second Modification

In the eighth modification, news and advertisements are alternately presented. However, it is possible that an advertisement can be displayed as a screen saver.

Figure 35:
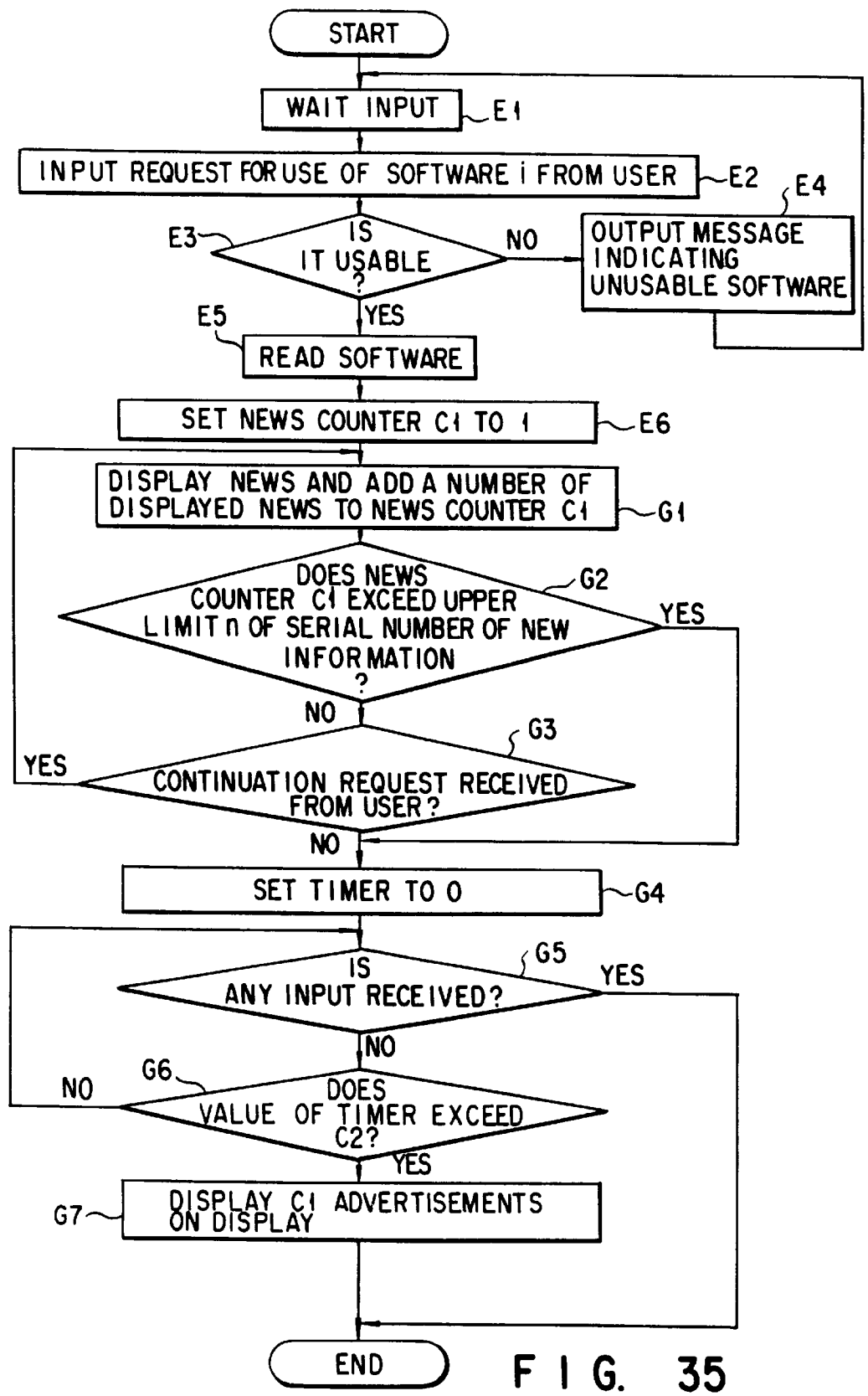
FIG. 35 is a flow chart explaining the operation of a second modification of the system shown in FIG. 30.

FIG. 35 is a flowchart showing the process of the second modification. In FIG. 35, Steps E1 to E6 are the same as those in FIG. 31 of the eighth embodiment, a description thereof is omitted.

News is displayed and the number of pieces of the displayed news is added to the news counter C1 (Step G1). It is determined whether news remains to be presented (Step G2). When news remains to be presented, if a continuation request is input by the user (Step G3), the flow returns to Step G4 to continue the process. If news to be presented does not remain in Step G2 or a continuation request is not input by the user, the flow advances to Step G5.

The value of a timer in the authorization control section 60 is set to "0" (Step G4). If anything is input, the process is terminated, and if not, the flow advances to Step G6 (Step G5). It is determined whether the value of the timer exceeds a preset time C2 (Step G7). In Step G7, if the value of the timer does not exceed C2, the flow returns to Step G5, and if the value of the timer exceeds C2, advertisements of the number corresponding to C1 are displayed on the screen (Step G8) and the process is terminated.

Figures 37, 39:
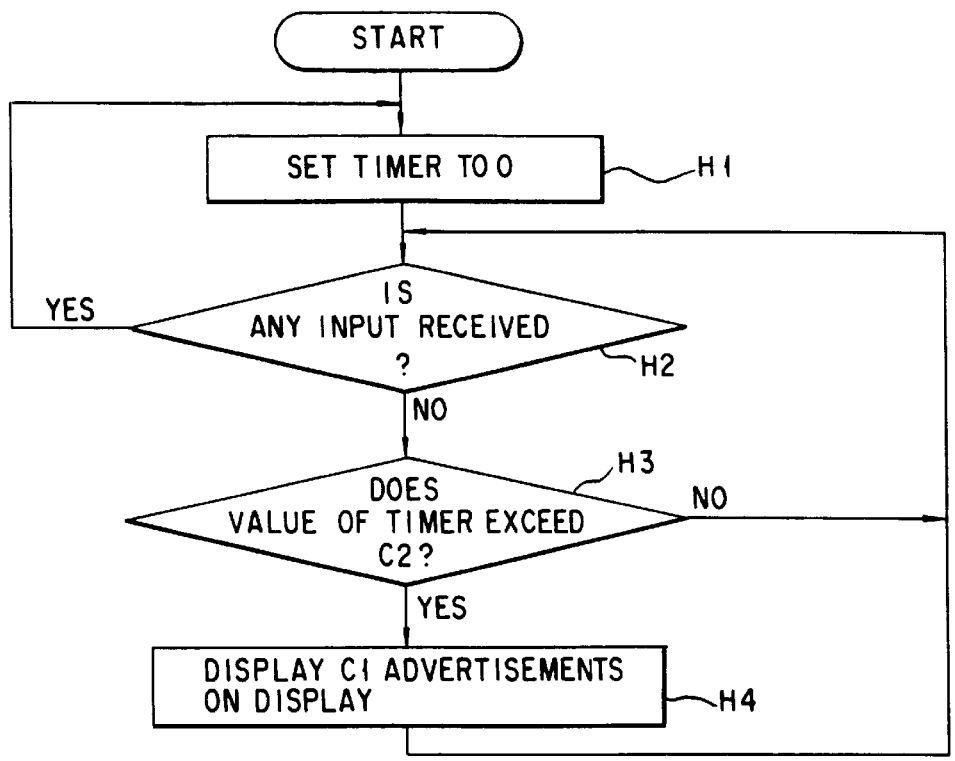
FIG. 37 is a flow chart explaining still another operation of the second modification of the system shown in FIG. 30.
FIG. 39 is a diagram showing an example of software incorporated in the system according to the ninth embodiment.

Alternatively, processes shown in FIGS. 36 and 37 can be executed instead of the process shown in FIG. 35. In FIG. 36, Steps E1 to G3 are the same as those in FIG. 35, a description thereof is omitted. The process shown in FIG. 37 is executed in parallel with the process shown in FIG. 36. The value of the timer is set to "0" (Step H1). It is determined whether anything is input (Step H2). If anything is input, the flow returns to Step H1. If not, it is determined whether the value of the timer exceeds a preset time C2 (Step H3). In Step H3, if the value of the timer does not exceed C2, the flow returns to Step H2, and if the value of the timer exceeds C2, advertisements of the number corresponding to C1 are displayed on the screen (Step H4) and the flow returns to Step H2.

Advertisements of the number corresponding to C1 can be presented in the order of the serial numbers of the advertisement information.

Ninth Embodiment (1) Main Elements and Features

The software use method control system according to the ninth embodiment is identical in structure to the seventh embodiment shown in FIG. 23, except that the authorization control section 60 includes a levy setting section 61.

(2) Advantages

Since electronic newspapers or magazines, as well as newspapers or magazines of paper, serve as advertising media, they are worth advertisement fees. In the ninth embodiment, since an advertisement is not automatically displayed and the user can select whether to display an advertisement, a levy can be advantageous to the user. For example, if the user has a sufficient time or does not have a sufficient money, the levy can be saved by making an advertisement displayed. If the user does not have a sufficient time or has a sufficient money, he or she can see only necessary information such as news excluding an advertisement.

(3) Detailed Description of the Ninth Embodiment

Figure 38:
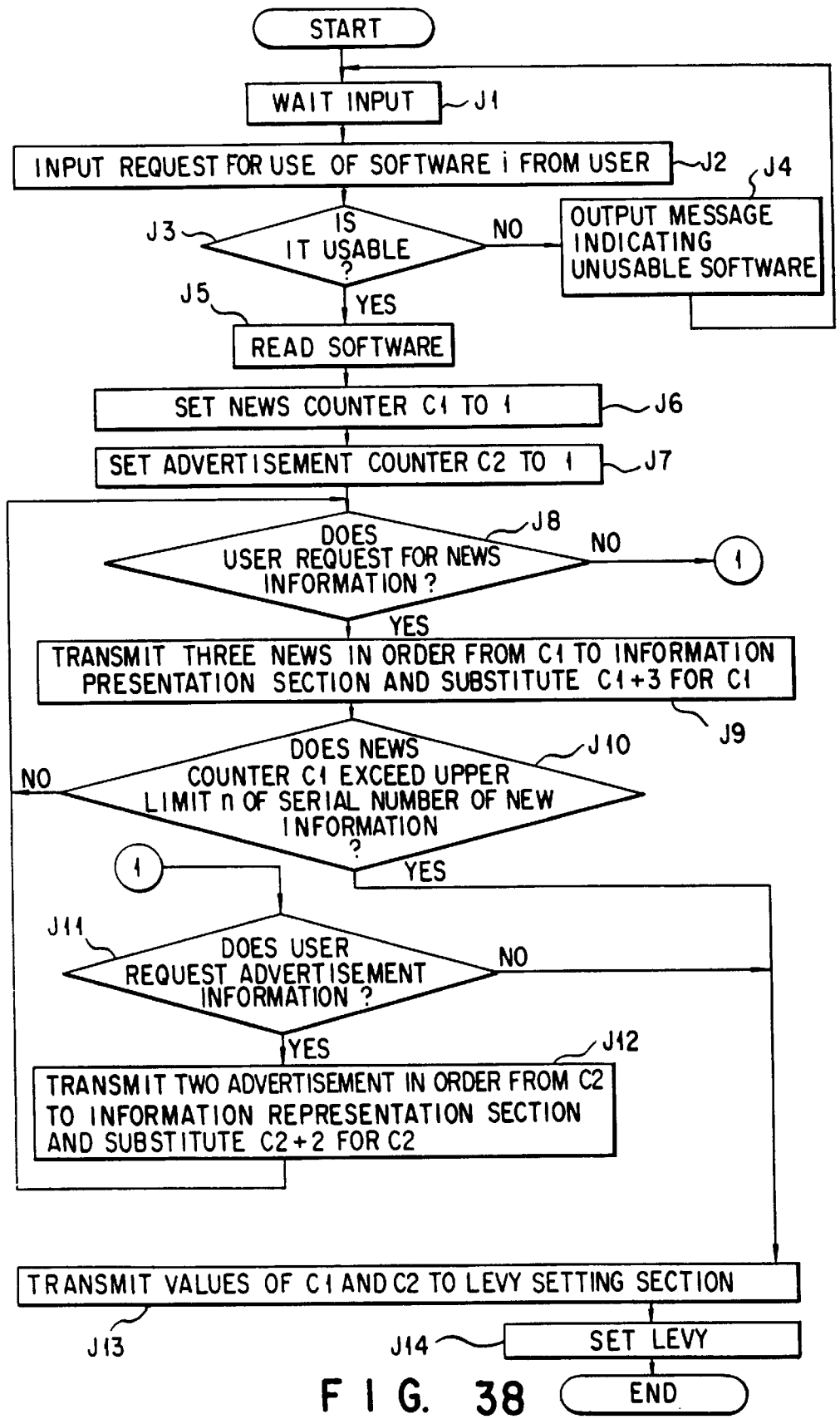
FIG. 38 is a flow chart explaining the operation of a software use method control system according to a ninth embodiment of the present invention.

FIG. 38 is a flowchart showing an operation of the ninth embodiment. In FIG. 38, Steps J1 to J7 are the same as Steps E1 to E7 in FIG. 31 performed in the fifth embodiment. FIG. 39 shows the structure of an example of the decoded or restored software i, which is the same as that shown in FIG. 32 of the fifth embodiment except that the number of pieces of information is stored in the line of "news information" and "advertisement information."

The authorization control section 60 presents a screen as shown in FIG. 40A to the information presentation section 85, and determines whether the user points □ located immediately before "news information" of the screen (Step J8). In FIG. 40A, the numbers of pieces of the news information and the advertisement information are displayed as "total number of cases" and "number of cases which have not seen".

In FIG. 40A, if □ located immediately before "news information" is pointed, three pieces of news, beginning with the news having the same serial number as the news counter C1, are successively sent to the information presentation section 85 and 3 is added to a value of the counter C1 (Step J9). It is determined whether news remain to be presented (Step J10). If news remain to be presented, the flow returns to Step J8, and if news to be presented does not remain, the flow advances to Step J13. If the flow returns to Step J8, the value of (C1−1) is displayed as "the number of cases which have seen" and the difference between the number of cases which have seen and the total number of cases is displayed as "the number of cases which have not seen," as shown in FIG. 40B.

In FIG. 40A, if ☐ located immediately before "news information" is not pointed, it is determined whether ☐ located immediately before "advertisement information" is pointed (Step J11). If ☐ located immediately before "advertisement information" is not pointed, the flow advances to Step J13. If ☐ located immediately before "advertisement information" is pointed, two advertisements, beginning with the advertisement having the same serial number as the advertisement counter C2, are successively sent to the information presentation section 85, 2 is added to a value of the counter C2 (Step J12), and the flow returns to Step J8. If the flow returns to Step J8, the value of (C2−1) is displayed as "the number of cases which have seen" and the difference between the number of cases which have seen and the total number of cases is displayed as "the number of cases which have not seen", as shown in FIG. 40C.

Of the information managed by the authorization managing section 50, the levy information is restored or decoded and transmitted to the levy setting section 61 along with the values of C1 and C2 (Step J13). The following is an example of the levy information:

$$y = C4 \cdot x^{C5}$$

where C4 and C5 are constants.

The levy is set (Step J14).

FIG. 41 is a flowchart showing the process for setting the levy.

The value of (C1−C2) is calculated and the result is set as C3 (Step K1). It is determined whether C3 is greater than 0 (Step K2). If C3 is greater than 0 in Step K2, the value y obtained by substituting C3 for x is set as the levy (Step K3) and then the process is terminated. If not, the process is terminated.

(4) Modifications of the Ninth Embodiment (a) First Modification

In the ninth embodiment, the levy can be saved by making an advertisement displayed. However, it can be saved also by, for example, displaying an advertisement as a screen saver, so that the advertisement can be seen by many people, as will be described below.

FIG. 42 is a flowchart showing the process corresponding to that of the ninth embodiment shown in FIG. 38. In FIG. 42, Steps J1 to J6 are the same as those in FIG. 38 of the ninth embodiment, a description thereof is omitted.

News are displayed, and the number of pieces of the displayed news is added to the news counter C1 (Step L1). It is determined whether news remain to be presented (Step L2). When news to be presented remains in Step L2, if a continuation request is input by the user (Step L3), the flow returns to Step L1 to continue the process. If news to be presented does not remain in Step L2 or a continuation request is not input by the user in Step L3, the flow advances to Step L4.

The advertisement counter C2 is set to "1" and the value of the timer in the authorization control section 60 is set to "0" (Step L4). It is determined whether anything has been input (Step L5). If not, it is then determined whether the value of the timer exceeds a preset time C3 (Step L6). In Step L6, if the value of the timer does not exceed C3, the flow returns to Step L5. If the value of the timer exceeds C3 in Step L6, the advertisement having the serial number C2 is displayed (Step L7). One (1) is added to C2 (Step L8) and the flow returns to Step L5. In Step 15, if anything is input, the values of C1 and C2 are transmitted to the levy setting section 61 (Step L9) and the levy is set (Step L10) in the same manner as in the ninth embodiment.

Alternatively, processes shown in FIGS. 43 and 44 can be executed instead of the process shown in FIG. 42. The process shown in FIG. 43 is the same as in Steps J1 to L3 shown in FIG. 42, a description thereof is omitted. The process shown in FIG. 44 is executed in parallel with the process shown in FIG. 43.

The advertisement counter C1 is set to "1," a number of presentation advertisement counter C4 is set to "0" and a number of levy news counter C5 is set to "0" (Step M1). Then, the value of the timer in the authorization control section 60 is set to "0" (Step M2).

It is determined whether anything has been input (Step M3). If nothing has been input, it is determined whether the value of the timer exceeds a preset time C3 (Step M4). If No in Step M4, the flow returns to Step M3. If Yes in Step M4, advertisements of the number corresponding to C2 are displayed on the screen (Step M5) and 1 is added to C2 (Step M6).

It is determined whether the advertisement counter C2 exceeds the upper limit of the serial numbers of advertisement information (Step M7). If No in Step M7, the flow returns to Step M3. If Yes in Step M7, the advertisement counter C2 is set to "1" and the number of presentation advertisement counter C4 is set to the upper limit of the serial numbers of the advertisement information (Step M8).

If anything is input in Step M3, the values of C1, C4 and C5 are transmitted to the levy setting section 61 (Step M9). The value of (C1−C4−C5) is substituted for x of the equation of the levy information, thereby obtaining a levy y. At the same time, the value of (C1−C4−C5) is set as C5, and the flow returns to Step M2 (Step M10).

(b) Second Modification

In the ninth embodiment, the levy can be saved by making an advertisement displayed. It can be saved also by, for example, copying an advertisement to another apparatus, i.e., letting another person copy the advertisement, as will be described below.

FIG. 45 is a diagram showing a second modification of the software use method control system of the ninth embodiment. The second modification is different from the ninth embodiment in that the authorization control section 60 comprises a copy managing section 62 in addition to the levy setting section 61.

FIG. 46 is a flowchart showing an operation of the authorization control section 60 of the second modification of the ninth embodiment. Steps J1 to J12 are the same as those performed in the ninth embodiment and as explained with reference with FIG. 38. and will not be described.

The pointer of an advertisement pointed by the user with a pointing device, such as a pen, is transmitted to the copy managing section 62 (Step N1), and then the flow returns to Step J8. The copy managing section 62 successively stores transmitted pointers of the advertisements. If the news counter C1 exceeds the upper limit of the serial numbers of news information in Step J10 and the user does not request advertisement information in Step J11, the value of C1 is transmitted to the levy setting section 61 (Step N2) and the process is terminated.

Figure 47:
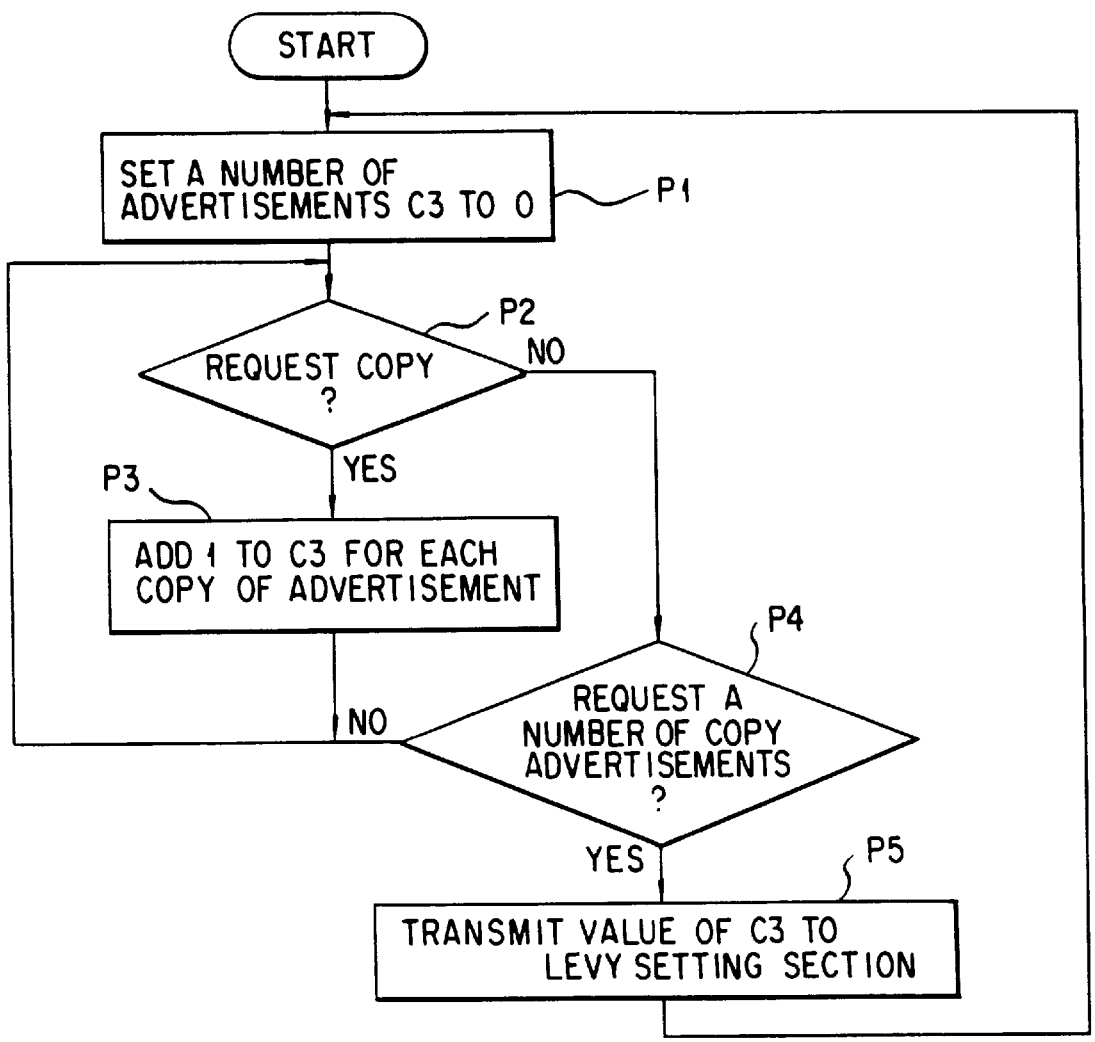
FIG. 47 is a flow chart explaining the operation of the copy managing section incorporated in the second embodiment of the system according to the ninth embodiment.

FIG. 47 is a flowchart showing an operation of the copy managing section 62 of the second modification of the ninth embodiment.

The number of advertisements C3 is set to "0" (Step P1). When a copy is requested by the user (Step P2), 1 is added to the value of C3 each time an advertisement is copied (Step P3) by another device, and the flow returns to Step P2. If a copy is not requested and the number of copy advertisements is requested by the levy setting section 61 (Step P4), the value of the number of advertisements C3 is transmitted to the levy setting section 61 (Step P5), and the flow returns to Step P1.

Figure 48:
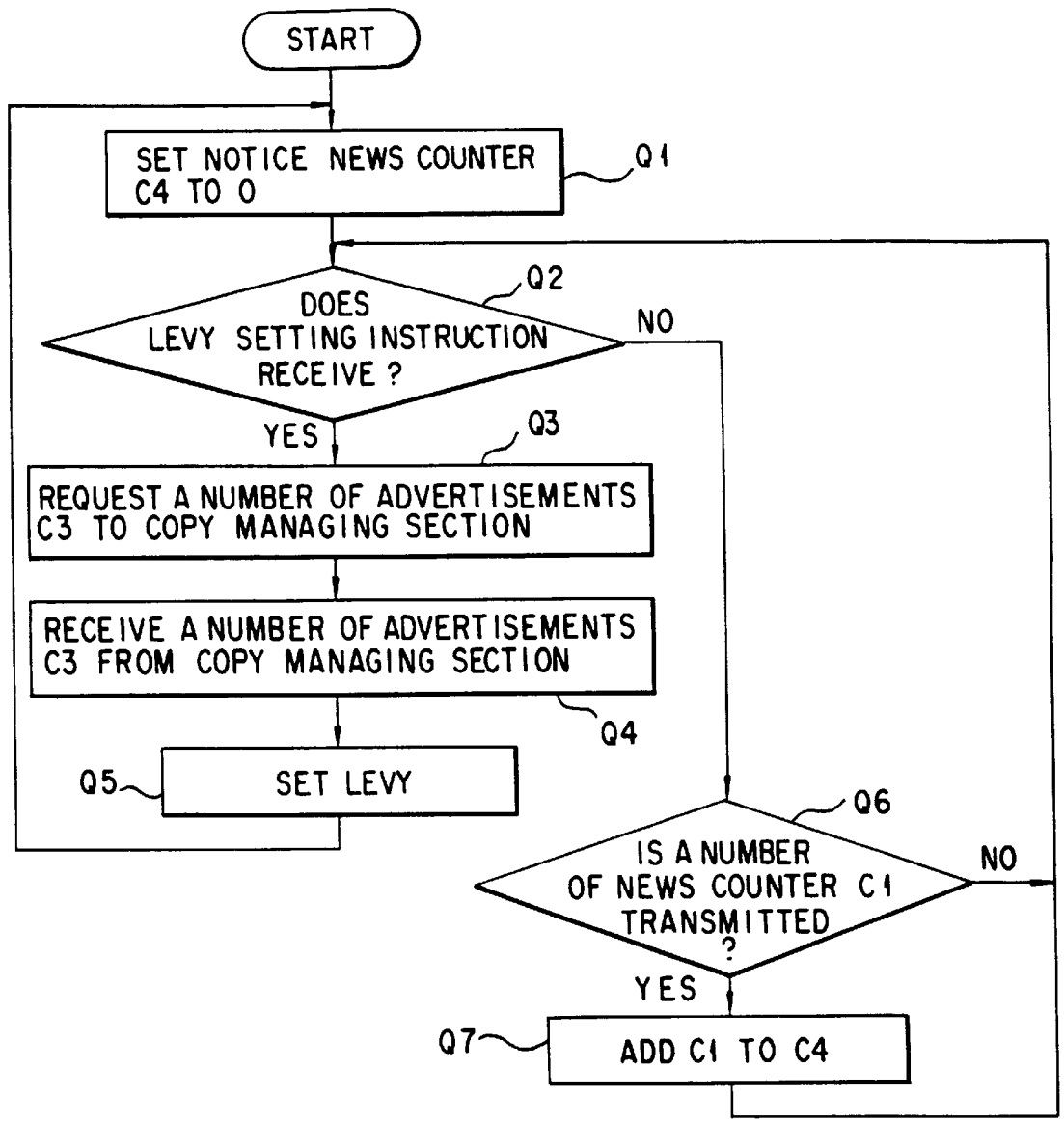
FIG. 48 is a flow chart explaining the operation of the levy setting section incorporated in the second embodiment of the system according to the ninth embodiment.

FIG. 48 is a flowchart showing an operation of the levy setting section 61 of the second modification of the ninth embodiment.

The number of presented pieces of news C4 is set to "0" (Step Q1). When the levy setting section 61 receives a levy setting instruction (Step Q2), it requests the number of advertisements C3 to the copy managing section 62 (Step Q3). It receives the number of advertisements C3 transmitted from the copy managing section 62 (Step Q4). The value of (C4−C3) is substituted for x of the equation of the levy information, thereby obtaining the levy y (Step Q5). In Step Q2, if the levy setting instruction is not received in Step Q2 and the number of news counter C1 is received (Step Q6), the value of C1 is added to the number of presented pieces of news C4 and the flow returns to Step Q1.

In the second modification, the levy is saved by copying an advertisement to another device, i.e., letting another person copy the advertisement. However, the same effect can be obtained by using a questionnaire instead of an advertisement. More specifically, a questionnaire pointed by the user is transmitted to the copy managing section 62, in which the number of transmissions by the user to answer questions in the questionnaire is recorded, in order to reduce the levy. At this time, a question which the user has just pointed is stored in the copy managing section 62, so that a difference in questions is detected when the questionnaire is transmitted, and if an answer is not given in the questionnaire, the number of transmissions can be reduced.

(c) Third Modification

In the ninth embodiment, the number of advertisements C2 is subtracted from the number of pieces of news C1, thereby setting the levy. However, for example, values can be respectively given to news and advertisements as will be described below, thereby setting the levy.

FIG. 49 shows a form of the structure of decoded or restored software. FIG. 49 is different from FIG. 39 of the ninth embodiment in that points are added to the respective news and advertisements. In the ninth embodiment, the number of news C1 and the number of advertisement C2 are transmitted to the levy setting section 61, whereas in the third modification, the sum of points of presented news and the sum of points of presented advertisements are transmitted to the levy setting section 61. The sums are used in place of C1 and C2 to set the levy.

According to the third modification, the levy can be varied in every news or advertisement. For example, when the software is a time table, the levy for information on a special train can be set higher than that of the other information.

Similarly, when the software is a detective story, assuming that the decoded or restored structure has a form as shown in FIG. 50, the levy can be relatively low if the user does not read the epilogue in which the conclusion of the story is written. The story having the structure shown in FIG. 50 consists of ten chapters including the prologue and the epilogue. The point of the epilogue is higher than those of the other chapters.

Tenth Embodiment (1) Main Components and Features

Since the structure of a tenth embodiment is characterized in that the authorization control section 60 includes the levy setting section 61 as in the seventh embodiment shown in FIG. 23, a drawing and a description of this embodiment are omitted.

(2) Advantages

In general, news of a newspaper or a magazine consist of an index and a text, and a book consists of a title, a table of contents, a text and so on. A reader first reads an index or a title, and decides whether to read the content. As regards a conventional newspaper, magazine or book of paper, even if the reader is interested in only a part of news or chapters, he or she must buy it for the price set for the entirety. According to the tenth embodiment, the reader can select news or a chapter in which the reader is interested. In addition, the reader can read only an index or a title at a low levy.

(3) Detailed Description of the Tenth Embodiment

FIG. 51 is a flowchart showing an operation of the tenth embodiment. FIG. 52 shows the structure of decoded or restored software i. As shown in FIG. 52, each news information consists of a news index pointer and a news text pointer. In FIG. 51, since the process of Steps RI to R5 are the same as that of Steps J1 to J5 shown in FIG. 38 of the seventh embodiment, a description thereof is omitted.

A news index counter C1 is set to "0" (Step R6) and a news text counter C2 is set to "0" (Step R7). It is determined whether the user requests a news index (Step R8). If the user requests a news index, three pieces of news, beginning with the news next to the news counter C1, are successively sent to the information presentation section 85 and (C1+3) is substituted for C1 (Step R9). FIG. 53 shows an example of the screen presented by the information presentation section 85. It is determined whether news information remains (Step R10). If news information remains, the flow returns to Step R8. If the user points □ located immediately before any news index of the screen (Step R11), the pointed news text is transmitted to the information presentation section 85, 1 is added to the news text counter C2 (Step R12), and the flow returns to Step R8. If news information does not remain in the Step R10 or "end" is selected in the screen of FIG. 53, the flow advances to Step R13.

Of the information managed by the authorization managing section 50, the levy information is restored or decoded and transmitted to the levy setting section 61 along with the values of C1 and C2 (Step R13). The following is an example of the levy information:

$$y = C4 \cdot x^{C5}$$

where C4 and C5 are constants.

The value C1+C2·8 is calculated and substituted for x of the equation of the levy information, thereby obtaining the levy y (Step R14).

As described above, the price ratio of an index to a text is set, so that the levy can be determined.

(4) Modifications of the Tenth Embodiment (a) First Modification

In the tenth embodiment, the case of news is described. However, also in a case of dictionary, a cyclopedia or the like, it is possible to set the price ratio of an index to an explanation. In a list of names, it is possible to set the price ratio of a person's name, serving as an index, to the address or position of the person. In a telephone directory, it is possible to set the price ratio of a name of a person or a shop, serving as an index, to the address or guide.

(b) Second Modification,

In the tenth embodiment, the case of using an index and a text of news is described. However, as shown in FIG. 54, the title and the text of each of a plurality of information can be stored. In this case, information which the user wishes to obtain can be displayed by means of the screen as shown in FIG. 55. At this time, it is possible to set the price ratio of the title to the text. It is also possible to provide points to the respective information and set the price ratio of a piece of information to another as described in the seventh embodiment. In this case, points are set to the respective information, and in order to obtain the sum of the titles and the texts, it is only necessary to multiply the points of the respective information and add the products together.

(c) Third Modification

In the tenth embodiment, the case of using an index and a text of news is described. However, it is possible that the user determines whether to select additional information or services. FIG. 56 shows the structure in a case where software is a movie. As shown in FIG. 56, if a movie with a superimposition service is selected, the levy can be higher than a case of a movie including no superimposition service.

Eleventh Embodiment (1) Main Components and Features

Figure 57:
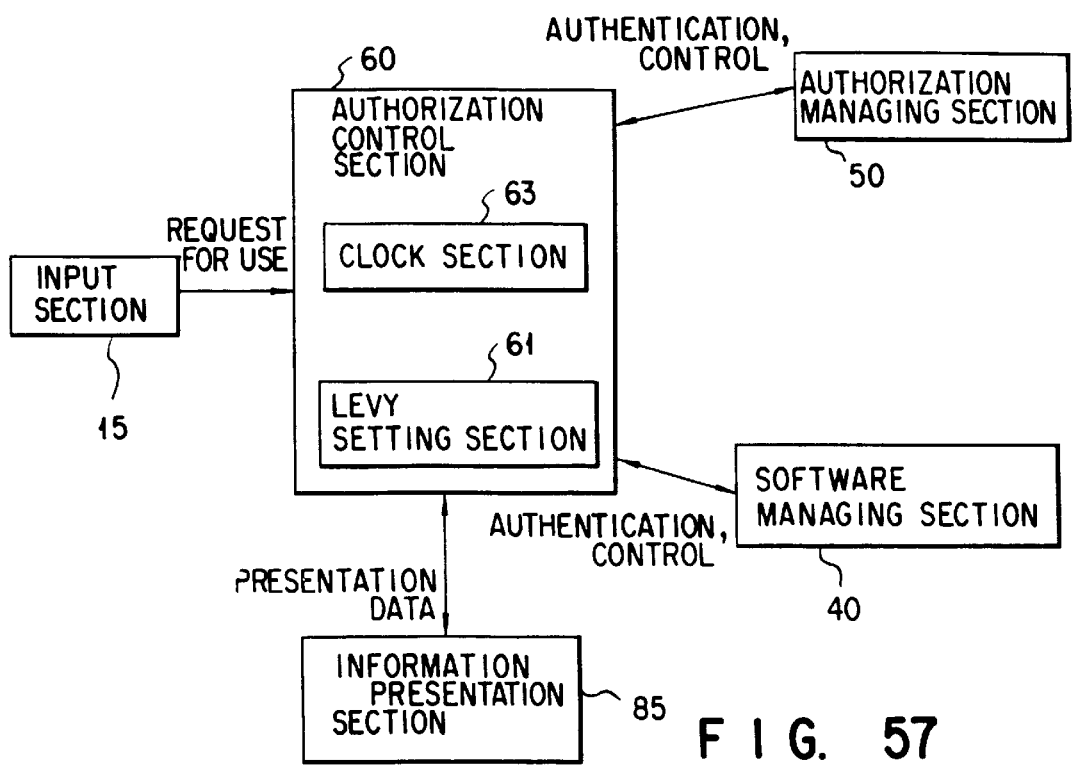
FIG. 57 is a diagram illustrating the basic structure of a software use method control system according to an eleventh embodiment of this invention.

FIG. 57 shows a general structure of a software use method control system according to the eleventh embodiment. This software use method control system is characterized in that the authorization control section 60 further comprises a clock section 63 in addition to a levy setting section 61 shown in FIG. 23 of the seventh embodiment.

The levy setting section 61 sets the levy in accordance with the date and the time, which are given to the software accessed by the user, when the authorization control section 60 judges that the software is usable.

The clock section 63 obtains date and time when the user accessed to the software. The components other than the clock section 63 perform the same function as their counterparts shown in FIG. 23, they will not be described in detail.

(2) Advantages

Generally, the more novel the news, the more valuable it is, and the older the news, the less valuable it is. Therefore, it is difficult to rationally determine the price of the conventional paper medium such as newspaper and books from viewpoint of time.

The eleventh embodiments can rationally determine the price of newspaper and books by referring to date and time when the newspaper and books are prepared and distributed and data and time when the user accesses to the newspaper and books.

(3) Detailed Description of the Eleventh Embodiment

FIG. 58 is a flow chart showing the processing of the eleventh embodiment. In the eleventh embodiment shown in FIG. 58, since Steps S1 to S7 are the same as Steps C1 to C7 of the fourth embodiment of FIG. 24, the explanation is omitted. In Step S6, decoding/restoring levy information to be transmitted to the levy setting section 61 can be expressed as follows:

$$y = C1 - C2 \cdot X^{c3}$$

where C1, C2, and C3 are predetermined constants.

The date when the presented software is prepared is transmitted to the levy setting section 61 (Step S8).

A levy is calculated (Step S9).

Figure 59:
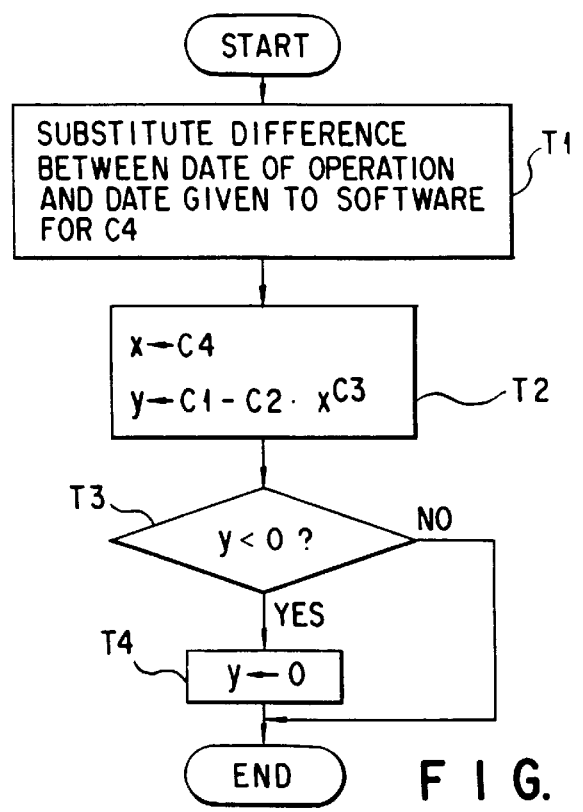
FIG. 59 is a flow chart explaining how a levy is set in the system according to the eleventh embodiment.

The flow chart showing the processing of the levy S amount setting of Step S9 is shown in FIG. 59.

A difference between date of operation and date given to the software is set as C4 (Step T1). In Step T2, y is obtained by substituting C4 for x. It is judged whether or not y is smaller than 0 (Step T3). In Step T4, y is set to 0 if y is smaller than 0. Finally, y is set as levy and the operation is ended.

Twelfth Embodiment (1) Main Components and Features

Figure 60:
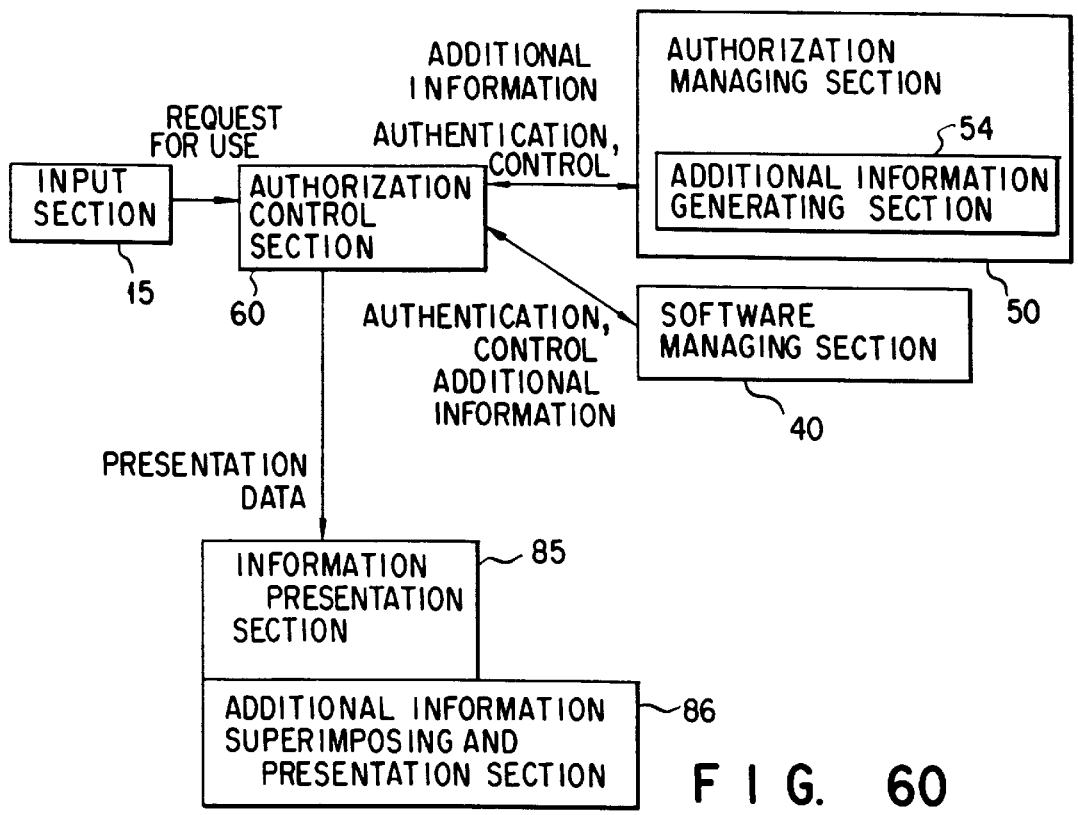
FIG. 60 is a diagram illustrating the basic structure of a software use method control system according to a twelfth embodiment of the present invention.

FIG. 60 is a view showing a general structure of a software use method control system of a twelfth embodiment. As compared with the seventh embodiment, the system is characterized in that the authorization control section 60 does not include the levy setting section 61, that an authorization managing section 50 includes an additional information generating section 54, and that an additional information superimposing/presenting section 86 is added to an information presentation section 85. Since the other parts are the same as the embodiment of FIG. 7, the explanation is omitted.

When the authorization control section 60 determines that the software is usable, the additional information generating section 54 generates a message (additional information, which clarifies the presence of a copyright such as an author's name in the software, in a form, which is a suitable for a form of software (text, voice, bit-map, static picture, moving picture, other form). The additional information superimposing/presenting section 86 presents additional data generated by the additional information generating section 54 to be superimposed on the software.

(2) Advantages

In the conventional system, a mark showing the copyright is written on, for example, a cover of the book, and the author's name can be concealed, merely by not using the portion.

For executing secondary use such as reference, copying, change in the software, the copyright becomes known since additional information (e.g., telop) showing the author's name is superimposed on the software. Additional information superimposed on the software is displayed when the software is displayed, it cannot be concealed, it is extremely difficult to keep the copyright in secret.

(3) Detailed Description of the Twelfth Embodiment

FIG. 61 is a flow chart showing the operation of the twelfth embodiment.

An input from the user is waited for (Step U1). If there is request of use of software from the user (Step U2), the authorization control section 60 refers to information of software i managed by a software managing section 40 manages, and to information about use method, managed by the authorization managing section 50. Based on these information pieces, the section 60 determines whether or not the use is permitted by the same method as the second embodiment (Step U3).

If Not in Step U3, a message describing to the effect that the software cannot be used is presented on a display section 19 (Step U4), and the processing is ended, and the operation is returned to a next waiting state.

If Yes in Step U3, the authorization control section 60 reads the software whose use is requested from the software managing section 40 (Step U5). If the software is compressed or encoded, compressed information is restored to the original, or encoded information is decoded by a key, etc., to be returned to the original.

The authorization control section 60 determines whether the form of the recorded or restored software is text, voice, bit-map, static picture, moving picture, or other form (Step U6).

Based on the result of Step U6, the additional information generating section 54 generates a message (additional information), which clarifies the presence of a copyright, in a form, which is a suitable for a form of software, for example, "ABCDE (c)" ((c) means a copyright) or "ABCDE has a copyright of this software" (voice) in, e.g., the form of FIG. 62 based on a corresponding table in which the correspondence between the software and information is described (Step U7). For example, if the software is a text, a copyright declaration is also generated by the text. If the software is a bit-map, text information is converted to a bit-map, and the copyright declaration is generated by the pit-map. If the software is a static picture, a moving picture, or the other form, text information is converted to a voice, and the copyright declaration is generated by the voice.

The authorization control section 60 presents the software decoded or restored in Step U5 to the information presentation section 85 (Step U8).

At this time, the additional information superimposing/presenting section 86 presents additional information generated by the additional information generating section 54 (Step U7). The presentation place or the presentation period are controlled in the form of FIG. 63 by use of the corresponding table described to correspond to the form of additional data (Step U9). If additional information is the text, the presentation place or the presentation period is displayed at a lower right side of the presentation section. If additional information is the bit-map, the presentation place or the presentation period is always displayed at an upper right side of the presentation section. If additional information is the voice, the presentation place or the presentation period is outputted from, e.g., a speaker every three minutes. The Steps U8 and U9 are executed at the same time.

Figure 64:
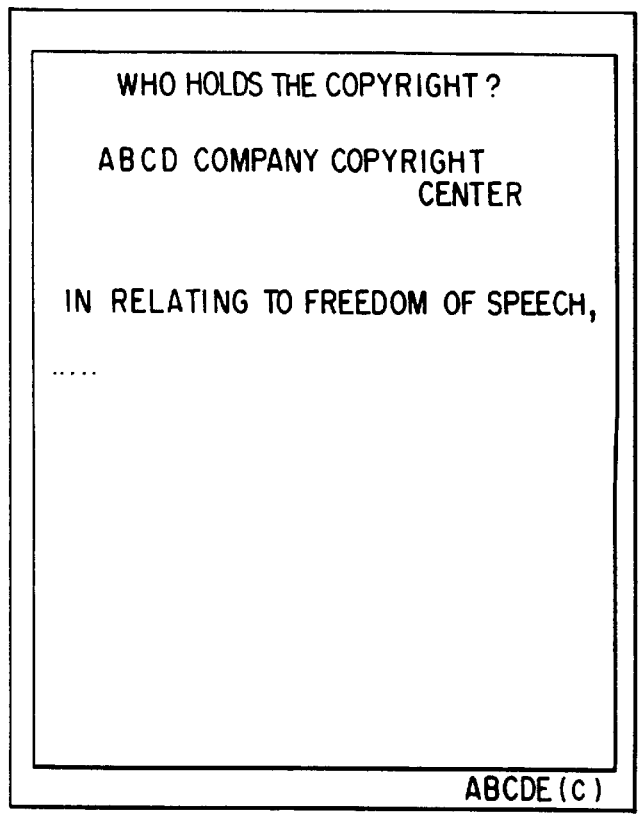
FIG. 64 is a diagram data items displayed by the system according to the twelfth embodiment.

As a result, for example, as shown in FIG. 64, the copyright declaration "ABCDE (c)" superimposed on the lower right side portion located outside the frame where the software is presented.

Also, when the user having the right to copy or change the software (temporarily called "i"), the contents of the authorization managing section 50 of the software i are directly copied to the authorization managing section 50 of a software (temporarily called "i'"), which is newly generated by the copy or change, as explained in the above embodiment. Therefore, there occurs no case where the copyright declaration clarifying the presence of the copyright is erased by the copy or the change.

Since the copyright declaration is generated by the means different from the software to be presented, as mentioned above, there occurs no case where the copyright declaration is deleted in editing the software. Nor any trouble occurs when the user uses the copyright declaration, since the copyright declaration is displayed on the place which does not interfere with the display of software information.

(4) Modification of twelfth Embodiment

In the twelfth embodiment, the additional information generating section 54 changes the form of additional information (copyright declaration) to be generated in accordance with the form of the software. A method can be used in which the copyright declaration is added in but the form of the software but a fixed form (for example, text or voice).

Moreover, the user can select the form of the copyright declaration. For example, the judgment table as shown in FIG. 62 is not set. Then, in Step U7, it is possible to transform the copyright use program to ask the user which form of the copyright declaration is used every time when the user uses the copyright declaration. Further, the user may set, in advance, a table (in place of FIG. 62) describing in which form the copyright declaration is presented and in which form of the software should be used. Then, in Step U7, the user can generate the copyright declaration as watching the judgment table.

The additional information generating section 54 can automatically change the form such that the copyright declaration can be printed on paper such as text. Also, the printing portion of additional information can be automatically reset to the portion where additional information should be necessarily printed (for example, portion close to the portion where the page number is printed).

The additional information superimposing/presenting section 86 controls the presentation of additional information based on the corresponding table as shown in FIG. 63. However, the contents of FIG. 63 can be changed for each user.

Also, the additional information generating section 54 is not necessarily added to all software managing sections. In a case where the author judges it unnecessary to use the additional information generating section 54 when preparing the software, the software can be prepared in the form having no additional information generating section 54.

Thirteenth Embodiment (1) Main Components and Features

FIG. 65 is a view showing a general structure of a software use method control system of a thirteenth embodiment. The thirteenth embodiment has the structure in which a copyright managing section 70 and a copyright control section 75 are added to the structure of FIG. 60 of the twelfth embodiment. The components identical or similar to those of the twelfth embodiment are designated at the same reference numerals and will not be described in detail.

The copyright managing section 70 manages information of the copyright of the software.

The copyright control section 75 controls the author of the software and the user other than the author in distinctly difference ways, by referring to information managed by the copyright managing section 70 and the copyright control section 75.

The thirteenth embodiment is characterized in that only the user, which the copyright control section 75 recognizes as the author of the software, can rewrite the contents stored in the authorization managing section 50, the additional information generating section 54 and the additional information superimposing/presenting section 86.

(2) Advantages

In the conventional system, the author's name can easily remain unknown unless the a mark showing the copyright is written on, for example, a cover of the book.

For executing secondary use such as reference, copying, change in the software, the copyright becomes known since additional information (e.g., telop) showing the author's name is superimposed on the software. Moreover, only the author of the software (person who has the copyright) can change, for example, the additional information to be presented and the place to be superimposed and presented. Therefore, the user, who has no copyright, cannot make changes, for example, additional information is displayed on the place where additional information is not clearly seen, or the size is changed not to be conspicuous. The copyright can be presented to the user so that the user may recognize it.

(3) Detailed Description of thirteenth Embodiment

In the twelfth embodiment, the authorization control section 60 can change data (corresponding to Table of FIG. 62 and Table of FIG. 63) controlled by the additional information generating section 54 and the additional information superimposing/presenting section 86. In the thirteenth embodiment, the authorization control section 60 cannot change data controlled by the sections 54 and 86. It is the copyright control section 75 that can control data.

Figure 66:
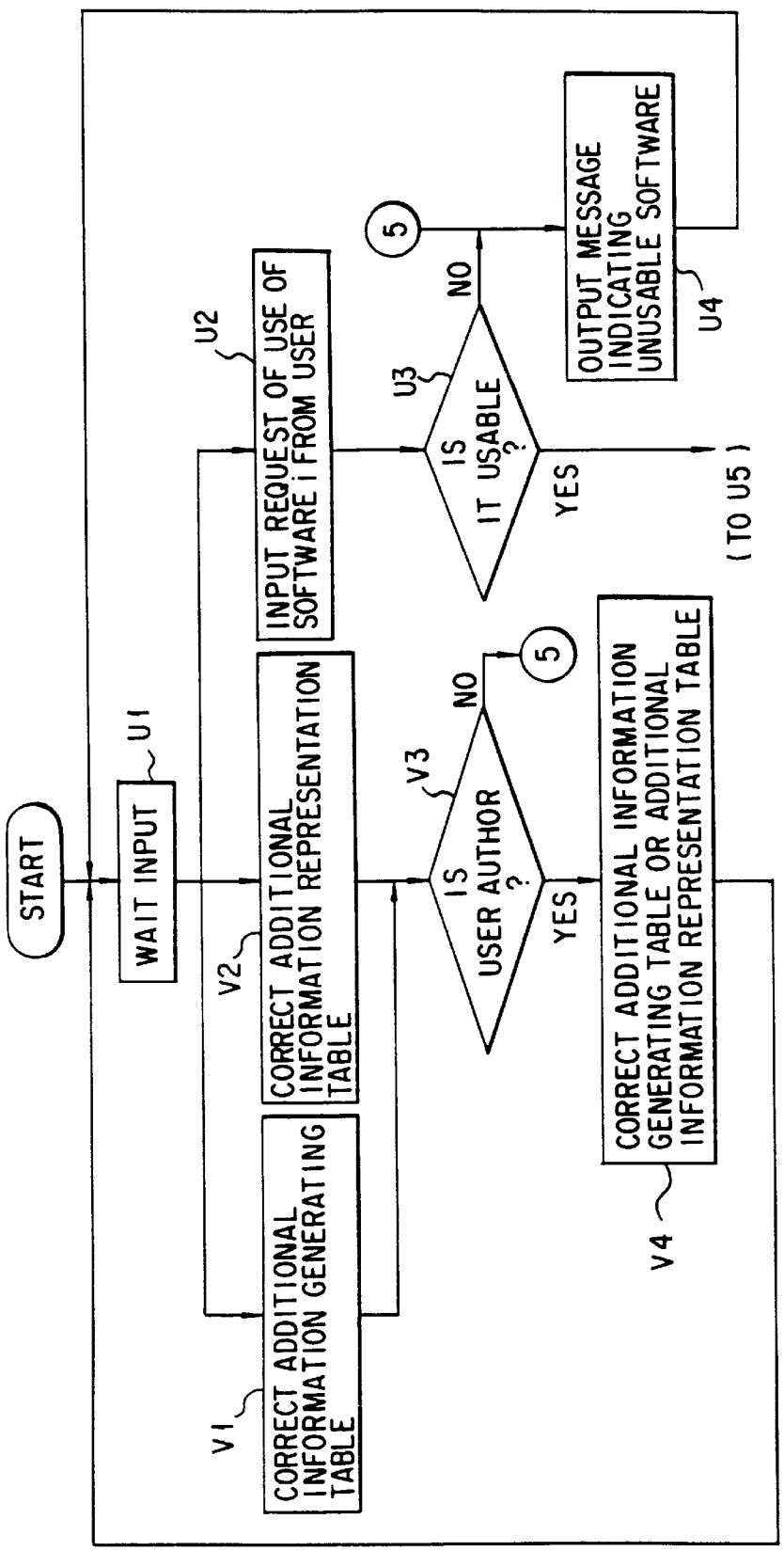
FIG. 66 is a flow chart explaining the operation of the system according to the thirteenth embodiment.

FIG. 66 is a flow chart showing the processing of the thirteenth embodiment. Since the processing of the thirteenth embodiment, which is from Steps V1 to V4, is different from the processing of the tenth embodiment, the following will explain only the different parts.

If the input from the user is a request for changing or correcting the additional information generation table, which the additional information generating section 54 controls (Step V1), the copyright control section 75 determines whether or not the user is the author of the software with reference to copyright information managed by the copyright managing section 70 manages, and authorization information managed by the authorization managing section 50 manages (Step V3).

If the user is the author of the software, the additional information is changed and written to the additional information generating table via the copyright control section 75 (Step V4). If the user is not the author of the software, the additional information cannot be changed, and the copyright declaration is presented (Step U4). The operation returns to Step V.

If the input from the user is a request for changing the additional information presentation table controlled by the additional information superimposing/presenting section 86, the copyright control section 75 judges whether or not the user is the author of the software (Step V3).

If the user is the author of the software, the additional information is changed and written to the additional information generating table via the copyright control section 75 (Step V4). If the user is not the author of the software, the additional information cannot be changed, and the copyright declaration is presented (Step U4). The operation returns to Step U1.

According to the thirteenth embodiment, the user other than the author cannot change the additional data (copyright declaration) or the place of presenting the additional information. Therefore, even if the user intends to present additional information at the place and the form by which the value of the software is reduced, such changes cannot be executed.

Also, when the user having the right of copy or change copies or changes the software (temporarily called "i"), the contents of the authorization managing section 50 of the software i are directly copied to the authorization managing section 50 of a software (temporarily called "i'"), which is newly generated by the copy or change, as explained in the above embodiment. Therefore, there does not occur a case that the copyright declaration clarifying the presence of the copyright is erased by the copy or the change.

(4) Modification of the Thirteenth Embodiment

In the thirteenth embodiment, the author is confirmed when the additional information generating table or the additional information presenting table are rewritten. However, in Steps U7 and U10 of the tenth embodiment of FIG. 61, it is possible to judge whether or not the user is the author when the change of the form of additional information or the change of the place of presenting the copyright declaration place are requested from the user.

Fourteenth Embodiment (1) Main Components and Features

Figure 67:
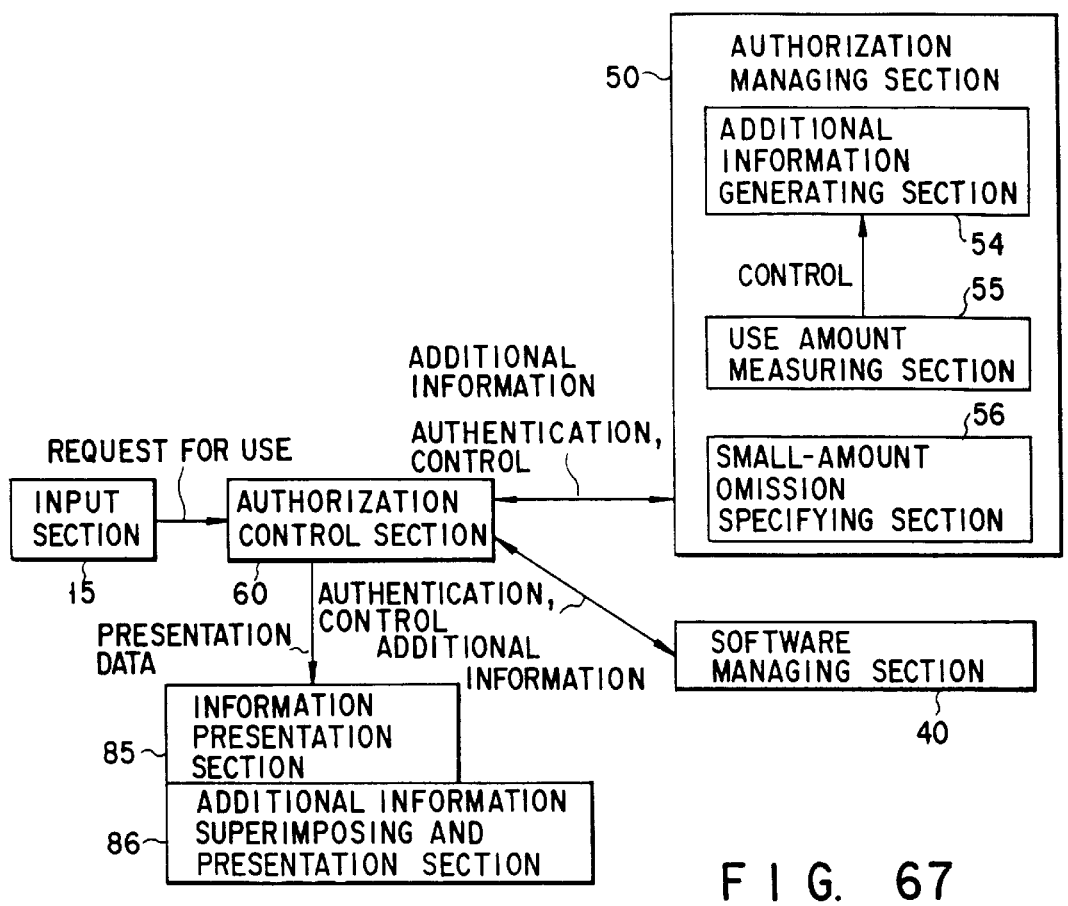
FIG. 67 is a diagram illustrating the basic structure of a software use method control system according to a fourteenth embodiment of the invention.

FIG. 67 shows a general structure of a software use method control system of the fourteenth embodiment.

The fourteenth embodiment is characterized in that the authorization managing section 50 includes a use amount measuring section 55 and a small-amount omission specifying section 56, and that the generation of additional information is controlled based on the use amount measured by the use amount measuring section 55. The components similar or identical to those of the twelfth embodiments are designated at the same reference numerals and will not be described in detail.

The use amount measuring section 55 measures the use amount when the user copies and transforms the software.

The small-amount omission specifying section 56 specifies that the presentation of the copyright declaration be omitted, if the use is a small amount when the author generates the software.

(2) Advantages

In the tenth and eleventh embodiments, additional information (copyright declaration), which clarifies the copyright, is superimposed on all software items which the user having authorization uses. Even in a case of copying a small amount of information, for example, one line, from the software, the copyright declaration is always superimposed to be displayed. In an extreme case, a small amount of information is copied from a plurality of software items (N software items) little by little, a plurality of copyright declarations (N copyright declarations) is presented, and this may extremely bother the user.

According to the fourteenth embodiment, the author judges it unnecessary to present the copyright declaration message in using the small amount of information, the copyright declaration may not be presented, so that there can be reduced the case in which N number of the copyright declarations bothers the user.

(3) Detailed Description of fourteenth Embodiment

Figure 68:
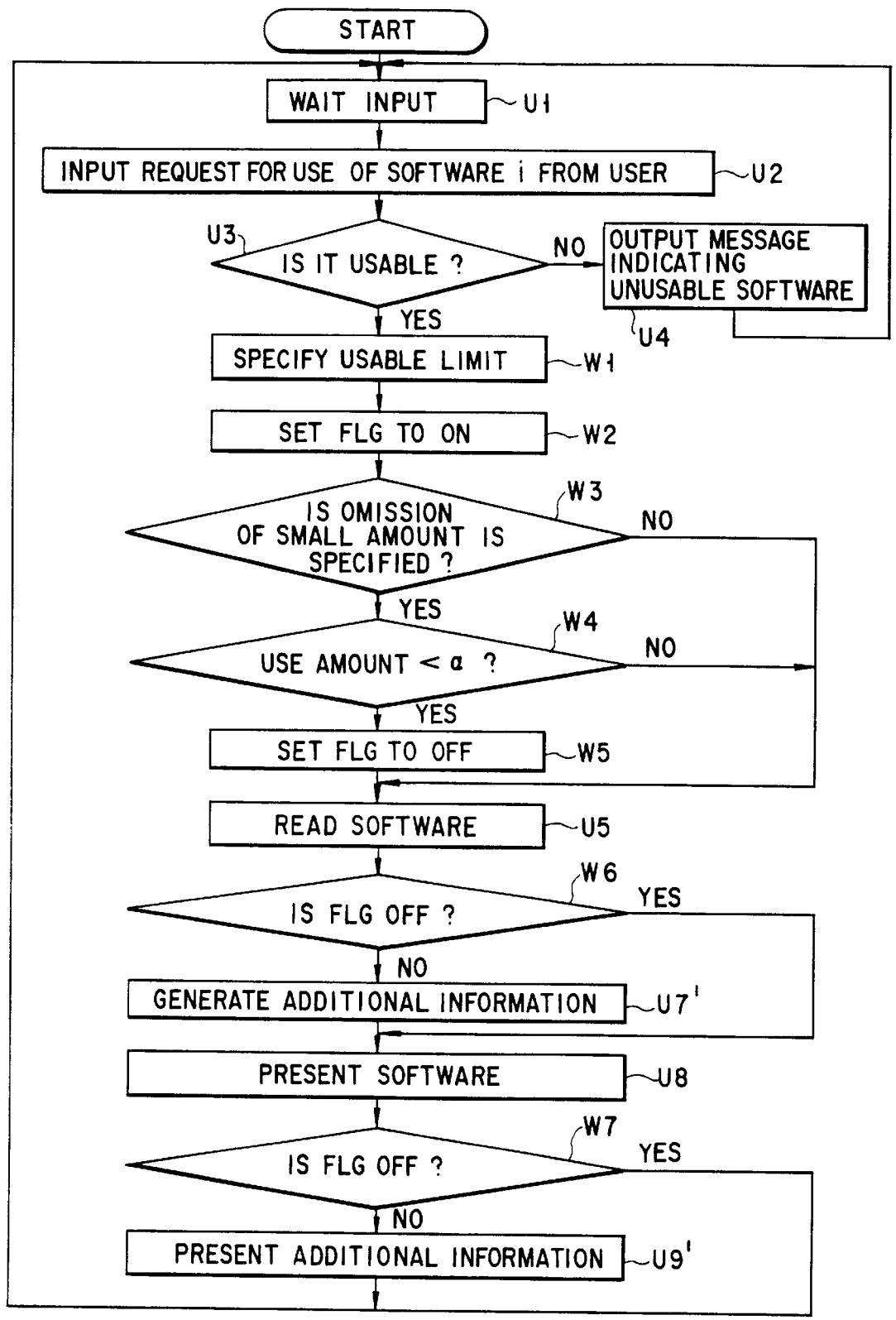
FIG. 68 is a flow chart explaining the operation of the system according to the fourteenth embodiment.

FIG. 68 is a flow chart showing the operation of the fourteenth embodiment. The steps similar or identical to those shown in FIGS. 60 and 66 are denoted at the same reference numerals and will not be described in detail.

If there is a use request from the user (Step U2) and it is usable (Step U3), the user specifies a usable limit for copying or changing (Step W1). The authorization control section 60 transmits the specified limit to the use amount measuring section provided in the authorization managing section 55. The authorization managing section 55 manages the total amount of the specified limit.

Since additional information is basically superimposed to be displayed in the use of e.g., the copy, a superimposing and presentation flag is turned ON (Step W2).

Next, it is checked whether or not omission of the superimposing and presentation of additional information is specified in connection with the use of small amount when the author prepares the software (Step W3). More specifically, the authorization control section 60 checks whether or not the omission of the small amount is specified in an omission of small amount specifying section 56 which the authorization managing section 50 manages.

If the omission of the small amount is to specified, since additional information is presented regardless of the use amount, the processing moves to the Step U5.

If the omission of the small amount is specified, it is checked whether or not the use amount, which the authorization managing section 55 has measured, exceeds a fixed amount ($\alpha$) which can be regarded as small amount (Step W4).

If the use amount does not exceed the fixed amount $\alpha$ in Step W4, the superimposing of additional information becomes unnecessary since the use amount is small. Then, the superimposing and presentation flag is turned OFF (Step W5).

If the use amount exceeds the fixed amount a in Step W4, this does not belong to the category of specifying the omission of small amount, the processing moves to the Step U5.

The decoding and restoring are executed after reading the software (Step U6), and a value of superimposing and presentation flat is checked (Step W6). If the superimposing and presentation flag remains in the initial setting state, that is, ON state, the form of the software is checked (Step U6), additional information is generated (in Step U7'), and the presentation of the software is performed (Step U8).

If the superimposing and presentation flag is in an off state, the generation of additional information is unnecessary and the processing is moved to the presentation of the software (Step U8).

After presentation, the value of superimposing presentation flag is checked again (Step W7), and additional information is presented (Step U9') or the processing is moved to the next processing (Step U8).

As mentioned above, according to the fourteenth embodiment, since the copyright declaration is not presented in the use of small amount if the author allows it, the user can avoid the bothering case.

(4) Modification of the Fourteenth Embodiment

The above-mentioned fourteenth embodiment explained the method for omitting the copyright declaration if the use amount is small. However, for example, it is possible to change the contents of the additional information presentation table, which the additional information superimposing and presentation section 86, so as to control the size and presentation period.

Moreover, the amount to be checked whether or not the use amount is small is set to the fixed amount a in the fourteenth embodiment. Instead, for example, in a case where the author specifies the omission of small amount, it is possible to designate the amount to be changed, depending on the software.

Also, in a case that the user uses the plurality of software items, the authorization control section calculates the amount, which is measured by the use amount measuring section of each software, based on a certain function (for example, linearly weighting). Then, it is possible to generally check whether or not the use amount is small based on the calculated amount.

Fifteenth Embodiment (1) Main Components and Features

Figure 69:
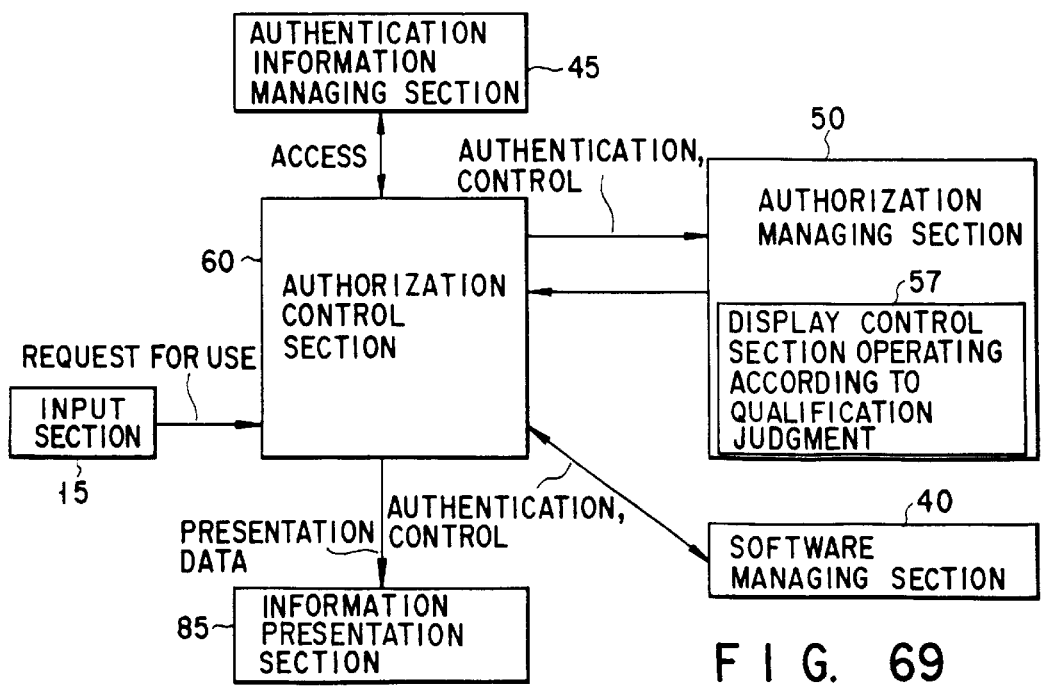
FIG. 69 is a diagram illustrating the basic structure of a software use method control system according to a fifteenth embodiment of the invention.

FIG. 69 is a view showing a schematic structure of the software use method control system according to the fifteenth embodiment.

The fifteenth embodiment is characterized in that the authorization managing section 50 includes a display control a section 57 which controls a presentation method in accordance with the qualification of the user (e.g., the user's age, or any qualification other than the user's having paid the charge for use). Since the other structure is substantially the same as the above-explained embodiment, e.g., twelfth embodiment, the explanation is omitted.

(2) Advantages

Since the conventional software is neither encoded nor compressed, everybody can see it if they but the software. Among the software items, there is one, which is not suitable for a person who does not reach a certain age, such as a nude magazine. However, there is no measures to prevent such an aged person from seeing such a software in the conventional printed software.

In the fifteenth embodiment, the software is encoded or compressed, and the encoding or restoring is required when the person sees the software. At this time, the age of the user is checked, and information, which is undesirable for seeing, can be maintained as it is encoded or compressed to be concealed.

(3) Detailed Description of the Fifteenth Embodiment

FIG. 70 is a flow chart showing the operation of the fifteenth embodiment. In FIG. 70, the steps similar or identical to those showing in the embodiments described above are designated at the same reference numerals and will not be explained in detail.

After checking whether or not the software is usable (Step U3), the authentication information managing section 45 determines whether or not the user is qualified to use the software which he or she has requested for (e.g., his or her age, not the requirement of having paid charge), based on the qualification corresponding tables shown in FIGS. 71A to 71C (Step X1).

In FIG. 71A, texts A and B included in the software show that the limit of U17 (17 years old or less) is NA (Not Applicable), and that a melting flag is in off state at present. A photograph C shows that the limit of U17 is A (Applicable). In other words, since there is the limit of U17 in the software having the qualification judgment table shown in FIG. 71A, the authentication information managing section 45 checks whether or not the age of the user is 18 or more.

If the user is 18 years old or older, he or she is fully qualified to use the software. Therefore, the processing moves to the processing of Step U31, and the melting flag of the qualification judgment table becomes on. More specifically, as shown in FIG. 71B, all attribution values of the item, and the melting flag becomes ON.

If the user is 17 years or younger, he or she is not qualified to use the software. Therefore, in connection with only part having a qualification, the melting flag is set in on state (Step X3). More specifically, since this can be applied to the texts A and B and advertisement D to which the limit of U17 is not applicable, the attribution values of the melting flag of the corresponding parts becomes on as shown in FIG. 71C.

Since the use is permitted in only the part where the melting flag is on, that part is restored or decoded (Step X4).

The part where the melting flag is set in off state may be presented as it is. In this embodiment, for example, a paint processing is performed (Step X5).

Figure 72:
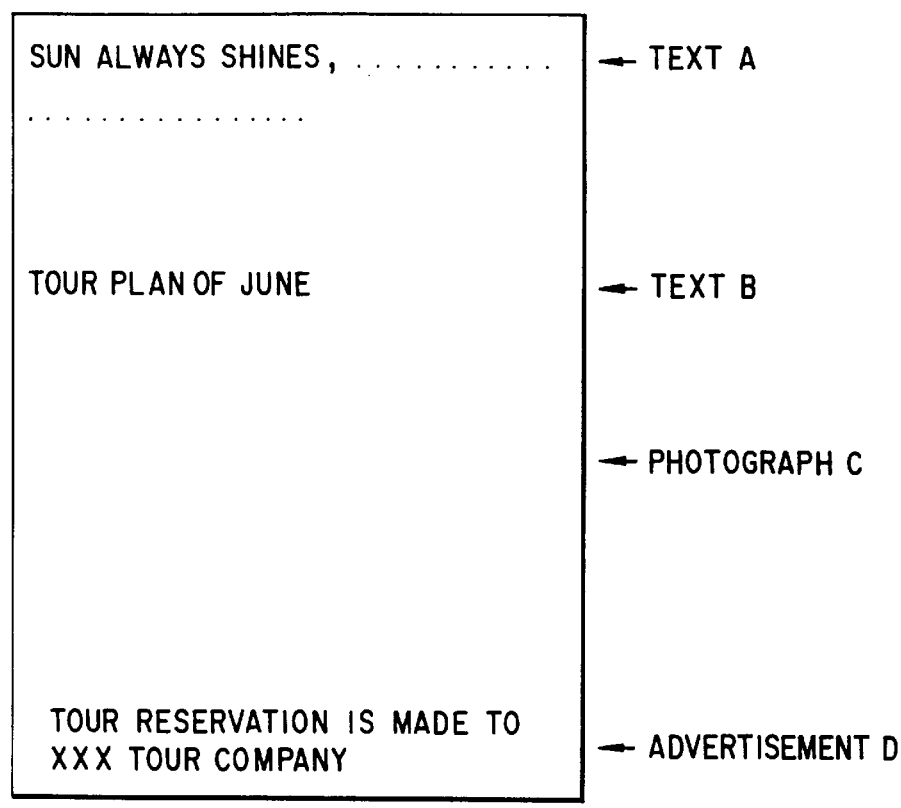
FIG. 72 is a diagram presenting data items displayed by the system according to the fifteenth embodiment.

Then, the result is presented in the information presentation section 85 (Step U8). For example, as shown in FIG. 71C, in a case where the software whose melting flag is off is presented in connection with only the part of the photograph C, the software is presented in a state that the part of the photograph C is painted not be seen as shown in FIG. 72.

As explained above, according to the fifteenth embodiment, the software is provided such that the user ethically not qualified to see such a part cannot see that part even if the he or she has paid the charge. That is, educational consideration is fully made.

(4) Modification of the Fifteenth Embodiment

In the fifteenth embodiment, the painting is provided on the part where any user ethically not qualified to see that part. However, for example, additional information showing the copyright may be presented or advertised on the part.

In the fifteenth embodiment, information can be concealed by deforming the signal if the unusable part is audio information, or by mixing the signal with noise if the unusable part is a moving picture.

Moreover, if the user is not qualified to use a part of the software, the charge he or she needs to pay may be reduced by an amount corresponding to that part of the software.

The authentication information managing section 45 of the fifteenth embodiment determines whether or not the user is qualified to use the software, in accordance with the qualification judgment table controlled by the display control section 57. The authentication information managing section 45 may check the necessary qualification items such as age and driver's license. The checked result is stored in the authorization control section 60. When a request for use of the software is input, it is possible to provide the designation of change by referring to the contents of the qualification stored in the authorization control section 60 and the qualification corresponding table of the display control section 57.

Sixteenth Embodiment (1) Main Components and Features

Figure 73:
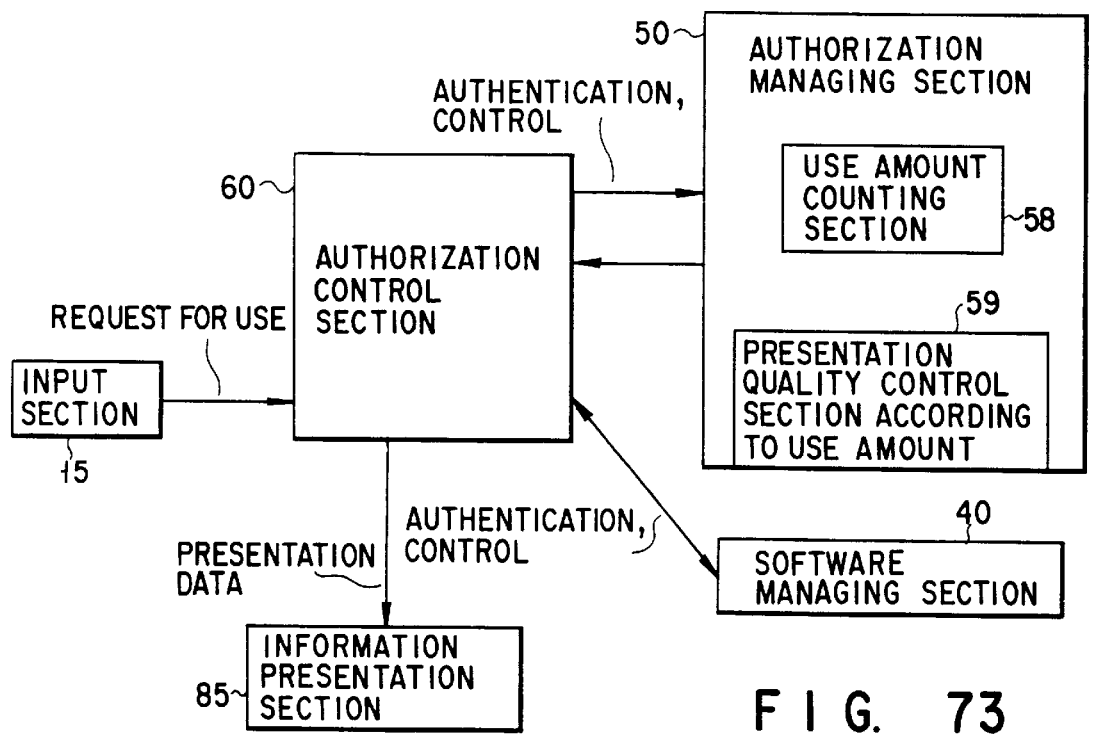
FIG. 73 is a diagram illustrating the basic structure of a software use method control system according to a sixteenth embodiment of the invention.

FIG. 73 shows a software use method control system according to the sixteenth embodiment.

The sixteenth embodiment is characterized in that the authorization managing section 50 includes a use amount counting section 58 for counting the number times the software has been copied, for storing the times counted, and a presentation quality control section 59 for controlling the software-presenting quality in accordance with the number of times counted by the section 58. The components identical or similar to those used in the embodiments described above are designated at the same reference numerals and will not be described in detail.

(2) Advantages

Unlike copies optically made, a copy of an electronic medium is not degraded in comparison with the original since the data copied is digital data. How many times the original is copied, the resultant copy is not degraded. The concept of the original is already lost.

In the sixteenth embodiment, how many times the software has been detected, and the quality of the copied software is degraded in accordance with the number of times the software has been copied, The quality of the original only can be preserved.

(3) Detailed Description of the Sixteenth Embodiment

FIG. 74 is a flow chart showing the operation of the sixteenth embodiment. The steps identical or similar to those explained in conjunction with the embodiment described above are designated at the same reference numerals in FIG. 74, and will not be described in detail.

If the software is usable in Step U3, the use amount counting section 58 counts how many times the corresponding software stored therein is copied (use amount c) is read (Step Y1).

A use amount of this time is added to c (c←c+1) (Step Y2).

The presentation quality control section 59 calculates a degradation rate according to the following function expressed by equation (1) (Step Y3):

$$d = F(c) = 1 - (1/2)^{c/10} \quad (1 =< c =< 10) \quad (1)$$
$$= 1/2 \quad (c > 10)$$

The function of equation (1) is set to reduce to ½ if the use amount is 10.

If the presentation quality control section 59 calculates degradation rate d, the authorization control section 60 decodes or restores the software, which the software managing section 40 manages, in accordance with the degradation rate d (Step Y4).

For example, if the degradation d is 10%, a high-frequency component of the decoded or restored software is filtered out by a filter designed to cut 10% of high-frequency component. Alternatively, a low-frequency component can be cut.

A degraded software is presented on the presentation section 19.

(4) Modification of the Sixteenth Embodiment

Though the section 59 sets the degradation rate based on the function as shown in equation (1), the degradation rate can be set based on the following table.

| Use amount | Degradation rate (%) |
|---|---|
| 1 to 3 | 0 |
| 4 to 7 | 5 |
| 8 to 10 | 10 |
| . | . |
| . | . |
| . | . |

For example, as shown in the above table, if the copy amount is 3 or less, since the degradation rate is 0%, no degradation is performed. If the copy amount is 4 to 7, 5% degradation is performed.

Moreover, the method of degradation is not limited to the method of the above-explained embodiment. In a case where the software is a moving picture, there can be used a method in which a quality of image of each frame is not degraded but the frames are intermittently reduced in a time serial direction to be degraded.

Furthermore, the degradation is increased in accordance with the use amount. Instead, the degradation may be achieved in accordance with the time which has passed since the software was prepared or since the user bought the software. In this case, a time count section (not shown) may be provided in place of the use amount counting section 58, and the section 59 may use the time as a variable, not the use amount, to calculate the degradation rate.

Seventeenth Embodiment (1) Main Components and Features

Figure 75:
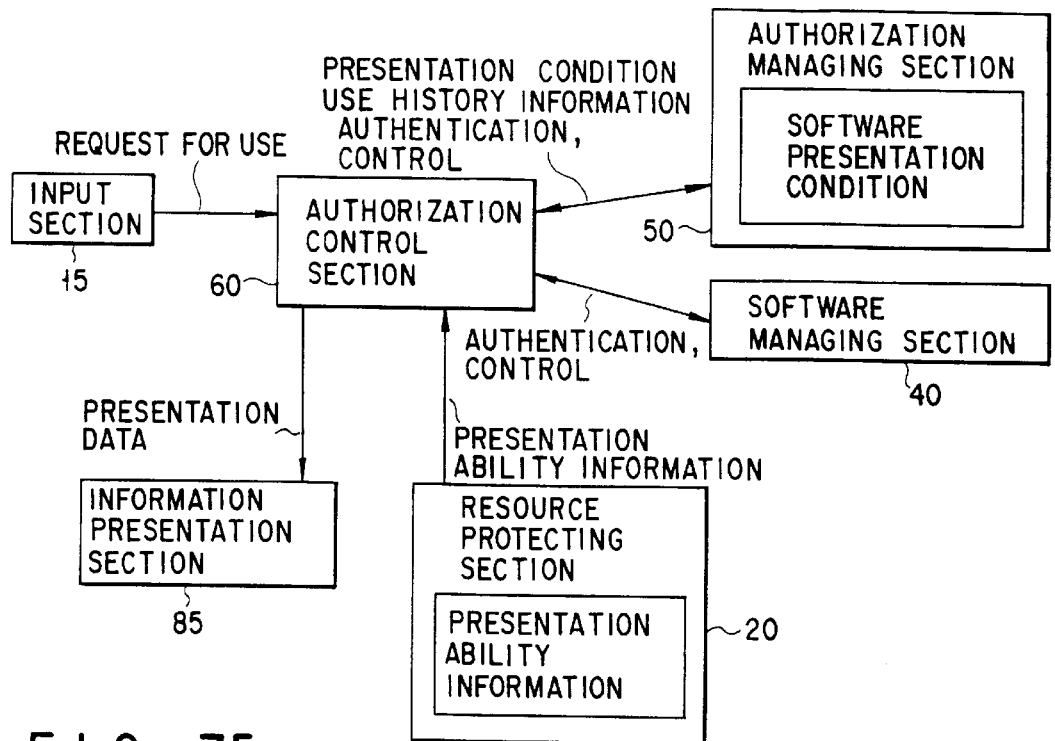
FIG. 75 is a diagram illustrating the basic structure of a software use method control system according to a seventeenth embodiment of the invention.

FIG. 75 shows a software use method control system according to the seventeenth embodiment.

The seventeenth embodiment has an input section 15, a resource protecting section 20, a software managing section 40, an authorization managing section 50, an authorization control section 60, and an information presentation section 85. The seventeenth embodiment is characterized in that the authorization managing section 50 manages the software presentation condition (i.e., the information required to presenting the software stored in the software managing section 40), and the resource protecting section 20 manages presentation ability information of the user's terminal when a request for the use of software is input via the input section 15.

(2) Advantages

Various terminals different in the display performance are used, such as work stations and portable personal computers. The work stations have a high-performance display device which can display the image with full colors (16,770,000 colors) and high resolution of one million pixels or more. The portable personal computers have a low-performance display device which can display the image with 256 colors or monochrome and resolution of about hundred thousand pixels. Similar to the voice presentation ability, there can be used various terminals including from a terminal having only 8-bit AD-DA performance to a terminal 24 bit AD-DA performs. This tendency is increasingly toward stronger in the future.

Hence, there may occur a problem in the secondary use by the terminal having the display performance inferior to the display performance prepared by the author. There may occur case in which the author's product, which has full colors (16,770,000 colors) and high resolution of one million pixels or more, is displayed by display device, which has 256 colors and resolution of about hundred thousand pixels. In the concept of accepting the secondary use of the author's product, the author's product can be used if the charge necessary for the use is paid, and there is no mechanism for determining the acceptance of use in consideration of the quality of presentation when using. Therefore, it is impossible to inhibit a terminal having a low display performance from displaying the author's product. This a big problem in the case the product has high artistic value.

In the seventeenth embodiment, the performance of the display device connected to a terminal is checked. If the display device cannot display the author's product in so high a quality as the author wishes, the use is prohibited from using the product on the display device. Therefore, the user cannot help but use a high-quality display in order to refer to the author's product in high quality.

(3) Detailed Description of the Seventeenth Embodiment

Figure 76:
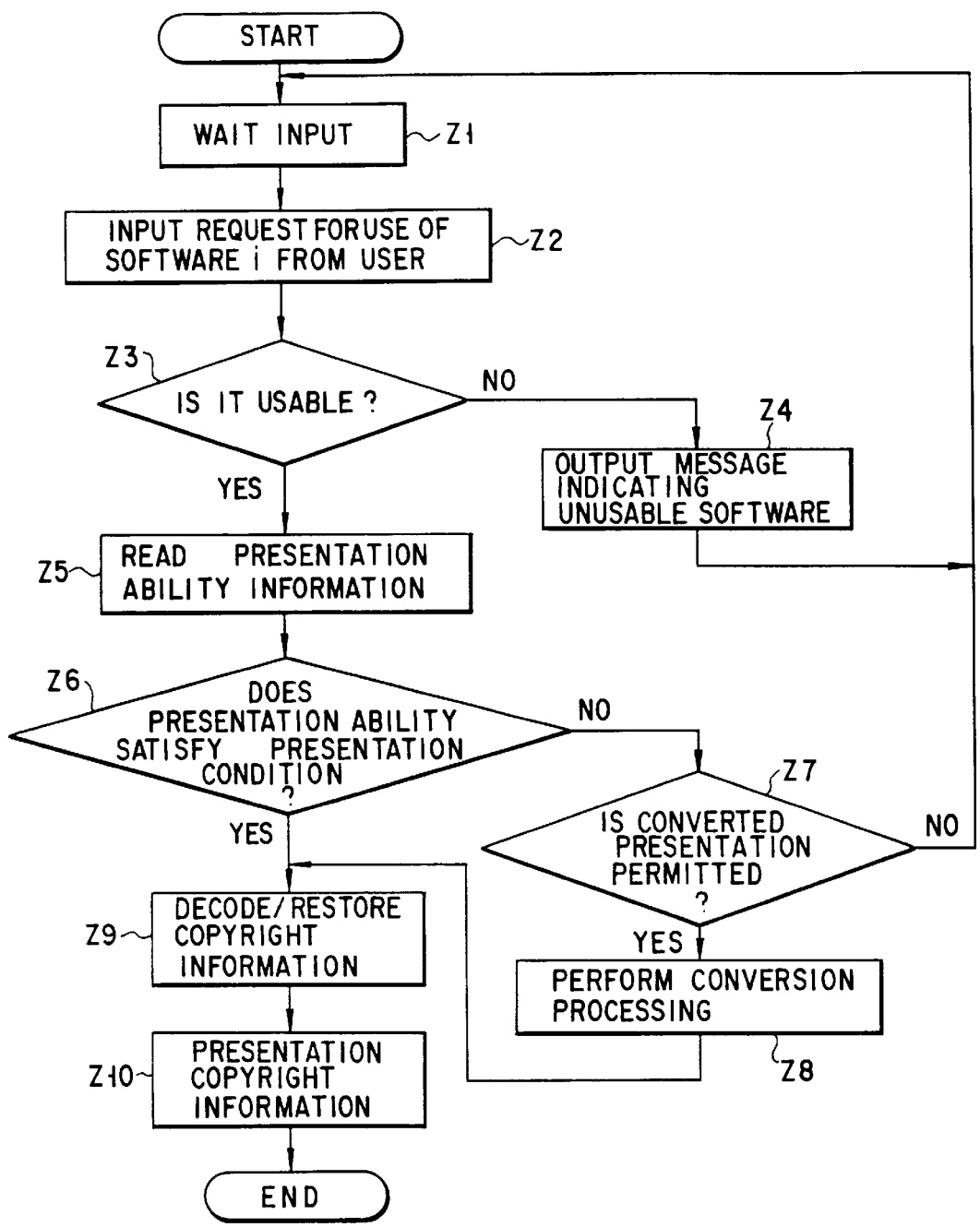
FIG. 76 is a flow chart explaining the operation of the system according to the seventeenth embodiment.

FIG. 76 is a flow chart showing the operation of the seventeenth embodiment.

An input from the user is waited (Step Z1). Then, a request for use of, for example, author's product information i, is input from the user (Step Z2). The authorization control section 60 determines whether or not the request should be granted, in accordance with author's product information i managed by the copyright managing section 70 manages, and with the use method information managed by the authorization managing section 50, as in the second embodiment (Step Z3).

If No in Step Z3, the message is presented to the information presentation section 85, showing that the request has been declined (Step Z4). The operation returns to the next input waiting state (Step Z1).

If Yes in Step Z3, the authorization control section 60 reads presentation ability information from the resource protecting section 20 in Step Z5. FIG. 77 shows one example of presentation ability information. This information contains graphics items such as the monitor size, the resolution and the color, and audio items such as output, sampling, an AD converter, and a DA converter. In FIG. 77, the monitor size is 16 inches, the resolution is 1280×1024, and the color is 8-bit color. Regarding the audio items, the output is a stereo level analog, the sampling grade is 32 KHz, the AD converter is 16 bits 64 times over-sampling, and the DA converter is 16 bits 8 times over-sampling.

The authorization control section 60 determines whether or not presentation ability information read from the section 20 as shown in FIG. 77 satisfies the software presentation condition managed by the authorization managing section 50 (Step Z6). For example, the software presentation condition is managed in the form as shown in FIG. 78. FIG. 78 shows the example of the condition in connection with the software using the graphic function as information presentation section 85. The storage form of FIG. 78 is largely different from that of FIG. 77 in the following points.

More specifically, the conditional expression such as "<" and/or "=" is added, and there is stored an address for executing a converting program in the case that the condition is not satisfied.

In other words, in the example of FIG. 78, since the performance value of the monitor is (>=16 inches), the monitor whose size is 16 inches or more is set as a display condition. In a case where a small-sized motor may be used, the item may be described to (<=16 inches). Moreover, in FIG. 78, a pointer to the converting program is shown as "NULL." This means that there is no converting program, which may be used. In other words, this means that display cannot be performed by use of the terminal having no motor whose size is 16 inches or more.

Since the item "resolution" describes "==1280×1024", the presentation can be permitted in only the case, which is equal to resolution of 1280×1024. In a case where the resolution is not equal to the above-described value, the point to the converting program is "p1." Due to this, the presentation can be permitted by use of the converting program even if the resolution differs.

Moreover, since the time "color" is "==24 bit full color", the presentation can be permitted by the terminal, which can present with 24 bit full color. Also, since the point to the converting program is "p2", the presentation can be permitted by conversion even if there is used the terminal in which the presentation with 24 bit full color cannot be performed.

Though FIG. 78 shows the example of the software using only graphics, the description can be made by the same method in connection with the software using audio, the software using both the graphics and audio, and the software using a function of the other three-dimensional computer graphics.

Moreover, the author describes the software presentation condition stored in the form of FIG. 78 at the time when the software is prepared. Therefore, the presentation, which does not meet the author's intention, can be rejected by making the software presentation condition more strict. Particularly, for rejecting the presentation other than the permitted performance, the point to the converting program is set to NULL, so that the presentation under only the same circumstance as the case when the software is prepared can be set as a condition.

In Step Z6, the authorization control section 60 sequentially checks whether or not the presentation ability condition of FIG. 77 satisfies the presentation condition of FIG. 78 item by item. If there is no presentation ability condition, which corresponds to the item of the presentation condition of FIG. 78, in FIG. 77, it is displayed that use of information cannot be executed since no conversion is performed. Then, the processing is returned to the input waiting state (Step Z1).

The motor size of 16 inches of FIG. 77 fulfills the condition of the motor size of "16 inches or more."

The resolution of 1280×1024 of FIG. 77 satisfies the condition of the motor size of "1280×1024."

The color of 8-bit color of FIG. 77 does not meet the condition of the color of "24 bit full color." However, since the pointer to the converting program is described in the item of converting program in FIG. 78 (Step Z7), conversion to 8 bit color is executed by the converting program, whereby the presentation can be performed.

In a case where product information i compressed or encoded, compressed information is restored to the original, or encoded information is decoded by a key, etc., to be returned to the original (Step Z9). Then, the result is presented (Step Z10).

As mentioned above, according to the seventeenth embodiment, the presentation can be performed under the quality circumstance, which the author intends.

Moreover, the use of the converting program is not permitted under the software presentation condition. Therefore, even if the conversion is illegally performed by some means or other, the software presentation condition of FIG. 78 cannot be rewritten, so that the presentation is rejected when the software presentation condition is checked in Step Z6.

(4) Modification of the Seventeenth Embodiment

Figure 79:
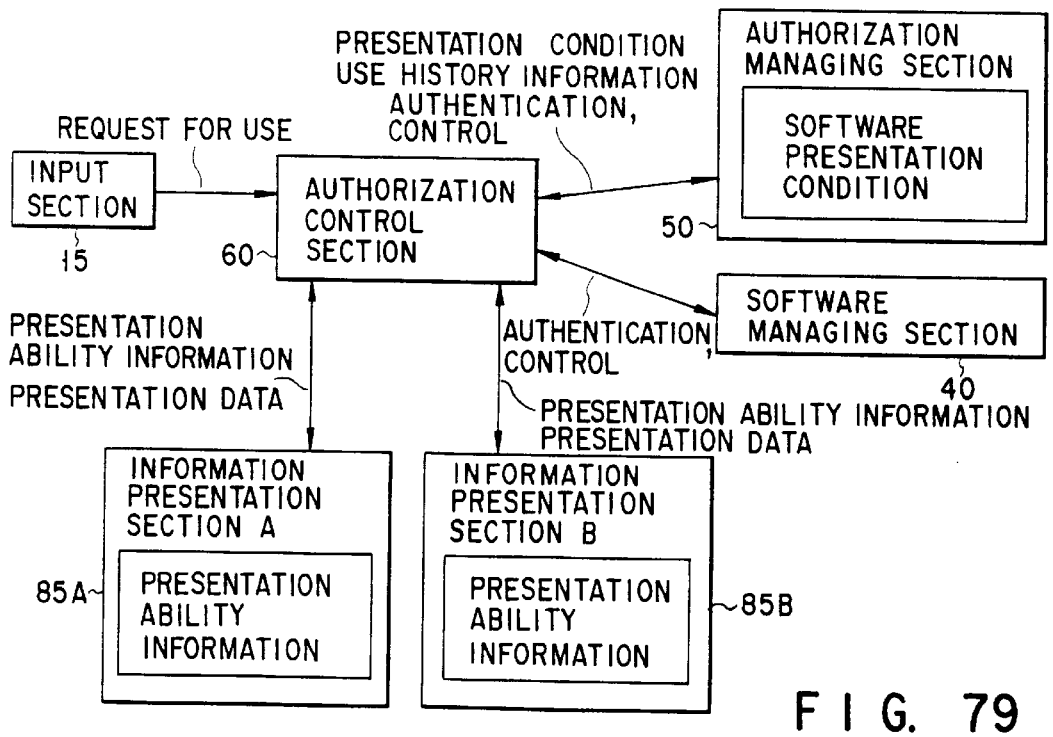
FIG. 79 is a diagram showing the basic structure of a modification of the seventeenth embodiment.

In the seventeenth embodiment, all presentation ability of the information presentation section 85, in which the source protecting section 20 is connected to the terminal, is managed together in the form of FIG. 77. Nonetheless, the authorization control section 60 can read individual information presentation ability, which each of information presentation sections A and B (85A and 85B) manages, by the structure of FIG. 79 in place of the structure of FIG. 75. In the structure of FIG. 79, presentation ability information as shown in FIG. 77 is separately managed as presentation ability information, which each of the information presentation sections for presenting information of graphics or information of audio (information presentation sections A and B (85A and 85B) in FIG. 79) manages, as shown in, for example, FIGS. 80A and 80B.

Moreover, the operation flow of this modification is substantially the same as the flow chart of FIG. 79. However, in Step Z5, which read presentation ability information, which the resource protecting section 20 of FIG. 75 manages, presentation ability information, which each of the information presentation sections A and B (85A and 85B) manages, is read.

As shown in FIG. 78, in a case where only a specified presentation ability such as graphics is needed as a software presentation condition, it is possible to access only to the corresponding information presentation sections A or and B (85A or 85B) so as not to read extra information. In the example of FIG. 78, since only the function of graphics is needed, access to only the information presentation section A is performed.

Eighteenth Embodiment (1) Main Components and Features

FIG. 81 shows a software use method control system according to the eighteenth embodiment.

The eighteenth embodiment has an input section 15, a software managing section 40, an authorization managing section 50, an authorization control section 60, and an information presentation section 85. The embodiment further comprises a protective section 64. The section 64 protects software information managed by the software managing section 40 such that a directory which can be accessed by the user having no access right cannot be used as a working area. A pseudo-working area section 41 is used when the working area to which the user having no access right cannot access is needed by the protective section 64.

Namely, the eighteenth embodiment is a software use method control system in which only the user having an access right can access to the software. It is characterized by the protective section 64 which inhibits the software being prepared or the backup software from being stored in a system resource which a user having no access right can use.

(2) Advantages

For preparing the author's product such as a novel by use of the computer, there is a case in which the backup of the author's product, which is being prepared, is automatically provided to take measures against an accident such as a power cut. Regarding such a backup, the so-called temporary directory (temporary area) such as /usr/tmp is often used in, for example, a UNIX system.

However, since everybody can use the temporary directory such as /usr/tmp, there is a problem in that everybody can easily refer and copy if the author forgets to erase the backup file prepared in the temporary directory such as /usr/tmp. Also, even if the backup file is erased after the preparation, there is high possibility that the backup file will be illegally referred and copied since the backup film exists in the temporary directory such as /usr/tmp.

According to the present invention, even if the temporary directory such as /usr/tmp, which everyone can access, is used, the directory, which the user other than the author cannot access, is formally replaced to the temporary directory such as /usr/tmp. Due to this, the user other than the author can not refer and copy even if the author forgets to erase the backup file prepared in the temporary directory such as /usr/tmp, the user other than the author cannot refer and copy, and the use, which does not meet the author's intention, can be prevented. Therefore, this is very useful from the viewpoint of security.

(3) Detailed Description of the Eighteenth Embodiment

FIG. 82 shows the operation of the authorization control section of the eighteenth embodiment.

Steps SA1 to SA5, and SA8 will not be described detail since they are substantially the same as the flow of the processing of Steps Z1 to Z5 and Z10 of the seventeenth embodiment of FIG. 76.

It is checked whether or not the accessed directory using software information is a directory, which can be used by only the user having the access right (Step SA6). More specifically, if software information is a C language, it is checked whether or not functions such as foropn, freopen, fdopen, are provided. If these functions are provided, it is checked whether or not the use file is in the temporary directory such as /usr/tmp, which is not protected by the access right.

In No in Step SA6, the processing goes to Step SA8 of information presentation. In Yes in Step SA6, the file using the directory in which no access right is necessary is switched to the directory in which the access right is necessary, that is, the pseudo-working area section 41 (Step SA7). More specifically, a file reading pointer $P_{s1}$ showing the directory in which no access right is necessary is switched to a file reading pointer $P_{s2}$ showing the pseudo-working area section 41. Similar processing is performed in the portion where the problem exists.

After switching the pointer sp1 to the pointer sp2 in Step SA7, the processing goes to Step SA8.

Nineteenth Embodiment (1) Main Components and Features

FIG. 83 shows a software use method control system of the nineteenth embodiment.

The nineteenth embodiment is characterized in that the authorization managing section 50 manages the name of the author of the software, identification information for distinguishing the software from the other software, and use history information, and that a sum total processing section 87 is further provided. The nineteenth embodiment is substantially the same in structure as, for example, the seventh embodiment. The components similar or identical to those of the seventh embodiment are designated at the same reference numerals in FIG. 83, and will not be described in detail.

The sum total processing section 87 receives an author's name, a software identification name, and use history information of the software, which are managed by the authorization managing section 50, from the authorization control section 60 when the authorization control section 60 accesses software information managed by the software managing section 40. Then, the sum total processing section 87 obtains the sum of the total these contents, and outputs the sum to the authorization section 60.

(2) Advantages

Which book is the best seller for a week is determined from the number of copies sold at major book stores. The best seller in each local area can be determined from the number of copies sold at each book store. However, it is extremely difficult to determine which books is the nation-wide best seller.

Since the determination of the best selling program is based on the number of copies shipped per a month, it is not always correct that the program is really the best seller. Moreover, the determination of the best selling program for a short period of time, such as week, can be hardly performed with accuracy.

Furthermore, it is impossible to estimate correctly how many times a book is read and how many times a software item is used, after the purchase.

With the nineteenth embodiment it is possible to easily sum up use information showing how many times the user has obtained the access right of the software, how many times he or she has used the software after obtaining the access right, and how much time has passed from the time he or she acquired the access right to the time he or she discarded the software. If the terminal the user uses is connected to the network, the use information can be summed up at any time, so that the use information can be summed up every week or every month. Also, the nationwide sum of use information can be obtained. Therefore, since the software sales company can get information of the present good seller software, they can review and alter their business policy and their plans of developing new software items.

Moreover, the use information, thus summed up, can be easily distributed to all users. The user can therefore know which software is convenient and which software is inconvenient. Thus, the users can select and buy a software item which is convenient and suitable for them.

(3) Detailed Description of the Nineteenth Embodiment

Figure 84:
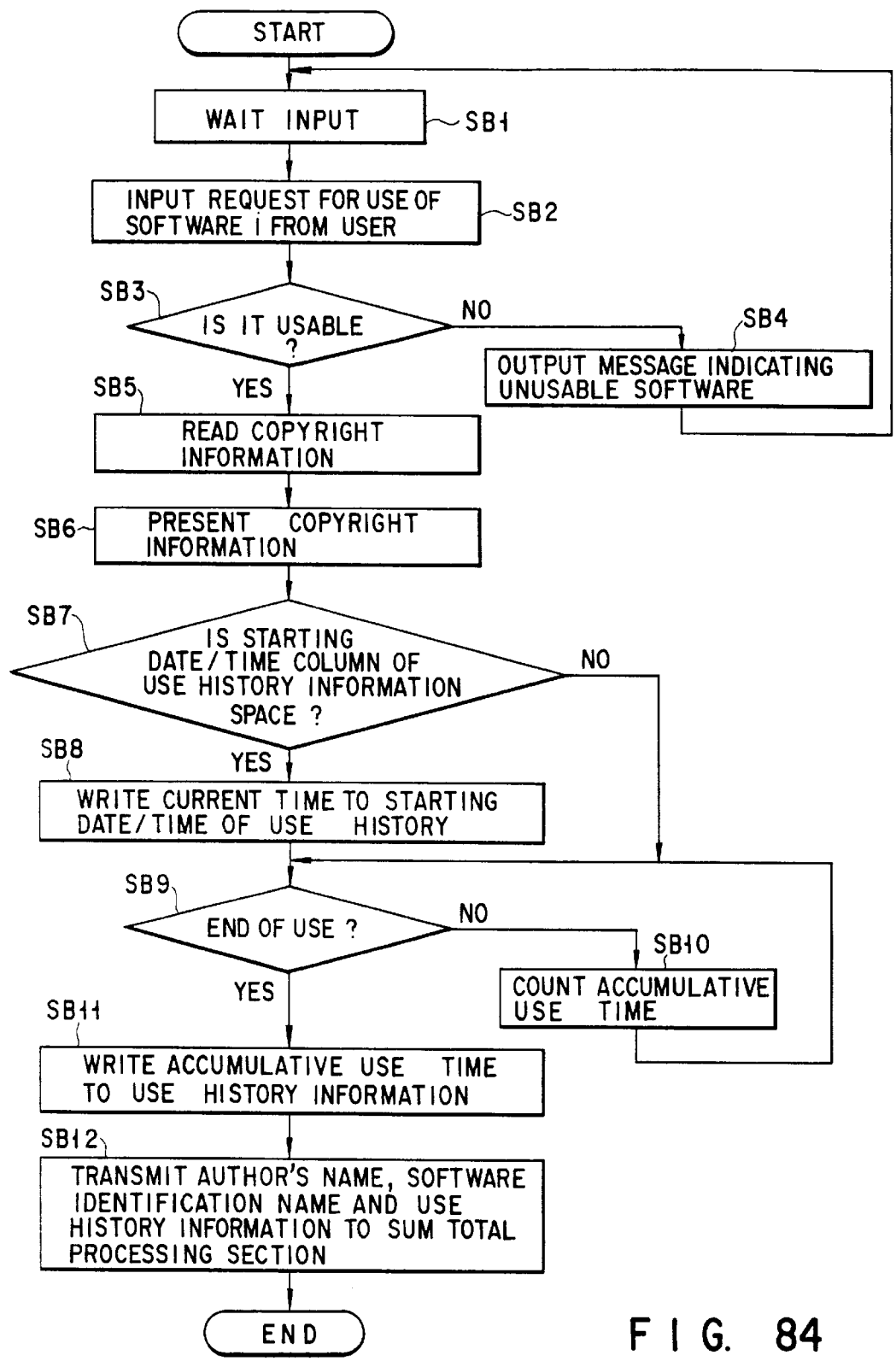
FIG. 84 is a flow chart explaining how the authorization control section operates in the system according to the nineteenth embodiment.

FIG. 84 is a flow chart explaining the operation of the authorization control section 60 incorporated in the nineteenth embodiment.

Steps SB1 to SB6 are the same as Steps Z1 to Z5 and Z10 of the operation the seventeenth embodiment of FIG. 76 performs, they will not be described.

After the information presentation section (not shown) presents the software (product information) whose use has been requested for, necessary data is input to the sum total processing. First, it is checked whether the software is used for the first time (Step SB7). The authorization managing section 50 determines whether or not the starting date/time column of use history information is a space. If the starting date/time column is a space, the current time is written to the starting date/time column of use history information since this is the first use (Step SB8). If the starting date/time column is not a space, the processing goes to Step SB9. Until the use is ended (Step SB9), accumulative use time is counted (Step SB10). The authorization managing section 50 writes accumulative use time (y1 hours and y2 minutes) in the accumulative use time column of the use history information. If the use is not the first one, the accumulative use time (y3 hours and y4 minutes) is already written in that column of the use history information, and the authorization managing section 50 writes added time ((y1+y3) hours and (y2+y4) minutes).

Now that information required in performing the summing process has been written to the use history information in Steps SB1 to SB10, the authorization control section 60 transmits an author's name managed by the authorization managing section 50 and a software identification name the use history information to the total processing section 87 (Step SB12). If the software is used for the first time, the data showing this fact is also transmitted to the sum total processing section 87. It is assumed that, in the system of FIG. 85, the author's name and the software identification name are written in the form of character code data such as ASCII. However, there is a case where encoded data or binary data are written.

Figure 86:
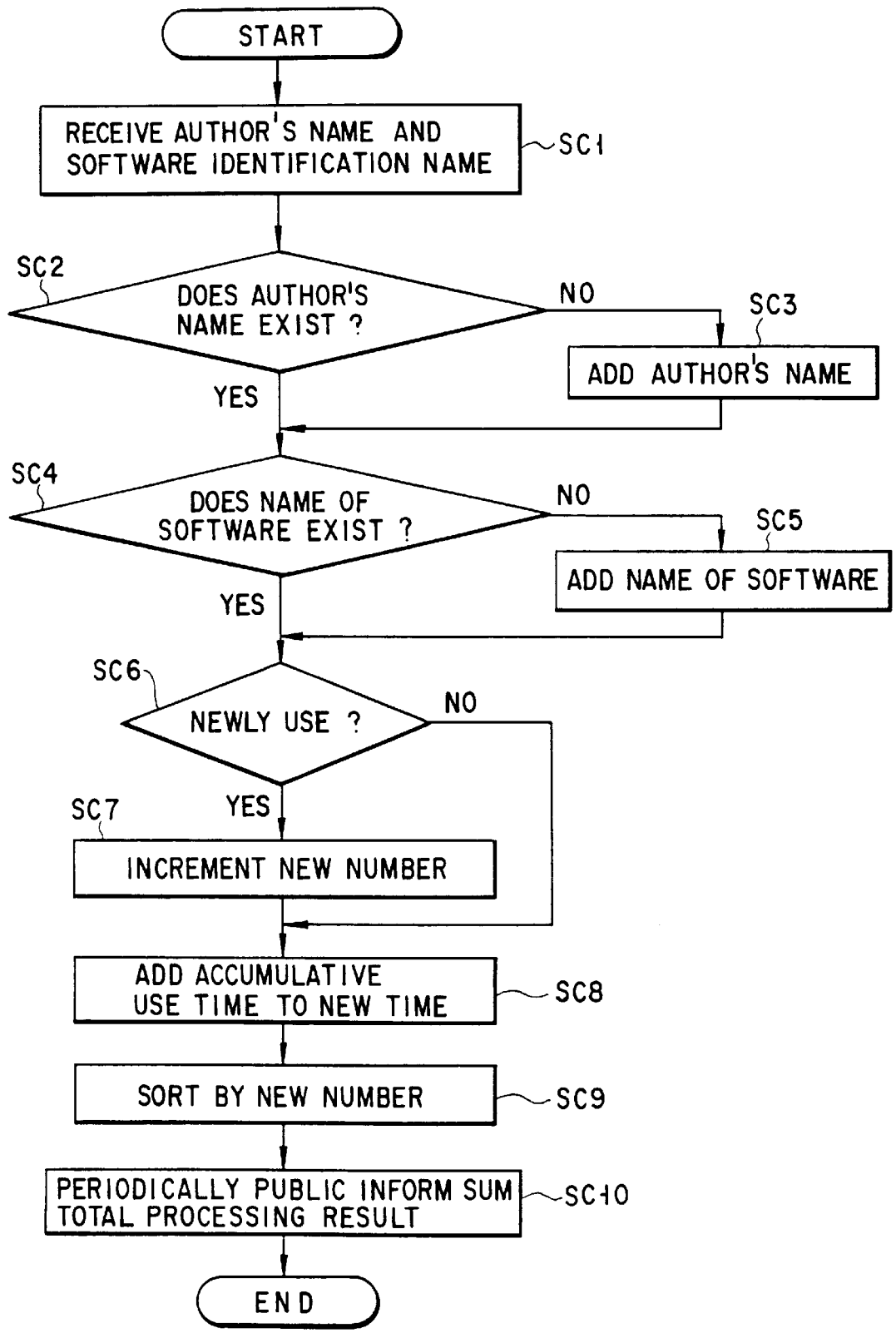
FIG. 86 is a flow chart explaining how the sum total processing section performs its function in the system according to the nineteenth embodiment.

FIG. 86 is a flow chart explaining the processing the sum total processing section 87 performs in the nineteenth embodiment.

The section 87 describes the author's name, the software identification name and the use history information, which have been transmitted from the authorization control section 60 of the terminal of each of the large number of the users, in the form shown in FIG. 87. FIG. 87 shows the sum total of the software items, which are prepared for each author's name.

First, the transmitted author's name, the software identification name, the use history information are received (Step SC1).

It is determined whether or not the author's name identical to the transmitted author's name already exists (Step SC2). If the same author's name does not exist, the author's name is added to the table of FIG. 87 (Step SC3). If the same author's name exists, it is checked whether or not the same name of the software as the transmitted name of the software exists in the item of the author's name (Step SC4). If there is no name of the software, the item of the author's name is added (Step SC5).

It is then determined whether or not the transmitted use data is new use (Step SC6). If Yes, one (1) is added to the value of the item of the number of new users showing the number of new users (Step SC7).

The transmitted accumulative use time is added to the item of new time showing new use time (Step SC8).

Since the best ten per a week is influenced by the number of new use, the sorting is performed by the new number (Step SC9).

The result obtained in Step SC9 is supplied to the user's terminal in the form shown FIG. 88 (Step SC10).

Upon lapse of a fixed period, such as one week, corresponding to the dates when the sum total should be performed, the new number is added up to the accumulative number. The new time is added up to the accumulative time, and the respective items are cleared to 0.

As mentioned above, in the nineteenth embodiment, the best seller for a fixed period of time (e.g., a week) can be correctly and speedily determined and informed to the users. This is greatly advantageous.

(4) Modification of the Nineteenth Embodiment

In the nineteenth embodiment, the best seller is determined based on the number of users, which is increased for a fixed period time such as a unit of week. Alternatively, it is possible to determine whether a particular software item is the best seller or not, from the number of users who have been using the software or the time for which the software has been used. This can be easily realized by which item index of FIG. 87 the sorting is performed.

Embodiment 20

(1) Main Structural Components and Features

Figure 94:
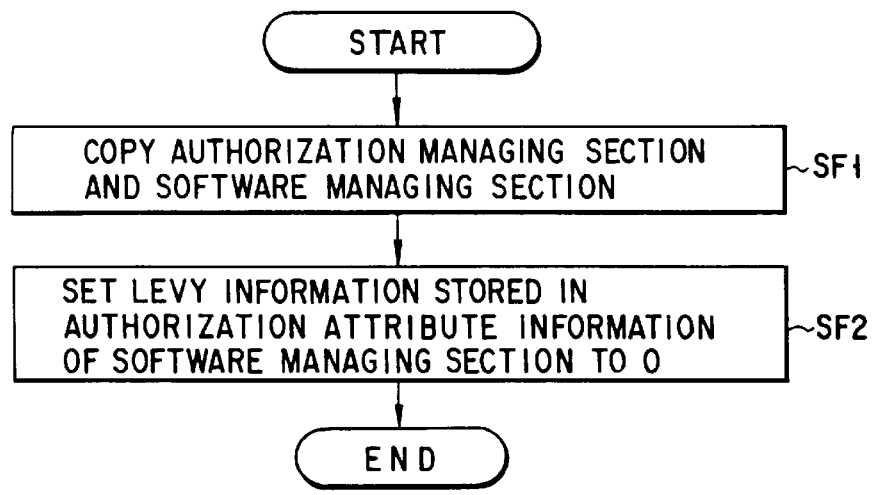
FIG. 94 is a flow chart explaining how a use-method is controlled when the menu of "copy" is selected.

FIG. 94 shows a structure of a software use method control system according to the twentieth embodiment of the present invention.

This software use method control system includes an input section 15, a software managing section 40, an authorization managing section 50, an authorization control section 60 and an information presentation section 85. The components similar or identical to those of the embodiments described above are designated at the same reference numerals, and will not be described in detail.

The twentieth embodiment is characterized in two respects. First, the authorization managing section 50 manages levy information containing an amount levied in accordance with data and usage corresponding to each use method for the software. Second, the authorization control section 60 accesses the software managing section 40 and the authorization managing section 50, while controlling its own access to the software managing section 40 by using authorization information, thus processing the levy information when the software is copied.

(2) Advantages

With the conventional computer, the existing measures for protection of software are not sufficient, and thus software can be illegally copied. With the software use method control systems described above, software can be protected, and each item of software can be levied in accordance with its usage. In the twentieth embodiment, the software can be copied, and the process of the levy can be appropriately carried out.

(3) Detailed Description of the Twentieth Embodiment

FIG. 90 shows an example of the format of information managed by the authorization managing section 50 and the authorization control section 60. The authorization attribute information shown in FIG. 90 is similar to the authorization attribute information of FIG. 9; however it further contains levy information.

As shown in FIG. 90, the authorization managing section 50 manages authorization attribute information. The authorization attribute information is data with regard to the software use method, and contains data indicating the name of the use method, ID data identifying the use method control program for controlling the use method, data indicating a pointer to the use method control program in the authorization control section 60, and levy data containing an amount levied in accordance with the use method control program. In the case where the pointer pointing to the use method control program is a NULL pointer in FIG. 90, it is indicated that the use method is not allowed to be executed with the software. In the case where it is not a NULL pointer, it is indicated that the use method is allowed to be used.

As shown in FIG. 90, the authorization control section 60 contains the ID information of the use method control program and the use method control program.

The flow of the process of referring to software and copying the software, which is carried out when the software is in the form of a document, will now be described.

Figure 91:
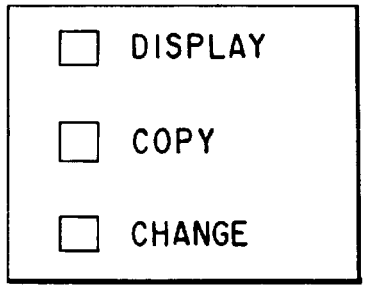
FIG. 91 is a diagram showing a menu displayed at the input section of the twentieth embodiment.

FIG. 91 shows an example of the display of the input section 15.

Figure 92:
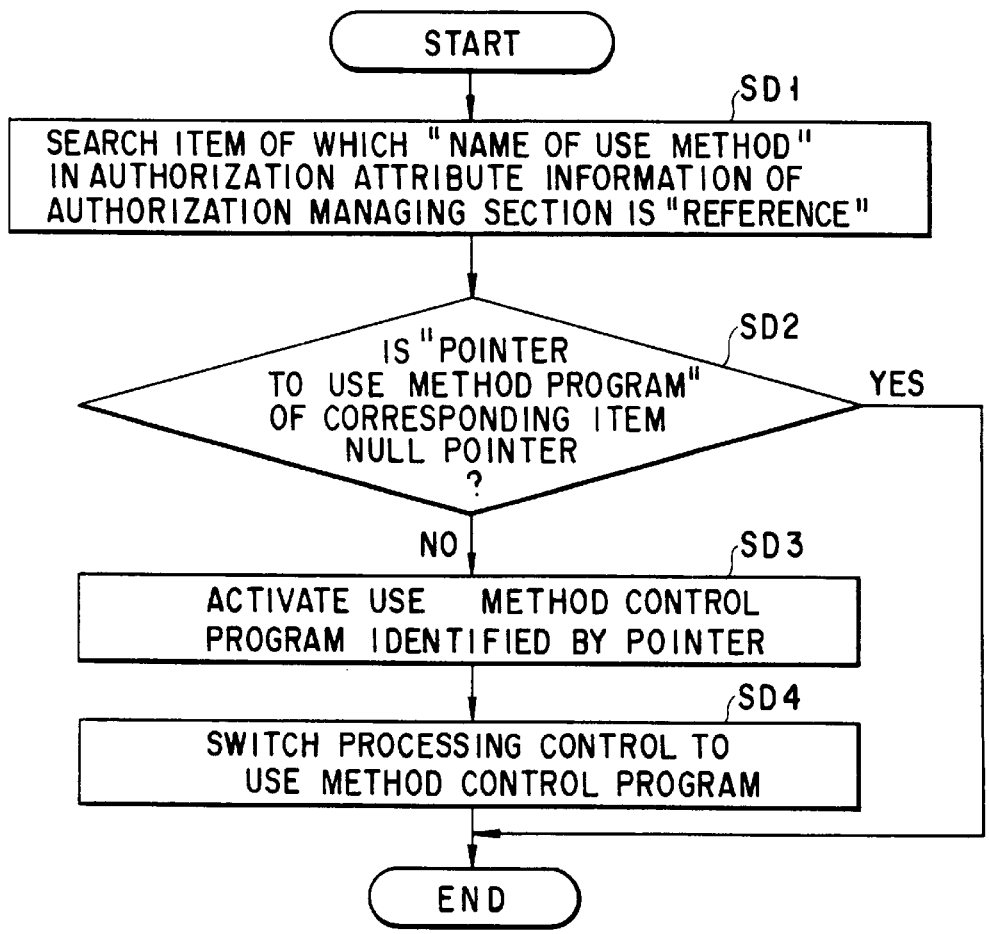
FIG. 92 is a flow chart explaining how the authorization control section operates when the menu item of "display" is selected.

FIG. 92 shows the flow of the processing of the authorization control section 60 in the case where "display" is selected.

When the "display" is selected, the authorization control section 60 searches the item for which the "title of the use method" is "reference", among the authorization attribute data of the authorization managing section 50 (Step SD1). It is checked whether or not "the pointer to the use method control program" of the item ("reference") is an NULL pointer (Step SD2). In Step SD2, when the pointer is not a NULL pointer, the use method control program indicated by the pointer is driven (Step SD3), and the control of the processing is passed onto the use method control program (Step SD4).

Figure 93:
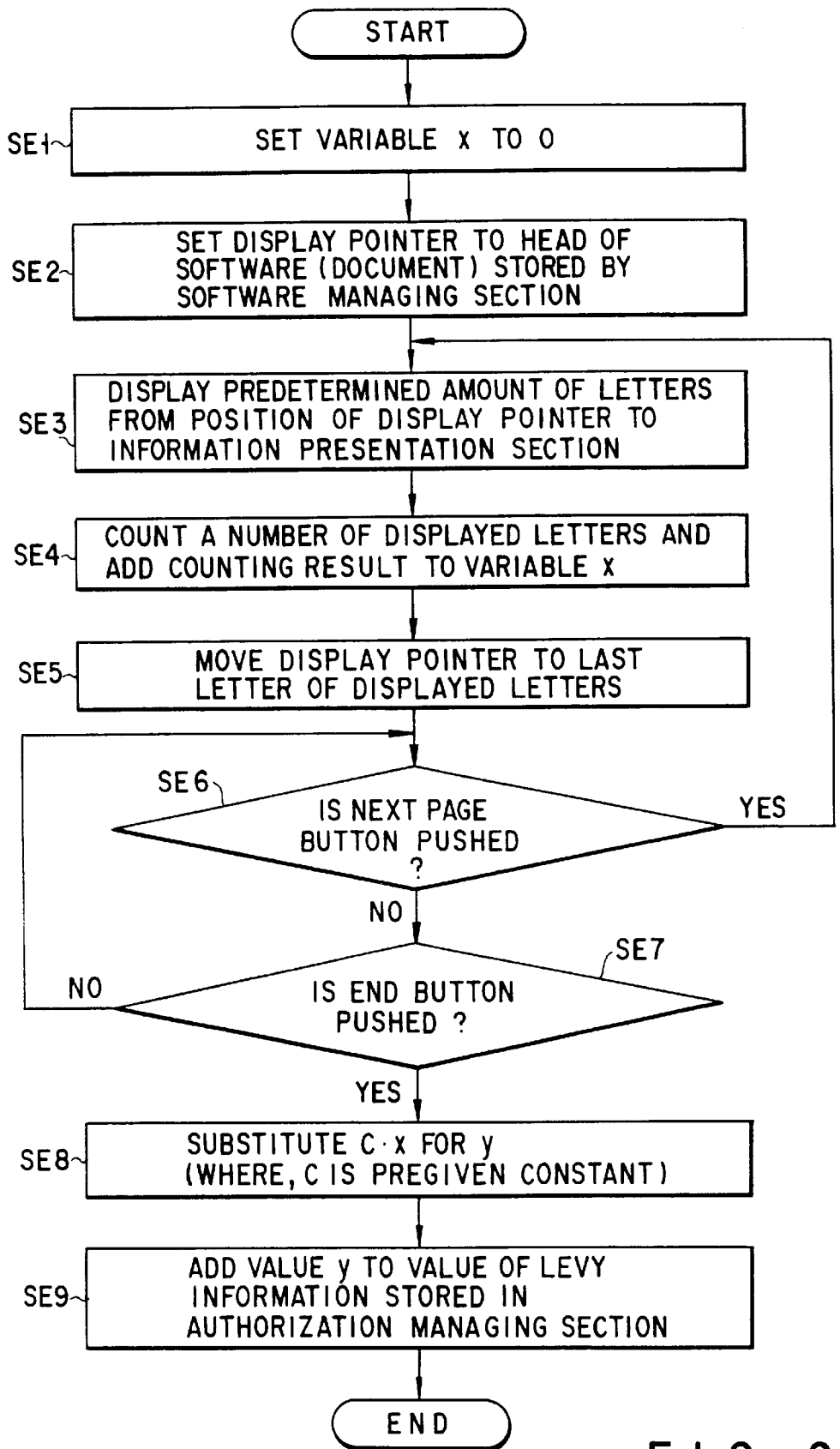
FIG. 93 is a flow chart explaining how a use-method is controlled when the menu of "reference is selected.

FIG. 93 shows a flow of the process of the use method control program in the case of "reference".

The value of variable x is reset to 0 (Step SE1). Next, an indicating pointer is set at the beginning of the software (document) in the software managing section 40 (Step SE2). A predetermined number of characters counted from the position of the indicating pointer are displayed on the information display 85 (Step SE3). At this time, the value of the count of displayed characters is added to a variable x (Step SE4), and the indicating pointer is shifted to the position of the last character displayed (Step SE5).

When the next page button is pushed, the process is set back to Step SE3 (Step SE6).

When the finish button is finished, the process proceeds to the next Step (Step SE7).

The value of the product of a predetermined constant C and a variable x is substituted for a variable y (Step SE8). Further, the value of the levy information in the item "reference" of the authorization attribute information of the authorization managing section 50 is replaced by the value obtained by adding the value of y to the value of the levy information (Step SE9).

In the case where "copy" is selected in FIG. 91, the use method control program for carrying out the copying shown in FIG. 90 is started as in the case of "reference" shown in FIG. 92, and the control is passed on. FIG. 94 shows the flow of the process of the use method control program in the case of the copying shown in FIG. 94.

First, the software managing section 40 and the authorization managing section 50 are copied in a memory section (not shown) of the device (Step SF1). The values of the levy information in the authorization attribute information of the authorization managing section 50 are then all set to 0 (Step SF2).

Embodiment 21

(1) Main Components and Features

Figure 95:
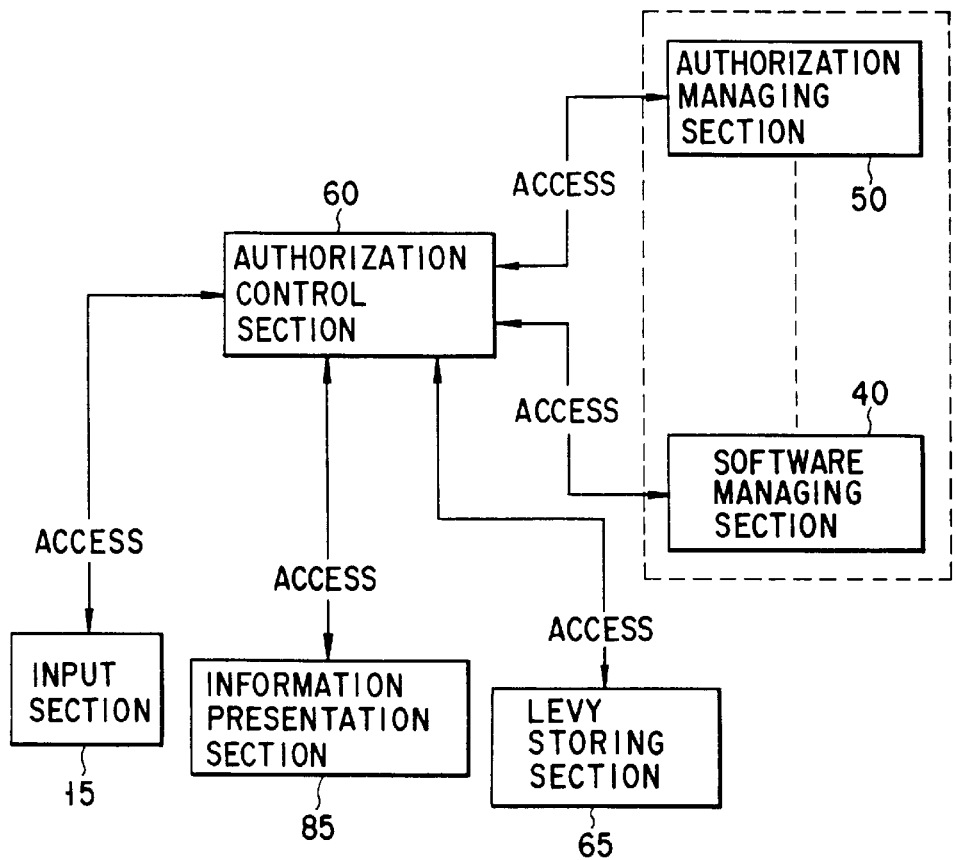
FIG. 95 is a diagram illustrating the basic structure of a software use method control system according to a twenty-first embodiment of the invention.

FIG. 95 shows a software use method control system according to the twenty-first embodiment of the invention.

This software use method control system is characterized by including a levy storing section 65, in addition to the structure of the software use method control system of the twentieth embodiment. In this embodiment, sections similar to those of the twentieth embodiments are designated by the same reference numerals, and the descriptions of the functions of those sections will be omitted.

The twenty-first embodiment is characterized in that the authorization control section 60 outputs levy information in the case where the software is erased, and the levy is added to a levy stored the levy storing section 65 from the authorization control section 60 and the levy storing section 65 stores the new amount.

(2) Advantages

With the conventional computer, the existing measures for protection of software are not sufficient, and thus software can be illegally copied. With the software use method control systems described above, software can be protected, and each item of software can be levied in accordance with its usage. In the twentieth embodiment, the software can be erased, and the process of the levy can be appropriately carried out.

(3) Detailed Description of the Twenty-First Embodiment

The display in an input section 15 is similar to that shown in FIG. 91 of the twentieth embodiment. Therefore, the illustration of this embodiment will be omitted, and the description will be made on the basis of FIG. 91.

The flow of the process of the authorization control program 60 in the case where "display" is selected in FIG. 91 is similar to that of FIG. 92 of the twentieth embodiment, and the flow of the process of the authorization control program is similar to that shown in FIG. 93. The process of the program 60 will not therefore be explained.

The flow of the process of the authorization control program 60 in the case where "copy" is selected in FIG. 91 is similar to that of FIG. 94 of the twentieth embodiment. The process of the program 60 will not be explained.

Figure 96:
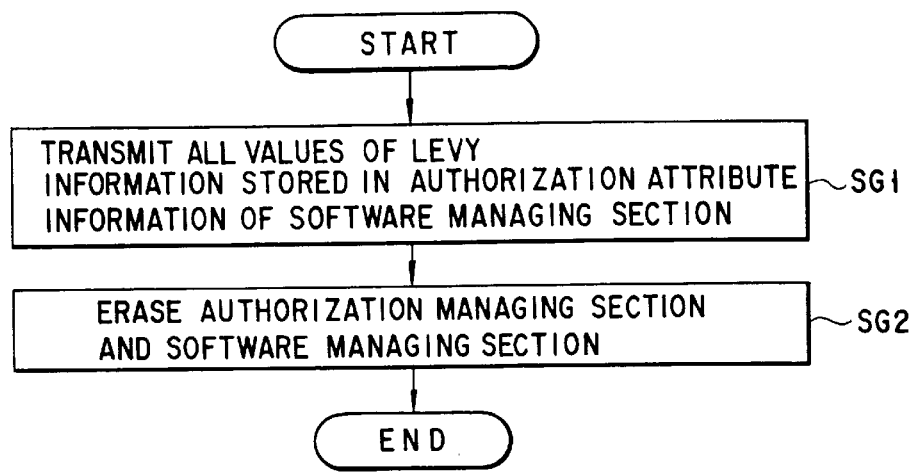
FIG. 96 is a flow chart explaining how a use-method is controlled when the menu of "delete" is selected.

FIG. 96 shows the flow of the process of the authorization control program for deletion in the case where "delete" is selected in FIG. 91.

First, all the values of the levy information of the authorization attribute information in the authorization managing section 50 of the software are output to the levy storing section 65 (Step SG1). The software managing section 40 and the authorization managing section 50 are then erased (Step SG2). When the value of the levy information is sent from the authorization control program, the levy storing section 65 adds the sent value to the currently stored value, and stores the added value.

Figure 97:
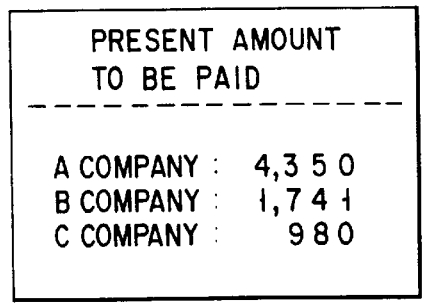
FIG. 97 is a diagram showing an example of levy information.

It should be noted that an ID can be assigned to a software so as to identify the publisher, writer, etc. of the software. In the use of the ID, the levy storing section 65 can add levy information separately for each publisher or writer, and store the added value. In this case, it is possible that an amount stored in the levy storing section 65 is displayed on the information presentation section 85 as shown in FIG. 97.

Embodiment 22

(1) Main Components and Features

Figure 98:
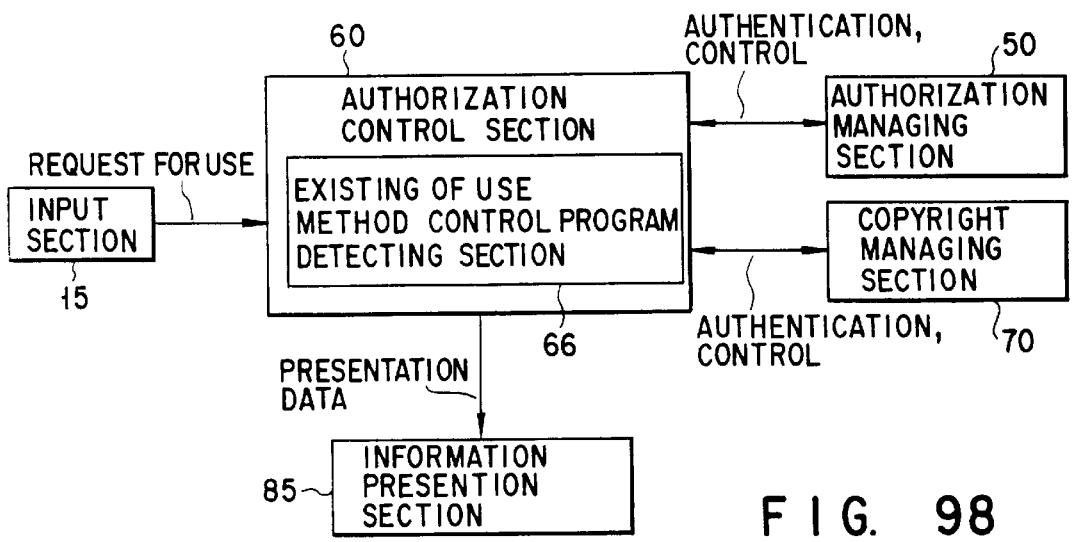
FIG. 98 is a diagram illustrating the basic structure of a software use method control system according to a twenty-second embodiment of the invention.

FIG. 98 is a diagram showing, in brief, a structure of a software use method control system according to the twenty-second embodiment of the present invention.

The twenty-second embodiment includes an input section 15, an authorization managing section 50, an authorization control section 60, a copyright managing section 70 and an information presentation section 85, and the authorization managing section 50 includes a use method control program detecting section 66 for detecting that a pointer pointing to a use method control program for the use requested by the user is not present in the authorization attribute information.

With the above-described structure, the twenty-second embodiment is characterized in that OS judges whether or not a use method control program corresponding to the requested usage is present in the system. If the program is not present, the user is informed that the requested usage cannot be performed, and if the program is present, the use method control program is executed.

(2) Advantages

If an OS does not have a use method control program which presents the process for the use method of information regarding copyright, a process appropriate for the usage cannot be executed.

In the twenty-second embodiment, when there is a request for use made by the user, it is judged whether or not the use method control program corresponding to the requested usage is present in the system. If the program is not present, the user is informed that the requested usage cannot be performed. Then, after informing the user that a process appropriate for the request cannot be executed, the OS stands by for a new request for usage. Thus, an error process in which an incorrect code, in place of the use method control program, is carried out in the system, can be prevented. Meanwhile, it is possible for the user to recognize that the use method control program needs to be added to the system.

(3) Detailed Description of the Twenty-Second Embodiment

Figure 99:
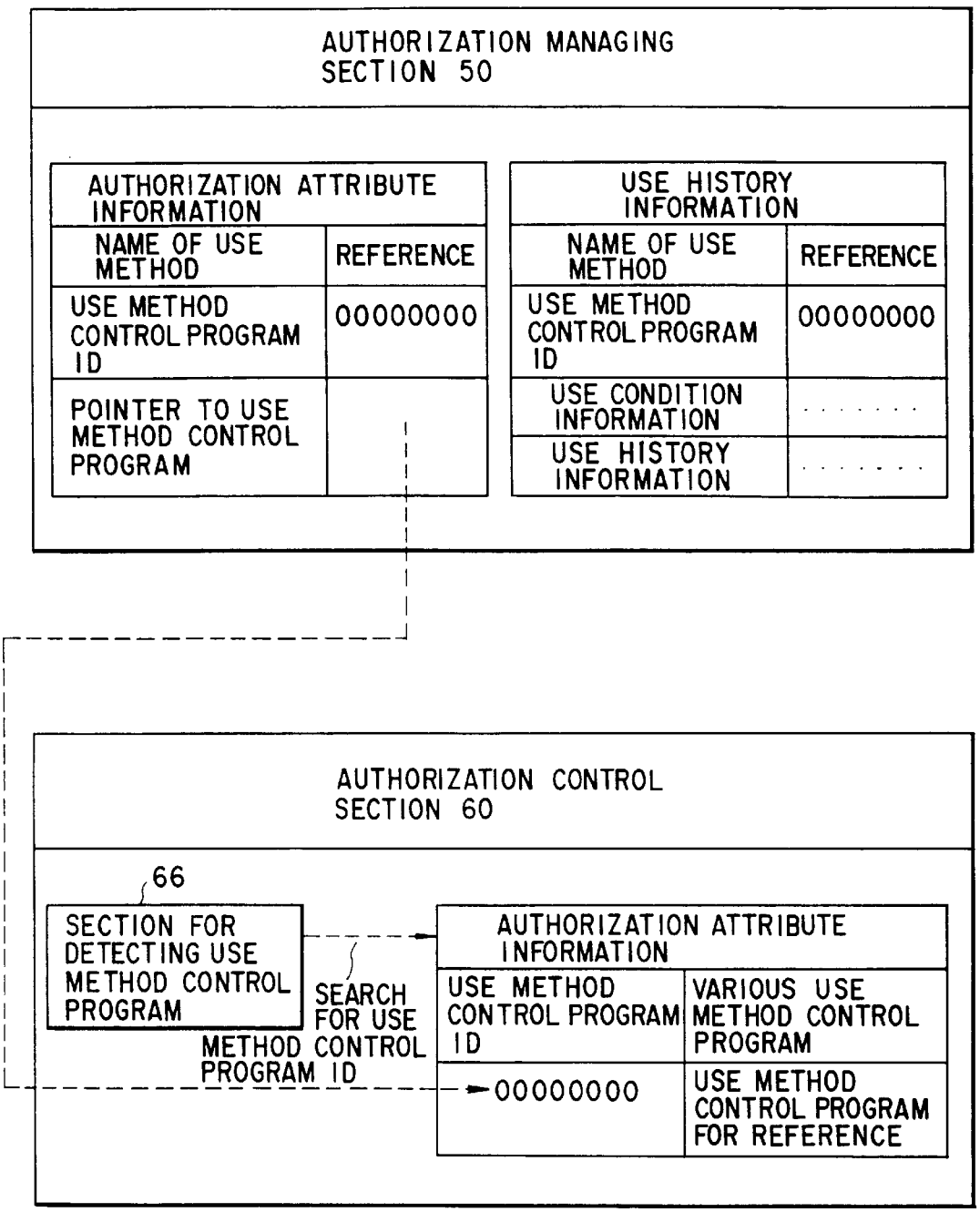
FIG. 99 is a diagram schematically showing the information managed by the authorization managing section and the authorization control section, both incorporated in the twenty-second embodiment.

FIG. 99 is a diagram showing a format of the authorization control section 60 and information managed by the authorization managing section 50.

FIG. 100 is a diagram showing the flow of the process of the twenty-second embodiment.

While the input section is standing by for an input from a user (Step SH1), and when there is a request of use of, for example, writing information i, from the user (Step SH2), the authorization control section 60 judges whether or not the control program of the use method is present in the authorization control section 60 by referring to the authorization attribute information managed by the authorization managing section 50. For example, in the twenty-second embodiment, it is judged whether or not a pointer pointing to the use method control program is NULL (Step SH3). In this case, if the pointer is NULL, the authorization control section 60 does not contain the use method control program for the usage. If the pointer is not NULL, the use method control program for usage is reserved at the position indicated by the pointer.

In Step SH3, if the pointer is NULL, the authorization control section 60 displays a message indicating that the use method control program for the usage is not present in the system and therefore cannot be executed, on the information presentation section 85 to the user, finishes the process, and then stands by for the next input.

In Step SH3, if the pointer is not NULL, the use method control program for the usage, which is reserved at the position pointed out by the pointer, is executed. It is then judged whether or not the use method control program is to be used, by judging whether or not such a use satisfies the use conditions or the levy conditions, permitted by the owner of the copyright, with reference to the information (use history information) regarding the use method managed by the authorization managing section 50 (Step SH5).

In the case where use is not allowed, the message indicating that the program is not to be used due to the use conditions set by the owner of the copyright or the levy conditions, is displayed on the information presentation section 85 (Step SH6), the process is finished, and then the input section stands by for the next input.

In the case where the use of the program is allowed, the authorization control section 60 reads writing information i requested for use, from the copyright managing section 70 (Step SH7). In the case where the writing information i has been compressed or coded, the restoration (returning the compressed information back to the original) or decoding (returning the coded information back to the original by decoding it, using a key or the like) is carried out at this point.

The authorization control section 60 displays the writing information decoded or restored in Step SH7 on the information presentation section 85 (Step SH8).

Consequently, even in the case where the use method control program for the use of the writing is not present in the system, erroneous processing by the system can be prevented, and the absence of the use method control program for usage can be reported to the user.

Embodiment 23

(1) Main Components and Features

Figure 101:
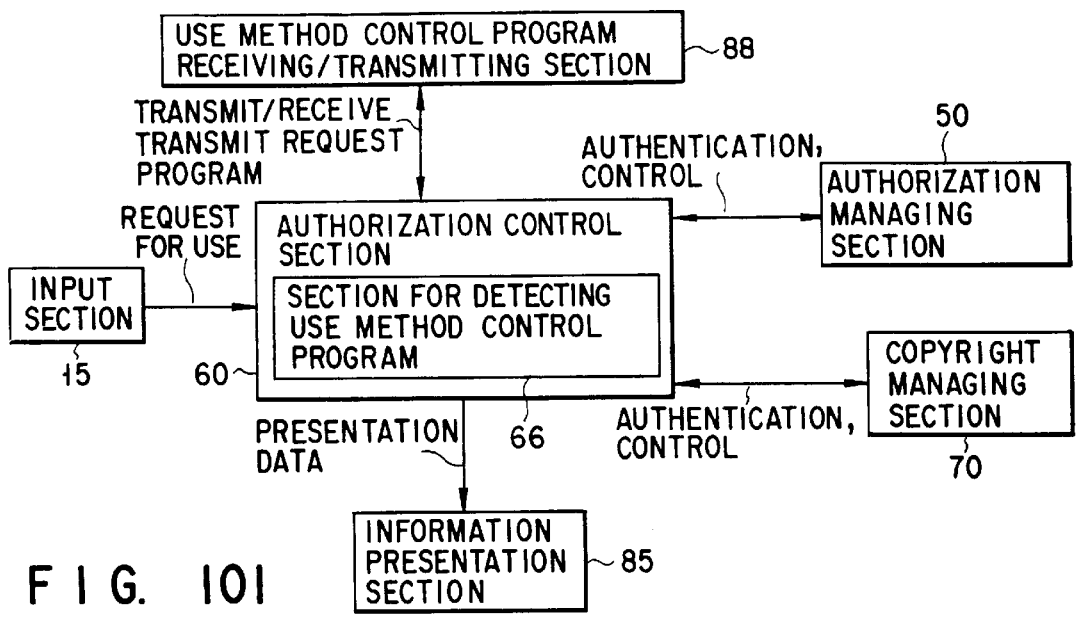
FIG. 101 is a diagram illustrating the basic structure of a software use method control system according to a twenty-third embodiment of this invention.

FIG. 101 shows a software use method control system according to the twenty-third embodiment of the present invention.

The twenty-third embodiment includes a use method control program receiving/transmitting section 88, in addition to those of the twenty-second embodiment.

The use method control program receiving/transmitting section 88 receives/transmits use method control programs from/to other OSs. The use method control program receiving/transmitting section 88 is connected in network so that the reception/transmission of programs can be performed with other systems.

With the above-described structure, the twenty-third embodiment is characterized in that, when the use of a writing is requested, the OS judges whether or not the use method control program for the use is present in the system, if the program is not present, the use method control program is transferred from some other system via the use method control program receiving/transmitting section 88 which requests that other system to transfer the use method control program, the use method control program is executed, whereas the program is present, the use method control program is executed.

(2) Advantages

In the case where an OS does not contain a use method control program which presents the process of the use method of the information for a copyright, the process appropriate for the use cannot be carried out.

In order to transform the OS into a new version so that it contains the process for the new use method, it is necessary to install the new version in the system in which the old version is already installed.

According to the twenty-third embodiment, a newly added use method can be flexibly dealt with, by adding only the corresponding use method control program to the system. Further, the use method control program is transferred from the OS which contains the program and to another OS which requires it. Therefore, the twenty-third embodiment is able to handle a new use method without conducting a complex reinstallment.

(3) Detailed Description of the Twenty-Third Embodiment

Figure 102:
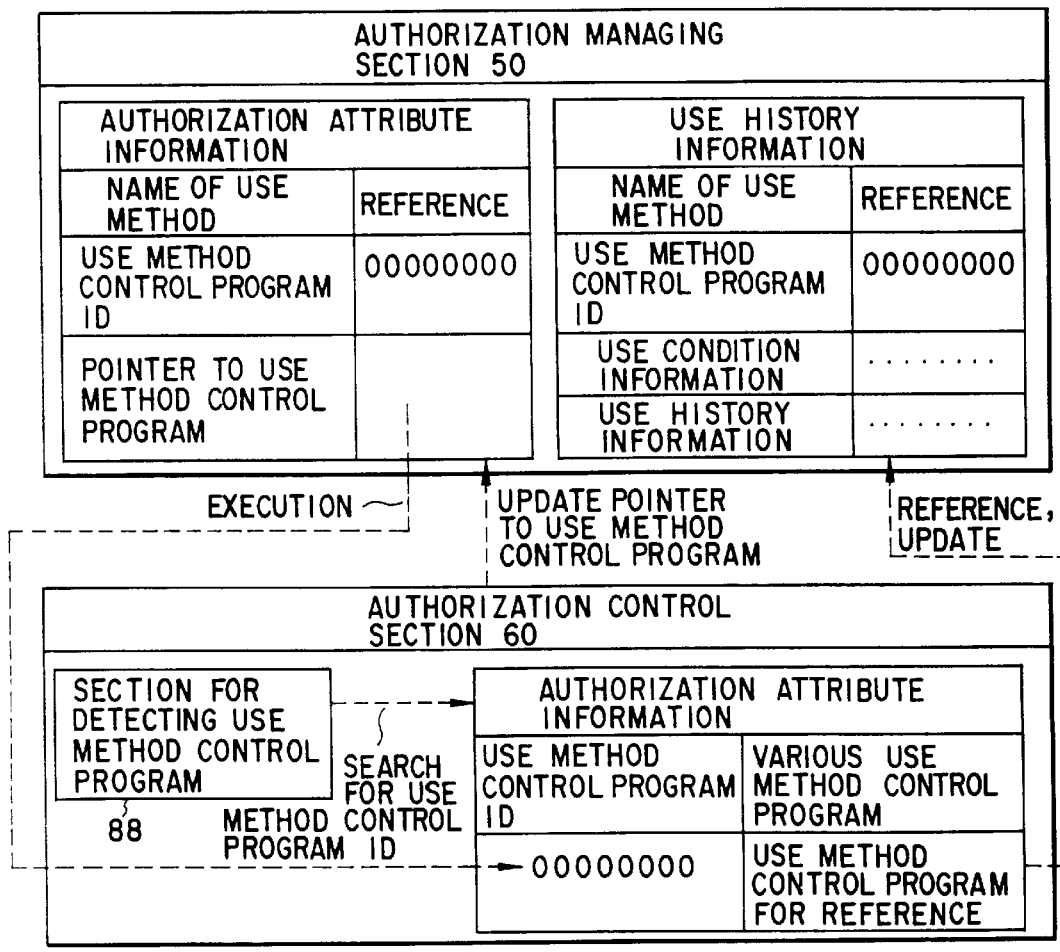
FIG. 102 is a diagram schematically showing the information managed by the authorization managing section and the authorization control section, both incorporated in the twenty-second embodiment.

FIG. 102 shows a format of the authorization control section 60 and information managed by the authorization managing section 50, according to the twenty-third embodiment.

FIG. 103 is a diagram showing the flow of the process of the twenty-third embodiment.

While the input section is standing by for an input from a user (Step SJ1), and when there is a request of use of, for example, writing information i, from the user (Step SJ2), the authorization control section 60 judges whether or not the control program of the use method is present in the authorization control section 60 by referring to the authorization attribute information managed by the authorization managing section 50 (Step SJ3). In this case, it is judged whether or not a pointer to the use method control program is NULL.

In Step SJ3, if this pointer is NULL, the authorization control section 60 does not contain the use method control program for the usage. If the pointer is not NULL, the use method control program for the usage is reserved at the position indicated by the pointer.

In Step SJ3, if the pointer is NULL, the authorization control section 60 issues a request to the use method control program receiving/transmitting section 88 so that the receiving/transmitting section transfers the control program for the usage, from some other system. The authorization control section 60 issues a request to other systems via the network so that the use method control program for the usage should be transferred. A use method control program which has been sent in response to the request, is stored as part of the authorization attribute information by the authorization control section 60. Among the authorization attribute information in the authorization managing section 50, the pointer to the use method control program for the usage is renewed, and set to point the position where the just-stored control program is saved (Step SJ4).

The use method control program for the usage is transferred into the system as described, and the use method control program is executed.

If the pointer is not NULL, it is indicated that the use method control program for the usage is already present in the system. Therefore, the use method control program for the usage, which is saved at the position pointed out by the pointer, is executed, without issuing a request of transfer, to the control program receiving/transmitting section 88.

In the execution of a use method control program, it is judged whether or not the use method control program is to be used, by judging whether or not such a use satisfies the use conditions or the levy conditions, permitted by the owner of the copyright, with reference to the information (use history information) regarding the use method managed by the authorization managing section 50 (Step SJ5).

In the case where the use is not allowed, the message indicating that the program is not used due to the use conditions set by the owner of the copyright or the levy conditions, is displayed on the information presentation section 85 (Step SJ6), the process is finished, and then the input section stands by for the next input.

In the case where the use of the program is allowed, the authorization control section 60 reads writing information i requested to be used, from the copyright managing section 70 (Step SJ7). In the case where the writing information i has been compressed or coded, the restoration (set the compressed information back to the original) or decoding (set the coded information back to the original by decoding it, using a key or the like) is carried out at this point.

The authorization control section 60 displays the writing information decoded or restored in Step SJ7 on the information presentation section 85 (Step SJ8).

Consequently, even in the case where the use method control program for the use of the writing is not present in the system, the erroneous process by the system can be prevented, and the absence of the use method control program for the usage can be reported to the user.

Embodiment 24

(1) Main Components and Features

Figure 104:
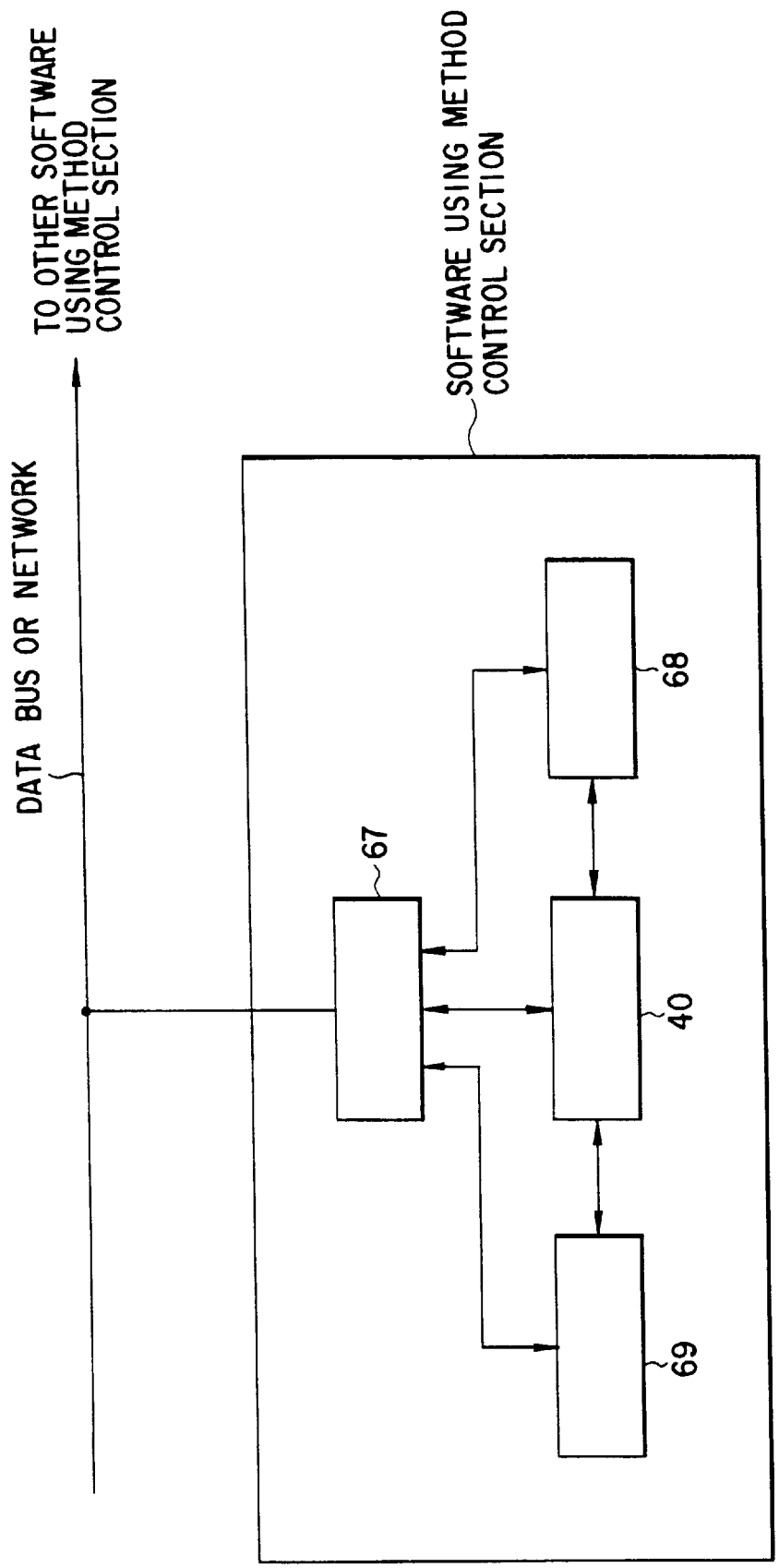
FIG. 104 is a diagram illustrating the basic structure of a software use method control system according to a twenty-fourth embodiment of this invention.

FIG. 104 is a diagram showing a brief structure of a software use method control system according to the twenty-fourth embodiment of the present invention.

The twenty-fourth embodiment is characterized in that a plurality of software use method control sections including the software managing section 40, the communication section 67, the judgment section 68 and the copying section 69, are communicated with each other, and therefore, even if the control program of a desired software is not present in the software managing section 40 of itself, the control program for the desired software is copied from some other software use method control section, to be used. These software use method control sections are connected via data busses, a network, or the like.

(2) Advantages

With the above-described structure, for example, in the case where the use method control program of a new use method is added, the control program, if not present, is copied automatically from some other section without having to be installed by the user. Thus, the software can be converted into a new version without causing any trouble to the user, and thus the new use method can be handled.

(3) Detailed Description of the Twenty-Third Embodiment

FIG. 104, the software managing section 40 manages software information of a book, paper, magazine, software and the like.

The communication section 67 carries out the reception and transmission of data with other software use method control section via a data bus or the like, and receives a request from other sections.

The judgment section 68 examines whether or not a desired software is present in those managed by the software managing section 40.

The copying section 69 copies a desired use method control program from some other software use method control section containing that desired use method control program, in the case where it is judged by the judgment section 68 that the desired program is not present.

The operation of the twenty-fourth embodiment having the above-described structure will be described. In this case, it is supposed that the software managing section 40 manages software A and software B, and a use method control program A' for software A.

When the communication section 67 receives a request of use of the software B, the judgment section 68 examines if the use method control program B' for software B is present in the software managing section 40. In this case, the software managing section 40 contains only the use method control program A', and therefore the software B cannot usually be used even though it is usable.

However, in the case where the use method control program B' for the software B is not present in the software managing section 40, the software managing section 40 reports this fact to the copying section 69.

Based on this report, the copying section 69 copies the use method control program B' from the software use method control section which contains the use method control program B', onto the software managing section 40.

In the above operation, the use method control program B' for the software B is copied in the software use method control section, and therefore the use method which is in accordance with the designation of the use method control program B', can be carried out.

In the twenty-fourth embodiment, the use method control program is managed by the software managing section 40; however it may be managed by the authorization managing section 50.

The present invention is not limited to the above-described embodiments.

For example, in the description of the embodiments, the information managed by the authorization managing section 50 and the authorization control section 60 is stored in a particular section; however, as long as it is manageable, the information may be stored in any section (for example, external memory device). Other copyright information and the like may be stored in any section, as well.

As long as the essence remains, the present invention can be modified into various versions.

The following are summaries of the inventions described in each of the embodiments.

(1) The system of the present invention is characterized by the protection of a system resource when the resource is used in the multiple OS environment, and has a resource protecting section for designating a right of accessing to the system resource for each operating system (OS) executed by the system, and controlling the access to the system source of the OS based on the designation.

(2) The system of the present invention is a software use method control system for which a super-user is not present, and has a privilege protecting section which inhibits all the users of the software use method control system access the system resource by obtaining a right to access to the system resource of the software use method control system via the software use method control system.

(3) The software itself, which has the characteristics of the authorization managing section and the software managing section (the minimum structure), and is executed on the software use method control system, has an authorization managing section for managing information (authorization information) corresponding to each use method (how it is executed and method of secondary use) of the software, and a software managing section for managing the software.

(4) The system characterized by the role of the authorization information, and according to the above (3) or the combination of (1), (2) and (3), wherein the authorization information is at least one of information indicating a use method of software, information indicating the intention of the owner of the copyright with regard to the use method of the software, information for distinguishing one piece of software from another, information for using software, information for controlling the use method of software, information for recording the history of the use method of software, information for controlling the levy for the use of the software, and information obtained by hierarchically or non-hierarchically combining the above information items.

(5) The software use method control system characterized by the content of the authorization data, and according to the above (4), wherein the authorization information is at least one of text information, voice information, bit map information, stroke information, static picture information, dynamic image information, binary information, program information and information obtained by hierarchically or non-hierarchically combining the above information items.

(6) The software use method control system characterized by the access to the software managing section by the authorization control section, and according to the above (5), wherein the control system includes an authorization control section which carries out at least one of the following accesses to the software: forming software, referring to, displaying, copying, transferring, revising, erasing, executing, solving, carrying out an access obtained by hierarchically or non-hierarchically combining these accesses, combining a plurality of software in their entireties or partially, and hierarchically or non-hierarchically combining a plurality of software in their entireties or partially.

(7) The software use method control system characterized by the access to the software managing section by the authorization control section, and according to the above (6), wherein the authorization control section which carries out at least one of the following accesses to the software: forming software, referring to, displaying, copying, transferring, revising, erasing, executing, solving, carrying out an access obtained by hierarchically or non-hierarchically combining these accesses, combining a plurality of software in their entireties or partially, and hierarchically or non-hierarchically combining a plurality of software in their entireties or partially.

(8) The software use method control system according to the above (7), characterized by the authentication information managing section for managing information (authentication information) which can present the circumstances at the time when the software was used.

(9) The software use method control system characterized by the content of authentication information, and according to the above (8), wherein the authentication information is at least one of the following: information for authenticate at least one individual, information for authenticating at least one particular device and information for authenticating at least one password.

(10) The software use method control system characterized by the content of the authentication data, and according to the above (9), wherein the authentication information is at least one of text information, voice information, bit map information, stroke information, static picture information, moving picture information, binary information, program information and information obtained by hierarchically or non-hierarchically combining the above information items.

(11) The software use method control system characterized by the characteristics of authentication information, and according to the above (10), wherein the authentication information is unique information.

(12) The software use method control system characterized by the access control of the authorization information with respect to the software managing section, and according to the above (10) or (11), wherein the authorization control section controls its own access to the software managing section by using at least one of the authorization information and authentication information.

(13) The software use method control system characterized by the use method control mode (present, absent, designation) of the authorization control section, and according to the above (12), wherein the authorization control section controls access to the software in at least one of the following manners, "unconditionally access", "absolutely not access" and "access in a designated mode".

(14) The software use method control system characterized by the use method control program, and according to the above (13), wherein the authorization control section execute at least one of the following procedures (use method control program): recording at least one of the following information (use history information), use history of software, authentication information at the time of use, levy history to use and pay history to use; determining whether or not software can be accessed in response to at least one of the following information, the use history information of the software, the present circumstances of use and the authentication information at the time of use; and executing designated accessing to the software in response to one of the following information, the use history information of the software, the present circumstances of use and the authentication information at the time of use.

(15) The software use method control system characterized by the management of the use history information, and according to the above (14), wherein the authorization managing section or authorization control section manages the use history information, or manages the use history information and the use method of the software, with the use history information being associated with the use method.

(16) The software use method control system characterized by the management of the use method control program, and according to the above (15), wherein the authorization managing section or authorization control section manages the use method control program, or manages the use method control program and the use method of the software, (integrally) with the use history information being associated with the use method.

(17) The software use method control system characterized by the authorization attribute information and the authorization state information, and according to the above (16), wherein the authorization managing section manages the control manner for access of the authorization control section to the software, or manages information indicating the control manner of access of the authorization control section to the software, and the use method of the software, while associating them with each other.

(18) The software use method control system characterized by the copyright managing section and its role, and according to the above (16), wherein the software itself has the copyright managing section for managing information (copyright information) for controlling access of the authorization control section to the authorization managing section.

(19) The software use method control system characterized by the content of the authorization information, and according to the above (3) or (18), wherein the copyright information is at least one of the followings: information for editing the use method of software, information indicating the conditions for editing the use method of the software, information indicating the author of the software or a person who has the copyright of the software (owner of copyright), information indicating the intention of the author on the copyright of the software, information for distinguishing one item of software from another, information for recording the edit history of the use method of software, information for controlling the levy to the edition of the use method of software, authentication information, and information obtained by hierarchically or non-hierarchically combining these information items.

(20) The software use method control system characterized by the copyright control section, and according to the above (18) or (19), wherein the system has a copyright control section for controlling access of the authorization control section to the authorization managing section, by using at least one of the copyright information and the authentication information.

(21) The software use method control system characterized by the access control manner of the copyright control section, and according to the above (20), wherein the copyright control section controls the edition of the copyright control section itself or the authorization control section, with regard to the authorization information in at least one of the following manners, "unconditionally edit, "absolutely not edit" and "edit in a designated mode".

(22) The software use method control system characterized by the copyright attribute information (free, fixed, conditional), and according to the above (21), wherein the copyright managing section manages information indicating the control manner of editing the authorization information of the authorization control section.

(23) The software use method control system characterized by the encoding by the authentication information, and according to the above (20), wherein the copyright control section or authorization control section encodes at least one of the following, copyright information, authorization information and information managed by the software managing section using the authentication information as a key.

(24) The software use method control system characterized by the special contract information, and according to the above (20), wherein while the authorization control section accessing the authorization information or the information managed by the software managing section, the copyright control section accesses the authentication information managing section, detects the authentication information, and decodes at least one of the copyright information items encoded by the copyright control section using the authentication information as a key, by the detected authentication information, and authenticates if the encoded information has been decoded into the original copyright information.

(25) The software use method control system characterized by the copyright control program, and according to the above (20), wherein the copyright control section executes at least one of the following procedures: recording at least one of the following information (edit history information), the edit history of authorization information and copyright information, the levy history to edit, the authentication information at the time of edit and the payment history to edit; determining whether or not the authorization information and copyright information in response to at least one of the edit history of authorization information and copyright information, the levy history to edit, the authentication information at the time of edit, the payment history to edit and the present circumstances of use; and executing a designated edit of the authorization information and copyright information in response to at least one of the edit history of authorization information and copyright information, the levy history to edit, the authentication information at the time of edit, the payment history to edit and the present circumstances of use.

(26) The software use method control system characterized by the management of a copyright control object, according to the above (25), wherein the copyright control section or copyright managing section manages the copyright control program.

(27) The software use method control system characterized by the copyright status information, according to the above (26), wherein the copyright managing section manages information as to whether or not the authorization control portion edits the authorization information, which is determined by the copyright control program.

(28) The software use method control system characterized by the handling of a work (free), etc., which have no copyrights, and according to the above (26), wherein the authorization control section, when software is copied and the owner of the software is changed, carries out one of the following managements: replacing the authorization information for authenticating the author in the copyright information, by the authentication information of the copyright owner of software; and erasing the authentication information in the copyright information.

(29) The software use method control system characterized by the handling of a user program (application program), etc., and according to the above (3) or (20), wherein the authorization managing section or authorization control section manages and executes the application program (use program) for using software.

(30) The software use method control system characterized by the handling of a use program, etc., which are protected and executed by the user ID, and according to the above (3) or (16), wherein the authorization control section executes the user program as an execution section protected from access of some other program, and uses the authentication information as an execution section ID which indicates the access right of each execution section.

(31) The software use method control system characterized by the use method control program protected by the author ID, and copyright control program, and according to the above (20) or (26), wherein the authorization control section or the copyright control section executes the use method control program and the copyright control program, as execution sections protected from access of some other program, and uses the copyright information as an execution section ID which indicates the access right of each execution section.

(32) The software use method control system characterized by the use method control program protected by the author ID, the copyright control program and software, and according to the above (21) or (26), wherein the authorization control section or the copyright control section executes the use method control program and the copyright control program, as execution sections protected from access of some other program, and uses the authentication information as an execution section ID which indicates the access right of each execution section, in the case where the copyright control section controls the edit of the authorization information of the authorization control section in the controlling manner of "unconditionally edit".

(33) The software use method control system characterized by the content of the copyright information as an execution section ID, and according to the above (30), (31) or (32), wherein the use program, the use method control program, the copyright control program, or the copyright information or authentication information used as an execution section ID of software, is at least one of an individual ID corresponding to a particular individual, a device ID corresponding to a particular device and a software ID corresponding to a particular item of the software.

(34) The software use method control system characterized by the OS for protecting programs and data, and according to the above (20) or (26), wherein the authorization control section or the copyright control section protects the programs and the data accessed by the programs, independently as a separated execution section.

(35) The software use method control system characterized by the management of access of the execution section ID to the data of the program, and according to the above (26) or (34), wherein the authentication control section or copyright control section inhibits access of a program to data, when at least one program and at least one item of data have different execution sections IDs.

(36) The software use method control system characterized by the management of access of the execution section ID to the data of the program, and according to the above (35), wherein the authentication control section or copyright control section permits access of a program to data, when at least one program and at least one item of data have the same execution section ID.

(37) The software use method control system according to the above (16), and comprising: a software managing section for managing software; an authorization managing section for managing the use method of software and at least one item of software, while associating them with each other; an authorization control section for controlling the use method of software by referring to information managed by the software managing section and the authentication control section, and an input section by which a user inputs a request of use, wherein the authorization control section includes a levy setting section for determining an amount of levy in accordance with an amount of software accessed by the user.

(38) The software use method control system characterized by the advertisement automatic display, related to the above (11) and according to the above (16), comprising: a software managing section for managing software; an authorization managing section for managing the use method of software, the structure of software and one or more items of software, while associating them with each other; an authorization control section for controlling the use method of software by referring to information managed by the software managing section and the authorization managing section, and an input section by which a user inputs a request of use, wherein the authorization control section includes a levy setting section for determining an amount of levy in accordance with an amount of software accessed by the user.

(39) The software use method control system characterized by the advertisement special levy, related to the above (12) and according to the above (16), comprising: a software managing section for managing software; an authorization managing section for managing the use method of software, the structure of software and one or more items of software, while associating them with each other; an authorization control section for controlling the use method of software by referring to information managed by the software managing section and the authorization managing section, and an input section by which a user inputs a request of use, wherein the authorization control section includes a levy setting section for determining an amount of levy with reference to the structure of software.

(40) The software use method control system characterized by the batch levy, related to the above (15) and according to the above (16), comprising: a software managing section for managing software; an authorization managing section for managing the use method of software, the structure of software and one or more items of software, while associating them with each other; an authorization control section for controlling the use method of software by referring to information managed by the software managing section and the authorization managing section, and an input section by which a user inputs a request of use, wherein the authorization control section includes a levy setting section for determining an amount of levy with reference to the structure of software.

(41) The software use method control system characterized by the time-charge system levy, according to the above (16), comprising: a software managing section for managing software; an authorization managing section for managing the use method of software, the structure of software and one or more items of software, while associating them with each other; an authorization control section for controlling the use method of software by referring to information managed by the software managing section and the authorization managing section, and an input section by which a user inputs a request of use, wherein the authorization control section includes a levy setting section for determining an amount of levy in accordance with the date and time marked in the software accessed by the user.

(42) The software use method control system according to the above (16), comprising: a software managing section for managing software; an authorization managing section for managing the use method of software and one or more items of software, while associating them with each other; an authorization control section for controlling the use method of software by referring to information managed by the software managing section and the authorization managing section, and an input section by which a user inputs a request of use, wherein the authorization control section includes an additional information superimposing section for superimposing additional information which specifies the owner of copyright, on the software, when used by the user.

(43) The software use method control system according to the above (16), comprising: a software managing section for managing software; an authorization managing section for managing the use method of software and one or more items of software, while associating them with each other; an authorization control section for controlling the use method of software by referring to information managed by the software managing section and the authorization managing section, and an input section by which a user inputs a request of use, wherein the authorization control section includes an additional information superimposing section for superimposing additional information which specifies the owner of copyright, on the software, when used by the user, and wherein only the user identified by the copyright control section to be the author of the software can rewrite the contents maintained by the authorization managing section, the additional information generating section and the additional information superimposing section.

(44) The software use method control system according to the above (16), comprising: a software managing section for managing software; an authorization managing section for managing the use method of software and one or more items of software, while associating them with each other; an authorization control section for controlling the use method of software by referring to information managed by the software managing section and the authorization managing section, and an input section by which a user inputs a request of use, wherein the authorization control section includes an additional information superimposing section for superimposing additional information which specifies the owner of copyright, on the software, when used by the user, and wherein the authorization control section controls a software use amount measuring section for measuring an amount of software content copied or revised by the user owns the right to copy or revise the software, and the additional information superimposing section in accordance with a software use amount measured by the software use amount measuring section.

(45) The software use method control system according to the above (16), comprising: a software managing section for managing software; an authorization managing section for managing the use method of software and one or more items of software, while associating them with each other; an authorization control section for controlling the use method of software by referring to information managed by the software managing section and the authorization managing section; the authentication information managing section for managing the authentication information of the user; an input section by which a user inputs a request of use; and a presentation section for presenting the software which has been rendered usable, wherein the system further includes a qualification correspondence control section for controlling the presentation method of the software in accordance with the profile of the user.

(46) The software use method control system characterized in that a reference control is performed by a terminal, and only the user who has acquired an access right can access software, wherein the system includes a software managing section for managing the software itself, a software display managing section for managing information as to whether or not the software corresponding to a display method is presented, a presentation ability informing section for obtaining presentation ability information of the terminal of the user when an access is requested by the user, and an authorization control section for controlling whether or not the software is accessed by referring to the display ability of the terminal of the user obtained by the presentation ability informing section and the information regarding display, managed by the software presentation managing section.

(47) The software use method control system characterized by the handling of an unsuccessful work, which is created in the middle of the processing, and in that only the user who has acquired an access right can access software, wherein the system includes a protection section for inhibiting software being created or a back-up of software from being stored in a system resource which can be used by a user who does not have an access right.

(48) The software use method control system characterized by having a function for informing the total amount of a best-seller, and in that only the user who has acquired an access right can access software, wherein the system includes a software managing section for managing software itself, an authorization managing section for managing identification information for identifying the name of the author of the software and distinguishing it from other items of software, and use history information, an authorization control section for informing the control of the user for accessing the software and the use history information managed by the authorization control section, and a total process section for totaling the use history information informed by the authorization control section and informing the user who uses the software use method control system of the total result.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A system, comprising;
   storage means for storing software, software managing means for managing the software and authorization information corresponding to a method for secondary use of the software as a set of information;
   authorization managing means for utilizing the software in accordance with the authorization information stored in said storage means;
   authentication information managing means for managing authentication information showing a condition the software assumes when the software is used;
   copyright managing means for managing copyright information which controls an access to said authorization managing means; and
   copyright control means for making an access to said copyright managing means and to said authorization managing means by using the copyright information and the authentication information.

2. The system according to claim 1, wherein said copyright control means edits the software in at least one of three control schemes of "software can be edited in any way," "software cannot be edited at all" and "software can be edited only in ways designated."

3. The system according to claim 1, wherein at least one of said authorization managing means and said copyright control means includes means for treating at least one of a use method control program and a copyright control program as an execution unit protected from access from any other program, and for using the copyright information as a software ID indicating an access right of each execution unit.

4. The system according to claim 1, wherein, when said copyright control means edits the software in the control scheme of "software can be edited in any way," at least one of said authorization managing means and said copyright control means includes means for treating the use method control program, the copyright control program and the software, as execution units protected from access from any other program, and for using the copyright information as a software ID indicating an access right of each of these execution units.

5. The system according to claim 1, wherein at least one of said authorization managing means and said copyright control means includes means for protecting a program and data access by use of the program, as independent execution units.

6. The system according to claim 5, wherein at least one of said authorization managing means and said copyright control means include means for inhibiting an access to data of at least one program when said at least one program and at least one data item have different execution unit IDs.

7. The system according to claim 6, wherein at least one of said authorization managing means and said copyright control means include means for allowing an access to the data of the program.

8. The system according to claim 1, wherein said copyright control means includes a copyright control program; and
   wherein said authorization managing means includes a use method control program and means for executing a program as an execution unit protected from an access from any other program and for using the authentication information as a software ID indicating the access right of the execution unit.

9. The system according to claim 8, wherein the program to be used, the use method control program, the copyright information and the authentication information include at least one of a personal ID assigned to a specific person, an apparatus ID assigned to a specific apparatus and a software ID assigned to specific software.

10. A software use method control system comprising:
    a plurality of software use method control means, each including software, software managing means for managing software, first storage means for storing authorization information corresponding to a use method for secondary use of the software and means for utilizing the software in accordance with the authorization information stored in the storage means; and
    communication means for achieving communication among software use method control units,
    each of said software use method control means further comprising:
      means for receiving, through said communication means, a request for using the software in a specific manner;
      second storage means for storing a program for controlling a manner of using the software, the program being stored at a storage location designated by the authorization information;
      means for determining, from the authorization information, whether the program is stored at the storage location designated by the authorization information; and
      copying means for copying the program from any other software use method control means storing the program, when the means for determining determines that the program is not stored at the storage location designated by the authorization information.

* * * * *